US012258511B2

(12) United States Patent
Anand et al.

(10) Patent No.: US 12,258,511 B2
(45) Date of Patent: Mar. 25, 2025

(54) COMPOSITIONS AND METHODS FOR INHIBITING ICE FORMATION ON SURFACES

(71) Applicant: The Board of Trustees of the University of Illinois, Urbana, IL (US)

(72) Inventors: Sushant Anand, Chicago, IL (US); Rukmava Chatterjee, Chicago, IL (US); Hassan Bararnia, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 765 days.

(21) Appl. No.: 17/464,603

(22) Filed: Sep. 1, 2021

(65) Prior Publication Data

US 2021/0395588 A1 Dec. 23, 2021

Related U.S. Application Data

(63) Continuation-in-part of application No. PCT/US2020/020714, filed on Mar. 2, 2020.

(60) Provisional application No. 62/812,619, filed on Mar. 1, 2019.

(51) Int. Cl.
*C09K 3/18* (2006.01)

(52) U.S. Cl.
CPC .................................... *C09K 3/18* (2013.01)

(58) Field of Classification Search
CPC ........................................................ C09K 3/18
See application file for complete search history.

(56) References Cited

U.S. PATENT DOCUMENTS

| | | | | |
|---|---|---|---|---|
| 2,373,727 | A | 4/1945 | West et al. | |
| 2,716,067 | A * | 8/1955 | Fain | C09K 5/20 62/82 |
| 7,270,767 | B1 | 9/2007 | Westmark et al. | |
| 2003/0012947 | A1 | 1/2003 | Carn | |
| 2008/0276837 | A1 | 11/2008 | Bhamidipati | |
| 2009/0039310 | A1 * | 2/2009 | Hietala | C09K 3/18 252/70 |
| 2010/0025622 | A1 * | 2/2010 | Blackwell | C09K 3/185 252/70 |
| 2013/0032316 | A1 | 2/2013 | Dhiman et al. | |
| 2013/0333789 | A1 | 12/2013 | Smith et al. | |
| 2017/0015865 | A1 * | 1/2017 | Bordoloi | C09D 7/61 |
| 2017/0167133 | A1 | 6/2017 | Sidheswaran et al. | |
| 2018/0230972 | A1 | 8/2018 | Martinez Goitandia et al. | |

FOREIGN PATENT DOCUMENTS

| | | | | |
|---|---|---|---|---|
| CN | 103436237 | A * | 12/2013 | C09K 3/18 |
| CN | 104130751 | A * | 11/2014 | C09K 3/18 |
| CN | 107365569 | A | 11/2017 | |
| CN | 108913097 | A * | 11/2018 | C09K 3/185 |
| GB | 2001095 | A * | 1/1979 | C09K 3/185 |
| KR | 2015030109 | A * | 3/2015 | C09K 5/00 |
| RU | 2280666 | C1 * | 7/2006 | C09K 3/18 |

OTHER PUBLICATIONS

International Search Report for PCT/US2020/020714, mailed Jun. 10, 2020, 2 pages.

* cited by examiner

*Primary Examiner* — Anthony J Green
(74) *Attorney, Agent, or Firm* — McDonnell Boehnen Hulbert & Berghoff LLP

(57) ABSTRACT

The present invention provides methods for inhibiting the formation of ice on a surface, reducing contact line pinning at a water-solid interface, inhibiting the transition of water from a vapor state to a solid state (i.e., desublimation), and decreasing adhesion of a substance to a surface, which methods comprise, in various aspects, applying to a surface one or more phase change materials where the phase change materials have a melting point above a temperature at which ice formation occurs on the surface. Anti-icing compositions are further provided.

16 Claims, 55 Drawing Sheets

A
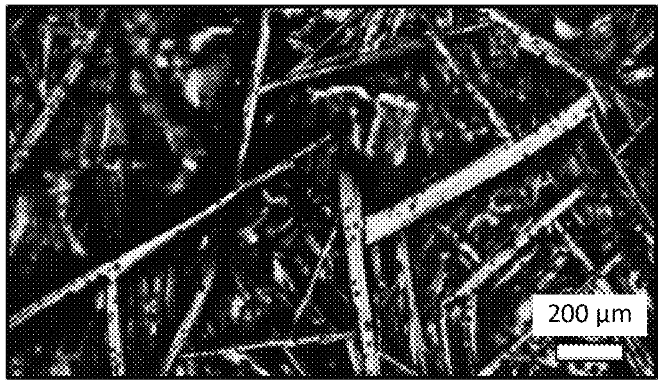
B
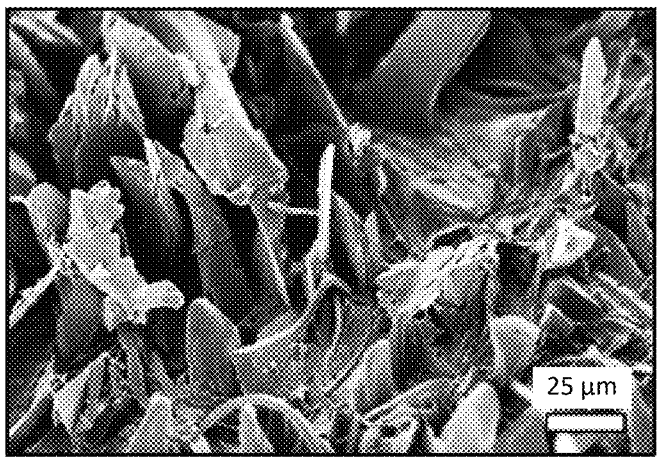
C
FIG. 16

Table 2. Properties of exemplary chemicals of the invention.

| Name | Cyclo-octane | Penta-decane | Tetra-decane | Hexa-decane | Cyclo-hexane | Benzene | DMSO | Glycerol |
|---|---|---|---|---|---|---|---|---|
| **CAS** | 292-64-8 | 629-62-9 | 629-59-4 | 544-76-3 | 110-82-7 | 71-43-2 | 67-68-5 | 56-81-5 |
| **Formula** | $C_8H_{16}$ | $C_{15}H_{32}$ | $C_{14}H_{30}$ | $C_{16}H_{34}$ | $C_6H_{12}$ | $C_6H_6$ | $C_2H_6OS$ | $C_3H_8O_3$ |
| **Mol. wt (g)** | 112 | 212 | 198 | 226 | 84.16 | 78 | 78.13 | 92.1 |
| **$T_{mp}$ (°C)** | 14.59 | 9.96 | 5.86 | 18.19 | 6.52 | 5.53 | 18.52 | 18.18 |
| **$L_c$ (kJ/kg)** | 21.52 | 162.9 | 227.2 | 235.6 | 31.8 | 126.3 | 183.9 | 198.5 |
| **ST, $\gamma_{oa}$ @AT (mN/m)** | 24.98 | 27.07 | 26.56 | 26.95 | 24.65 | 28.88 | 44.52 | 66.1 |
| **IFT, $\gamma_{ow}$@ AT (mN/m)** | 50 | 52.2 | 52.2 | 26.56 | 50 | 34.0 | × | × |
| **$\theta_{ow}$ @AT (deg)** | 146 | 132 | 132 | 124 | 148 | × / 148 | × | × |
| **$S_{ow}$ @AT (mN/m)** | -3 | -6.17 | -6.06 | -8.42 | -2.62 | 8.94 / -3.3 | × | × |
| **$S_{wo}$ @AT (mN/m)** | -97 | -96.43 | -98.34 | -98.18 | -97.38 | -77 / -67 | × | × |
| **μ, Liquid @MP (Pa.s)** | 1E-3 | 2.8E-3 | 3.1E-3 | 3.7E-3 | 1.2E-3 | 8.4E-3 | 2.2E-3 | 1.6761 |
| **ρ, Liquid @MP (kg/m³)** | 834 | 768 | 769.5 | 774.8 | 789.5 | 892 | 1102 | 1262 |
| **ρ, Solid@-15 °C (kg/m³)** | × | × | 914 | 902 | 856.1 | 1024 | 1230 | × |
| **Solubility of liquid PSL in water @AT (ppm)** | 7.9 | 1E-3 | 2.2E-3 | 9E-4 | 56.1 | 1755 | 1E6 | 1E6 |
| **Solubility of water in liq. PSL @AT (ppm)** | × | 56 | 57.952 | 53.97 | 157.86 | 691.88 | 1E6 | 1E6 |
| **Vapor pres. (mmHg)** | 16 | 4.9E-3 | 6.9E-3 | 8E-4 | 77.76 | 74.6 | 0.42 | × |

FIG. 46

COMPOSITIONS AND METHODS FOR INHIBITING ICE FORMATION ON SURFACES

CROSS-REFERENCE TO RELATED APPLICATIONS

This application is a continuation-in-part of International Patent Application No. PCT/US2020/020714, filed Mar. 2, 2020, which claims the benefit of priority of U.S. Provisional Patent Application No. 62/812,619, filed Mar. 1, 2019, both of which applications are hereby incorporated by reference in their entirety.

FIELD OF THE INVENTION

The present invention relates generally to methods and compositions for anti-icing and deicing.

BACKGROUND OF THE INVENTION

Ice and frost formation on surfaces afflicts various energy and transportation industries worldwide, causing extensive economic losses annually. For instance, the freezing upon impact of cloud-borne supercooled water droplets leads to ice accretion on aircraft surfaces causing failure of critical instruments. Aircraft icing prior to takeoff is also a significant problem such that the Federal Aviation Administration requires that all ice and snow accumulated under freezing conditions be removed from the aircraft prior to takeoff. Surface icing/frosting also causes expensive power outages and compromises the operational safety of land vehicles and marine vessels (e.g., freezing water spray and "ice fog"), wind turbines and thermal management systems. Strategies to mitigate such hazards include active mechanical, chemical and electro-thermal deicing techniques that are energy and cost intensive, and often environmentally detrimental (e.g., aircraft deicing fluid) or corrosive (e.g., road salt).

Consequently, considerable efforts have been directed into developing surfaces that impede ice formation or have low ice adhesion on the surface. Pursuit of this goal has led to the development of engineered surfaces that show extreme water repellency, such as superhydrophobic surfaces (SHS). However, SHS are intolerant of high humidity and occurrence of ice/frost nucleation randomly within their surface texture causes loss of superhydrophobicity. Although some of these difficulties can be overcome by using lubricant infused surfaces (LIS), the lubricant itself is prone to depletion by wicking into the frost, thereby necessitating periodic lubricant replenishment. Thus, strategies to prevent icing/frosting remain a grand challenge.

SUMMARY OF THE INVENTION

The invention provides a method for inhibiting the formation of ice on a surface, where the method comprises applying to the surface one or more phase change materials, wherein the phase change materials have a melting point above a temperature at which ice formation occurs on the surface.

The invention also provides a method for reducing contact line pinning at a water-solid interface, where the method comprises applying to a surface of the solid one or more phase change materials, which phase change materials have a melting point above the temperature at which the water exhibits a phase change from liquid to solid on the surface.

The invention further provides a method for inhibiting the transition of water from a vapor state to a solid state (i.e., desublimation) on a surface comprising applying to the surface one or more phase change materials, which phase change materials have a melting point above the temperature at which the water exhibits a phase change from a vapor to solid on the surface.

The invention further provides a method for reducing the power required to transport a heated fluid through a pipeline comprising applying to an inner surface of the pipeline one or more phase change materials, which phase change materials have a melting point below the temperature of the fluid in the pipeline so that the phase change material is partially or fully in a liquid state.

The invention provides a method for decreasing adhesion of a substance to a surface comprising applying to the surface one or more phase change materials, where the phase change materials have a melting point above the temperature at which a substance condenses on the surface.

The invention also provides a method for increasing the operating efficiency of a wind turbine comprising applying to one or more surfaces of the turbine one or more phase change materials, wherein the phase change materials have a melting point above the temperature at which water condenses on the surface.

The invention further provides a method for increasing the operating efficiency of a steam turbine comprising applying to one or more surfaces of the turbine one or more phase change materials, wherein the phase change materials have a melting point above the temperature at which water condenses on the surface.

The invention also provides deicing or anti-icing compositions comprising one or more phase change materials, optionally further comprising one or more solvents, diluents, thickeners, surfactants, pigments, carriers, biologically active ingredients or emulsifiers. These can be in a variety of forms, e.g., provided as liquids, polymers or nanoparticles. In certain embodiments as otherwise described herein, the deicing or anti-icing compositions comprise a phase change material incorporated within a polymer network, for example, an organohydrogel. These and other aspects and features and advantages of the present invention will be more fully understood from the following detailed description of the invention taken together with the accompanying claims. It is noted that the scope of the claims is defined by the recitations therein and not by the specific discussion of features and advantages set forth in this disclosure.

BRIEF DESCRIPTION OF THE DRAWINGS

FIG. 16 shows characterization of solidified pentadcane (SP) surface.

FIG. 46 shows Table 2.

DETAILED DESCRIPTION OF THE INVENTION

Figure 1:
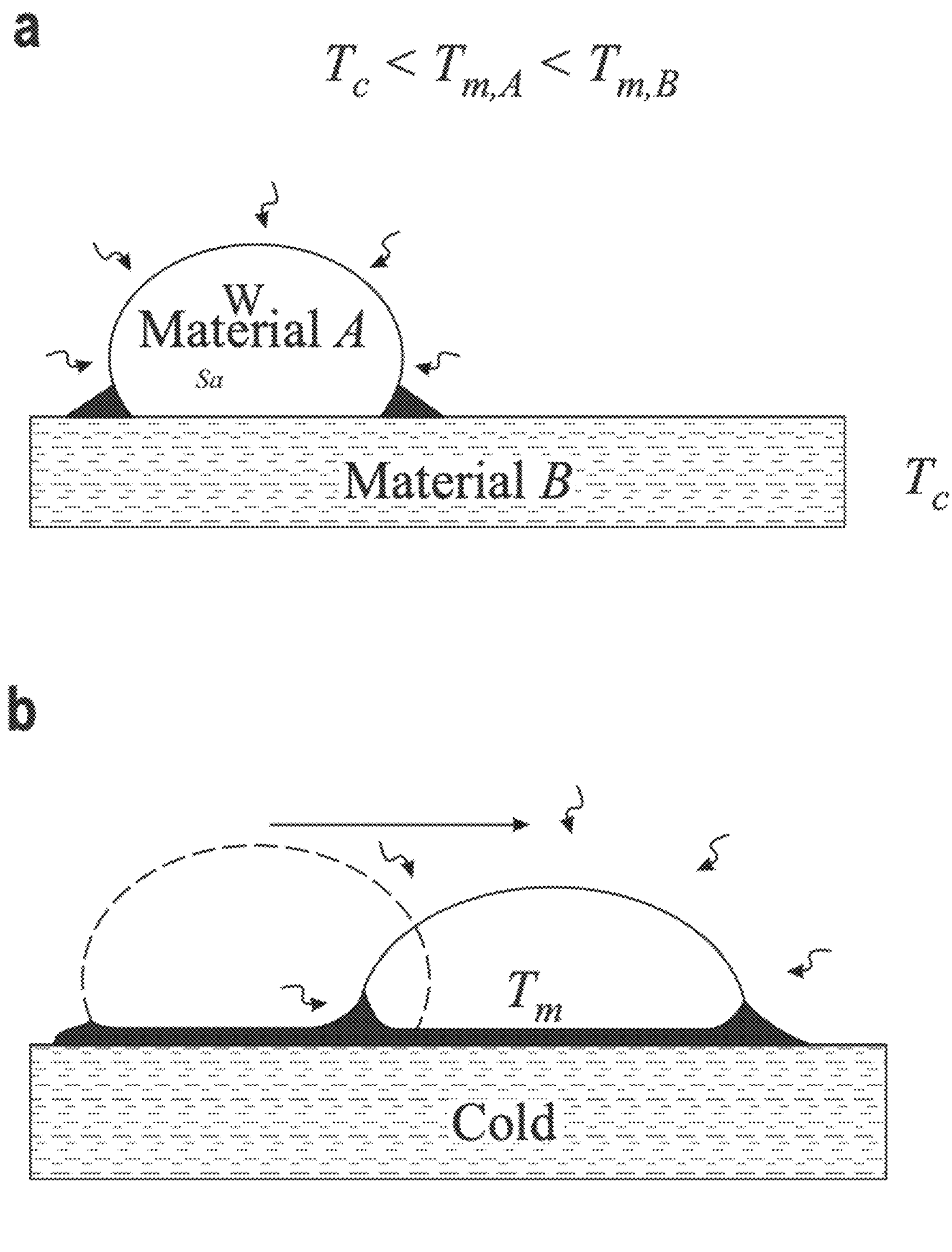
FIG. 1 shows a schematic describing the present invention for inhibiting or delaying freezing during condensation.

Before describing the present inventions in detail, a number of terms will be defined. As used herein, the singular forms "a", "an", and "the" include plural referents unless the context clearly dictates otherwise.

As used herein, "phase change material" (PCM), also referred to as a "phase switching liquid" (PSL), means any material having a freeze point greater than the material whose freezing is to be inhibited or delayed and is non-reactive towards the substrate material, and non-reactiveness towards the material whose freezing is to be delayed in cases where the PCM comes in direct contact with such material. A non-limiting list of PCMs is provided in Table 1. An "S-" prepended to a "PCM" or "PSL" refers to the PCM or PSL being in a partially or fully solid state.

"Anti-icing" means the general term in this art. It usually describes the use of some external force, heating, shock, a liquid (gel) composition; whose function is to slow or to stop the icing process (e.g., through condensation frosting or by preventing drops impacting on a cold surface to freeze) or to render any icing which might occur to be easily removed.

"Effective amount" means the amount sufficient to provide the desired properties of an ice or deice to meet the particular application requirements, for example, a clear automotive windshield.

"Non-toxic" means the benign nature of the interaction of the component or composition with respect to the tolerance by specific plant or animal organisms (i.e. vegetables, animals, humans, and aquatic life), at the concentrations of normal use.

"Protection time" means the useful time provided by the deicing step. There are many variables affecting the protection time: e.g. wind velocity, precipitation rate, outside air temperature (OAT), aircraft skin temperature, solar radiation, types of precipitation or other hydrometeorological deposits (drizzle, rain, freezing drizzle, freezing rain, snow, snow pellets, snow grains, ice pellets, hail, hailstones, ice crystals, dew, frost, hoar frost, rime, glaze, and/or blowing snow), jet blast from other aircraft, sudden changes in temperature or precipitation type or rate, etc. All these can affect the holdover protection time.

"Ice" means all forms of frozen water, whether by freezing of liquid water or desublimation of water vapor, by whatever names they are known, including snow, sleet, ice, frost and the like.

It is against the above background that the present invention provides certain advantages and advancements over the prior art.

In one embodiment of the invention, a method for inhibiting the formation of ice on a surface is provided, comprising applying to the surface one or more phase change materials, wherein the phase change materials have a melting point above a temperature at which ice formation occurs on the surface. The one or more phase change materials may have, e.g., a melting point in the range of 0° C. to 30° C., e.g., 0° C. to 25° C., or 0° C. to 20° C., or 0° C. to 15° C., or 0° C. to 10° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments, the method for inhibiting the formation of ice on a surface may comprise allowing water to be disposed on the surface (e.g., by condensation) after applying to the surface the one or more phase change materials, wherein the inhibition of the formation of ice comprises delaying the freezing of the water. In certain desirable embodiments, the surface is allowed to reach a temperature of 0° C. or colder (e.g., −10° C. or colder, or even −15° C. or colder) while the water is disposed thereon. For example, the surface can be at one of these temperatures before water is disposed thereon, or reach that temperature after water is disposed thereon.

In some embodiments, the one or more phase change materials makes direct full contact with the water at an interface between the one or more phase change materials and the water; whereas, in other embodiments the one or more phase change materials makes direct partial contact with the water at an interface between the one or more phase change materials and the water.

In certain embodiments, the one or more phase change materials is supported entirely by the surface, while in others such phase change materials are incorporated within one or more structures or textures on the surface. For example, in some embodiments, the phase change material is incorporated within a polymer network. In particular embodiments, the polymer network is an organohydrogel. The organohydrogel, in particular embodiments, may be formed from natural or biosynthetic polymers, such as glycosaminoglycans (e.g., hyaluronic acid, chrondroitin sulfates, chitin, heparin, keratin sulfate, keratosulfate), polysaccharides (e.g., carboxymethylcellulose, oxidized regenerated cellulose, natural gum, agar, agarose, sodium alginate, carrageenan, fucoidan, pectin, amylopectin), proteins and polypeptides (e.g., collagen, gelatin, and derivatives and hydrolysis products thereof). These materials may be extracted from a natural source, purified, and optionally hydrolyzed and/or derivatized. For example, in certain embodiments, the organohydrogel may comprise gelatin, cellulose (e.g., is gelatin, or a derivative thereof). In other embodiments, the polymer network may comprise a gel formed from one or more synthetic polymers. For example, in particular embodiments, the polymer network comprises (meth)acrylate, such as those based on polymers of acrylic acid such as poly(methyl methacrylate) or poly(hydroxyethylmethyl acrylate), 2-ethoxyethylacrylate, poly(ethylene glycol), poly(vinyl alcohol) polyurethanes, or poly(vinyl pyrrolidone).

The phase change material may be incorporated within a polymer network by any suitable technique known in the art. For example, the phase change material may be incorporated within the polymer network by contacting the polymer network with a phase change material, wherein the phase change material is in its liquid state. In some embodiments, the polymer network is dehydrated before contacting with the phase change material. Examples of dehydration techniques include exposure to heat, reduced pressure, lyophilization, or combinations thereof.

In other embodiments, the one or more phase change materials is encapsulated within a secondary solid material that is in contact with the water such that the secondary solid material prevents a direct contact between the water and the one or more phase change materials.

The one or more phase change materials can be provided in a composition that additionally includes a variety of additional material, for example, diluents, thickeners, surfactants, pigments, carriers, biologically active ingredients or emulsifiers. These can be in a variety of forms, e.g., provided as liquids, polymers or nanoparticles. Diluents can include solvents to help disperse the phase change material; such solvents can be, for example, volatile, such that they evaporate upon application leaving behind a layer of one or more phase change materials, or can be relatively non-volatile and remain as part of the layer. Thickeners, e.g., polymeric thickeners, can be provided to increase the viscosity of the formulation, in order to provide relatively thicker and more tenacious layers upon activation. For example, in certain embodiments, the polymeric thickeners are soluble in the phase change material.

Surfactants and emulsifiers can be useful in providing formulations. In single-phase change material formulations, a surfactant or emulsifier be used to adjust wetting characteristics of the composition. A surfactant or emulsifier can also be used to provide the phase change material as an emulsion in water for convenient dispensing. When two or more immiscible phase change materials are present, the surfactant or emulsifier can be used to compatibilize the materials in an emulsion. A variety of surfactants and emulsifiers can be used, e.g., nonionic surfactants like ethylene oxide/propylene oxide/ethylene oxide block copolymers or anionic/cationic surfactants like sodium stearate, sodium dodecylbenzenesulfonate and the like. Surfactants and emulsifiers can be present in the compositions in a variety of amounts, e.g., up to 50%, up to 25%, up to 15%, up to 10%, or in the range of 0.5-50%, 0.5-25%, 0.5-15%, or 0.5-10%, by weight. Co-stabilizing compounds like silicone oils can be present in the system up to 10% or in the range of 0.5-10%, 0.5-5%, 0.5-2%, or 0.5-1%, by weight. Particulate materials such as nanoparticulate materials can be included in composition, to provide additional functionality.

In certain embodiments, the one or more of the phase change materials is immiscible with water. For example, in certain embodiments, one or more of the phase change materials may comprise cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclo-hexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In other embodiments, the one or more of the phase change materials is miscible with water. For example, in certain embodiments, one or more of the phase change materials may comprise dimethyl sulfoxide (DMSO), 1-bromonaphthalene (which is partially miscible), ethylenediamine, ethanolamine, formamide, and glycerol.

In some embodiments, the phase change materials comprise a mixture of two or more phase change materials, which materials may be miscible in one another or immiscible with one another. The mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water.

In some embodiments of the aforementioned method for inhibiting the formation of ice on a surface, the one or more phase change materials may be mixed with one or more deicing liquids, some of which deicing liquids may comprise a freezing point depressant. In some embodiments, the freezing point depressant may comprise a glycol-based fluid, comprising, in certain embodiments, one or more of propylene glycol, ethylene glycol and diethylene glycol. The deicing liquid may further comprise one or more additives, which additives may comprise benzotriazole and methyl-substituted benzotriazoles, alkylphenols and alkylphenol ethoxylates, triethanolamine, high molecular weight, non-linear polymers and dyes.

In certain embodiments that include one or more deicing liquids, the deicing liquids have a melting point below the freezing point of water, provided that the phase change materials comprise greater than 50% by weight of the mixture. In embodiments that include one or more deicing liquids, the mixture may further comprise one or more water miscible deicing liquids.

In some embodiments that include one or more deicing liquids, the mixture is in the form of a solid at a temperature at which ice formation occurs on the surface, a liquid, an emulsion, a blend, or a eutectic mixture.

In some embodiments of the aforementioned method for inhibiting the formation of ice on a surface, the one or more phase change materials are each in a phase that has a melting point above a temperature at which ice formation occurs on the surface. The one or more phase change materials may each be in a phase that has a melting point in the range of 0° C. to 30° C., e.g., 0° C. to 25° C., or 0° C. to 20° C., or 0° C. to 15° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments of the aforementioned method for inhibiting the formation of ice on a surface, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In another embodiment of the invention, a method for reducing contact line pinning at a water-solid interface is provided, comprising applying to a surface of the solid one or more phase change materials, wherein the phase change materials have a melting point above the temperature at which the water exhibits a phase change from liquid to solid on the surface. In some embodiments, the one or more phase change materials may be partially or fully in a liquid state at the water-solid interface, and wherein when partially or fully melted, the phase change material acts as a lubricant that reduces contact line pins. The one or more phase change materials may have a melting point in the range of 0° C. to 30° C., e.g., 0° C. to 25° C., or 0° C. to 20° C., or 0° C. to 15° C., or 0° C. to 10° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments, the method for reducing contact line pinning at a water-solid interface may comprise allowing water to be disposed on the surface (e.g., by condensation) after applying to the surface the one or more phase change materials, wherein the reducing of contact line pinning at a water-solid interface comprises delaying the freezing of the water.

In some embodiments, the one or more phase change materials makes direct full contact with the water at an interface between the one or more phase change materials and the water; whereas, in other embodiments the one or more phase change materials makes direct partial contact with the water at an interface between the one or more phase change materials and the water.

In certain embodiments, the one or more phase change materials is supported entirely by the surface, while in others such phase change materials are incorporated within one or more structures or textures on the surface. In other embodiments, the one or more phase change materials is encapsulated within a secondary solid material that is in contact with the water such that the secondary solid material prevents a direct contact between the water and the one or more phase change materials.

In certain embodiments, the one or more of the phase change materials is immiscible with water and may comprise cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclohexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In other embodiments, the one or more of the phase change materials is miscible with water, and may comprise DMSO, 1-bromonaphthalene, ethylenediamine, ethanolamine, formamide, and glycerol.

In some embodiments, the phase change materials comprise a mixture of two or more phase change materials, which materials may be miscible in one another or immiscible with one another. The mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water.

In some embodiments of the aforementioned method for reducing contact line pinning at a water-solid interface, the one or more phase change materials may be mixed with one or more deicing liquids, some of which deicing liquids may comprise a freezing point depressant. In some embodiments, the freezing point depressant may comprise a glycol-based fluid, comprising, in certain embodiments, one or more of propylene glycol, ethylene glycol and diethylene glycol. The deicing liquid may further comprise one or more additives, which additives may comprise benzotriazole and methyl-substituted benzotriazoles, alkylphenols and alkylphenol ethoxylates, triethanolamine, high molecular weight, non-linear polymers and dyes.

In certain embodiments that include one or more deicing liquids, the deicing liquids have a melting point below the freezing point of water, provided that the phase change materials comprise greater than 50% by weight of the mixture. In embodiments that include one or more deicing liquids, the mixture may further comprise one or more water miscible deicing liquids.

In some embodiments that include one or more deicing liquids, the mixture is in the form of a solid at a temperature at which ice formation occurs on the surface, a liquid, an emulsion, a blend, or a eutectic mixture.

In some embodiments of the aforementioned method for reducing contact line pinning at a water-solid interface, the one or more phase change materials are each in a phase that has a melting point above a temperature at which ice formation occurs on the surface. The one or more phase change materials may each be in a phase that has a melting point in the range of 0° C. to 30° C., e.g., 0° C. to 25° C., or 0° C. to 20° C., or 0° C. to 15° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments of the aforementioned method for reducing contact line pinning at a water-solid interface, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In one embodiment, a method for inhibiting the transition of water from a vapor state to a solid state (desublimation) on a surface is provided, comprising applying to the surface one or more phase change materials, wherein the phase change materials have a melting point above the temperature at which the water exhibits a phase change from a vapor to solid on the surface. The one or more phase change materials may have a melting point in the range of 0° C. to 30° C., e.g., 0° C. to 25° C., or 0° C. to 20° C., or 0° C. to 15° C., or 0° C. to 10° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments, the method for inhibiting the transition of water from a vapor state to a solid state (desublimation) on a surface may comprise allowing water to be disposed on the surface (e.g., by condensation) after applying to the surface the one or more phase change materials, wherein the inhibition of the transition of water from a vapor state to a solid state comprises delaying the freezing of the water.

In some embodiments, the one or more phase change materials makes direct full contact with the water at an interface between the one or more phase change materials and the water; whereas, in other embodiments the one or more phase change materials makes direct partial contact with the water at an interface between the one or more phase change materials and the water.

In certain embodiments, the one or more phase change materials is supported entirely by the surface, while in others such phase change materials are incorporated within one or more structures or textures on the surface. In other embodiments, the one or more phase change materials is encapsulated within a secondary solid material that is in contact with the water such that the secondary solid material prevents a direct contact between the water and the one or more phase change materials.

In certain embodiments, the one or more of the phase change materials is immiscible with water and may comprise cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclohexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In other embodiments, the one or more of the phase change materials is miscible with water, and may comprise DMSO, 1-bromonaphthalene, ethylenediamine, ethanolamine, formamide, and glycerol.

In some embodiments, the phase change materials comprise a mixture of two or more phase change materials, which materials may be miscible in one another or immiscible with one another. The mixture may further be stabilized by one or more surfactants or nanoparticles, or a combination thereof. In certain embodiments the mixture may comprise at least one phase change material that is miscible with water, and at least one phase change material is immiscible with water.

In some embodiments of the aforementioned method for inhibiting the transition of water from a vapor state to a solid state (desublimation) on a surface, the one or more phase change materials may be mixed with one or more deicing liquids, some of which deicing liquids may comprise a freezing point depressant. In some embodiments, the freezing point depressant may comprise a glycol-based fluid, comprising, in certain embodiments, one or more of propylene glycol, ethylene glycol and diethylene glycol. The deicing liquid may further comprise one or more additives, which additives may comprise benzotriazole and methyl-substituted benzotriazoles, alkylphenols and alkylphenol ethoxylates, triethanolamine, high molecular weight, non-linear polymers and dyes.

In certain embodiments that include one or more deicing liquids, the deicing liquids have a melting point below the freezing point of water, provided that the phase change materials comprise greater than 50% by weight of the mixture. In embodiments that include one or more deicing liquids, the mixture may further comprise one or more water miscible deicing liquids.

In some embodiments that include one or more deicing liquids, the mixture is in the form of a solid at a temperature at which ice formation occurs on the surface, a liquid, an emulsion, a blend, or a eutectic mixture.

In some embodiments of the aforementioned method for inhibiting the transition of water from a vapor state to a solid state (desublimation) on a surface, the one or more phase change materials are each in a phase that has a melting point above a temperature at which ice formation occurs on the surface. The one or more phase change materials may each be in a phase that has a melting point in the range of 0° C. to 30° C., e.g., 0° C. to 25° C., or 0° C. to 20° C., or 0° C. to 15° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments of the aforementioned method for inhibiting the transition of water from a vapor state to a solid state (desublimation) on a surface, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi e R^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In one embodiment of the invention, a method for reducing the power required to transport a heated fluid through a pipeline comprising applying to an inner surface of the pipeline one or more phase change materials, wherein the phase change materials have a melting point below the temperature of the fluid in the pipeline so that the phase change material is partially or fully in a liquid state. When partially or fully melted, the phase change material acts as a lubricant for the fluid in the pipeline, which fluid may comprise a liquid petroleum product, which, in some embodiments may be crude oil.

In some embodiments, the one or more phase change materials makes direct full contact with the heated fluid at an interface between the one or more phase change materials and the heated fluid; whereas, in other embodiments the one or more phase change materials makes direct partial contact with the heated fluid at an interface between the one or more phase change materials and the heated fluid.

In certain embodiments, the one or more phase change materials is supported entirely by the surface, while in others such phase change materials are incorporated within one or more structures or textures on the surface. In other embodiments, the one or more phase change materials is encapsulated within a secondary solid material that is in contact with the heated fluid such that the secondary solid material prevents a direct contact between the heated fluid and the one or more phase change materials.

In certain embodiments, the one or more of the phase change materials is immiscible with water, while in others the one or more of the phase change materials is miscible with water.

In some embodiments, the phase change materials comprise a mixture of two or more phase change materials, which materials may be miscible in one another or immiscible with one another. In some embodiments, the mixture may comprise at least one phase change material that is miscible with water, and at least one phase change material that is immiscible with water. The mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water.

In certain embodiments, the mixture of one or more phase change materials is in the form of a solid below the temperature of the heated fluid in the pipeline, in the form of a liquid, of an emulsion, of a blend or of a eutectic mixture.

In some embodiments of the aforementioned method for reducing the power required to transport a heated fluid through a pipeline, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In one embodiment, a method for decreasing adhesion of a substance to a surface is provided, comprising applying to the surface one or more phase change materials, wherein the phase change materials have a melting point above the temperature at which a substance condenses on the surface. The one or more phase change materials may partially or fully change to a liquid state at an interface between the one or more phase change materials and the substance condensing on the surface. When partially or fully melted, the phase change material acts as a lubricant for the substance, decreasing adhesion of the substance to the surface.

In some embodiments, the one or more phase change materials may have a melting point in the range of 0° C. to 30° C., e.g., 0° C. to 25° C., or 0° C. to 20° C., or 0° C. to 15° C., or 0° C. to 10° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments, the method for decreasing adhesion of a substance to a surface may comprise allowing a substance to be disposed on the surface (e.g., by condensation) after applying to the surface the one or more phase change materials, wherein the inhibition of the formation of substance in a frozen state comprises delaying the freezing of the substance disposed on the surface.

In some embodiments, the one or more phase change materials makes direct full contact with the substance disposed on the surface at an interface between the one or more phase change materials and the substance; whereas, in other embodiments the one or more phase change materials makes direct partial contact with the substance disposed on the surface at an interface between the one or more phase change materials and the substance.

In certain embodiments, the one or more phase change materials is supported entirely by the surface, while in others such phase change materials are incorporated within one or more structures or textures on the surface. In other embodiments, the one or more phase change materials is encapsulated within a secondary solid material that is in contact with the substance disposed on the surface such that the secondary solid material prevents a direct contact between the substance disposed on the surface and the one or more phase change materials.

In certain embodiments, the one or more of the phase change materials is immiscible with water and may comprise cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclohexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In other embodiments, the one or more of the phase change materials is miscible with water, and may comprise DMSO, 1-bromonaphthalene, ethylenediamine, ethanolamine, formamide, and glycerol.

In some embodiments, the phase change materials comprise a mixture of two or more phase change materials, which materials may be miscible in one another or immiscible with one another. The mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water.

In some embodiments of the aforementioned method for decreasing adhesion of a substance to a surface, the one or more phase change materials may be mixed with one or more deicing liquids, some of which deicing liquids may comprise a freezing point depressant. In some embodiments, the freezing point depressant may comprise a glycol-based fluid, comprising, in certain embodiments, one or more of propylene glycol, ethylene glycol and diethylene glycol. The deicing liquid may further comprise one or more additives, which additives may comprise benzotriazole and methyl-substituted benzotriazoles, alkylphenols and alkylphenol ethoxylates, triethanolamine, high molecular weight, non-linear polymers and dyes.

In certain embodiments that include one or more deicing liquids, the deicing liquids have a melting point below the freezing point of water, provided that the phase change materials comprise greater than 50% by weight of the mixture. In embodiments that include one or more deicing liquids, the mixture may further comprise one or more water miscible deicing liquids.

In some embodiments that include one or more deicing liquids, the mixture is in the form of a solid at a temperature at which ice formation occurs on the surface, a liquid, an emulsion, a blend, or a eutectic mixture.

In some embodiments of the aforementioned method for decreasing adhesion of a substance to a surface, the one or more phase change materials are each in a phase that has a melting point above a temperature at which the substance freezes on the surface. The one or more phase change materials may each be in a phase that has a melting point in the range of 0° C. to 30° C., e.g., 0° C. to 25° C., or 0° C. to 20° C., or 0° C. to 15° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments of the aforementioned method for decreasing adhesion of a substance to a surface, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In some embodiments, the substance may comprise water vapor. The substance may also comprise liquid water, liquid water further comprising one or more solutes, where such solutes may comprise salts, such salts comprising sodium chloride, calcium chloride, potassium chloride, magnesium chloride, sodium acetate, calcium magnesium acetate, ammonium nitrate, ammonium sulfate, and blends thereof, optionally including urea.

In some embodiments, the substance comprises water from a natural or man-made body of water, in which natural bodies of water may comprise a pond, lake, river, ocean or sea.

In one embodiment, a method for increasing the operating efficiency of a wind turbine is provided, comprising applying to one or more surfaces of the turbine one or more phase change materials, wherein the phase change materials have a melting point above the temperature at which water condenses on the surface. The one or more phase change materials may partially or fully change to a liquid state at an interface between the one or more phase change materials and the water condensing on the surface. When partially or fully melted, the phase change material acts as a lubricant for the water, decreasing adhesion of the substance to the surface. The one or more phase change materials may have a melting point in the range of 0° C. to 30° C., e.g., 0° C. to 25° C., or 0° C. to 20° C., or 0° C. to 15° C., or 0° C. to 10° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments, the method for increasing the operating efficiency of a wind turbine may comprise allowing water to be disposed on the surface (e.g., by condensation) after applying to the surface the one or more phase change materials, wherein the increasing of the operating efficiency of a wind turbine comprises one or more phase change materials partially or fully changing to a liquid state at an interface between the one or more phase change materials and the water condensing on the surface, thereby acting as a lubricant to the water, increasing the probability of it moving or falling off the surface of the wind turbine. In some embodiments, the method for increasing the operating efficiency of a wind turbine may comprise allowing water to be disposed on the surface (e.g., by condensation) after applying to the surface the one or more phase change materials, wherein the increasing of the operating efficiency of a wind turbine comprises delaying the freezing of the water.

In some embodiments, the one or more phase change materials makes direct full contact with the water at an interface between the one or more phase change materials and the water; whereas, in other embodiments the one or more phase change materials makes direct partial contact with the water at an interface between the one or more phase change materials and the water.

In certain embodiments, the one or more phase change materials is supported entirely by the surface, while in others such phase change materials are incorporated within one or more structures or textures on the surface. In other embodiments, the one or more phase change materials is encapsulated within a secondary solid material that is in contact with the water such that the secondary solid material prevents a direct contact between the water and the one or more phase change materials.

In certain embodiments, the one or more of the phase change materials is immiscible with water and may comprise cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclohexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In other embodiments, the one or more of the phase change materials is miscible with water, and may comprise DMSO, 1-bromonaphthalene, ethylenediamine, ethanolamine, formamide, and glycerol.

In some embodiments, the phase change materials comprise a mixture of two or more phase change materials, which materials may be miscible in one another or immiscible with one another. The mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water.

In some embodiments of the aforementioned method for increasing the operating efficiency of a wind turbine, the one or more phase change materials may be mixed with one or more deicing liquids, some of which deicing liquids may comprise a freezing point depressant. In some embodiments, the freezing point depressant may comprise a glycol-based fluid, comprising, in certain embodiments, one or more of propylene glycol, ethylene glycol and diethylene glycol. The deicing liquid may further comprise one or more additives, which additives may comprise benzotriazole and methyl-substituted benzotriazoles, alkylphenols and alkylphenol ethoxylates, triethanolamine, high molecular weight, non-linear polymers and dyes.

In certain embodiments that include one or more deicing liquids, the deicing liquids have a melting point below the freezing point of water, provided that the phase change materials comprise greater than 50% by weight of the mixture. In embodiments that include one or more deicing liquids, the mixture may further comprise one or more water miscible deicing liquids.

In some embodiments that include one or more deicing liquids, the mixture is in the form of a solid at a temperature at which ice formation occurs on the surface, a liquid, an emulsion, a blend, or a eutectic mixture.

In some embodiments of the aforementioned method for inhibiting the formation of ice on a surface, the one or more phase change materials are each in a phase that has a melting point above a temperature at which ice formation occurs on the surface. The one or more phase change materials may each be in a phase that has a melting point in the range of 0° C. to 30° C., e.g., 0° C. to 25° C., or 0° C. to 20° C., or 0° C. to 15° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

In some embodiments of the aforementioned method for increasing the operating efficiency of a wind turbine, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In one embodiment, a method for increasing the operating efficiency of a steam turbine is provided, comprising applying to one or more surfaces of the turbine one or more phase change materials, wherein the phase change materials have a melting point above the temperature at which water condenses on the surface. The one or more phase change materials may partially or fully change to a liquid state at an interface between the one or more phase change materials and water condensing on the surface. When partially or fully melted, the phase change material acts as a lubricant for water condensing on the surface decreasing adhesion of the water to the surface.

In some embodiments, the one or more phase change materials makes direct full contact with the water at an interface between the one or more phase change materials and the water; whereas, in other embodiments the one or more phase change materials makes direct partial contact with the water at an interface between the one or more phase change materials and the water.

In certain embodiments, the one or more phase change materials is supported entirely by the surface, while in others such phase change materials are incorporated within one or more structures or textures on the surface. In other embodiments, the one or more phase change materials is encapsulated within a secondary solid material that is in contact with the water such that the secondary solid material prevents a direct contact between the water and the one or more phase change materials.

In certain embodiments, the one or more of the phase change materials is immiscible with water, while in others the one or more of the phase change materials is miscible with water.

In some embodiments, the phase change materials comprise a mixture of two or more phase change materials, which materials may be miscible in one another or immiscible with one another. In some embodiments, the mixture may comprise at least one phase change material that is miscible with water, and at least one phase change material that is immiscible with water. The mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water.

In certain embodiments, the mixture of one or more phase change materials is in the form of a solid at the temperature at which water condenses on the surface, in the form of a liquid, of an emulsion, of a blend or of a eutectic mixture.

In some embodiments, the one or more phase change materials are each in a phase that has a melting point above a temperature at which water condenses on the surface.

In some embodiments of the aforementioned method for increasing the operating efficiency of a steam turbine, the one or more phase change materials may each in a phase that has a melting point in the range of 100° C. to 130° C., e.g., 100° C. to 125° C., or 100° C. to 120° C., or 100° C. to 115° C., or 105° C. to 130° C., or 105° C. to 125° C., or 105° C. to 120° C., or 105° C. to 115° C., or 110° C. to 130° C., or 110° C. to 125° C., or 110° C. to 120° C., or 115° C. to 130° C., or 115° C. to 125° C.

In some embodiments of the aforementioned method for increasing the operating efficiency of a steam turbine, the one or more phase change materials may form one or more layers on the surface with an average roughness of ≤1 micron and a Z-roughness (i.e., Z-axis; off the plane of the surface) of ≤1 micron. In other embodiments, the one or more phase change materials may form one or more layers on the surface with an average roughness of >1 micron and a Z-roughness of >1 micron.

In some embodiments, the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

In some embodiments, the one or more phase change materials may form one or more layers on the surface wherein the one or more layers may comprise an average inter-droplet distance ($L_{avg}$) to droplet size ratio ($D_{avg}$) of >1.3, may comprise an average inter-droplet distance ($L_{avg}$) of >80 microns and may comprise a bridging parameter <1.

In certain embodiments, a surface comprises one or more surfaces of a motorized or non-motorized vehicle. Such vehicles may comprise aircraft (e.g., airplanes, gliders, helicopters and the like), watercraft (e.g., boats, ships, rafts and the like) and land-going vehicles (e.g., automobiles, trucks, tractors, tanks and the like), such land-going vehicles comprising one or more wheels or tracks.

In some embodiments, a surface comprises one or more surfaces of a power transmission apparatus, which in some embodiments may comprise a power transmission line.

In some embodiments, a surface comprises one or more surfaces of a plant susceptible to frost damage.

In one embodiment, a deicing or anti-icing composition is provided, comprising one or more phase change materials, and optionally comprising one or more solvents, diluents, thickeners, surfactants, pigments, carriers, biologically active ingredients or emulsifiers. In certain embodiments, the deicing or anti-icing composition that optionally comprises one or more solvents, diluents, thickeners, surfactants, pigments, carriers, biologically active ingredients or emulsifiers is a paint or a pesticide.

In some embodiments, the deicing or anti-icing composition is a solid at ≤0° C., or is a liquid, or a blend, an emulsion or a eutectic mixture.

In certain embodiments of the deicing or anti-icing composition, the one or more of the phase change materials is immiscible with water and may comprise cyclohexane, peanut oil, corn oil, eucalyptol, 1-phenyl dodecane, phenylcyclohexane, fennel oil, 2'-hydroxy-acetophenone, ethyl cinnamate, octanoic acid, anise oil, cyclo-hexanol, cyclooctane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In other embodiments of the deicing or anti-icing composition, the one or more of the phase change materials is miscible with water, and may comprise DMSO, 1-bromonaphthalene, ethylenediamine, ethanolamine, formamide, and glycerol.

In some embodiments of the deicing or anti-icing composition, the phase change materials comprise a mixture of two or more phase change materials, which materials may be miscible in one another or immiscible with one another.

In some embodiments of the deicing or anti-icing compositions, the one or more phase change materials may be mixed with one or more deicing liquids, some of which deicing liquids may comprise a freezing point depressant. In some embodiments, the freezing point depressant may comprise a glycol-based fluid, comprising, in certain embodiments, one or more of propylene glycol, ethylene glycol and diethylene glycol. The deicing liquid may further comprise one or more additives, which additives may comprise benzotriazole and methyl-substituted benzotriazoles, alkylphenols and alkylphenol ethoxylates, triethanolamine, high molecular weight, nonlinear polymers and dyes.

In certain embodiments of deicing or anti-icing compositions that include one or more deicing liquids, the deicing liquids have a melting point below the freezing point of water, provided that the phase change materials comprise greater than 50% by weight of the mixture. In embodiments that include one or more deicing liquids, the mixture may further comprise one or more water miscible deicing liquids.

In some embodiments of the deicing or anti-icing compositions, wherein the phase change materials are immiscible with one another, the mixture may further be stabilized by one or more surfactants, emulsifiers, or nanoparticles, or a combination thereof, as described above. In certain embodiments the mixture may comprise at least one phase change material that is miscible with water, and at least one phase change material is immiscible with water. Certain embodiments comprising immiscible phase change materials may further comprise one or more water miscible deicing liquids, and some of these embodiments may exist in the form of an emulsion or blend.

In certain embodiments of the deicing or anti-icing compositions, the phase change materials are substantially transparent when deposited on a surface, which substantial transparency may exhibit a total transmittance in the range of 50% to 100%, e.g., 50% to 100%, 55% to 100%, 60% to 100%, m 65% to 100%, 70% to 100%, 75% to 100%, 80% to 100%, 85% to 100%, 90% to 100%, 95% to 100%, 96% to 100%, 97% to 100%, 98% to 100%, or 99% to 100%.

In certain embodiments of the deicing or anti-icing compositions, the composition spontaneously self-heals mechanical damage to the composition in the presence of water condensation, where mechanical damage may comprise a size range of 1 nm to 10 mm in any dimension, e.g., 1 nm to 5 mm, or 1 nm to 1 mm, or 1 nm to 500 microns, or 1 nm to 100 microns, or 1 nm to 50 microns, or 1 nm to 10 microns, or 1 nm to 5 microns, or 1 nm to 1 micron, or 1 nm to 500 nm, or 1 nm to 100 nm.

In certain embodiments of the aforementioned methods for inhibiting the formation of ice on a surface where the one or more phase change materials is mixed with one or more deicing liquids, the one or more phase change materials comprise one or more of the deicing or anti-icing composition provided directly above and herein.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, further comprising one or more solvents, diluents, thickeners, surfactants, pigments, carriers, biologically active ingredients or emulsifiers.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the composition is a paint.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the composition is a pesticide.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the composition is a solid at ≤0° C., or a liquid, a blend, or an emulsion.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the phase change material is immiscible with water.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein wherein the phase change material is immiscible with water, and wherein the phase change material is selected from cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclo-hexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the phase change material is miscible with water.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the phase change material is miscible with water and wherein the phase change material is selected from DMSO, 1-bromonaphthalene, ethylenediamine, ethanolamine, formamide, and glycerol.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the phase change materials comprise a mixture of two or more phase change materials.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the phase change materials are miscible in one another.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein the phase change materials further comprise one or more deicing liquids.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, the one or more deicing liquids comprises a freezing point depressant.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, the freezing point depressant comprises a glycol-based fluid.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, the glycol-based fluid comprises one or more of propylene glycol, ethylene glycol and diethylene glycol.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when such composition further comprises one or more deicing liquids, the composition may further comprise one or more additives.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, the composition may further comprise one or more additives.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, the composition may further comprise one or more additives.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, and the glycol-based fluid comprises one or more of propylene glycol, ethylene glycol and diethylene glycol, the composition may further comprise one or more additives.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when such composition further comprises one or more deicing liquids, and the composition further comprises one or more additives, the one or more additives may comprise benzotriazole and methyl-substituted benzotriazoles, alkylphenols and alkylphenol ethoxylates, triethanolamine, high molecular weight, nonlinear polymers and dyes.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the composition further comprises one or more additives, the one or more additives may comprise benzotriazole and methyl-substituted benzotriazoles, alkylphenols and alkylphenol ethoxylates, triethanolamine, high molecular weight, nonlinear polymers and dyes.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, and the composition further comprises one or more additives, the one or more additives may comprise benzotriazole and methyl-substituted benzotriazoles, alkylphenols and alkylphenol ethoxylates, triethanolamine, high molecular weight, nonlinear polymers and dyes.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, and the glycol-based fluid comprises one or more of propylene glycol, ethylene glycol and diethylene glycol, and the composition further comprises one or more additives, the one or more additives may comprise benzotriazole and methyl-substituted benzotriazoles, alkylphenols and alkylphenol ethoxylates, triethanolamine, high molecular weight, nonlinear polymers and dyes.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, and when the phase change materials further comprise one or more deicing liquids, the deicing liquids have a melting point below the freezing point of water, provided that the phase change materials comprise greater than 50% by weight of the mixture.

In certain embodiments of the aforementioned methods for inhibiting the formation of ice on a surface, the aforementioned methods for reducing contact line pinning at a water-solid interface, and the aforementioned method for inhibiting the transition of water from a vapor state to a solid state (desublimation) on a surface, the one or more phase change materials may comprise an aforementioned deicing or anti-icing compositions, and when the phase change materials further comprise one or more deicing liquids, and when the one or more deicing liquids comprises a freezing point depressant, the deicing liquids have a melting point below the freezing point of water, provided that the phase change materials comprise greater than 50% by weight of the mixture.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, the deicing liquids have a melting point below the freezing point of water, provided that the phase change materials comprise greater than 50% by weight of the mixture.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing composition, wherein when the phase change materials further comprise one or more deicing liquids, and the one or more deicing liquids comprises a freezing point depressant, and the freezing point depressant comprises a glycol-based fluid, and the glycol-based fluid comprises one or more of propylene glycol, ethylene glycol and diethylene glycol, the deicing liquids have a melting point below the freezing point of water, provided that the phase change materials comprise greater than 50% by weight of the mixture.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing compositions, wherein when such composition further comprises one or more deicing liquids, and the compositions further comprises one or more additives, the deicing liquids have a melting point below the freezing point of water, provided that the phase change materials comprise greater than 50% by weight of the mixture.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, the one or more phase change materials may comprise an aforementioned deicing or anti-icing compositions, wherein when such composition further comprises one or more deicing liquids, and the compositions further comprises one or more additives, and the one or more comprise benzotriazole and methyl-substituted benzotriazoles, alkylphenols and alkylphenol ethoxylates, triethanolamine, high molecular weight, nonlinear polymers and dyes, the deicing liquids have a melting point below the freezing point of water, provided that the phase change materials comprise greater than 50% by weight of the mixture.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, when the one or more phase change materials comprises the aforementioned deicing or anti-icing composition, the phase change materials of the deicing or anti-icing composition are immiscible with one another and the mixture may further be stabilized by one or more surfactants, emulsifiers, or nanoparticles, or a combination thereof, as described above.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, when the one or more phase change materials comprises the aforementioned deicing or anti-icing composition, the phase change materials comprise a mixture of water miscible and water immiscible phase change materials.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, when the one or more phase change materials comprises the aforementioned deicing or anti-icing composition, and the phase change materials of the deicing or anti-icing composition are immiscible with one another and the mixture is stabilized by one or more surfactants, emulsifiers or nanoparticles, or a combination thereof, the mixture may further comprise one or more water miscible deicing liquids.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, when the one or more phase change materials comprises the aforementioned deicing or anti-icing composition, and when the phase change materials comprise a mixture of water miscible and water immiscible phase change materials, the mixture may further comprise one or more water miscible deicing liquids.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, when the one or more phase change materials comprises the aforementioned deicing or anti-icing composition, and the phase change materials of the deicing or anti-icing composition are immiscible with one another and the mixture is stabilized by one or more surfactants, emulsifiers or nanoparticles, or a combination thereof, and the mixture further comprises one or more water miscible deicing liquids, the mixture is in the form of an emulsion, blend or eutectic mixture.

In certain embodiments of the aforementioned methods for inhibiting the formation of ice on a surface, the aforementioned methods for reducing contact line pinning at a water-solid interface, and the aforementioned methods for inhibiting the transition of water from a vapor state to a solid state (desublimation) on a surface, when the one or more phase change materials comprises the aforementioned deicing or anti-icing composition, and when the phase change materials comprise a mixture of water miscible and water immiscible phase change materials, and the mixture further comprises one or more water miscible deicing liquids, the mixture is in the form of an emulsion, blend or eutectic mixture.

The following examples further illustrate the present invention but should not be construed as in any way limiting its scope.

Example 1

Schematics

One goal of the invention was to delay the transition of a material (designated as Material A) in vapor/liquid state to its solid state during phase change by introducing a phase change material (PCM; designated as Material 8) that absorbs the heat released during the transition of vapor/liquid to solid of material A and undergoes phase change itself near its phase transition temperature, where the PCM phase transition temperature is above the transition temperature of vapor/liquid to solid state of the material A. This process is illustrated in FIG. 1. Heat is released during condensation of Material A. Tc is the substrate temperature, and Tm refers to the melting point of the PCM. The region at the interface between Material A and Material B is the melted PCM (shown in dark grey).

Figure 2:
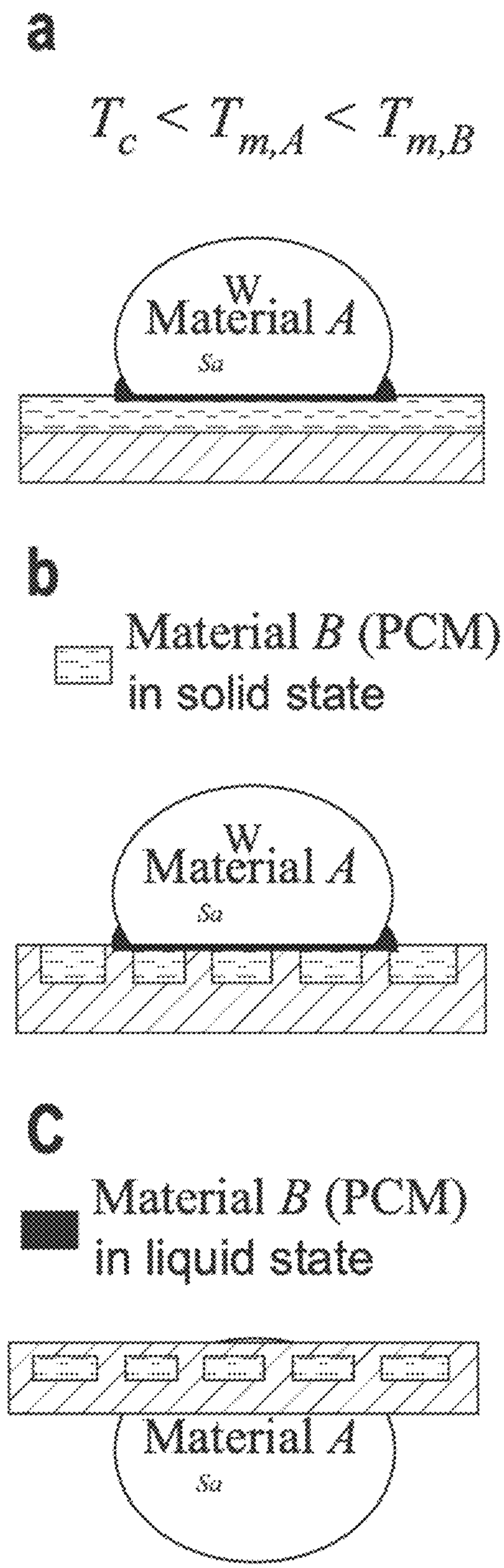
FIG. 2 shows different embodiments for delaying freezing of material A from vapor/liquid to solid form.

In one embodiment, PCM material can come in direct contact (full or partial) of material A. In these embodiments, the PCM material can be supported entirely by a solid substrate (FIG. 2*b*) or could be incorporated within textures created on an underlying solid substrate (FIG. 2*b*). In another embodiment, the PCM material is encapsulated within a secondary solid material that is in contact with material A such that the solid material prevents a direct contact between material A and the PCM (FIG. 2*c*). in FIG. 2, heat is released during condensation of Material A. Tc is the substrate temperature, and $T_{m,B}$ refers to the melting point of the PCM. $T_{m,A}$ refers to the melting point of the material whose freezing is to be delayed in case it is a liquid, or the desublimination temperature if Material A is transitioning from vapor to solid state.

Figure 3:
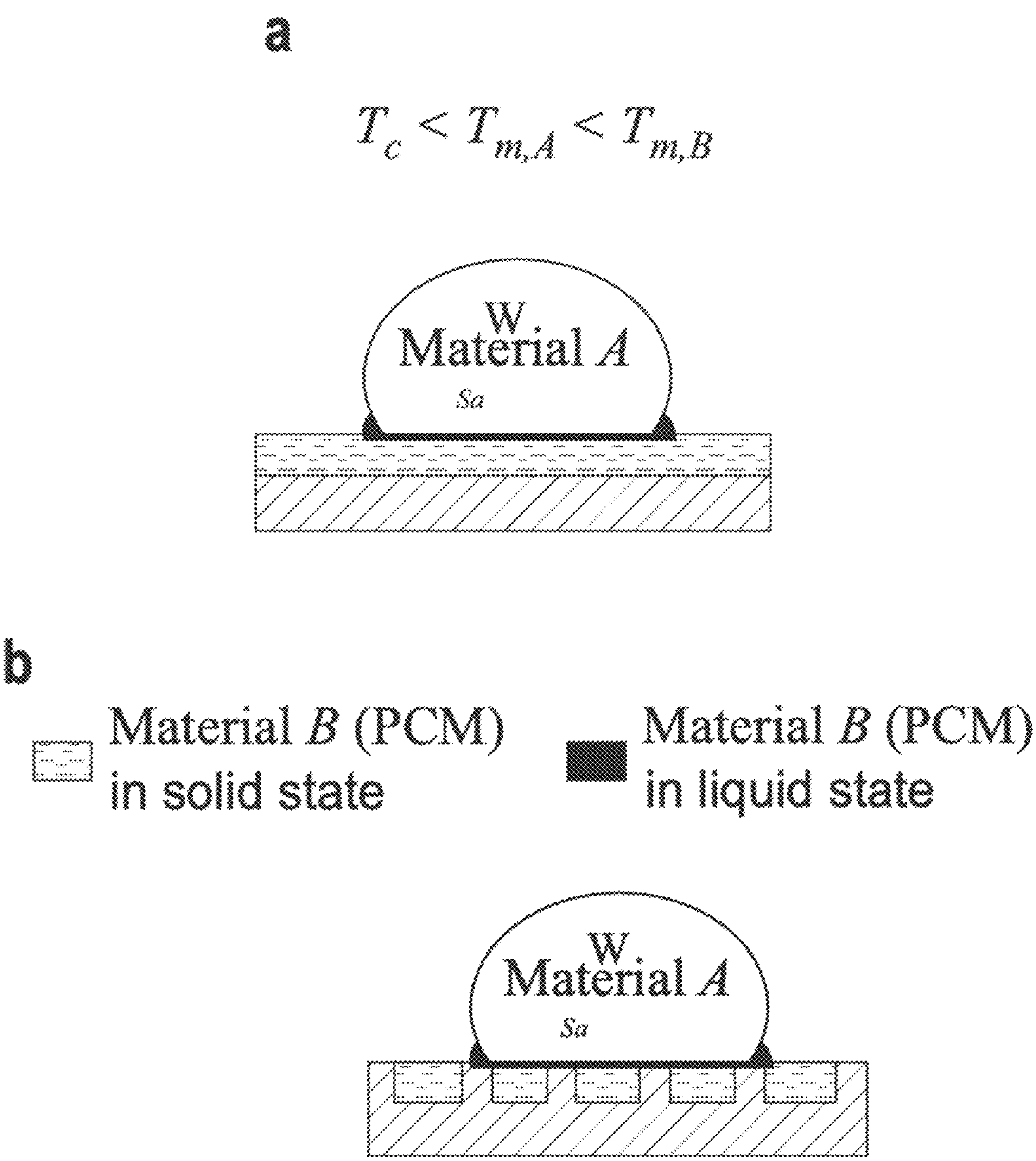
FIG. 3 shows different embodiments for decreasing adhesion of material A on a surface.

In one embodiment, the PCM material can result in decrease of adhesion with the substrate by introduction of a lubricating liquid layer formed by the melting of the PCM. The PCM material itself can come in direct full contact (FIG. 3*a*) or direct partial contact of material A (FIG. 3*b*). In this embodiment, the PCM material can be supported entirely by a solid substrate or could be incorporated within textures created on an underlying solid substrate. Generally, FIG. 3 shows different embodiments for decreasing adhesion of material A over a surface. Tc is the substrate temperature, and Tm,B refers to the melting point of the PCM. TA refers to the temperature of the material A. The heat-transfer from the material A results in melting of the PCM forming a lubricating layer underneath the material A.

Example 2

Technical Description (a.1) Fundamentals of Heat Transfer During Condensation on Phase Change Materials To explain the fundamental aspects of our invention, we consider a case where the freezing of water is to be delayed during condensation, and the surface is a solid PCM layer supported on a solid substrate and the PCM undergoes a transition to liquid state upon absorbing heat.

As the droplet grows during condensation, heat is continuously released to the substrate. For isolated drops, the water vapor profile around the drops is hemispherical and the drop radius follows $R=kt^{1/2}$ The volume evolution $V_w=\pi F(\theta)R^3$ of a water drop where condensation proceeds on its surface with constant contact angle θ is:

$$\frac{dV_w'}{dt} = 3\pi F(\theta)R^2\frac{dR}{dt}$$

Here, $$F(\theta) = \frac{2-3\cos\theta+\cos^3\theta}{3\sin^3\theta}$$

is the volume geometrical factor.

As the contact line of the droplet is pinned on the substrate, the contact angle varies during growth, from the receding to the advancing value, making the water vapor profile to vary. However, this variation is weak as the contact angle is near 90°. We will thus neglect this variation in the following for sake of simplification. Since $R=kt^{1/2}$, the volume evolution can be written as:

$$\frac{dV_w}{dt} = \frac{3\pi}{2}F(\theta)k^2R$$

We consider the PCM to be at temperature Tc. The temperature of the substrate at the places where condensation does not take place results from the balance of two opposite heat fluxes, $P_a$, corresponding to convective air heating and $P_c$, the cooling flux from the Peltier thermostat below the PCM. The temperature $T_c$ results from the balance between $P_a$, $P_c$, the water condensation process corresponding to the latent heat production $P_{Lw}$ and possibly the cyclohexane melting latent heat $P_{Lc}$. Latent heat flux can be written as:

$$P_u \triangleq \rho_i L_i \frac{dV_i}{dt}$$

with i standing for water (w) or PCM (c). The other parameters are the density of liquid water ($\rho_w$), the density of liquid PCM ($\rho_{lc}$), the latent heat of water condensation ($L_w$) and the latent heat of PCM melting ($L_c$).

We assume that in steady state, the water drop temperature is at the melting temperature ($T_m$) of the PCM. The heat flux from water condensation primarily heats up the substrate beneath the drop from $T_c$ to $T_m$, corresponding to the energy $Q_c$ and then melts it, corresponding to the energy $P_{L_c}t_m$ where $t_m$ is the time required to heat and melt a PCM layer of thickness e corresponds to the following energy balance:

$$(P_a+P_{L_w})t_m=Q_c+(P_c+P_{L_c})t_m \tag{1}$$

Here $Q_c$ is the sensitive heat of the PCM layer:

$$Q_c=\pi eR^2\rho_{cs}C_{p,cs}(T_m-T_c) \tag{2}$$

where $C_{p,cs}$ is the specific heat of solid PCM. Here, e corresponds to the melting of a PCM layer under the drop resulting in a melted PCM volume of $V_c=\pi eR^2$.

Figure 4:
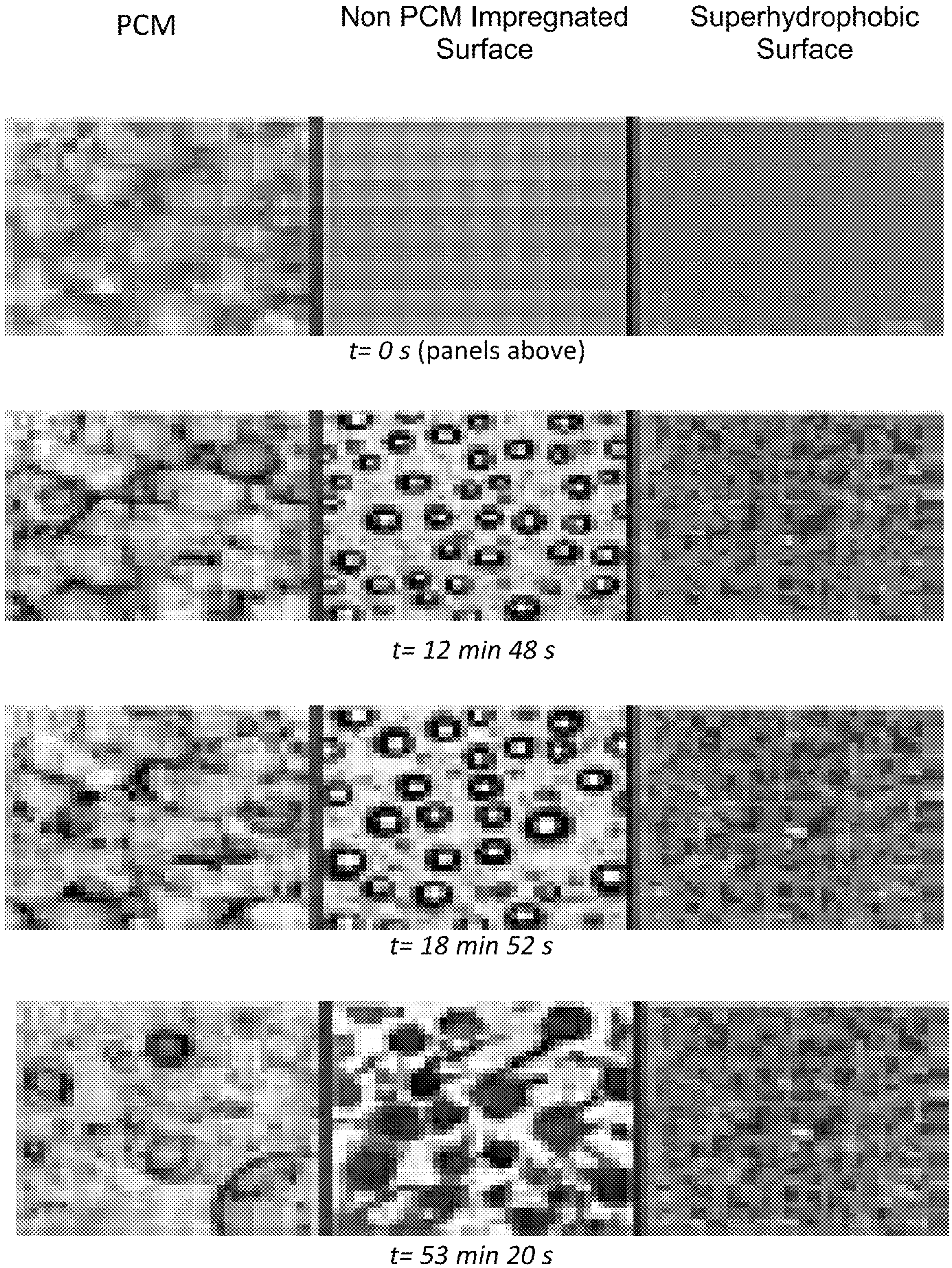
FIG. 4 shows a comparison of delayed freezing behavior on PCM with freezing behavior of water droplets on Liquid Impregnated Surface and superhydrophobic surface.

To show the successful working behind our principle, we show in FIG. 4 a comparison of water freezing behavior on a PCM (here Cyclohexane, $T_m$=6.5°), a Liquid Impregnated Surface and a superhydrophobic surface. In greater specifics, FIG. 4 shows a comparison of delayed freezing behavior on PCM with freezing behavior of water droplets on Liquid Impregnated Surface and Superhydrophobic surface. Here, the superhydrophobic surface comprises of etched silicon wafer that results in formation of nanograss features, and which has subsequently been silanized to decrease the surface energy of the solid, thereby making it icephobic. The Liquid impregnated surface here comprises of silicon wafer with micropost features comprising of 10 μm height, width and edge-to-edge spacing; thereafter the sample is silanized and infused with silicone oil of viscosity 10 cSt.

The PCM material had a thickness of 5 mm and was supported on a smooth silicon wafer. To compare the anti-icing behavior, the samples were cooled to temperature of −15° C. on a peltier cooler, while the dew point was 10° C. FIG. 4 shows that on superhydrophobic surface, condensed water droplets froze after about 15 minutes, on the Liquid Impregnated surfaces, the freezing of droplets occurred after about 25 minutes, while on the PCM surface, the water droplets remained in liquid state for about 60 minutes.

Figure 5:
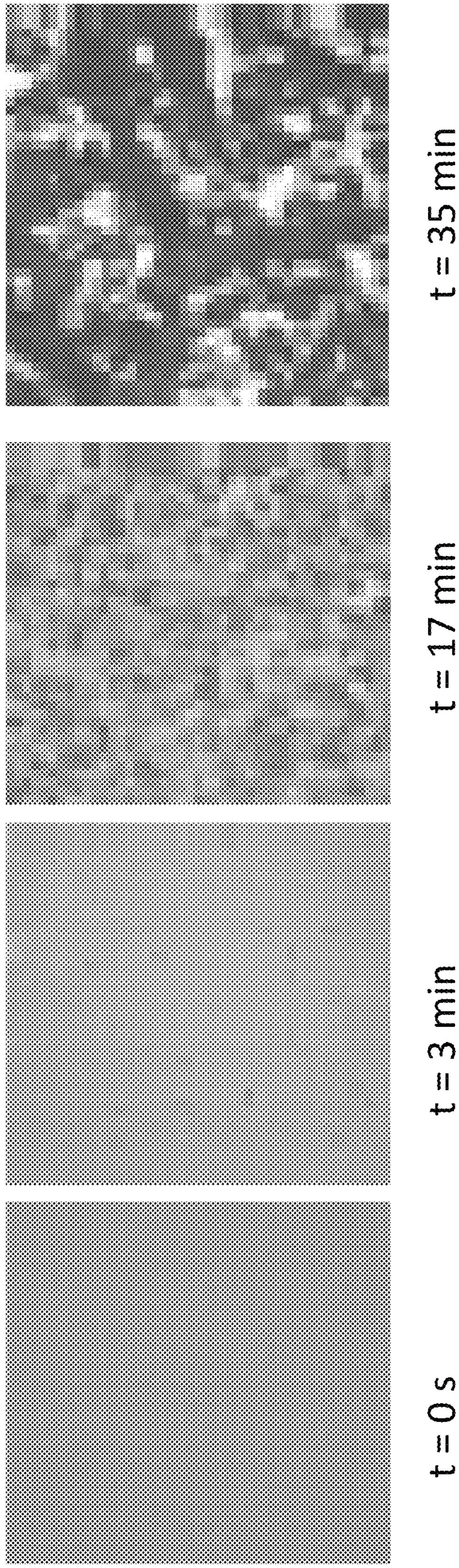
FIG. 5 shows delayed water-freezing behavior on 1-bromonapthalene during condensation.

In FIG. 4, the PCM used to show our concept was cyclohexane that has low miscibility with respect to water. For our invention, the solubility of water with the underlying PCM is not important, and even water miscible PCM materials can be used. In FIG. 5, we show delayed freezing behavior of water during condensation on 1-bromonaphthalene that has higher miscibility with water. Here, the water freezing did not occur for >50 minutes during the course of experiment. Here, the sample was cooled to temperature of −15° C. on a peltier cooler, while the dew point was 10° C. The thickness of 1-bromonapthalene layer was 5 mm.

Figure 6:
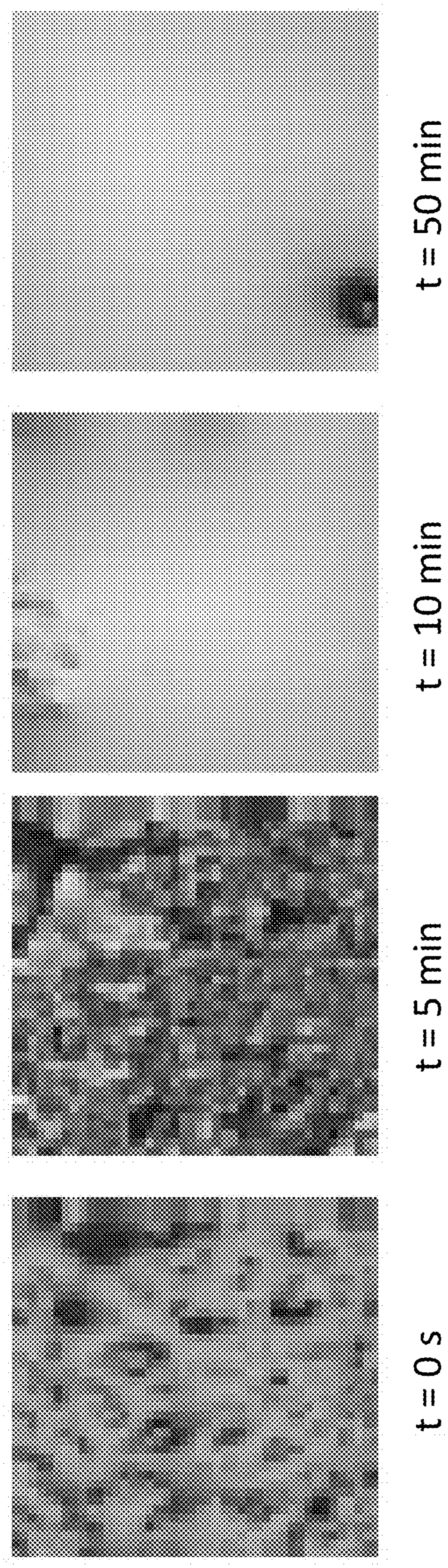
FIG. 6 shows delayed water-freezing behavior on DMSO during condensation.

In FIG. 6, we show delayed freezing behavior on Dimethyl Sulfoxide (DMSO), a PCM which is completely soluble with respect to water in its liquid form. The melting point of DMSO is approximately 18° C. Despite the high melting point, the heat flux applied during condensation results in melting of the top layer of the DMSO, and no water droplet freezing was observed for >60 minutes. Here, the sample was cooled to temperature of −15° C. on a Peltier cooler, while the dew point was 10° C. The thickness of DMSO layer was 5 mm.

Decreased Adhesion Due to Phase Change of the Underlying Surface

For the instant invention, the adhesion on a surface for various materials can be decreased by creating a introducing a film of solid PCM material at the substrate-air interface, so that the interface of the substrate and material A can be replaced completely or partially by contact of Material A with the PCM (Material B). In this embodiment, the adhesion is decreased when the substrate temperature $T_A$ is larger than then melting point of the PCM so that the complete or partial contact may result in formation of a melted liquid layer of the PCM, and acts as a lubricating layer under the material A. The two different embodiments of this work are shown in FIG. 3.

Example of PCM Materials

An important requirement for a PCM material is non-reactiveness towards the substrate material, and non-reactiveness towards the material whose freezing is to be delayed in cases where the PCM comes in direct contact with such material. A list of PCMs that can be used to delay freezing of water is given in Table 1. Essentially any PCM can be used as long as Eqn. (1) and (2) are satisfied.

TABLE 1

Non-Limiting List of Phase Change Materials (PCMs)

| PCM | Formula | CAS | MP (° C.) |
|---|---|---|---|
| Ethylenediamine | $C_2H_8N_2$ | 107-15-3 | 11.14 |
| Ethanolamine | $C_2H_7NO$ | 141-43-5 | 10.5 |
| Hexadecane | $C_{16}H_{34}$ | 544-76-3 | 18.19 |
| Tetradecane | $C_{14}H_{30}$ | 629-59-4 | 5.86 |
| dimethyl sulfoxide | $C_2H_6OS$ | 67-68-5 | 18.52 |
| 2-heptyne | | 1119-65-9 | 1.25 |
| formamide | $CH_3NO$ | 75-12-7 | 2.55 |
| Pentadecane | $C_{15}H_{32}$ | 629-62-9 | 9.96 |
| n-dodecyl acetate | | 112-66-3 | 1.25 |
| oleic acid | | 112-80-1 | 13.38 |
| benzene | | 71-43-2 | 5.53 |
| nitrobenzene | $C_6H_5NO_2$ | 98-95-3 | 5.65 |
| cyclohexylbenzene | | 827-52-1 | 7.14 |
| 1,2,3-tribromopropane | $C_3H_5Br_3$ | 96-11-7 | 16.19 |
| 2,2-dimethyl-3-pentanol | | 3970-62-5 | 5.15 |
| 1-Bromnaphthalene | $C_{10}H_7Br$ | 90-11-9 | 5 |
| hexafluorobenzene | | 392-56-3 | 5.25 |
| ethylene dibromide | $C_2H_4Br_2$ | 106-93-4 | 9.79 |
| tert-butyl mercaptan | | 75-66-1 | 1.4 |
| Cyclohexane | $C_6H_{12}$ | 110-82-7 | 6.52 |
| Bromoform | $CHBr_3$ | 75-25-2 | 8.35 |
| diiodomethane | | 75-11-6 | 6.1 |
| Nitrobenzene | | 98-95-3 | 5.7 |
| bicyclohexyl | $C_{12}H_{22}$ | 92-51-3 | 3.63 |
| cyclohexylbenzene | $C_{12}H_{16}$ | 827-52-1 | 6.99 |

Example 3

Figure 7:
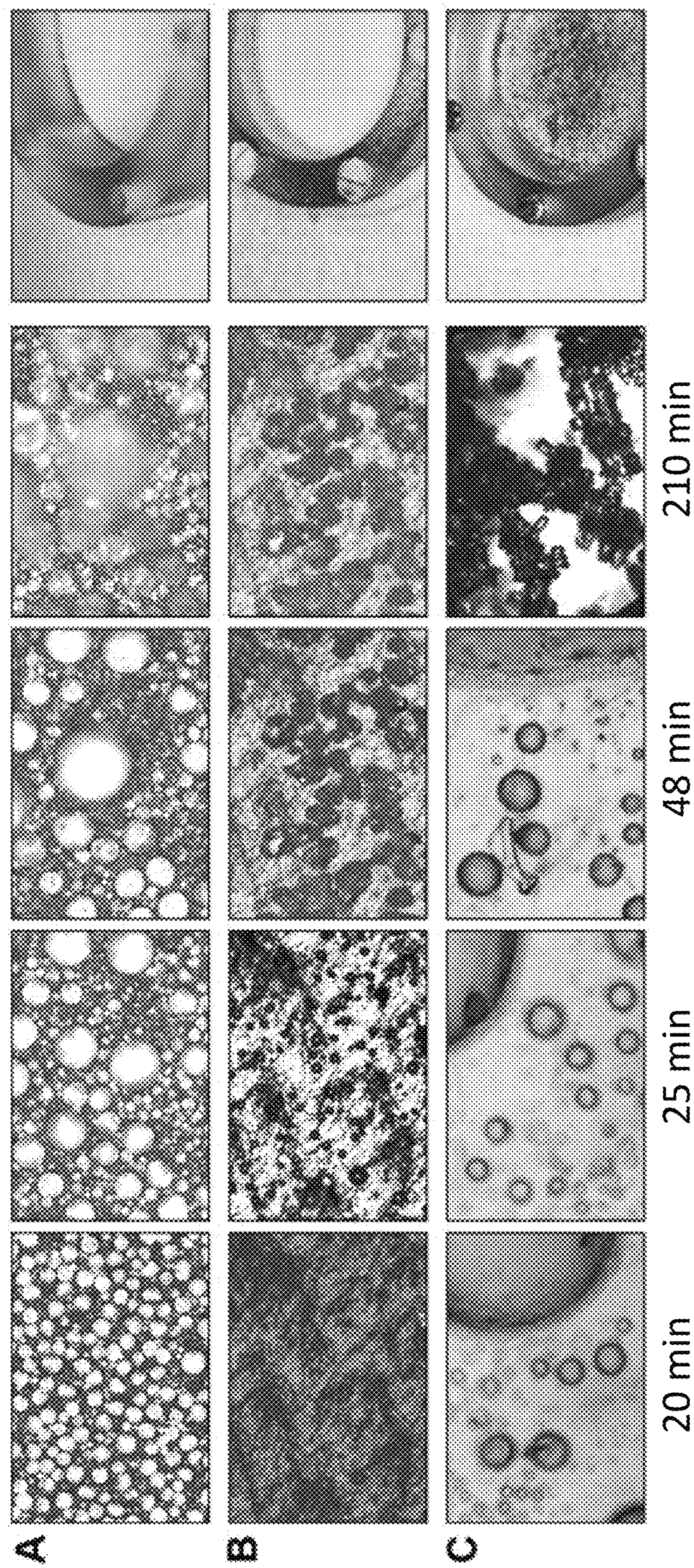
FIG. 7 shows comparison of freezing delay on different substrates, with (A) a superhydrophobic silicon nanograss surface, (B) a 5 mm teflon film, and (C) a Phase Change Material (PCM), in this case cyclohexane with initial thickness of 5 mm.

We have shown conclusively that drop freezing on PCM surfaces is considerably delayed due to condensation effect. Comparing the performance of PCM and Teflon—both of which have similar thickness and similar thermal conductivities, we find that droplet freezing is delayed by ~5 times longer on PCM surface. Specifically, FIG. 7 shows a comparison of freezing delay on different substrates. (A) Superhydrophobic silicon nanograss surface. As shown in the figure, water droplets freeze on a nanograss structured surface within 25 minutes. (B) 5 mm teflon film. Teflon is a hydrophobic material with low thermal conductivity. Despite this, water droplets freeze on the surface within 48 minutes. (C) a Phase Change Material—in this case cyclohexane with initial thickness of 5 mm. As shown in the image, the water droplets freeze on the surface on the surface in 210 minutes. In all the experiments, the substrate temperature was kept at −15 C, and the humidity of the chamber was 80%. As shown in the bulk images, the amount of ice formed in case of (C), the phase change material, is orders of magnitude less as compared to (A) and (B)

Example 4

We have also shown that the freezing delay is dependent upon the nature of the solid PCM structure. Some PCMs (e.g. linear alkanes) upon freezing form highly crystalline molecular solids (i.e., exhibit macrocrystalline morphology); whereas, some PCM materials (e.g. cyclic compounds) upon freezing form very low crystalline molecular solids (i.e., exhibit microcrystalline morphology). The degree of crystallinity has a strong effect on freezing delay. Higher the crystallinity, lower is the freezing delay. Finally, some PCMs upon freezing may become liquid in contact with water—because of their high solubility with water (e.g. includes DMSO). Such materials have highest delay in ice formation because they combine the effects of heat release during condensation with freezing depression due to high solubility.

Figure 8:
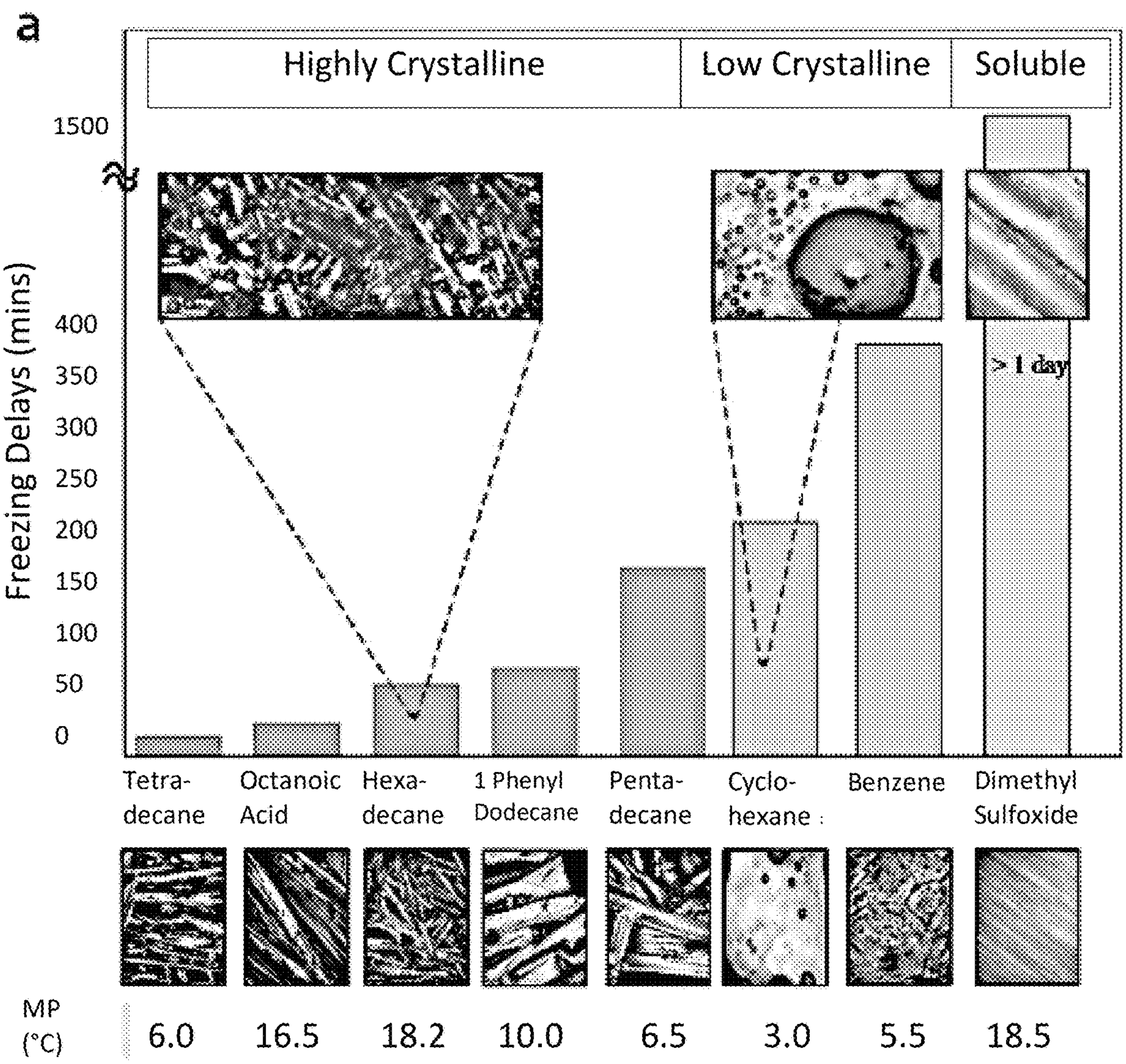
FIG. 8 shows freezing delay (in mins) associated with different PCMs.

FIG. 8 shows Freezing delay (in mins) associated with different PCMs. The bottom images show the top structure of PCM before condensation initiates, observed through optical microscope. The inset images in the graph show examples of condensed droplets on PCM surface. The surface was kept at −15° C. environment and under 80% RH conditions.

Example 5

We have also shown that the PCM materials can be encapsulated in solid micro/nano-textured surfaces. Furthermore, we have shown that even when the surface is hydrophilic, when the solid PCM-infused surface comes into contact with water, the solid PCM remains impregnated within the texture. In contrast, if a hydrophilic surface is impregnated with an oil, the water immediately displaces the oil.

Figure 9:
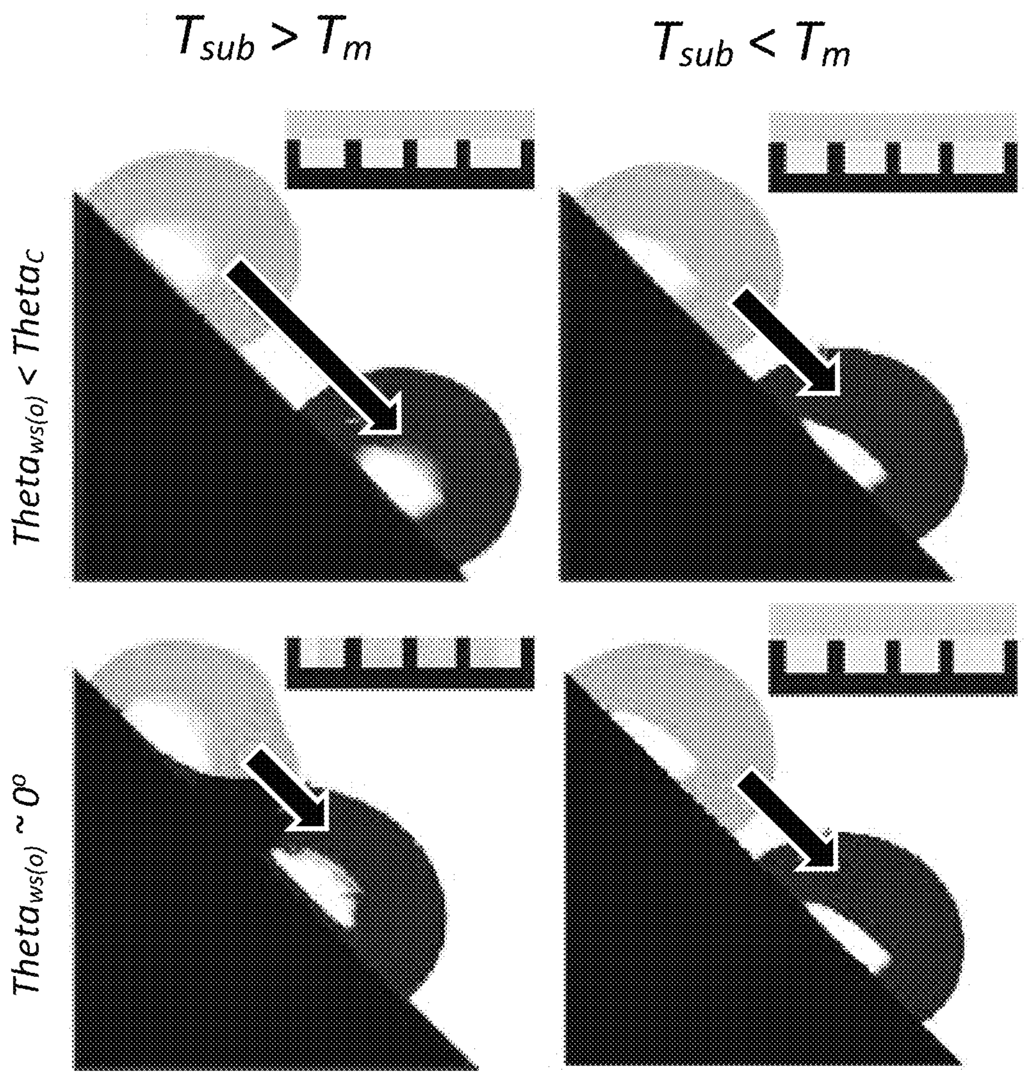
FIG. 9 shows adhesion of water on different impregnated surfaces.

FIG. 9 shows this principle via adhesion of water on different impregnated surfaces. For the case where the temperature of the substrate is greater than the melting temperature ($T_{sub}>T_m$), a water droplet can remain floating on the impregnated surface only if the surface is hydrophobic and water contact angle on the impregnated surface in presence of oil is less than the critical angle of impregnation. When the surface is hydrophilic, the water droplet immediately displaces out the oil. On other hand, even when the surface is hydrophilic, and the surface is infused with PCM that is then frozen ($T_{sub}<T_m$), the water droplets slide over the composite surface easily. The surface was kept at −15° C. environment and under 10% RH conditions.

Example 6

We have also shown that hydrophilic materials infused with PCM liquids show freezing delay to the same order or twice longer than a superhydrophobic surface.

Figure 10:
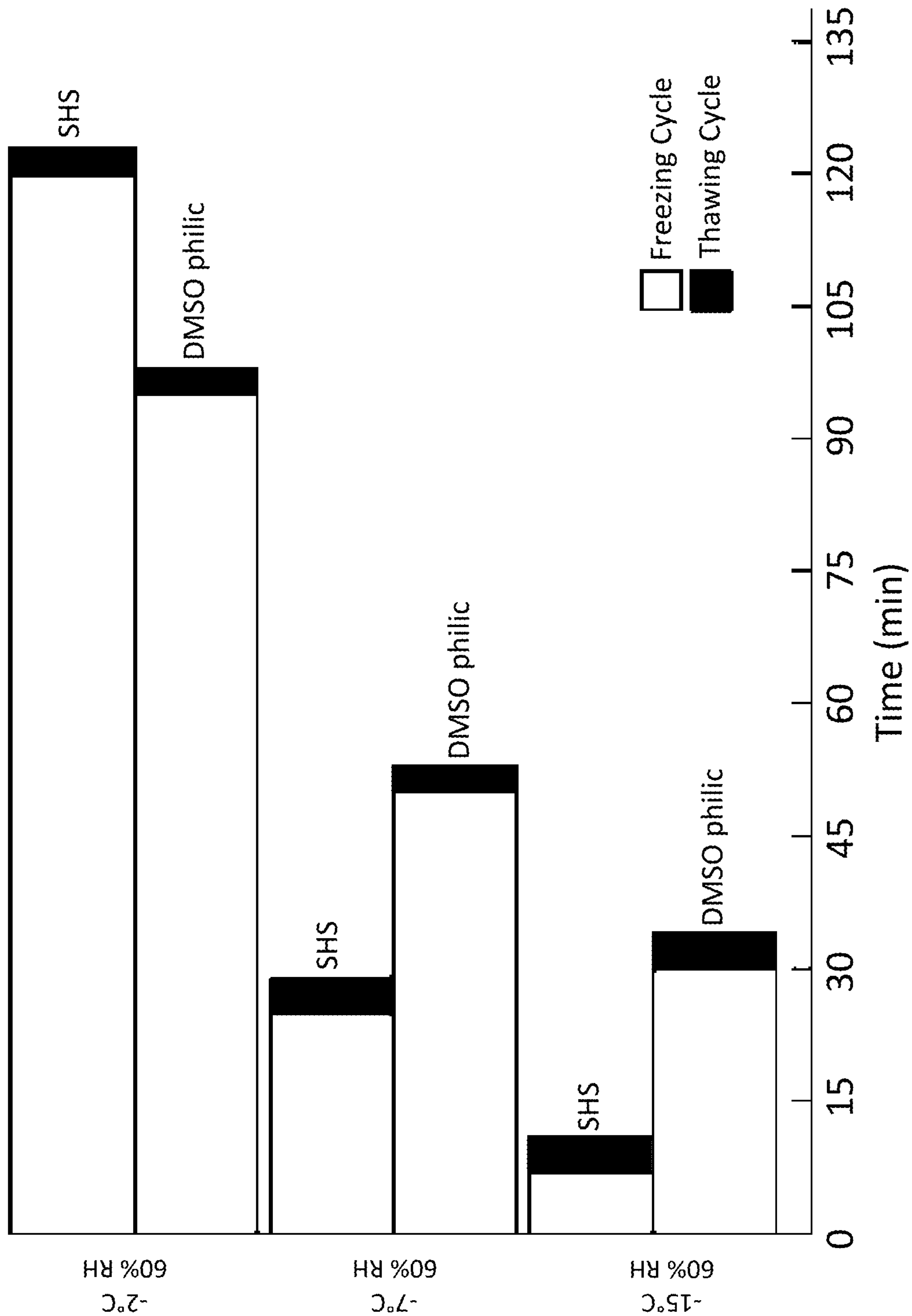
FIG. 10 shows a freezing delay comparison of a superhydrophobic surface and a hydrophilic surface infused with soluble PCM.

FIG. 10 shows Freezing delay comparison of superhydrophobic surface and a hydrophilic surface infused with soluble PCM. The experimental conditions are mentioned in the Y-axis. The temperature refers to the substrate temperature.

Example 7

To demonstrate PCM/PSL's ability to trap the latent heat released during condensation, we selected Cyclohexane as a test PSL. Eight milliliters of cyclohexane were rapidly cooled to few degrees below its $T_{mp}$ (6.52° C.) in controlled environmental conditions (relative humidity, RH: 80%; air temperature, $T_{air}$: 25° C.; see Example 8; B.2) forming a 3.3 mm thick solidified film (2375 $mm^2$ surface area). Droplets condensing on solidified cyclohexane (SCh) surface can display a myriad of unique behaviors. Firstly, the droplets showed very high mobility, gliding along the surface in a series of 'stick/slip' events. Secondly, as the droplets constantly moved along the SCh surface, they left distinct perimeter footprints at their previous locations (FIG. 11A). Finally, it was observed that sometimes an intervening barrier film between the droplets delayed their coalescence (FIG. 11B). These observations are characteristic evidence of liquid Cyclohexane in the vicinity of the droplets. The competition between latent heat release and heat removal at the opposite faces of the SCh film leads to aperiodic solid-liquid-solid phase transitions of SCh beneath/around the droplets. This engenders stochastic interfacial temperature gradient along the droplet contact line and resulting 'stick/slip' motion. The droplet imprints and the barrier film between two coalescing droplets are remnants of the Cyclohexane 'wetting-ridge' formed around the droplets because of interfacial interactions between water droplets and liquid Cyclohexane. Although for high thermal conductivity materials like Silicon, the temperature increase at the substrate-drop interface due to the release of latent heat during condensation is negligible (~0.03° C.), it can be significant (~3° C., Example 9; 2.1.1) for an insulative material like SCh. Incorporating the environmental heat transfer, the total temperature increase at the SCh-air interface can be ~5° C., sufficient to cause localized SCh melting and explaining the observation in FIG. 11A.

The above implies that the surface melting might be absent on highly supercooled SCh. Interestingly, the droplet 'stick/slip' motion, their footprints and the barrier oil film were observed even when SCh was subjected to Peltier temperature ($T_{pel}$) of −15° C., 80% RH (FIG. 11C, D). Similar behavior was also observed (FIG. 11E, F) on solidified cyclooctane (SCt), a PCM/PSL with $T_{mp}$ (~14° C.) higher than that of SCh subjected to identical conditions, although the droplet mobility on it was lower compared to SCh. Additionally, condensed water droplets did not freeze for an extended duration (>2 hours) on both SCh and SCt. They also outlasted a 3.3 mm thick plain Polytetrafluoroethylene (PTFE) surface (having similar thermal conductivity) and nano-textured superhydrophobic Silicon surface under identical environs with both materials having same surface areas as SCh/SCt (Example 8; B.4). Since the freezing point depression effect is absent in both water and SCh/SCt due to their mutual immiscibility (Example 9; 2.2), we considered that condensation heat release provided sufficient energy to cause local temperature increase greater than 10° C. and 20° C. for the cases of SCh and SCt, respectively. Although such temperature jumps can arise during condensation on aerosol nanoparticles, our experiments indicate that significant temperature jumps can also occur on PCM (also referred to as solidified PSL (5-PSL)) surfaces. We consider the condensation mass transfer occurs primarily along the contact line of water droplets (FIG. 11G), wherein heat transfer dominates, a phenomenon that may play a important role especially on low thermal conductivity materials. Large temperature jumps, sufficient to locally melt S-PSL can potentially occur near the droplet contact line (Example 9; 2.1.2), provided that the length-scale (δ) of such heat transfer dominated region is <about 1 μm. We conducted high-resolution (4.5 μm/pixel) infrared thermography to visualize the condensation dynamics on SCh and SCt surfaces similar to FIG. 11A-F. These experiments showed a distinct temperature jump of 1-2° C. along the contact line of droplets on each of these materials (FIG. 14), somewhat expected since 5 is much smaller than the resolution of the imaging system.

Figure 14:
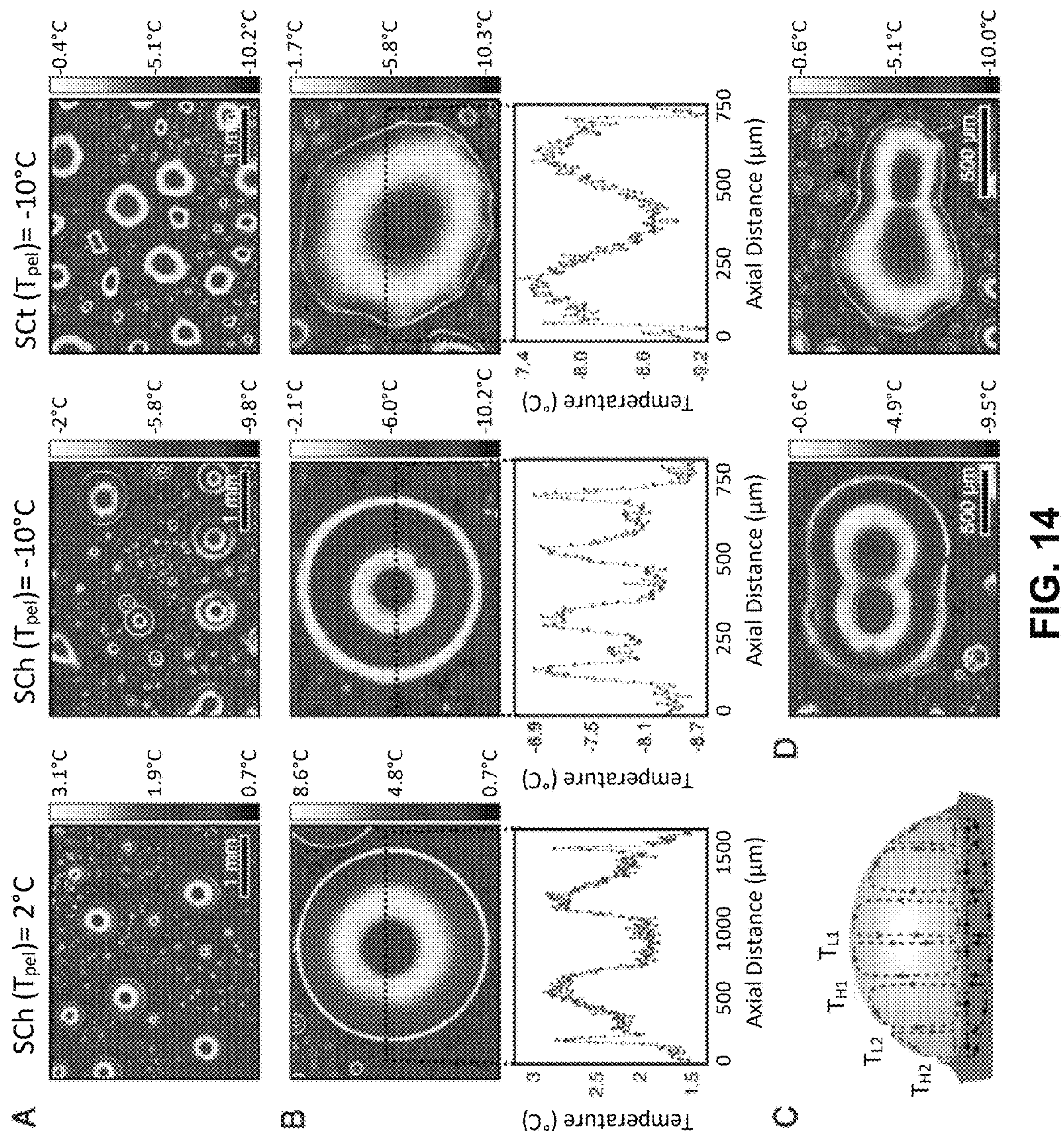
FIG. 14 shows a thermometric characterization of the heat release due to condensation on a PCM.

The non-uniform heat-flux distribution around droplets can have many consequences. For example, it could lead to uneven melting of S-PCM/S-PSL and induce convective flow within the condensing droplets and melt PSL film (FIG. 11G). Our conclusion is supported by IR thermography that indicated the presence of six circulation cells along the diameter of the supercooled condensed droplets (FIG. 14). Taken together, these results suggest that PCM/PSL film of non-uniform thickness exists below and around the droplets at any given instant, that could then delay droplet freezing via one or both of two possible mechanisms. Firstly, the contact of water droplets with the insulating PCM/PSL film at a temperature higher than $T_{fp}$ could make it thermodynamically unfavorable for freezing. Secondly, the relative smoothness of a liquid film beneath the droplets may increase the energy barrier for ice nucleation by subduing the surface roughness ensued droplet freezing. To elucidate the importance of surface melting in droplet freezing delay, we examined droplet freezing dynamics on supercooled SCh under conditions wherein its melting was suppressed. A cold-water droplet was deposited on SCh surface ($T_{pel}$=−15° C.) in a very low humidity environment (4% RH) thereby precluding any condensation. The droplet froze within ~5 minutes of deposition (FIG. 11H, I), reconfirming that condensation heat release plays a pivotal role in delaying freezing of condensing droplets on SCh.

To investigate whether surface melting and delayed freezing is observable on other PCMs/PSLs with similar thermal properties, anhydrous PCMs/PSLs were tested; namely benzene ($T_{mp}$=5.53° C.), tetradecane ($T_{mp}$=5.86° C.), pentadecane ($T_{mp}$=9.96° C.), hexadecane ($T_{mp}$=18.19° C.) and dimethyl sulfoxide (DMSO, $T_{mp}$=18.52° C.)—a water miscible compound. Since surface structure can strongly influence the nucleation behavior, we first characterized the S-PCM/S-PSL surfaces (FIG. 12A) by cooling them below their respective $T_{mp}$ in a low humidity (15% RH) environment. Upon freezing, S-PCMs/S-PSLs optically appeared as transparent (SCh, SCt), semi-transparent (solidified DMSO, SD), or nearly opaque (solidified Hexadecane, SH). Since direct observation of S-PSLs is not possible in SEM, we used a replica molding technique to obtain the negative embossment of the respective surfaces (Example 8; B.5). Corresponding SEM images revealed that κ-PCMs/S-PSLs had varying surface morphologies (FIG. 12B). SEM and optical images indicated that solidified Tetradecane (ST), solidified Pentadecane (SP) and SH have microstructured topologies (FIGS. 15-17); in-line with previous observations that have shown that solidified n-alkanes have a macrocrystalline structure. However, cyclic alkanes (like SCh, SCt) and solidified Benzene (SB) have microcrystalline structure and hence appear relatively smooth. Next, direct surface roughness measurements of S-PSLs were conducted in a low humidity (5% RH) environment using a high magnification optical profilometer (Example 8; B.6). It was found that ST has higher average roughness and Z-roughness than SP and SH, while other S-PCMs/S-PSLs have sub-microscopic roughness, typically on the order of about 1 micron or less (FIG. 12D).

Following the S-PCMs/S-PSL surface morphology characterization, we examined condensation-frosting dynamics on bulk PCMs/PSLs (8 ml) cooled down to $T_{pel}$=−15° C. in a high humidity (80% RH) environment. We evaluated the time when droplet freezing was first observed (referred as freezing initiation time in FIG. 12D) in the field of view (2.1 $mm^2$) and the total time it took for all the droplets on the entire S-PCMs/S-PSL surface (area ~2375 $mm^2$) to freeze since the onset of freezing initiation. On SD, the combination of heat release from condensation and freezing point depression causes continuous melting and mixing of the water-DMSO mixture, thereby preventing the freezing of the solution for >96 hours: 300 times longer compared to the freezing delay potential of SHS and PTFE surfaces in bulk with identical surface areas. However, for immiscible S-PCMs/S-PSLs, putting the surface roughness measurements in context of these results, it becomes perspicuous that higher the sample surface roughness, lower the freezing delay (FIG. 12D). Among the macrocrystalline (i.e. rough) S-PCMs/S-PSLs, while the droplet footprints were faintly visible on certain locations of ST/SP, they did not appear on SH surface. It was found that such surfaces retained their roughness features during condensation, presumably because their feature sizes are orders of magnitude larger than the nanometric PCM/PSL film forming below the condensate. Thus, condensation induced melting appears to play a small role in governing the freezing delay potential on rough S-PCM/S-PSL surfaces. On them, the droplet size distribution in the field of view just before freezing initiation revealed a high droplet density with smaller inter-droplet distances (Example 9; 2.3 and FIGS. 22-24). Consequently, on ST, SP and SH surfaces once condensation-frosting initiates, the freezing front rapidly propagates (at nearly the same rate, FIG. 25)) over the entire surface mediated by the inter-droplet bridging mechanism. However on microcrystalline (i.e. smooth) S-PSLs, condensation-frosting progresses in a distinctively different manner. In addition to having low droplet density, the inter-droplet distances on these surfaces are ~1.5-2 times larger than the average droplet size. The mobility of droplets is also much higher on such surfaces, that further dynamically alters the local vapor concentration gradient between frost and drops. Hence, while smooth S-PCMs/S-PSLs do fail by inter-droplet ice-bridging mechanism, the aforementioned factors significantly repress the frost propagation on them, consequently engendering longevity against condensation-frosting compared to rough S-PCMs/S-PSLs (Example 9; 2.4 and FIGS. 26-27).

S-PCMs/S-PSLs can operate even in low-humidity environments by indirectly harnessing heat energy into the substrate. For example, by tapping into the internal thermal energy of liquid droplets coming in contact with the bulk S-PCM/S-PSL surface, the latter can cause the droplets to self-lubricate and eventually get repelled from the surface. Consequently, a wide variety of liquids (e.g. water, glycerol, crude motor oil, hydraulic oil and olive oil) can glide on the bulk S-PCM/S-PSL surface (FIG. 13A) while getting highly pinned on PTFE and SHS. In an arid environment, subjected to frigid temperatures ($T_{pel}$=−15° C.), bulk S-PCM/S-PSL surface manifests no ice-accretion (FIG. 13B) and also retains its icephobicity after being inflicted by a series of surface incisions. S-PCM/S-PSL surface shows self-healing properties. On being subjected to critical mechanical damage, bulk SCt surface ($T_{pel}$=5° C.) self-heals after 42 minutes of sustained condensation (FIG. 13C). Thus, S-PCM/S-PSL surfaces can span a vast range of functional properties.

Having tested the functional attributes of PSLs in bulk state, we next investigated the dynamics of Phase Changing Material infused Surfaces (PCM-IS)/Phase Switching Liquid Infused Surface (PSL-IS). For typical LIS applications, an oil film remains stably infused within a solid matrix in the presence of a water droplet provided the contact angle of the oil on the solid in the presence of water ($\theta_{os(w)}$) is lower than the critical angle of impregnation ($\theta_c$) i.e. when $\theta_{os(w)}<\theta_c$ wherein $\theta_c=\cos^{-1}[(1-\phi)/(r-\phi)]$, r is surface roughness and $\phi$ is the projected area of the surface occupied by the solid. Thus, when a water droplet interacts with a PCM/PSL (e.g. Pentadecane) infused textured superhydrophobic surface fulfilling the above criterion, it shows very low adhesion and rolls down the composite surface regardless of the fact whether the sample is at room conditions (FIG. 13D, state I) of $T_{air}$=23° C., RH=24% or below the $T_{mp}$ of PSL at $T_{pel}$=2° C. (FIG. 13D, state II). However, when a water droplet under ambient conditions interacts with a textured surface that does not meet the aforementioned criterion (e.g. PCM/PSL infused hydrophilic surface), the droplet displaces the PCM/PSL out of the texture and gets strongly pinned on the surface (FIG. 13D, state III). This behavior changes dramatically when the same PCM/PSL infused textured hydrophilic surface is operated below ($T_{pel}$=2° C.) the $T_{mp}$ of PCM/PSL. The freezing of PCM/PSL on and within the texture prevents its out-of-texture depletion by water. The water droplet has sufficient thermal energy to partially melt a fraction of S-PCM/S-PSL, creating a self-lubricating liquid layer beneath itself—resulting in droplet gliding across the surface (FIG. 13D, state IV).

Figure 21:
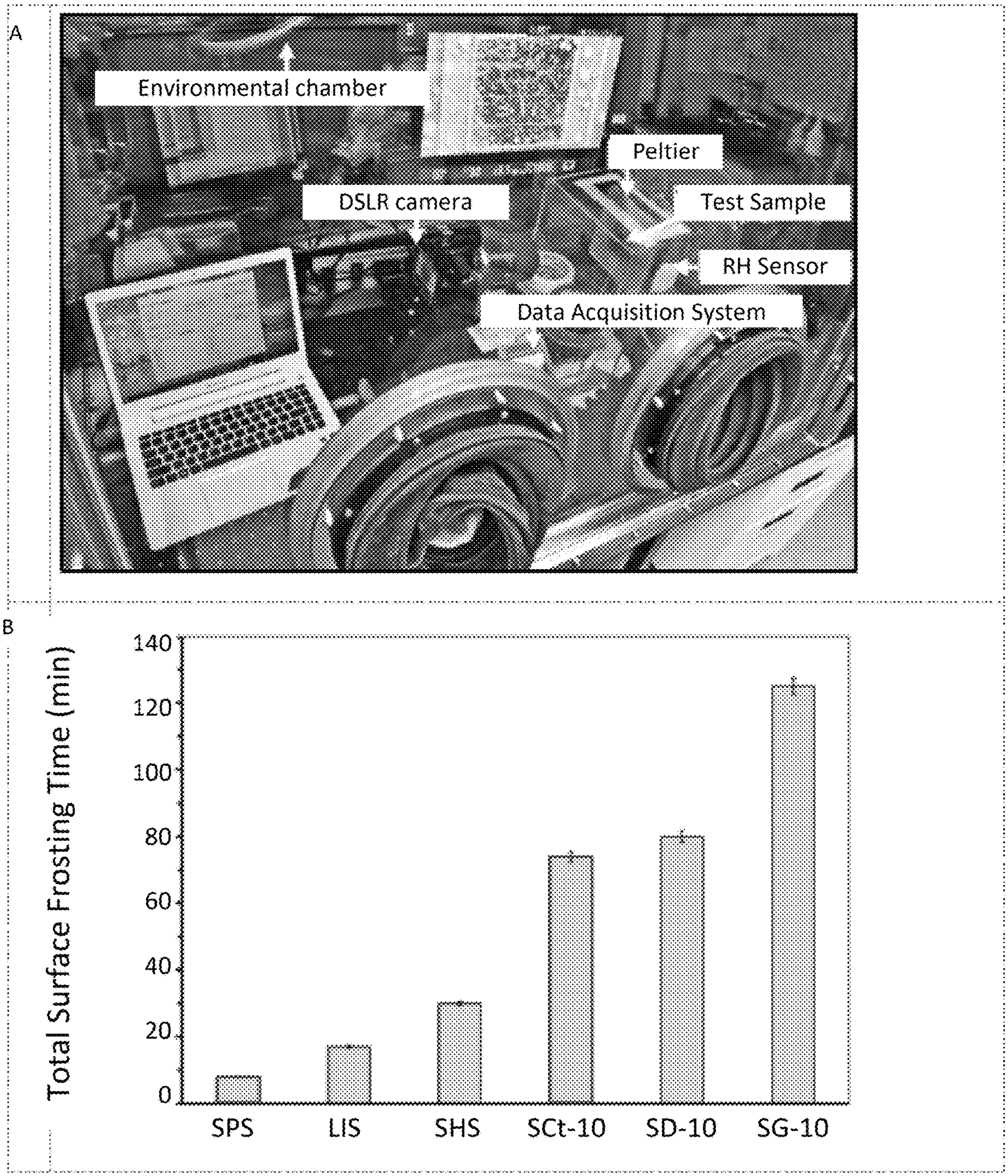
FIG. 21 shows a controlled-environment study of condensation-frosting performance of functional surfaces.

Next, we investigated the freezing delay potential of PCM/PSL infused hydrophilic surfaces and compared their performance (Example 8; B.11) with superhydrophilic surface (SPS), SHS and LIS by cooling all the test substrates (6.45 $cm^2$ size) to −7° C. in controlled environmental conditions ($T_{air}$=25° C., RH=60%). For the bare SPS, SHS and LIS, a hierarchically structured Silicon substrate with 50 μm spacing was used (SEM image in FIG. 18A)). The substrate was silanized to prepare SHS and infused with 10 centistokes Silicone oil to prepare LIS. PCM-IS/PSL-IS were prepared by infusing 10 μm spacing microstructured (SEM image in FIG. 18B)) hydrophilic surfaces with water-miscible (DMSO and Glycerol, $T_{mp}$=18.18° C.) and water-immiscible (Cyclooctane) PCMs/PSLs. These surfaces will hereafter be referred as SD-10, SG-10 and SCt-10 respectively. Experiments showed that PSL-IS lasted ~15 times longer than the bare SPS; even outperforming SHS and LIS (FIG. 13E, 3F and FIG. 21B). These results can be considerably improved by optimizing the surface texture and PCMs/PSLs (for example by choosing smooth S-PCM/S-PSL with even lower vapor pressures). Additionally, like bulk S-PCMs/S-PSLs, PCM-IS/PSL-IS can effectively repel impacting water droplets compared to SHS (FIG. 13G) in outdoor frigid ($T_{air}$=−5° C., RH=65%) environmental conditions.

To summarize the findings of this example, we demonstrate a surface coating that significantly delays frost and ice formation, repels a myriad of liquids thereby preventing contamination, is self-healing by being resilient towards mechanical damage and thus has the potential for far-reaching technological advance. PCMs/PSLs can significantly delay condensation-frosting when used either in bulk or surface infused states, imparting ice/frost-phobicity even to hydrophilic substrates. Our approach is simple and scalable making expensive fabrication techniques redundant. Additionally, the synergistic effect of condensation induced surface melting and freezing point depression can culminate in extensive freezing delays using water-miscible PCMs/PSLs. With reconfigurable surface topographies, S-PCMs/S-PSLs demonstrate unique optical properties that could be useful for fabricating 'smart windows' capable of dynamically adjusting the daylight by switching from being transparent to opaque while simultaneously being self-cleaning. Thus, we expect S-PCMs/S-PSLs to play an important role in designing next-generation materials for applications ranging from lab-on-chip to drag reduction. We envision that the vast library of PCMs/PSLs available today could target a wide temperature range. With the broad spectrum of unrivalled functionalities, PCMs/PSLs may address the most compelling economic and ecological problems experienced by modern adhesion and anti-icing industries.

Figure 11:
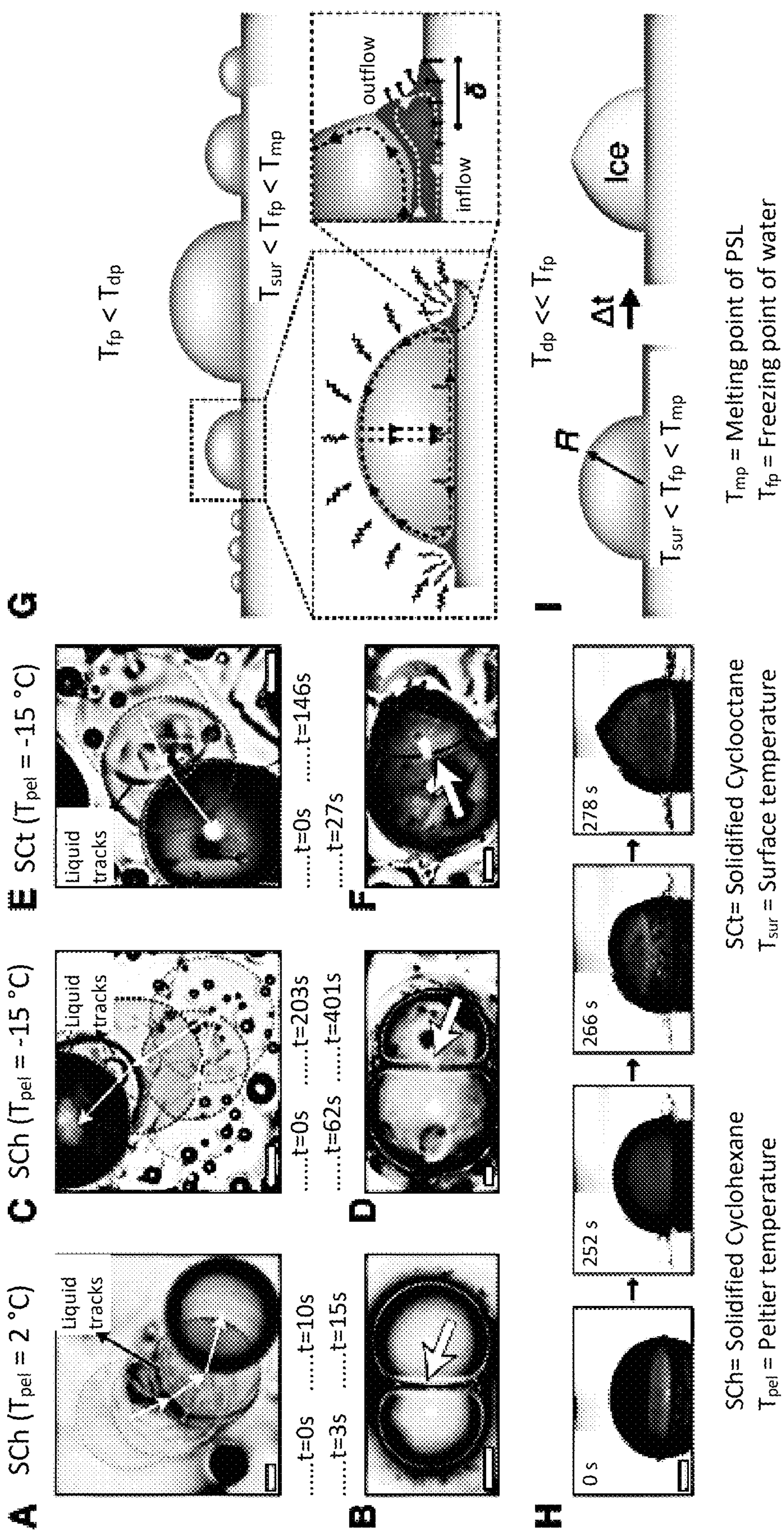
FIG. 11 shows the effects of latent heat trapping during condensation on PCM surfaces.

FIG. 11 shows the effects of latent heat trapping during condensation on bulk S-PCM/S-PSL surfaces. (A), (C), (E), Optical images of a condensed water droplet in an environment with relative humidity, RH=80% on: (A) SCh surface subjected to Peltier temperature, Tpel=2° C., (C) SCh surface at Tpel=−15° C. and (E) SCt surface at Tpel=−15° C. Droplet perimeter footprints (liquid tracks) at prior time instants are shown using overlapping circles. (B), (D), (F), Optical images of two condensed water droplets in an environment with RH=80% separated by: (B) a Cyclohexane film at Tpel=2° C., (D) Cyclohexane film at Tpel=−15° C. and (F) Cyclooctane film at Tpel=−15° C. (G), Schematic elucidating the underlying mechanism of latent heat trapping in S-PCMs/S-PSLs during vapor condensation. (H), Time-lapse images of a cold-water droplet (~0.1 μl) freezing on SCh surface (Tpel=−15° C.) in the absence of condensation (Tair=25° C. and RH=4%). (I), Schematic illustrating the droplet freezing behavior on S-PCM/S-PSL surface when Tdp is far below Tfp. Scale bars: (A-F) 25 μm, (H) 500 μm.

Figure 12:
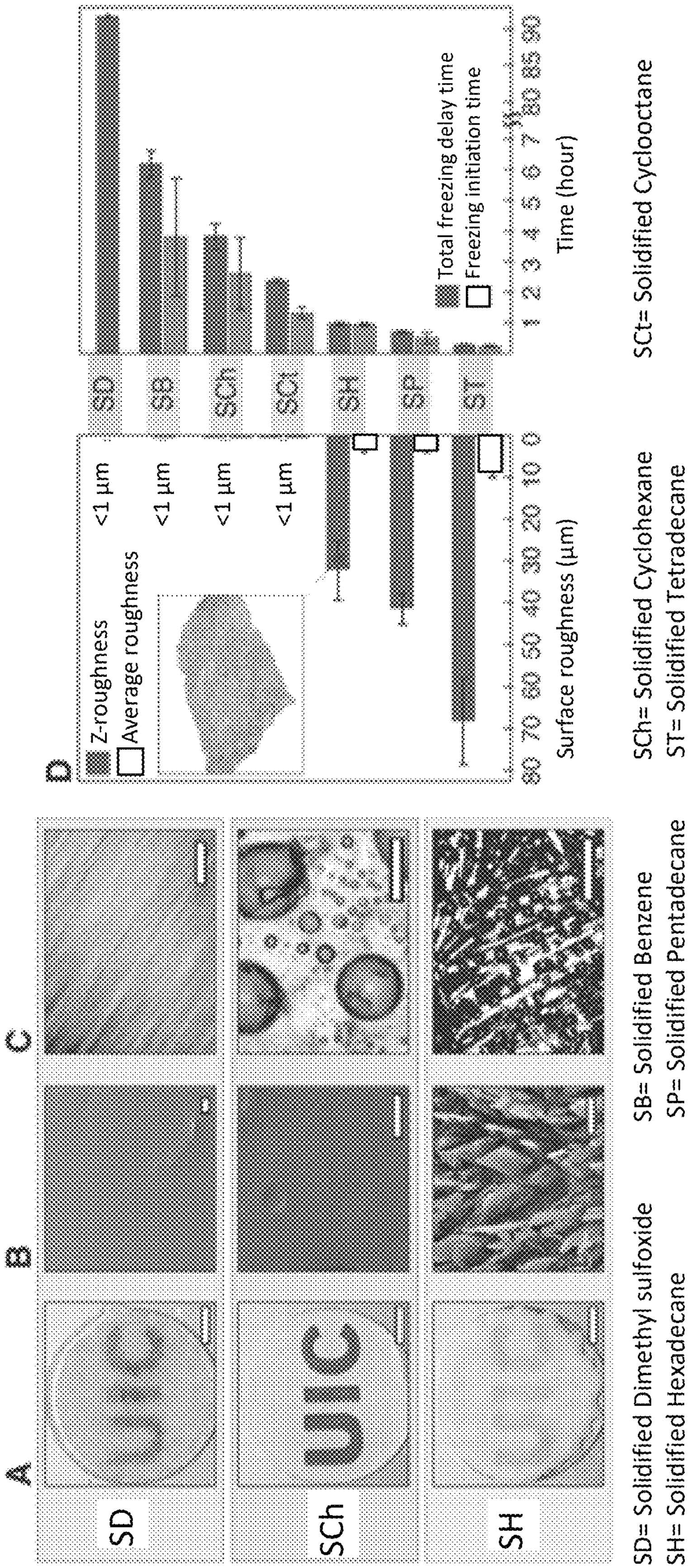
FIG. 12 shows condensation-frosting dynamics on different PCM surfaces.

FIG. 12 shows condensation-frosting dynamics on different bulk S-PCM/S-PSL surfaces. (A) Optical transparency of PCM/PSL (Dimethyl sulfoxide, Cyclohexane and Hexadecane) coated Aluminum surfaces at Tpel=4° C., RH=15%. Scale bars: 1 cm. (B) SEM images (imaged at 45°) of photopolymer replica molds delineating S-PCM/S-PSL surface morphologies (Tpel=−5° C., RH=11%). Scale bars: 25 μm. (C) Optical micrographs of typical condensation behavior on corresponding bulk S-PCM/S-PSL surfaces at Tpel=−15° C., RH=80%. Scale bars: 200 μm. (D) S-PCM/S-PSL surface roughness (left) was measured using an optical profilometer in 5% RH environment. 'Average roughness' is the arithmetic mean of absolute height shifts about the mean reference plane while 'Z-roughness' denotes the distance between the highest peak and lowest valley on the surface. Condensation-frosting performance of various bulk S-PCMs/S-PSLs (right) cooled to Tpel=−15° C. in 80% RH environment. The 'freezing initiation time' depicts the occurrence of the first condensate freezing event in the field of view (2.1 mm2), while the 'total freezing delay time' represents the net time required for all the condensed droplets on S-PCM/S-PSL surface (2375 mm2) to freeze since the onset of freezing initiation. The error bars (left and right) denote standard deviations, obtained from experimental measurements on different 5-PCMs/S-PSLs repeated at least four times each.

Figure 13:
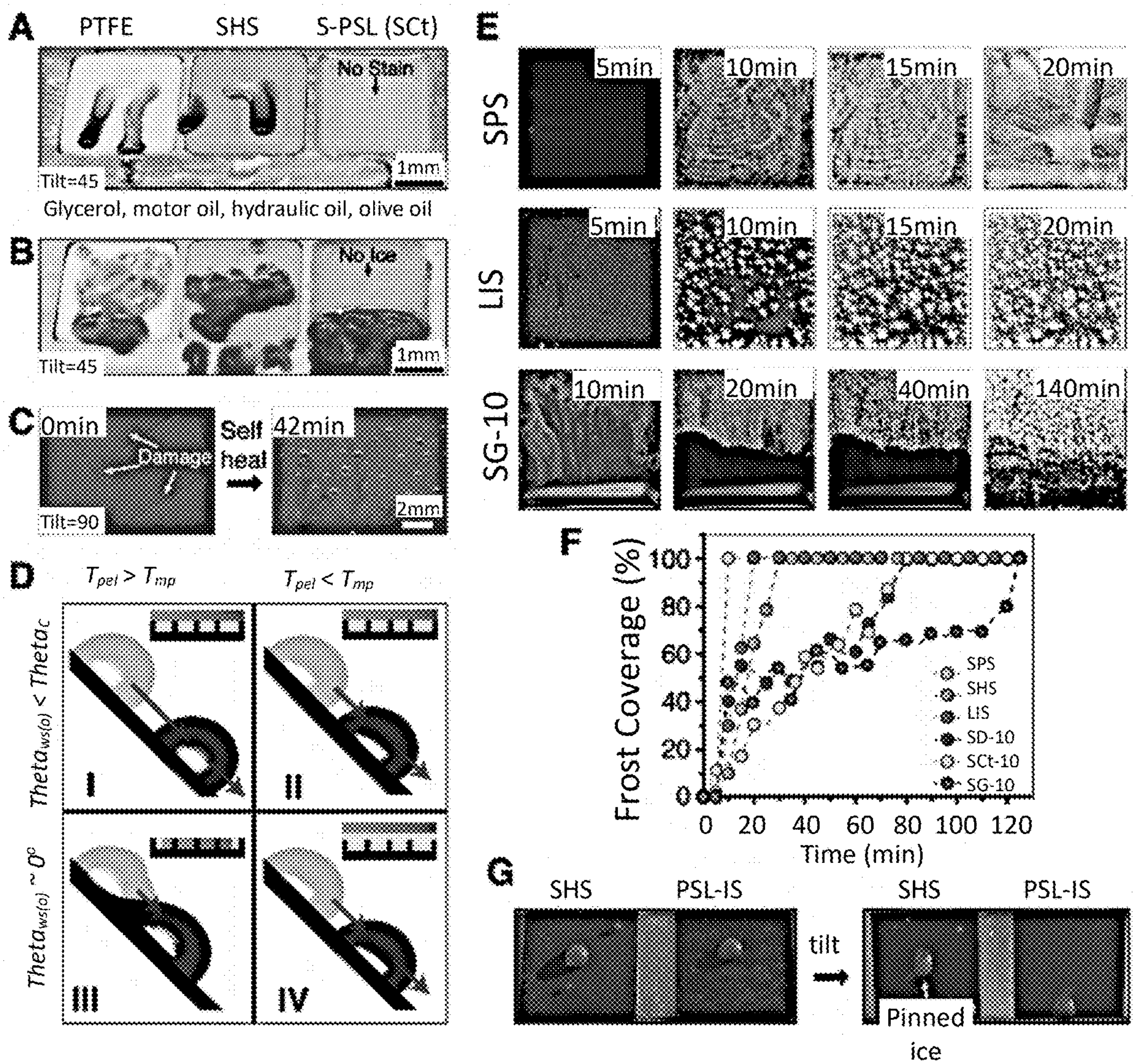
FIG. 13 shows the versatility of PCMs in bulk and surface infused states.

FIG. 13 shows the versatility of S-PSLs in bulk and surface infused state. (A) Repulsion of various liquids (70 μL) on S-PCM/S-PSL (SCt), PTFE and SHS (Tpel=5° C., 25% RH, 45° inclination) in bulk state. (B) Ice-repellency of S-PCM/S-PSL compared to PTFE and SHS (Tpel=−15° C., 18% RH, 45° inclination) in bulk state. (C) Condensation ensued self-healing (Tpel=5° C., 80% RH, 90° inclination) of bulk S-PSL (SCt) subjected to mechanical damage (~400 μm wide, ~800 μm deep). (D) Regime map showing the mobility of a cooled (0° C.) water droplet (10 μL) on PCM/PSL (Pentadecane) infused SHS maintained above its Tmp (I) and below its Tmp (II) at Tpel=2° C.; PSL infused hydrophilic surface maintained above its Tmp (III) and below its Tmp (IV) at Tpel=2° C. Samples (6.45 cm2) were tilted at 45° in 23° C., 24% RH environment. (E) Time-lapse images of condensation-frosting experiments on vertically mounted SPS, LIS and PSL (Glycerol) infused hydrophilic surface (each 6.45 cm2 size) subjected to Tpel=−7° C., 60% RH. (F) Temporal surface frost coverage (field of view ~6.45 cm2) plot of different substrates at −7° C. and 60% RH. (G) Outdoor ice-repellency experiment (Tair=−5° C., 65% RH) of PCM/PSL (Pentadecane) infused SHS compared to nano-textured SHS (each 6.45 cm2 size).

Example 8

Materials and Methods

A. Materials

Figure 34:
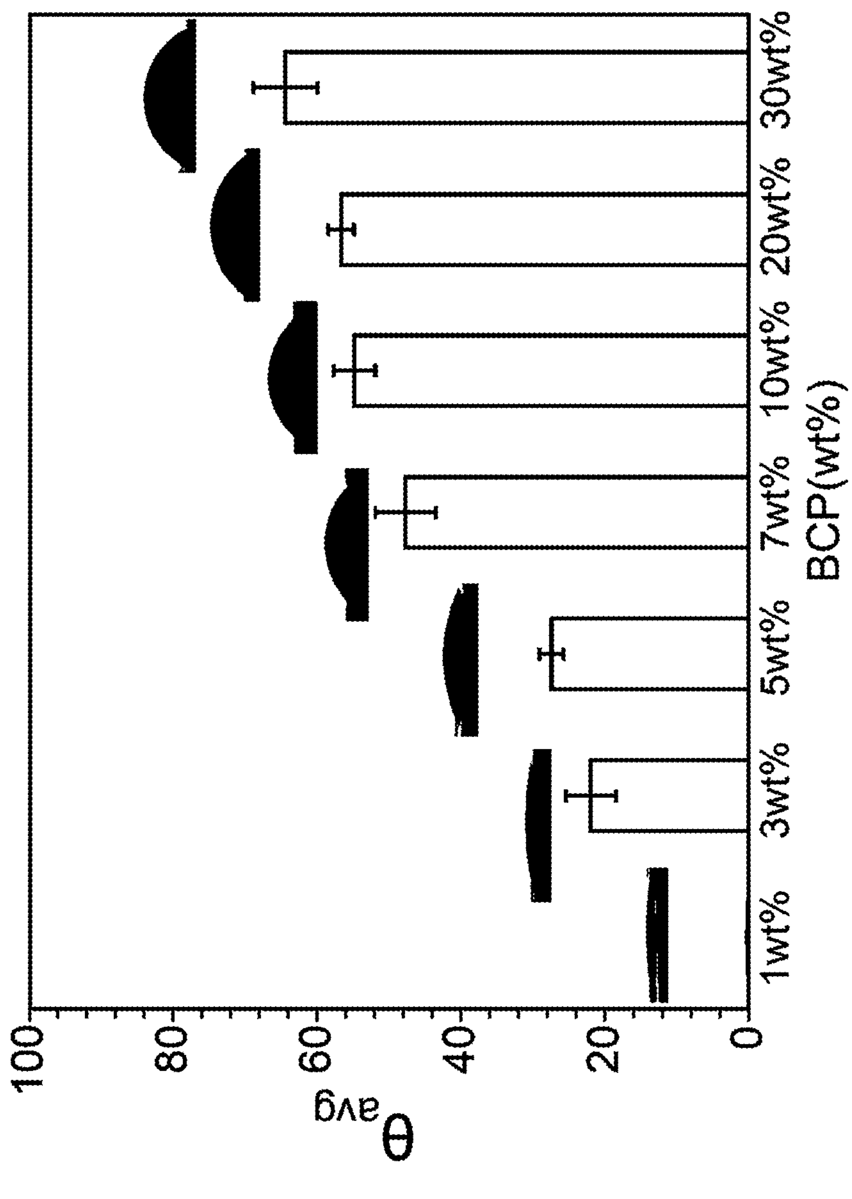
FIG. 34 shows the effect on water drop contact angle on solidified surfaces of DMSO with varying percentages of block-copolymer (BCP) of poly(ethylene glycol)-block-poly(propylene glycol)-block-poly(ethylene glycol) in a low humidity environment.

A.1 Chemicals: All the chemicals used in the current study were of analytical grade (or higher), purchased from Sigma Aldrich and used without any further purification. Chemical properties are listed in Table 2, which is shown in FIG. 34. For Table 2, $T_{mp}$=melting point, AT=ambient temperature, ST=surface tension, IFT=interfacial tension, $L_c$=enthalpy of fusion, μ=dynamic viscosity, ρ=density. Further, general material properties were obtained from W. M. Haynes, CRC handbook of chemistry and physics, CRC press, 2014; C. L. Yaws, The Yaws Handbook of Physical Properties for Hydrocarbons and Chemicals, Elsevier Science, 2015. Solubility of organics in water obtained from C. L. Yaws, Yaws' Critical Property Data for Chemical Engineers and Chemists, Knovel, 2012. Solubility of water in organics obtained from C. Yaws, Knovel: Norwich, NY 2012, 515, 244. Interfacial tension obtained from A. H. Demond, A. S. Lindner, Environ. Sci. Technol. 1993, 27, 2318. Spreading coefficients, described in A. H. Demond, A. S. Lindner, Environ. Sci. Technol. 1993, 27, 2318, are given by $S_{wo(a)}=\gamma_{oa}-\gamma_{wa}-\gamma_{wo}$, $S_{ow(a)}=\gamma_{wa}-\gamma_{oa}-\gamma_{wo}$. The liquid-organic angle ($\theta_{ow}$) is described as $\theta_{ow}=$ $$\cos^{-1}\left[\frac{\gamma_{oa}^2+\gamma_{ow}^2-\gamma_{wa}^2}{2\gamma_{oa}\gamma_{ow}}\right].$$

For benzene-water IFT, two different behaviors have been observed due to the slightly higher miscibility of the liquids as a result of which water IFT changes substantially. Refer to A. H. Demond, A. S. Lindner, Environ. Sci. Technol. 1993, 27, 2318 and A. H. Demond, A. S. Lindner, Environ. Sci. Technol. 1993, 27, 2318.

Figure 18:
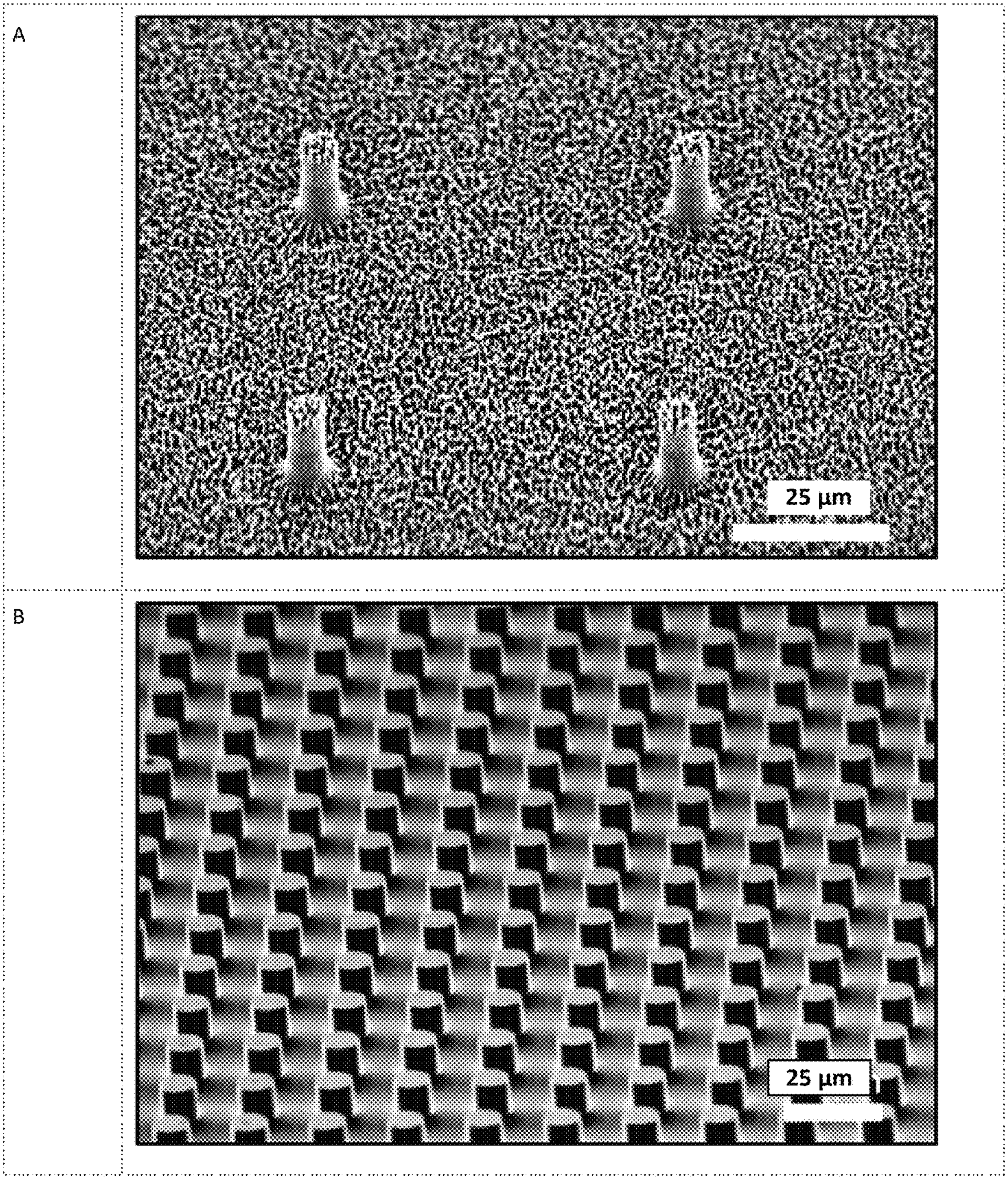
FIG. 18 shows Scanning Electron Microscopy (SEM) images of textured Silicon surfaces.

A.2 Fabrication of micro/nano patterned surfaces: Silicon wafers were first cleaned by sonicating them sequentially in a bath of acetone, methanol, isopropyl alcohol, deionized water and later dried. To prepare the nanograss surface, black Silicon method was used wherein four-inch Silicon wafer (525 μm thick, p-type) was etched using Deep Reactive Ion Etching (DRIE) under the continuous flow of an etchant gas ($SF_6$) and a passivation gas ($O_2$). To obtain the micropost surface (10 μm post width, 10 μm pillar height, 10 μm edge-to-edge spacing), four-inch Silicon substrate was first patterned via standard photolithography using Heidelberg MLA 150 Direct Write Lithographer, followed by dry etching using a Bosch DRIE process. To obtain the hierarchically textured surface, the micropost surface (50 μm edge-to-edge spacing) was further etched in a plasma of $SF_6$ and $O_2$ rendering nanograss texture on the top and in the spaces between the microposts. FIG. 18 shows the SEM images of the textured samples. After fabrication, all the samples were examined under a FEI Quanta 650 FEG SEM. TYKMA Electrox Laser Marking System was used to laser cut the fabricated 4-inch sample into the desired size, as required for experimentation.

A.3 Preparation of impregnated samples: The fabricated Silicon samples were first thoroughly cleansed by sonicating them in a bath of acetone, ethanol, isopropyl alcohol and deionized water. After drying the samples with nitrogen gas, they were plasma cleaned (Herrick Barrel Plasma Etcher) to remove any organic contaminants. Phase Change Material Infused Surfaces (PCM-IS)/PSL Infused Surfaces (PSL-IS) were prepared by initially spreading out excess PCM/PSL in order to completely cover the textured surfaces. Uniform impregnation of samples, without any excess lubricant, was achieved by next spinning the impregnated samples at 1500 RPM for one min using a spin coater (Laurel) Technologies WS-650 Mz-23NPPB) and subsequently mounting them vertically for 10 minutes to gravity-shed any excess lubricant. To prepare lubricant infused superhydrophobic surface, the plasma cleaned sample was silanized with Octadecyltrichlorosilane (OTS) and then lubricant impregnated, following the same protocol as mentioned above.

Figure 19:
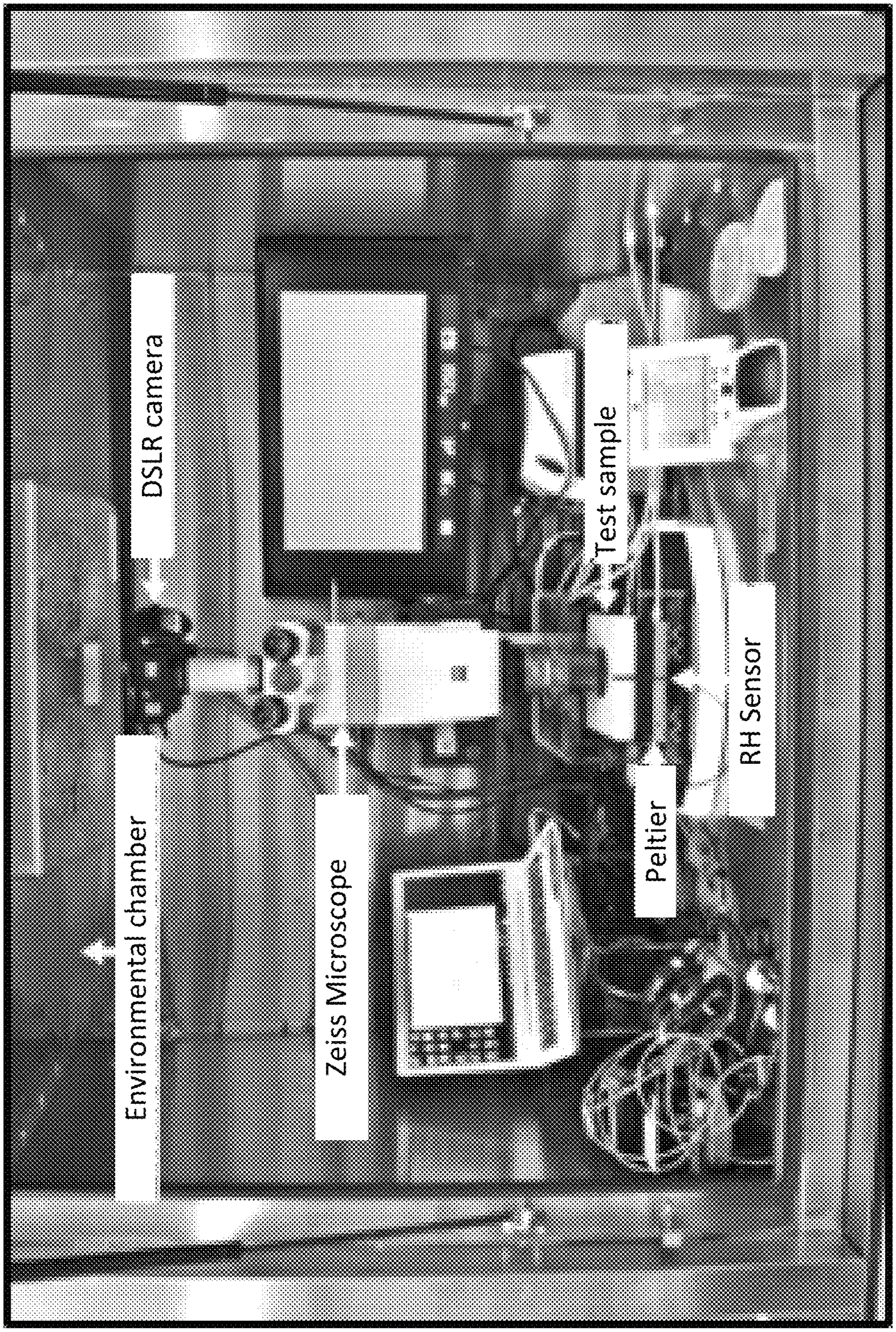
FIG. 19 shows the experimental setup for performing condensation-frosting experiments escribed herein.

A.4 Setup for performing condensation-frosting experiments: All the condensation-frosting experiments, pertaining to FIGS. 11A-11F and FIG. 28, were performed in a custom-built environmental chamber (FIG. 19). The environmental chamber is capable of precisely controlling the ambient temperature and relative humidity of the enclosure while maintaining a contaminant-free, positive-pressure environment with negligible air convection effects. The humidity of the environmental chamber was measured by the glovebox humidity sensor (measuring range: 0-100% RH, accuracy: ±2% RH at 20° C.). Additionally, the local humidity and temperature around the test samples were monitored using a Sensirion sensor (SHT71) throughout the experimental duration. A water-cooled thermoelectric cold plate (TECA LHP-800CP) capable of lowering the temperature from 20° C. to −15° C. within 5 minutes was used for all the condensation-frosting experiments. The Peltier surface temperature was controlled using a PID temperature controller. Electrically insulated thermocouples (Type K, OMEGA) were bonded onto the Peltier surface to continuously record the Peltier surface temperature using a digital data acquisition system (OMEGA-DAQPRO-5300). For optical recording of the condensation-frosting experiments, videos were shot from a top-down view using a Nikon D810 DSLR camera (1920×1080 resolution, 29.97 fps) fitted on a high zoom optical microscope (Carl Zeiss Axio Zoom V16 equipped with a Zeiss Plan Apo1.5× lens). The microscope uses a CL 9000 LED co-axial cold light source for illumination thereby eliminating the possibility of local heating of the test sample surface even while observing at very close working distances.

B. Laboratory Studies

B.1 Contact angle measurements: Water Contact Angles (WCA) of superhydrophobic and Polytetrafluoroethylene (PTFE) surfaces were measured using a video based optical contact angle measurement system by virtue of SCA20 software on a goniometer (OCA 15Pro, Dataphysics GmbH, Germany) at ambient conditions (23° C., 20% RH). WCA measurement of the solidified PSL surface was carried out inside the glovebox, maintained at a very low humidity (4% RH) environment in order to prevent any condensation. The liquid PCM/PSL (8 ml) was cooled below its corresponding $T_{mp}$ using the TECA Peltier cooler. A deionized water droplet (~5 μL), at a temperature lower than the melting point of the PSL was gently deposited on the solidified PSL surface and imaged from the side using a PointGrey camera fitted with an InfiniProbe (TS-160 MACRO) lens and backlit by Nita Zaila light source. Subsequently, the images were analyzed in ImageJ software to obtain the corresponding WCAs. All reported CAs are averages of five independent measurements on different locations of a single sample. The accuracy of the measured contact angle is ±1°.

B.2 Protocol for performing condensation-frosting experiments on bulk surfaces: Samples (bulk liquid PCM/PSL, structured Silicon surfaces, PTFE) were placed in a specially built annular copper container (inner diameter: 5.5 cm, capacity of 10 ml) fitted with a matching PTFE ring (1 cm thick). The PTFE ring aided in suppressing the icing/frosting due to edge effects to some extent. The bottom of the copper chamber had a highly polished flat surface which ensured good thermal contact with the Peltier cooler surface. A rectangular PTFE block (1.5 cm thick) with an annular hole in the middle, to incorporate the copper chamber and covering the Peltier surface area was used to insulate the latter, thereby ensuring that the Peltier only cooled the copper chamber and its contents. For experiments corresponding to condensation-frosting on bulk S-PCM/S-PSL surfaces, a smooth bare Silicon wafer was placed on the base of the copper container for enhancing the experimental visualization. For each of the aforementioned experiments, 8 ml of PCM/PSL (~3.3 mm thick layer of S-PCM/S-PSL on solidification and 2375 mm2 solidified surface area) was filled into the container. Before each experiment, the copper chamber, PTFE ring and Silicon wafer were thoroughly cleansed using acetone, ethanol, isopropanol, deionized water and then dried using Praxair nitrogen gas (99% pure). For performing each experiment, the corresponding test samples, test chemicals (in sealed containers), visualization equipment and all the necessary experimental apparatus were placed inside the environmental chamber. Then, the chamber was air-locked and set to desired humidity/temperature conditions and experiments were performed. The Plan APO-Z 1.5× lens of the Zeiss microscope along with the Peltier and copper chamber assembly were housed inside a rectangular acrylic chamber with front face open to ensure that the local environ of the test sample is maintained at the set humidity level while being shielded from the direct impact of gushing in stream of steam inside the glovebox. Until the desired experimental conditions of RH and temperature were reached, the copper chamber containing the samples was kept covered with an acrylic plate. When the ambient conditions in the glovebox reached a steady state value, the acrylic cover plate was uncovered, the Peltier was switched on and simultaneously the video recording was started using the DSLR camera atop the microscope. Continuous video recordings were made for all the experiments and analyzed later using ImageJ and MATHEMATICA software. For all the condensation-frosting experiments with bulk test substrates, a constant field-of-view pertaining to the central region of each sample was fixated upon for each test to ensure uniformity of experimental visualization (100× magnification) and analysis. The total freezing delay timescale characterization for the bulk test surfaces (FIG. 28) was calculated based on the onset of the first droplet freezing event. For determining the "freezing initiation time" (FIG. 28) the field of view corresponded to 2.1 mm2 while for the determination of "total freezing delay time" (FIG. 28), the entire test surface was within the field of view with the observation window corresponding to 23.75 cm2 surface area. At the end of each experiment, macroscopic image of the entire test sample was taken to capture the frost coverage and densification.

B.3 Infrared Imaging: Thermometric characterization of S-PSLs were performed by means of an infrared camera (FLIR A8201sc, spectral range 3-5 μm) equipped with a 4× microscopic lens (f/4.0, 50 mm), within 1024×1024 pixels (detector pitch: 18 μm), at a framerate of 30 fps with an accuracy of ±2° C. In combination with the microscopic lens, the resolution of the camera is ~4.5 μm/pixel. The IR camera was mounted on a fixture for top-down imaging and housed in the glovebox for controlled environment experiments while taking measures to negate the Narcissus effect [1] as much as possible. Prior each experiment, the IR camera was calibrated based on the experimental conditions. The thermometric data was acquired and analyzed using the built-in FLIR Research IR software. IR images are showcased using the 'Ironbow' color palette to exhibit the subtle details of heat distribution. This palette represents hot entities in warm colors and the colder objects with dark colors. The temperature scale bar's color gradient from black to white corresponds to the infrared signal emission varying from low to high.

B.4 Freezing delay potential in bulk state of S-PCM/S-PSL compared to conventional materials: The condensation-frosting experiments were performed in the glovebox subjected to the conditions of $T_{air}$: 25° C., RH: 80%. A nano-textured Silicon substrate (5.5 cm diameter) silanized with Octadecyltrichlorosilane, exhibiting WCA of 147°, was used as a representative example of superhydrophobic surface (SHS). The substrate was placed in a copper container and subsequently cooled to $T_{pel}$=−15° C. Within 18±6 minutes an invading inter-droplet freezing wave engulfed the entire field of view (2.1 $mm^2$, constant for all experiments) in a spate of freezing events. Next, a hydrophobic surface with higher thermal resistance than thermally-conductive silicon was tested. A plain PTFE sample (5.5 cm diameter, 3.3 mm thick, WCA ~108°) was subjected to $T_{pel}$=−15° C. Although thermal conductivity of PTFE (0.25 W/m/K) is significantly lower than that of Silicon (142.2 W/m/K), droplets condensing in the field of view of PTFE surface froze within 22±1 minutes. Finally, we performed condensation-frosting experiments under identical experimental conditions on solidified Cyclohexane having thickness same as PTFE (3.3 mm). Droplets condensing on hydrophobic SCh surface (WCA) ~104° showed distinct behaviors compared to SHS or PTFE surfaces. Condensed droplets on SCh remained mostly unfrozen for as long as 229±25 minutes. They froze eventually, primarily due to the gradual sublimation of Cyclohexane itself which was further exacerbated by the inevitable "edge-effect" ensued freezing wave front propagation. It must be noted that if the bulk performance (constant 23.75 $cm^2$ circular surface area) of SHS/PTFE is directly compared with bulk SD (23.75 $cm^2$), where ice/frost formation was impeded for >5760 minutes (FIG. 28) under identical environmental conditions, then the freezing delay can be ~300 times longer than a conventional surface.

B.5 Protocol to obtain the negative replica of solidified PCM/PSL surface: Experiments were performed in the glovebox in a low humidity ($T_{air}$: 22° C., RH: 11%, $T_{dp}$: −8° C.) environment. A rectangular copper container (5×5×3 $mm^3$) was partially filled (80% of its volume) with PCM/PSL and cooled to −5° C. using the Peltier. Once the PCM/PSL solidified, cooled liquid photopolymer from Norland Optics (NOA-89 for ST, SP, SH; NBA-108 for SB, SCh, SCh, SD) was gently poured over the frozen PCM/PSL to fill up the remaining volume of the container. Prior deposition, the photopolymer was maintained at a temperature below the melting point of each PCM/PSL so as to prevent any PCM/PSL melting upon contact. The photopolymer spread completely on the surface of the S-PCMs/S-PSLs. Thereafter, the photopolymer was quickly polymerized using a UV lamp (exposure time of 5-10 minutes). Post curing, the Peltier was set to the ambient temperature which caused the PCM/PSL to melt but caused the cured polymer film to detach. The cured polymer film (having the negative embossments of the solidified PCM/PSL surface) was carefully withdrawn and any excess oil on it was removed by placing it in a vacuum oven at 30° C. Thereafter, it was kept in an air-tight container and immediately taken for surface characterization by SEM.

B.6 Surface roughness measurements of solidified PCM/PSL surface: The size and shape of surface irregularities can play a pivotal role in dictating the nucleation dynamics, thereby necessitating a thorough surface roughness quantification. Commonly, surface roughness characterization is quantitatively described in form of average roughness ($S_a$) and root mean square roughness ($S_q$). $S_a$ represents the arithmetic mean of the absolute height shifts about the mean reference plane, corresponding to the measured area, while $S_q$ represents the standard deviation of the profile. However, these parameters are inadequate to describe texture features like presence of peaks and valleys, because of which surfaces having same $S_a$ can have entirely different geometrical features. Thus, use of additional shape parameters are often necessary, namely kurtosis ($S_{ku}$) that is indicative of "spikiness" of the features, skewness ($S_{sk}$) that is indicative of surface symmetry and finally maximum height ($S_z$) that is indicative of the distance between highest peak and lowest valley on the surface.

In the current study, roughness measurements of solidified PCM/PSL surfaces were obtained by scanning the S-PCM/S-PSL surfaces (cooled down to 5° C.) using an optical surface profilometer (Keyence VHX6000) placed inside the glovebox, which was maintained in a very low humidity (5% RH) environment. This enabled high magnification (2000×), high-resolution and non-contact 3D roughness measurement. For each sample, a minimum of four measurements were taken at different spatial locations of the sample with a measurement scan area of 2,388,273 $μm^2$. The corresponding surface roughness parameters were evaluated and is tabulated in Table 3.

TABLE 3

Surface roughness parameters for rough S-PSL (PCM) surfaces

| | RMS, $S_q$ (μm) | | Kurtosis ($S_{ku}$) | | Skewness ($S_{sk}$) | |
|---|---|---|---|---|---|---|
| Surface | Mean | SD | Mean | SD | Mean | SD |
| ST | 10.89 | 1.62 | 3.28 | 0.50 | −0.38 | 0.35 |
| SP | 4.53 | 1.12 | 4.20 | 0.35 | −0.28 | 0.23 |
| SH | 3.98 | 1.02 | 3.60 | 0.00 | −0.33 | 0.25 |

Figure 15:
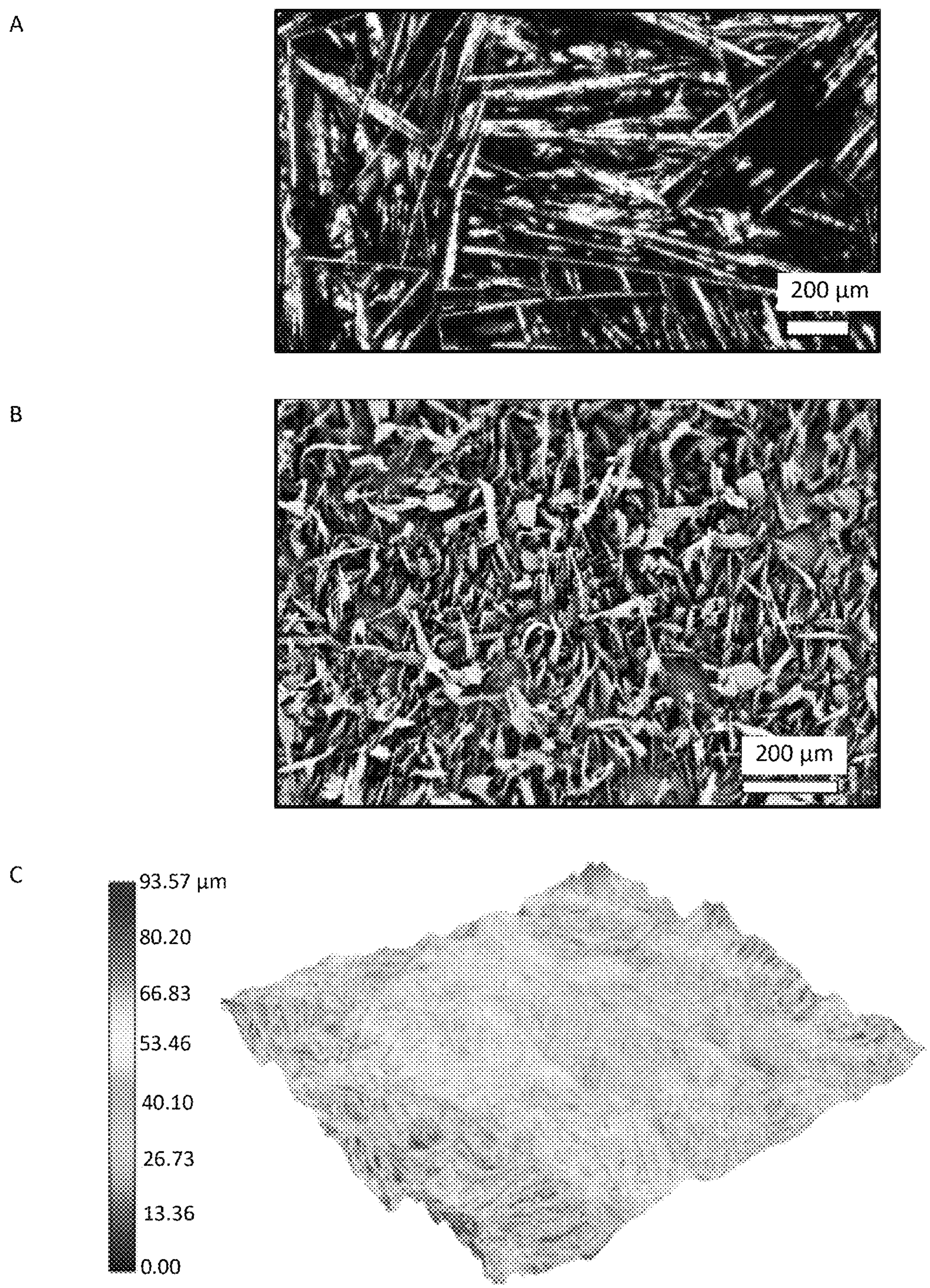
FIG. 15 shows a characterization of solidified tetradecane (ST) surface.
Figure 17:
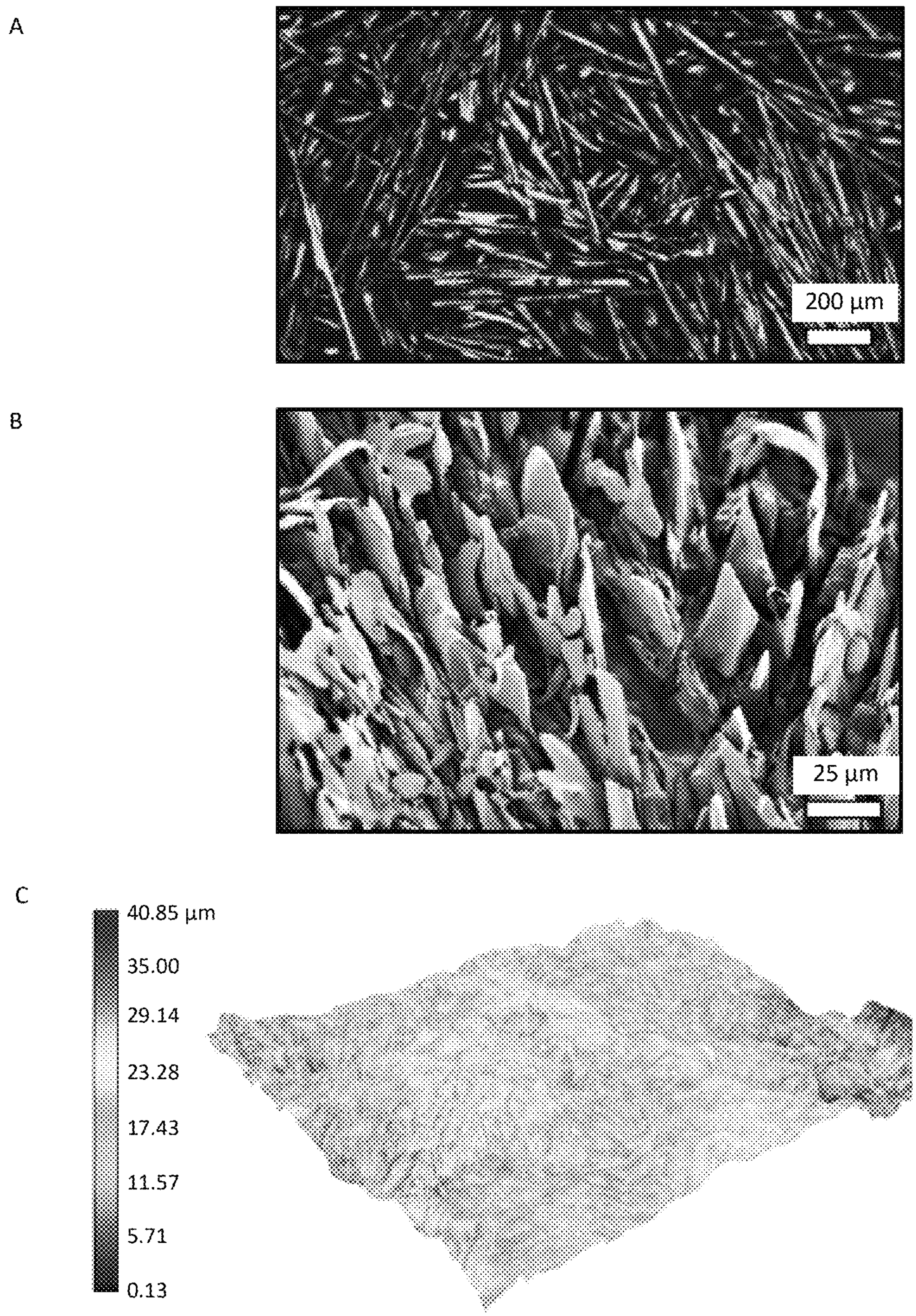
FIG. 17 shows characterization of solidified hexadecane (SH) surface.

Solidified Tetradecane (ST), solidified Pentadecane (SP) and solidified Hexadecane (SH) surfaces were found to demonstrate a sequentially decreasing order of average roughness ($S_a$) and root mean square roughness ($S_q$) values. Additionally, each of ST, SH, SP surfaces exhibit a predominance of deep valleys as corroborated by a negative skewness ($S_{sk}<0$) measurement. The fact that the surfaces of ST, SP, SH are spiky comprising of sharp asperities are substantiated by the kurtosis ($S_{ku}$) measurements of $S_{ku}>3$. These measurements also make sense upon observing the corresponding optical and SEM images of the S-PCM/S-PSL surfaces (FIGS. 15-17). Looking into the logical trend of the surface roughness parameters, the relation between surface roughness and curtailed freezing delays of rough PCMs/PSLs appear well correlated.

B.7 Liquid repellency test of S-PCM/S-PSL: A rectangular aluminum block (5.6×10.2 cm², 0.5 cm thick) having three equally spaced rectangular pockets (3×2.4 cm², 0.1 cm deep) was bolted onto a Thermoelectric Peltier stage (TE Technology CP-061). PTFE, superhydrophobic surface and PCM/PSL (Cyclooctane) matching the sample holder's pocket dimensions were filled in and the entire setup was subjected to the conditions of $T_{pel}$=5° C., $T_{air}$=25° C., RH=25% and inclination of 45°. Next, different kinds of liquids (volume ~70 μL) were impinged on each of these surfaces from at a height of 2 cm above each test substrate. Dyed water, glycerol, crude motor oil, hydraulic machine oil and olive oil were used as the impacting test liquids. The PTFE and superhydrophobic surface was seen to get stained while the PSL surface repelled all the impacting liquids. The S-PCM/experiment was repeated 3 times and also verified with SCh which is also a smooth S-PCM/S-PSL.

B.8 Ice-repellency of S-PCM/S-PSL compared to conventional materials: A rectangular aluminum block (5.6×10.2 cm², 0.5 cm thick) having three equally spaced rectangular pockets (3×2.4 cm², 0.1 cm deep) was bolted onto a Thermoelectric Peltier stage (TE Technology CP-061). PTFE, superhydrophobic surface and PSL (Cyclooctane) matching the sample holder's pocket dimensions were filled in and the entire setup was subjected to the conditions of $T_{pel}$=−15° C., $T_{air}$=25° C., RH=18% and inclination of 45°. After steady state was reached, dyed water (volume ~70 μL) was sprayed on each of the surfaces. Heavy ice accretion was observed on the PTFE and superhydrophobic surfaces while the PCM/PSL surface was completely ice free for the entire experimental duration. Furthermore, even after critical mechanical damage was inflicted on the PCM/PSL surface with a sharp metal blade, it was seen to retain its icephobicity. The sliding water droplets didn't freeze on the PCM/PSL surface and were seen to accumulate in the form of ice at the edge of its base where it came in direct contact with the frigid Peltier surface at −15° C. The experiment was repeated 3 times and also verified with SCh as a test S-PCM/S-PSL.

B.9 Self-healing test of S-PCM/S-PSL: An aluminum plate (0.5 cm thick) with a rectangular cavity (3×2.4 cm², 0.1 cm deep) was filled with a PCM/PSL (Cyclooctane) and bolted onto the Peltier surface. After cooling it to $T_{pel}$=5° C., the setup was tilted at an angle of 90°. Mechanical damage was inflicted on the PCM/PSL surface in the form of a series of surface incisions (~400 μm wide, ~800 μm deep) using a sharp metal blade. Experiments were carried out under environmental conditions of 25° C., 80% RH. After 42 minutes of sustained condensation, the S-PSL surface was seen to, or 1 micron to with the disappearance of the physical damages.

Figure 20:
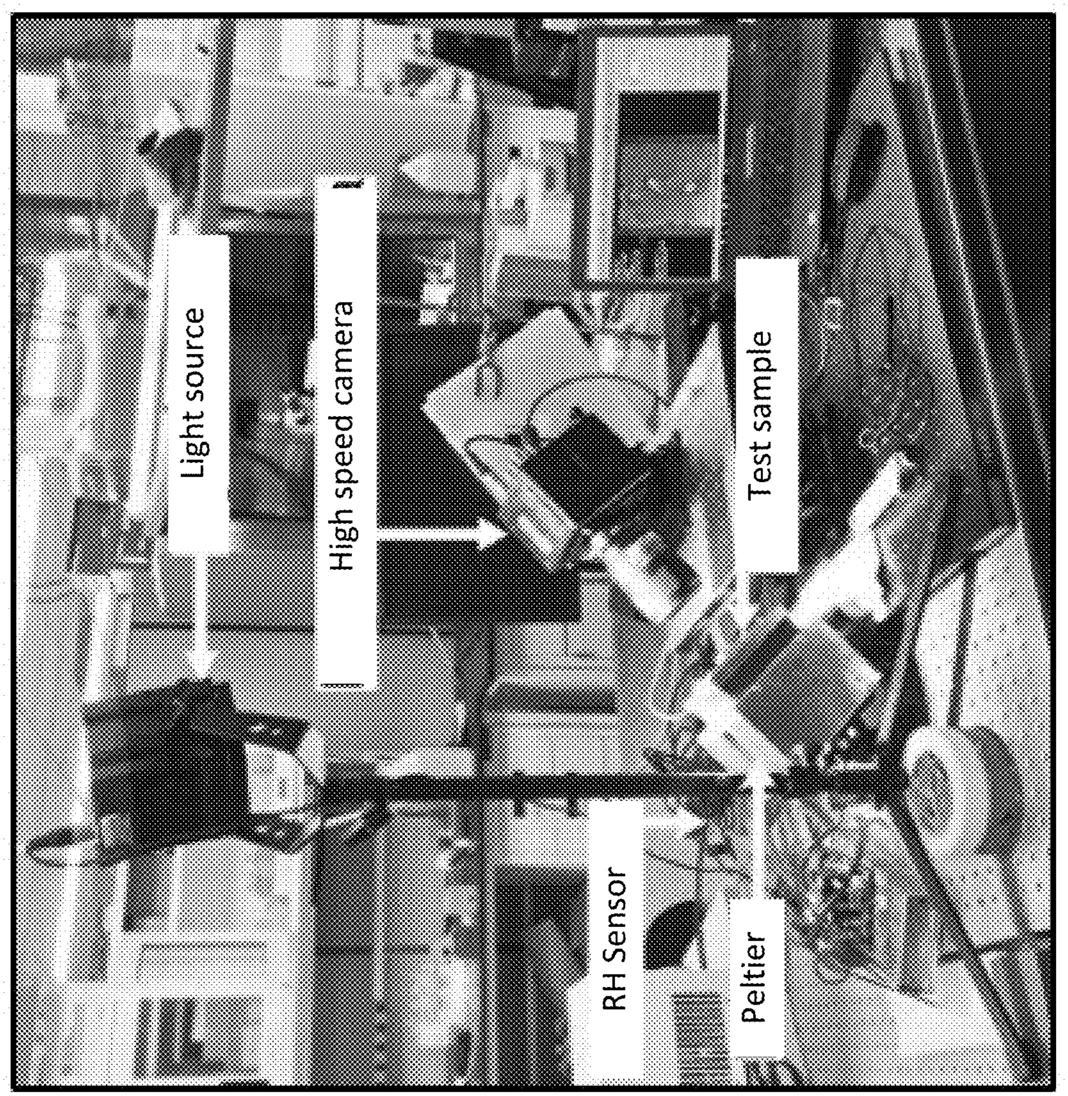
FIG. 20 shows the experimental setup for comparing the water droplet on PCM-infused textured surfaces.

B.10 Droplet mobility on different surfaces: A 10 μL cold water droplet (0° C.) was deposited on various test substrates using an insulated glass needle, fixed at a height of 0.5 cm above each test substrate. The experiments were carried out at an ambient temperature of 23° C. and 24% RH. The test substrates were thermally bonded using a double-sided copper tape onto a Peltier stage (TE Technology CP-061) fixed at an angle of 45°. The experimental setup for the tests corresponding to FIG. 13D is shown in FIG. 20. Hierarchically textured (50 μm edge-to-edge spacing) samples, each 6.45 cm² in size with varying surface functionalization were tested as follows:

PCM/PSL infused superhydrophobic surface at room temperature.

PCM/PSL infused superhydrophobic surface below the $T_{mp}$ of PCM/PSL ($T_{pel}$=2° C.)

PCM/PSL infused hydrophilic surface at room temperature.

PCM/PSL infused hydrophilic surface operated below the $T_{mp}$ of PCM/PSL ($T_{pel}$=2° C.)

To prepare PCM-IS/PSL-IS, the hierarchically textured surfaces were spin coated with PCM/PSL (Pentadecane) in the same manner as discussed earlier. Backlit with a Nila Zaila light source, the phenomenon of drop impact and mobility on different surfaces was captured from the side using a high-speed camera (Photron FASTCAM Mini AX100) equipped with an InfiniProbe (TS-160 MACRO) lens at a frame rate of 4,000 fps. PCM/PSL infused superhydrophobic surface at room temperature demonstrated the highest droplet mobility. While lower than the former, PCM/PSL infused superhydrophobic and hydrophilic surfaces maintained below the $T_{mp}$ of PCM/PSL had comparable droplet mobility. However, irreversible droplet pinning occurred for the PCM/PSL infused hydrophilic surface at room temperature. Simultaneous top view observation of the droplet mobility phenomenon was carried out using the high-speed camera fitted equipped with a TAMARON macro lens. Each test was repeated a minimum of 5 times and at different positions of the sample to ensure experimental uniformity of the reported results.

B.11 Condensation-frosting experiments on functional surfaces: Condensation-frosting experiments to investigate the freezing delay potential of the bare/textured surfaces (with/without lubricants) was carried out under controlled environmental conditions inside the glovebox (FIG. 21A). The test surfaces and Peltier assembly were mounted vertically for experimentation. The temperature of the test substrate, sample holder and the Peltier surfaces were monitored continuously (using a K-type thermocouple connected to OMEGA-DAQPRO-5300) during the experiment and the two measurements were found to match closely justifying the absence of any surface temperature difference due to the inclusion of the sample holder. A SENSIRON SHT7× digital humidity and temperature sensor was placed in close proximity to the test sample to additionally monitor and record the local environmental conditions. The glovebox was actively controlled to maintain a constant relative humidity of 60% and 25° C. ambient temperature. Once the glovebox reached steady state conditions, the Peltier was switched on to cool the test substrates from ambient temperature of 22° C. to −7° C. at a ramp rate of 7° C./min. The test substrates (6.45 $cm^2$ each) were bonded with a highly thermally conductive double-sided tape onto a copper plate (6×6 $cm^2$, 0.2 cm thick) that was bolted directly to the center of the water-cooled Peltier surface to abate the "edge-effect" to some extent. To negate the effect of spatial temperature variation across the Peltier surface and ensure experimental uniformity, the test samples were attached to the same central location for each of the trials. Once attached, the Peltier assembly was mounted vertically and experiments were performed inside the glovebox. Using a Nikon D810 DSLR camera fitted with a TAMRON macro lens (90 mm F/2.8) the entire cooling and freezing phenomenon were video recorded at a resolution of 1920×1080 and an acquisition rate of 29.97 fps. For defrosting the Peltier was switched off and the water circulation turned off.

Each of the freezing experiments were repeated at least 3 times and the time required for frost coverage (FIG. 21B) of the entire sample surface was evaluated for each of the cases. The entire sample surface area of 6.45 $cm^2$ was within the field of view for both experimentation and subsequent analysis. From the experimental videos, digital images were extracted, converted to 8-bit grayscale images and thresholded using ImageJ software. This was done to precisely differentiate the frost covered areas (white) from the underlying substrate (black). Next, the percentage of the test substrate surface area covered by frost was characterized as a function of the experimental cooling time (FIG. 13F). The morphology and packing density of frost on different surfaces were conspicuous, varying between densely packed frost sheet on SPS to discreet parcels on LIS, edgy sheaf on SHS to a spongy packing on PCM-IS/PSL-IS, owing primarily to their delayed freezing and intermittent self-replenishment. It is to be noted that the presence of the hygroscopic lubricant-water mixture near the bottom edge of the hydrophilic PCM/PSL infused sample (accumulated by itself as the experiment progressed) acts as a replenishing reservoir supplying the elixir to retreat the advancing freezing front and is responsible for the superior performance as compared to the other surfaces (Table 4). This is elucidated by the zig-zag nature of the temporal frost coverage percentage for DMSO and Glycerol infused surface demonstrated in FIG. 13F.

TABLE 4

Quantitative freezing delay potential comparison of the PCM-infused/PSL-infused surfaces with respect to conventional surfaces of 6.45 $cm^2$ size

| | Times better by | | |
|---|---|---|---|
| Surface | SPS | LIS | SHS |
| SCt-10 | 9.3 | 4.4 | 2.5 |
| SD-10 | 10.0 | 4.7 | 2.7 |
| SG-10 | 15.6 | 7.4 | 4.2 |

To check for the scalability of our approach, (in addition to testing 6.45 $cm^2$ size square samples as shown in FIG. 13E) we also tested 42.25 $cm^2$ size square samples under the same experimental conditions. Even in this case, the PCM/PSL infused surfaces were seen to outperform the conventional surfaces by orders of magnitude. Having checked for the scalability of our approach, we also carried out experiments where we subjected the test substrates to Peltier temperatures of −2° C., −10° C. and −15° C. to establish the freezing delay potential of the PCM-IS/PSL-IS at varying sub-coolings. Even under these conditions, the PCM-IS/PSL-IS outperformed the conventional surfaces under comparison. As a representative example, the relative performances of different treated and untreated surfaces (6.45 $cm^2$ size) corresponding to FIG. 13F are compared in Table 4. This table demonstrates by how many orders of magnitude, the surfaces represented in the first column are better than the surfaces mentioned in the adjoining columns.

LIS are bestowed with icephobic characteristics upon harnessing the exceptional properties of low contact angle hysteresis and minimized contact line pinning on them. The lifetime of LIS, however, is governed by the factors of lubricant cloaking, miscibility, drainage and also depletion attributed to capillary attraction driven migration to the frozen droplet. Under the deep-freezing humid conditions subjected to a rapid cooling rate, water condensation, growth and coalescence events are visible on LIS. These sliding supercooled condensates freeze on finding a suitable icy defect, until the entire surface freezes completely. Superhydrophobic surfaces fail in highly humid environs attributed to either water condensation or direct indiscriminate frosting on microscale surface textures engendering fiercely adherent "Wenzel ice" formation. Additionally, the sharp edges of superhydrophobic surface can get notched into the incipient frost exhibiting a penchant for mechanical breakage while deicing or owing to expansion induced stress concentration of freezing water. Hence, in the current condensation-frosting studies, hierarchically structured (50 μm spacing) superhydrophobic surfaces, which in humid environments demonstrate stable superhydrophobicity and have the ability to preclude inter-droplet freeze front propagation were used in contrast to solely microstructured surfaces (10 μm spacing) used for PCM/PSL infused surfaces. This was done to compare the very best of the conventional surfaces with respect to the bare minimal necessities of a PCM-IS/PSL-IS. In our current study, hydrophilic PCM/PSL infused surfaces exhibit up to 15 and 4 orders of magnitude higher freezing delay compared to SPS and SHS surfaces, respectively, at −7° C., 60% RH experimental conditions with 6.45 $cm^2$ size square samples (Table 3). Extending the lifetime of the oil infused surfaces may require sustained lubricant replenishment for perpetual performance of PCM-IS/PSL-IS over multiple freeze-thaw cycles and also engineering surface structures for enhanced wicking of the liquids.

C. Outdoor Studies

Ice-repellency experiments of PCM-IS/PSL-IS in outdoor freezing environment: The experiments demonstrating the ice-repellency of PCM-IS/PSL-IS were performed outdoors in Chicago, Illinois on 14 Mar. 2017 when the ambient conditions were: Tair=−5° C. (felt like a temperature of −13° C.), RH=65% and light snow. A nanostructured superhydrophobic surface and a PCM/PSL (Pentadecane) infused hierarchically textured (50 μm edge to edge spacing) superhydrophobic surface, each of 6.45 cm2 size, were thermally bonded to an aluminum plate (2 mm thick) using a double-sided copper tape and initially held horizontally. After the surfaces had equilibrated with the outdoor ambient conditions, a dyed cold-water droplet (~70 μL) was gently deposited on each of the test substrates successively. On tilting the base plate gradually, it was observed that the water drops on the superhydrophobic surface remained strongly pinned, while the same was seen to glide off on PCM-IS/PSL-IS (FIG. 13G).

Example 9

D. Additional Studies 2.1 Estimation of Solid Surface Temperature Increase During Condensation 2.1.1 Theoretical Analysis We consider the droplet growth on a surface following the diffusion law, based on which the growth law is given by $R=k\sqrt{2}\Rightarrow\dot{R}=k/2\sqrt{t}$, where, R is the droplet radius, k is the growth coefficient (~$2.5\times10^{-7}$ m/$s^{0.5}$. Following the growth law, the volumetric growth rate can be estimated as:

$$V_w=\pi F(\theta)R^3\Rightarrow\dot{V}_w=3\pi F(\theta)R^2\dot{R}=1.5\pi F(\theta)kR^2/\sqrt{t}=1.5\pi F(\theta)k^2R \quad \text{(Equation S1)}$$

In the above equation, F(θ) is the droplet contact angle function. It relates the droplet cap radius with its volume as a function of the droplet contact angle given by $$F(\theta)=(2-3\cos\theta+\cos\theta^3)/3\sin\theta^3.$$

First, we consider the case where the condensation heat release is uniformly distributed below the droplet's surface over an area given by $S\sim\pi R^2$. We presume that the droplet is in contact with a semi-infinite solid surface at location z=0, and that the heat transfer from the droplet into the solid surface is governed purely by conduction heat transfer. The solid surface is maintained at the Peltier temperature given by $T_{pel}$. For these conditions, the governing equations along with the boundary conditions are given by:

$$z=0\text{(droplet location)},\ \frac{\partial T_s}{\partial t}=\alpha_s\frac{\partial^2 T_s}{\partial z^2} \quad \text{(Equation S2)}$$

$$T_s(z,0)=T_p\ \ \&\ -\kappa_s\frac{\partial T_s}{\partial z}\Big|_{z=0}=\frac{\rho_wL_w\dot{V}_w}{\pi R^2}=\frac{F_{01}}{\sqrt{t}}\ \text{where}\ F_{01}=1.5F(\theta)k\rho_wL_w$$

and $$T_s(\infty,t)=T_p$$

In the above equations, $T_s$ is the solid surface temperature, $\kappa_s$ is the solid thermal conductivity, $\alpha_s$ is the thermal diffusivity of the solid substrate, $\rho_w$ is the density of water, $L_w$ is the enthalpy of condensation of water.

It can be seen that the condensation heat release causes an imposed flux on the solid at z=0. The solution of the above equations for applied flux of form $F_0t^{0.5n}$ at z=0 and t>0 (where n maybe −1, 0 or a positive integer) is given by $$\Delta T=\frac{F_0\alpha_s^{1/2}\Gamma(0.5n+1)}{\kappa_s}(4t)^{0.5(n+1)}i^{n+1}\operatorname{erfc}\frac{z}{2\sqrt{\alpha_st}} \quad \text{(Equation S3)}$$

Substituting the flux from Equation S2, the surface temperature is given by $$\Delta T_{surface,con}=\frac{F_0\alpha_s^{1/2}\Gamma(0.5n+1)}{\kappa_s\Gamma(0.5n+1.5)}t^{0.5(n+1)} \quad \text{(Equation S4)}$$

For condensation, based on Equation S2, $$n=-1,\ \therefore T_{sur}-T_{pel}=\frac{F_{01}\sqrt{\pi\alpha_s}}{\kappa_s}\sim 2.6^\circ\text{ C.}$$

for Cyclohexane. These results are consistent with prior works wherein it has been shown that heat transfer rates decrease on low thermal conductivity materials.

Next, we seek to obtain the temperature at the surface due to its contact with the surrounding air. Using 1D conduction heat transfer, the actual surface temperature at the Cyclohexane/air interface (Tsur,1d) as a function of the PSL thickness (h), Peltier temperature (Tpel), air temperature (Ta), thermal conductivity of solidified PCM/PSL ($\kappa_s$) and air thermal conductivity ($\kappa_a$) can be given as $T_{sur,1d}=(T_{pel}+\eta T_{air})/(1+\eta)$ wherein $\eta=h\kappa_{air}/\zeta\kappa_s$ and ζ is the boundary layer thickness around the surface (~2.2 mm). Thus, the temperature jump expected at the surface is given by $$\Delta T_{surface,1d}=T_{sur,1d}-T_{pel} \quad \text{(Equation S5)}$$

Ignoring the temperature change in the droplet (as a conservative estimate), the total temperature jump can be estimated as $\Delta T_{surface,t}=\Delta T_{surface,con}+\Delta T_{surface,1d}$. Using this relation, we find that for h=2.5 mm, $T_{pel}=-15^\circ$ C. and $T_{air}=20^\circ$ C., the surface temperature $T_{sur}=-9.4^\circ$ C., and thus $\Delta T_{surface,t}\approx8^\circ$ C. While such large temperature changes can melt SCh when it is cooled a few degrees below its melting point[10], it is unlikely to cause any melting of PSLs that are substantially supercooled.

Consequently, we consider a second case, wherein condensation heat release occurs along the droplet contact line in a region, having a length scale of length δ (See FIG. 11G). In this case, the governing heat transfer equation remains the same as before, but the boundary conditions are given by:

$$T_s(z,0)=T_{pel}\quad T_s(\infty,t)=T_{pel}\ \ \& \quad \text{(Equation S6)}$$

$$-\kappa_s\frac{\partial T_s}{\partial z}\Big|_{z=0}=\frac{\rho_wL_w}{2\pi R\delta}\frac{dV_w}{dt}=F_{02}=\frac{1.5\rho_wL_wF(\theta)k^2}{2\delta}=\frac{kF_{01}}{2\delta}$$

Substituting the flux from Equation S2, we find that this case corresponds to n=0. The solution therefore is given by:

$$\therefore T_{sur}-T_{pel}=\frac{1.13F_{02}\sqrt{\alpha_st}}{\kappa_s}=\frac{F_{01}\sqrt{0.32\alpha_s}}{\kappa_s}\frac{R}{\delta}\approx0.7^*(R/\delta)^\circ\text{ C.},$$

for Cyclohexane/Cyclooctane etc. The extent of temperature change thus depends upon the extent of δ. Thus, if we consider a droplet of 100 μm diameter, the temperature change can be ~70° C., provided that δ~100 nm. It has been suggested that the description of a moving contact line can be related to a condensation-evaporation process which leads to definition of a micro/nano-region where heat and mass exchange is confined. In their description the length-scale (δ) where heat and mass transfer can occur is expected to be lower than 10 nm. On such length scale, the temperature increase could be even more significant. Clearly, that is not the case. This is because such huge temperature increase may result in intense melting—something that is not observed in our experiments. Nonetheless, conservatively, we expect such region to be <1 μm in size making it extremely challenging for observation using conventional or advanced thermometric techniques such as thermocouples or infra-red imaging (as discussed below).

2.1.2 Infrared Thermometry

To probe into the details of the aforementioned phenomenon, we also performed thermometric analysis of the condensation dynamics on S-PCMs/S-PSLs using an Infrared camera (FLIR A8201sc) equipped with a with a 4× microscopic lens. It must be noted that since water is opaque to Midwave Infrared (MWIR), the represented thermal maps refer to temperature of water. Also, the absolute values of the temperatures may have some inaccuracy owing to the difference in emissivity's of the water and substrate phases. As seen in FIG. 14, droplets condensing on SCh/SCt surface have a distinctively well-defined 'hot' contact line supporting our interpretation of contact line heating (and consequently the condensation induced melting) as described in FIG. 11. The pronounced contrast of the IR imaging demonstrates the resulting contact line heating as evidenced by the temperature spikes along the axial distance pertaining to the location of the contact line in the plot of FIG. 14B. A temperature jump of around 1°-2° C. occurs near the edge of the droplet. While this temperature change is far less than that predicted in our model, this is expected because although we used a high-resolution microscopic IR lens, the resolution of the system is ~4.5 μm/pixel which is far lower than that would be required to image the nanoscale (10-100 nm region) region around the droplets. Note that even the best IR cameras available today have a maximum resolution of 2.5 μm/pixel and above—which would be still insufficient to visualize the large temperature jumps expected at the contact line. FIG. 14B also shows that while the contact line heating appears to occur on both SCh (solidified Cyclohexane) and SCt (solidified Cyclooctane), clearly the circumferential rim of contact line on the latter appears to be thinner than the former. For the experiments corresponding to $T_{pel}$=−10° C., it is also seen that the water droplets are supercooled (FIG. 14A-B). In the main manuscript, possible mechanisms by which the melt film maybe preventing the nucleation of ice phase at the droplet-surface contact line have been hypothesized. In the light of these results, such mechanisms may hold the key behind the delay in freezing of the condensed droplets on S-PCMs/S-PSLs. FIG. 14B also reveals the apparent presence of be three zones of temperature jump within the condensed droplets indicating six circulation cells across the droplet diameter. In keeping with our discussion of FIG. 11G (second row inset image), this can be interpreted as the presence of strong thermocapillary convective flows within the droplets. The schematic in FIG. 14C elucidates the nature of different circulation zones arising as a result of thermal Marangoni flow in the drop-PCM/PSL film system as evidenced by IR thermometry. $T_H$ and $T_L$ are indicative of the relative 'high' and low' temperatures at each of the spatial locations in the condensed drop resulting in the depicted flow directions in the system. FIG. 14D also validates our observation of the intervening barrier molten PSM/PSL film as demonstrated in FIGS. 11B, 1D and 1F.

2.2 Freezing Point Depression of Test Liquids

Freezing point depression of solvent by addition of a solute is given by $\Delta T_f = i^*K_f^*m_w$ where i=Van't Hoff Factor of solute depending on $i^{st}$ disassociation.

$K_f$=Freezing point depression constant of solvent (in ° C./m)

$m_w$=Molality of solute in solvent=moles of solute/weight of solvent in kg=$x_w/M_o$ $M_o$=Weight of 1 mole of solvent (in kg)

$x_w$=Moles of solute in 1 mol of solvent, $x_w$=P/(1−P)

P=Solubility of the solute in solvent (mol fraction), P=S/100

S=Solubility of the solute in solvent (mol %)

For example:

i) for Cyclohexane (solvent) and water (solute), S=0.058, $K_f$ (° C./m)=20,

Freezing point depression of Cyclohexane due to water=$\Delta T_f$=0.42° C.

ii) for water (solvent) and Cyclohexane (solute), S=0.0012, $K_f$ (° C./m)=1.858, $\Delta T_f$=0.42° C.

Freezing point depression of water due to Cyclohexane=0.00074° C.

Consequently, since most of the other immiscible PCMs/PSLs tested in the current study have water miscibility lower than that of Cyclohexane, we expect that the freezing point depression to be negligible for them.

Figure 22:
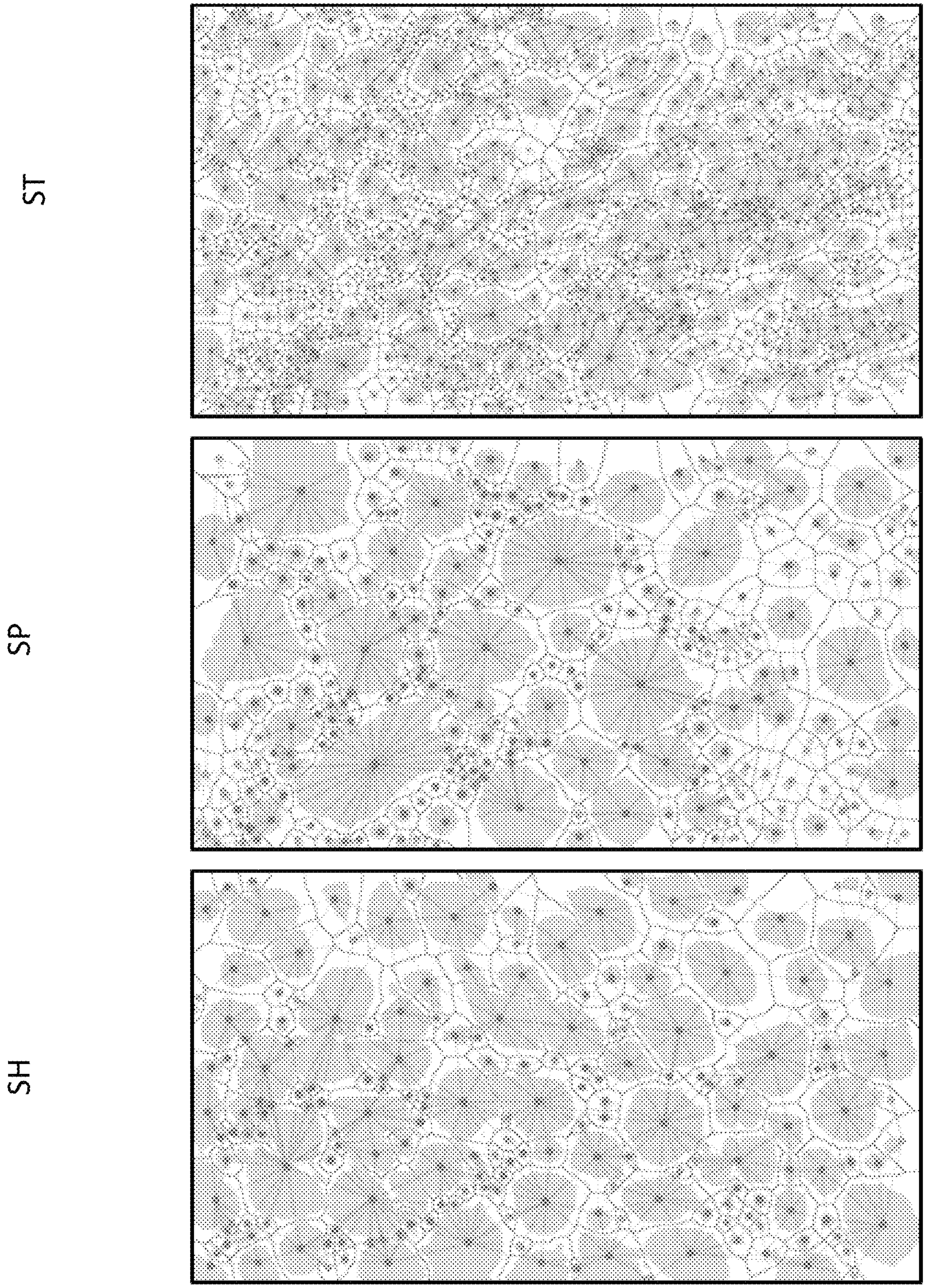
FIG. 22 shows droplet distribution on rough PCMs.
Figure 23:
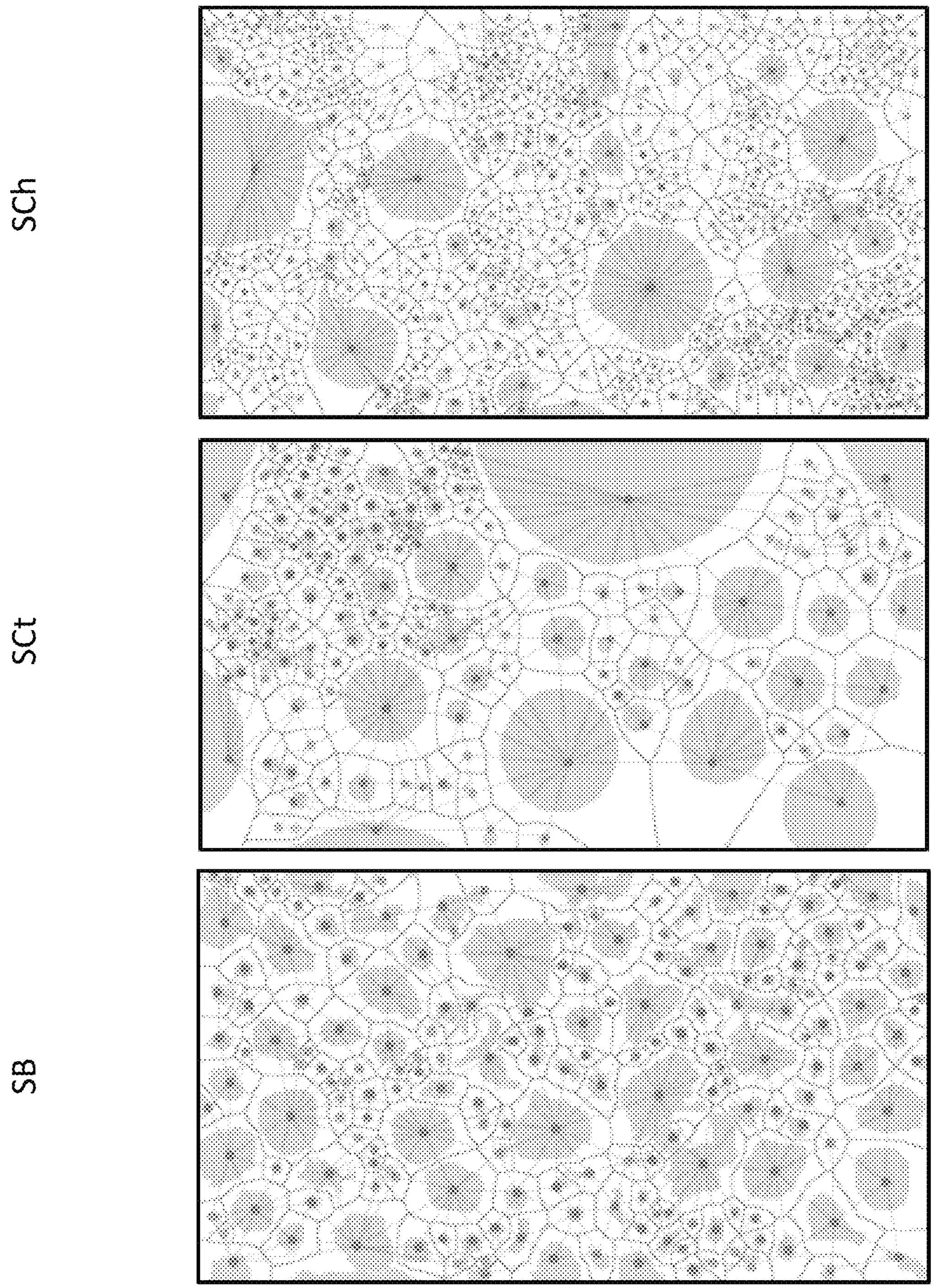
FIG. 23 shows droplet distribution on smooth PCMs.

2.3 Role of Droplet Distribution on S-PCM/S-PSL Surface Dictating the Condensation-Frosting Dynamics The formation of frost, and its subsequent propagation on S-PCM/S-PSL surfaces is strongly a function of the surface characteristics and the suppressive effect of condensation induced melting. To elucidate the influence of solidified PCM/PSL surface morphology on the freezing dynamics of condensed drops atop S-PCM/S-PSL surface, we characterized the nature of condensation dynamics on them. For this purpose, image analysis was carried out corresponding to the experiments on S-PCM/S-PSLs studied in FIG. 12D. Images were analyzed using ImageJ and further processed by MATHEMATICA software. First, the frame corresponding to the time instant just prior to the observance of the inter-droplet freezing initiation front in the field of view (2.1 $mm^2$), was extracted from the experimental video recording corresponding to each S-PCM/S-PSL. Next, each and every condensed droplet atop S-PCM/S-PSL surface was manually detected and stored as an object in the Region of Interest (ROI) manager in ImageJ software, whereby their geometrical properties could be analyzed. This allowed determination of the distribution and size of all the condensed droplets on the S-PCM/S-PSL surface just before their freezing occurred in the field of view pertaining to the window under observation. Having detected the droplet patterns, Voronoi polygons (surrounding each droplet) with the corresponding Delaunay triangulation cells (connecting the centroid of each droplet) were drawn using ImageJ. Use of such a Voronoi diagram subdivides the S-PSL plane, with the side of each polygon being the bisectors of the lines between the drops and its neighbors. To identify and better enhance the visualization of different components, the translucency of each experimental image was manipulated in ImageJ. The experimental image of each S-PCM/S-PSL surface superimposed with the Voronoi diagram and Delaunay triangulation are shown in FIGS. 22-23. The average distance ($L_{D,avg}$) between the condensed droplets was calculated by taking the mean of the representative length scale of Delaunay cells (i.e. cells formed by the lines connecting the circles as shown in images). This length scale was calculated as the square-root of the area. As can be seen from the images in FIGS. 22-23, the droplet size in each Voronoi cell is different. Thus, the distance between their centroids does not fully represent the correct length scale for frost propagation. To account for this discrepancy, the corrected average inter-droplet distance ($L_{avg}$) for the frame was used, given by $$L_{avg} = \frac{A_{D,avg}}{A_{Droplet,avg}} \times L_{D,avg},$$

where $A_{d,avg}$ represents the average area of a Delaunay cell and $A_{Droplet,avg}$ represents the average area of droplet of a frame. The latter is calculated as $$A_{Droplet,avg} = \sum_{i=1}^{N} A_{Droplets} / N$$

where $A_{Droplet}$ is the area of a droplet, and N is the number of droplets. The area of droplets was calculated by image analysis and segmentation techniques in ImageJ software. From this analysis, the average droplet ($Diameter_{avg}$) representing a frame was calculated as $$Diameter_{avg} = \sqrt{4A_{Droplet,avg}/\pi}$$

Upon analyzing the images shown in FIGS. 22-23, the average distance between the droplets and the distance relative to the average droplet sizes on different solidified PCMs/PSLs just prior to the time instant when droplet freezing initiation occurred for different solidified PCMs/PSLs were plotted as shown in FIG. 24A. The analysis of these images was carried out based on the videos recorded at 100× magnification, so it is conceivable that some larger droplet sizes might not have been fully captured in the frame under the chosen field of view (2.1 $mm^2$). The parameter $L_{avg}/D_{avg}$ represents the mean measurements over the entire frame, and it can be viewed as a modified form of 'bridging parameter' as done in previous works. As seen from the FIG. 24A, the average inter-droplet distance ($L_{avg}$) is smallest on ST that shows the fastest rate at which freezing is initiated (FIG. 12D). For ST, SP and SH, the average inter-droplet distance is nearly the same as the average droplet size—as a result, frost propagation is nearly the same for these cases (FIG. 27B). This help explains why on such surfaces the time for freezing initiation and the time for total surface to freeze (FIG. 12D) is small. However, it does not explain why it takes longer for freezing to initiate on SH surface despite the fact its melting point is higher than melting point of ST. This difference in behavior appears to be more correlated with the surface roughness of these materials. The roughness of these surfaces may initiate additional effects. For example, roughness could alter the thinning rate of the PCM/PSL melt below the droplets. As the rough surfaces melt, the Laplace pressure of the droplet may drive the melt away from the peaks (similar to the case of droplet propulsion on conical wires).

Note that, as shown in FIG. 27A, smooth S-PCM/S-PSL surfaces (SCh, SCt, SB) have higher percentage of droplet free region compared to the rough S-PCM/S-PSL surfaces (SH, SP and ST), yet there is a stark difference in the freezing delay time of condensed droplets amongst smooth versus rough S-PCM/S-PSL surfaces. For the case of SCh, SCt and SB—the average inter-droplet distance is 1.5-2× the size of droplets, as a consequence of which the frost propagation is much slower on these surfaces. The droplets in the cases of SCh and SCt are so far apart and also mobile that the freezing front propagates in the form of bursts and is intangible to be characterized under the defined field of view. The above analysis is in line with our observations of condensation-frosting. However, it must be noted that the actual dynamics on SCh, SCt and SB is also affected by the events of rapid droplet coalescence and the 'stick-slip' motion; thus, the actual variation in the frost propagation is much more diverse on these surfaces. We also characterized the droplet size distribution (polydispersity) on different solidified PCMs/PSLs (FIG. 24B), just prior to the time instant when droplet freezing initiation occurred in the field of view. The size of each circle, as shown in the plot for the case of each S-PSL, is proportionate to the density of the condensed droplets in that particular size range. It is seen that, on the highly rough ST surface, the size of droplets in range of 0-99 micron is the highest. Interestingly, although SB is much smoother than ST, the size range of the droplets is similar on these two surfaces. This can potentially be because of the fact that Benzene's spreading coefficient on water can be positive (Table 1). It is well known that, oils with positive spreading coefficient on water tend to reduce the coalescence rates.

2.4 Details of Condensation-Frosting Dynamics on Various S-PSL Surfaces

Although the organic PCMs/PSLs tested in this study have similar thermal properties, they have widely varying surface properties. Previous research works corroborated by numerous X-ray diffraction studies have shown that solidified n-alkanes (like ST, SP and SH) have a macrocrystalline surface structure made up of large crystals. Additionally, n-alkanes with an even number of carbon atoms form a stable triclinic structure up to $C_{24}$, while all n-alkanes with odd number of carbon atoms have an orthorhombic structure. On the other hand, cyclic alkanes and Benzene compounds lead to microcrystalline structures. These diverse crystal structures lead to different appearances of the paraffin waxes. Top-down optical microscopy and SEM imaging from our experiments confirm that indeed the group of n-alkanes (ST, SP, SH) show highly rough structure (FIGS. 15-17) while SCh and SB show a very smooth surface due to the microcrystalline sizes of their crystals. While organic PSLs show little constitutional supercooling (unlike water that can remain in a liquid state even till −38° C.), normal alkanes show solid-solid phase transitions within a few degrees below their respective melting points. Just below their corresponding melting point, n-alkanes enter a disordered state, called the rotator phase that has characteristics of both a liquid and a crystalline solid. Alkanes can undergo large changes in their structural properties in this phase compared to their highly crystalline phases at temperatures much below their melting points. Depending upon the number of carbon atoms, the rotator phases may span temperatures ranging from 1 to 10 K below their melting point. On the other hand, cyclic alkanes (like Cyclohexane) and Benzene compounds do not typically show any rotator phase and belong to a group called 'plastic crystals' that can deform under pressure, as their molecules possesses significant rotational and/or reorientation degree of freedom. Hence, the morphological nature of S-PCM/S-PSL crystals should significantly influence the resulting condensation-frosting performance of S-PCM/S-PSL at a macro level.

Because the immiscible organic PCMs/PSLs tested in this work form either microcrystalline (smooth) or macrocrystalline (rough) surfaces upon cooling below their respective $T_{mp}$, condensation-frosting ($T_{pel}$=−15° C., RH=80%) takes place in a distinctively different manner on them as discussed below.

Figure 24:
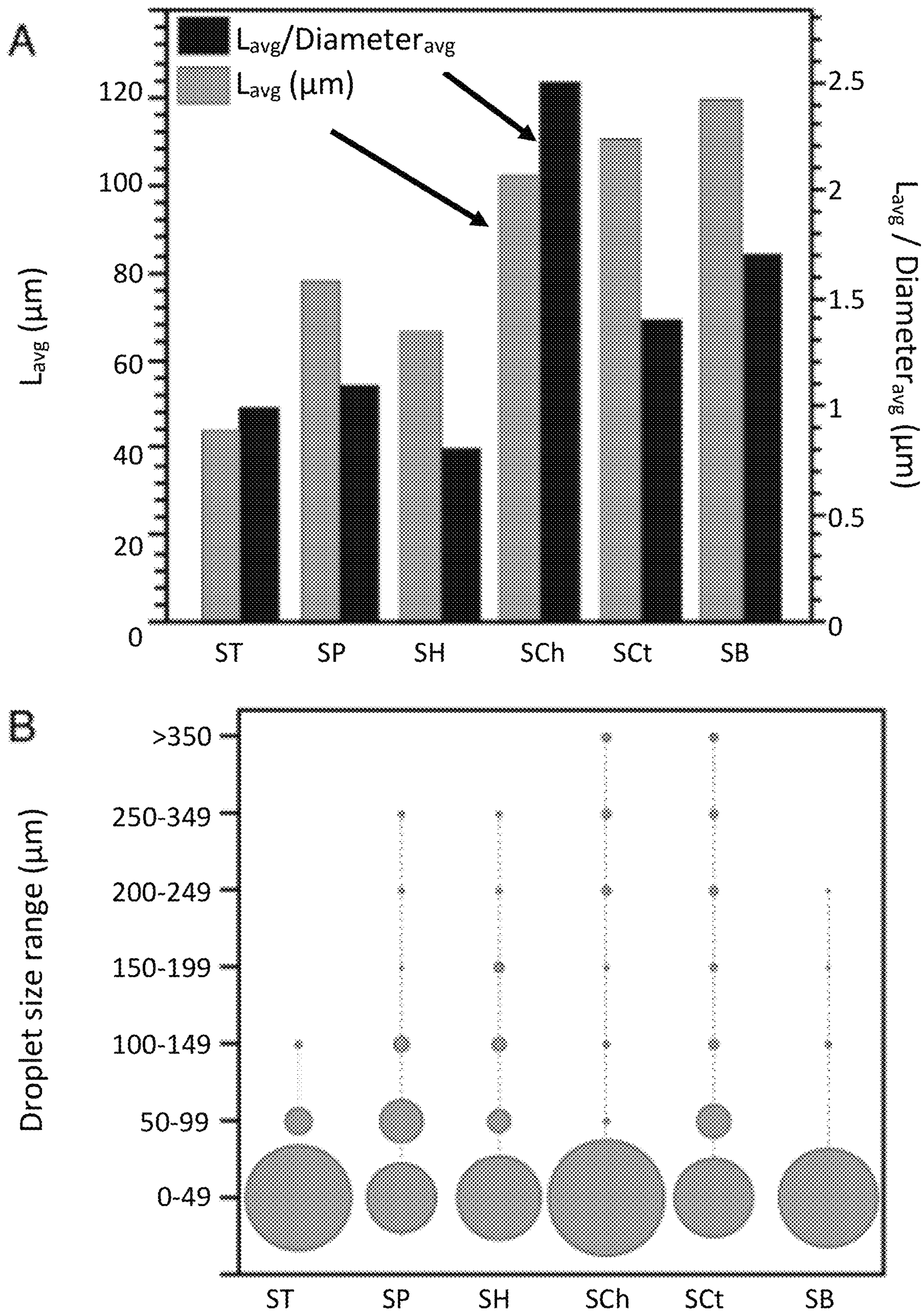
FIG. 24 shows an analysis of droplet polydispersity on PCM surfaces.
Figure 25:
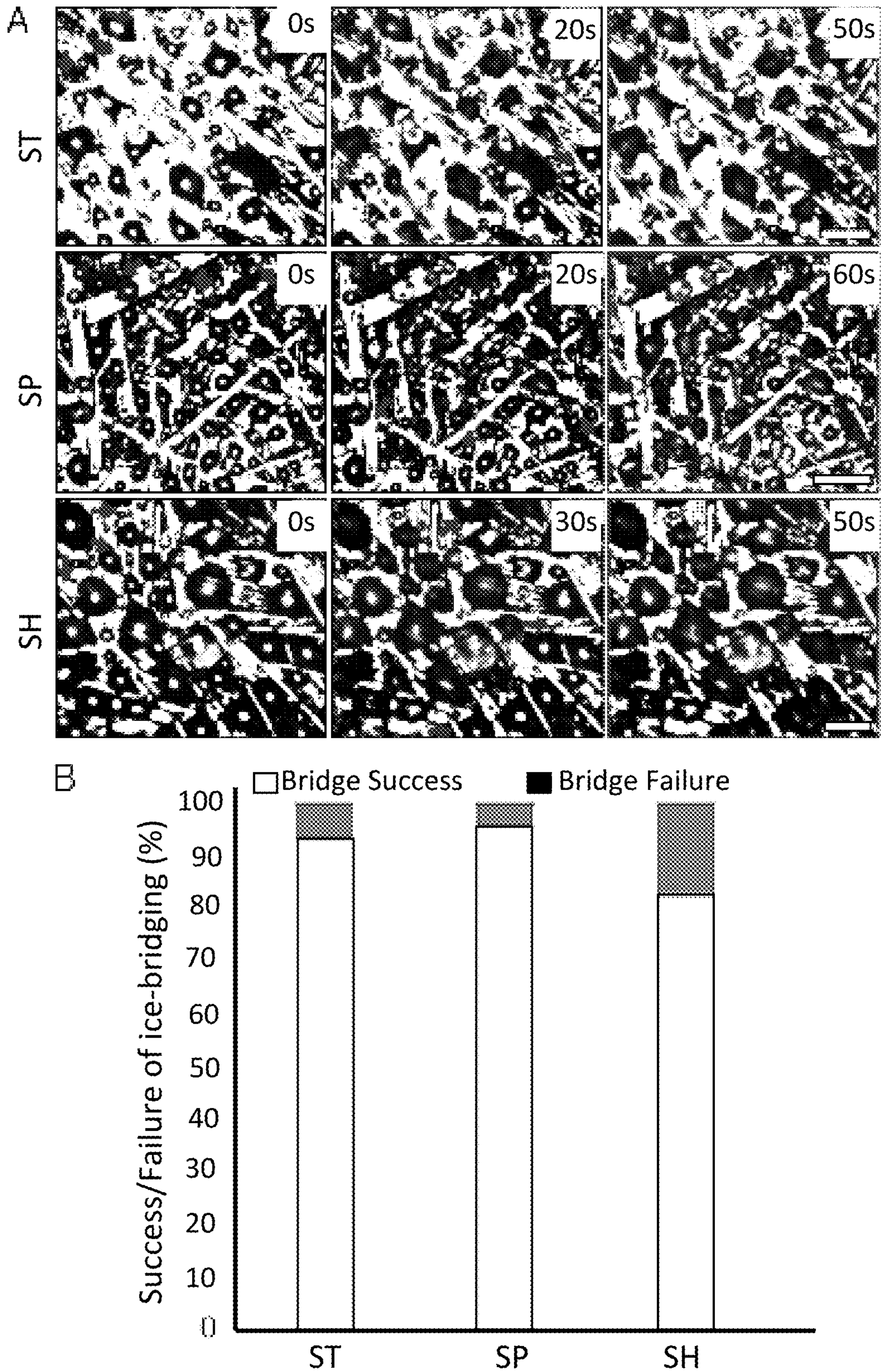
FIG. 25 shows the characterization of condensation-frosting dynamics on bulk macrocrystalline PCM surfaces at $T_{pel}$=−15° C., 80% RH.

Macrocrystalline S-PCM/S-PSL surfaces (e.g. ST, SP and SH) have innate roughness that diminishes the droplet mobility on them and as a result the average bridging parameter ($L_{avg}/D_{avg}$ defined in Section 2.3) on these surfaces is <1. Although, a small percentage of droplets do evaporate causing ice-bridging failure, these failures don't contribute significantly as an impedance to frost progression because of the large droplet density and small inter-droplet distances (FIG. 24). This is shown in FIG. 25A wherein it is clear that the frost propagation appears at nearly the same speed and very rapidly across the entire population of supercooled condensate in the field of view of the microscope for all the three rough S-PCM/S-PSL surfaces. Upon investigating the bridging dynamics of droplets in the field of view (FIG. 25B), we find that only a very small fraction of droplets evaporates completely (i.e. bridging failure) showing that condensation-frosting precipitates on rough S-PCMs/S-PSLs predominantly due to the widespread success of inter-droplet ice bridges.

On microcrystalline S-PCM/S-PSL surfaces, under identical environmental conditions the frost propagation mechanism is far more complex and diverse. On these surfaces, the droplets share three special features: (i) droplets are highly polydisperse; (ii) they have large inter-droplet distances between them (FIG. 24) and (iii) are more mobile compared to the droplets on rough S-PCMs/S-PSLs. The details of the different facets of condensation-frosting phenomenon visible on bulk microcrystalline S-PCMs/S-PSLs are presented in FIG. 26 and described as follows:

1) Altered bridging rate due to abrupt bridging failure: Experimental video analysis reveals that on smooth S-PSLs, while there are instances whereby the frost front propagates in a manner similar to rough S-PSLs (FIG. 25A), the progression is not consistent throughout the entire surface area. An example of the former behavior is shown in FIG. 26A for SCt surface where the global frost front sweeps across the field of view at a speed of 6.16±2.8 μm/s. However, this is not a universal feature on smooth S-PSL surfaces, as even on SCt surface different frost propagation behaviors are observed. It appears that as the frost propagates on these surfaces in a localized region, it also evaporates the neighboring droplets (including droplets that are at quite large distances from the frost) leaving the surface bare and causing a drastic decrease in frost propagation rate. For example, on SCt surface (FIG. 26B) a droplet evaporates for over 11 minutes, but no single frost is visible in its immediate vicinity.

Figure 26:
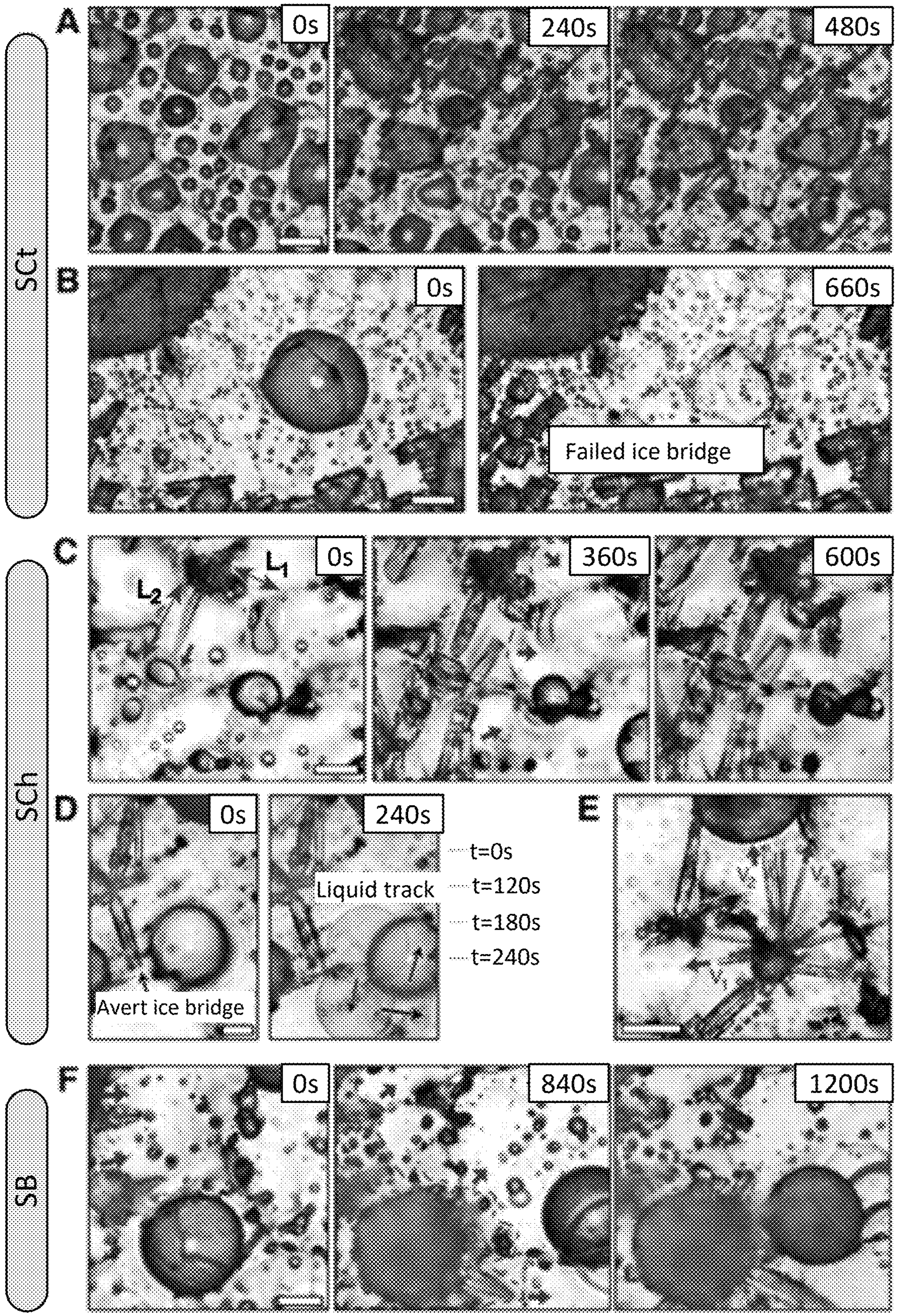
FIG. 26 shows different facets of condensation-frosting on bulk microcrystalline PCMs at $T_{pel}$=−15° C., 80% RH.
Figure 27:
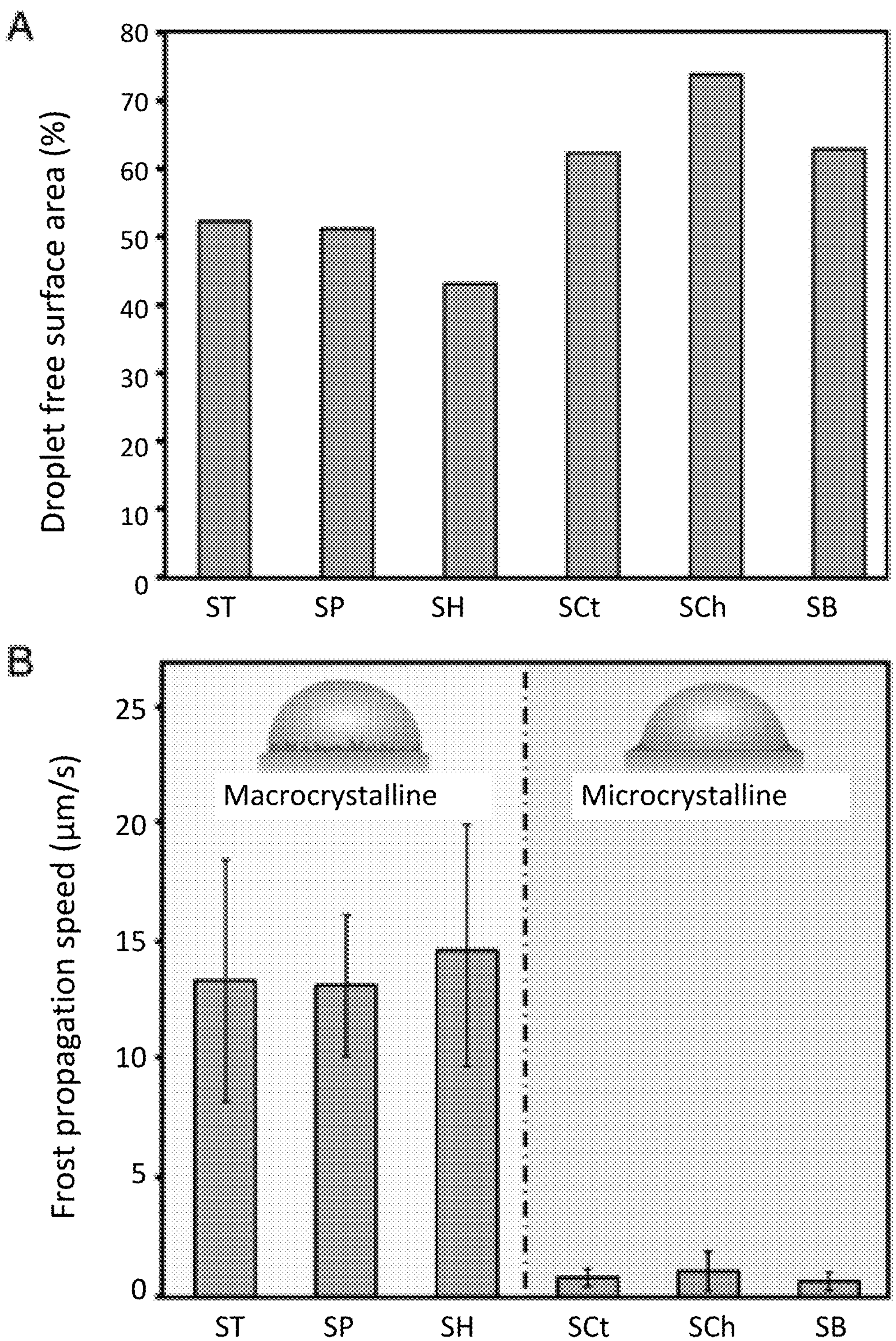
FIG. 27 shows the characterization of the condensation-frosting rate on bulk PCMs at $T_{pel}$=−15° C., 80% RH.
Figure 28:
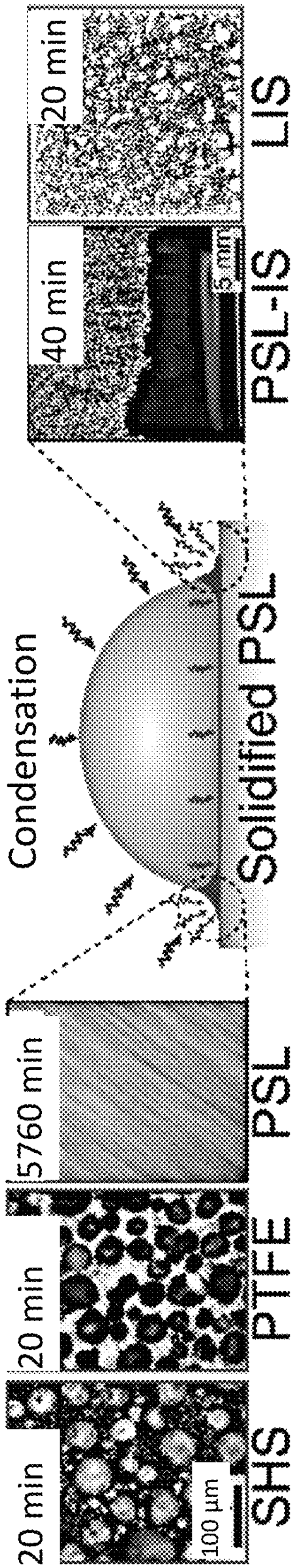
FIG. 28 shows condensation frosting experiments that demonstrate the freezing delay potential in bulk state of PCMs compared to conventional material bulk surfaces.

2) Altered bridging rate due to nature of ice crystal growth: The speed of inter-droplet frost propagation can also be influenced by the nature of ice crystal growth whereby the crystals can grow in many forms (e.g. needles, hollow columns, dendrites, plates, etc.) depending upon the temperature and saturation conditions. In the conducted experiments, it was observed that ice grows predominantly in the form of needle/hollow columnar shapes, growing out of the plane (FIG. 26). This implies that the growth rate of ice crystal is faster along its basal plane. Hence, there can be droplets situated very near to a frozen drop and yet not freeze/evaporate because of being oriented along the prismatic face of the growing ice columns. This is clearly visible for the case of SCh surface in FIG. 26C where although a droplet is located at a close proximity ($L_1$=183 μm) of a frozen droplet, the ice tip preferentially propagates (10 times faster) to freeze another droplet situated a distance $L_2$ (=317 μm>$L_1$). This observation cannot be ascribed solely to 'ice-bridging failure'. The effect of ice crystal growth nature is subdued for hydrophobic/superhydrophobic or macrocrystalline S-PCM/S-PSL surfaces—because in them the droplet surface coverage is high with small inter-droplet distance. On the contrary, on microcrystalline S-PCM/S-PSL surfaces (e.g. SCh, SCt and SB) the average inter-droplet distance to droplet size ratio ranges from 1.4 to 2.5 (FIG. 24A). Thus, in smooth S-PCM/S-PSLs the effect of ice crystal growth is much more conspicuous and its effects more pronounced.

3) Consequences of droplet mobility: Compared to macro-crystalline surfaces, droplets on microcrystalline S-PCMs/S-PSLs are much more mobile. Amongst these materials, droplet mobility is higher on SCh compared to SCt (presumably because SCh has lower $T_{mp}$ and hence is expected to show more melting). Because the droplets are very mobile on the smooth SCh surface, ice nucleation of droplets also becomes a stochastic event. For example, in some cases a droplet may linger or hover around a growing frost front for longer time and yet completely avert it. An example of this behavior is shown in FIG. 26D, where for nearly 4 minutes an agile droplet hops about a growing frost while remaining nearly of the same size. In other cases, untimely death of a jumping droplet may happen when it rolls towards a growing ice bridge and freeze promptly upon contact as shown for SB surface in FIG. 26F. The mobility of the droplets not only add a certain degree of randomness to harmoniously characterize the frost propagation mechanism, but their movement across the surface constantly alters the local equilibrium water vapor concentration gradient of the liquid drop-frost system atop the S-PCM/S-PSL surface. This in turn influences the rate at which frost grows on the surface. While regular hydrophobic/superhydrophobic surfaces exhibit mere coalescence or 'jumping droplet' motion, smooth S-PCM/S-PSL themselves are responsive in nature which adds an avant-garde characteristic in terms of the self-propelled droplet dynamics, unprecedented by the conventional characterization of condensation-frosting using 'bridging-parameter'. It must be noted that in all the cases of FIG. 26, the perimeter footprints or 'liquid tracks' (a proof a condensation induced surface melting) are distinctly visible even when the drops are adjacent to the growing frost front (indicative of our previous explanations regarding local melting causing freezing delay).

4) Random nucleation of multiple ice columns: Likely as a consequence of the large inter-droplet distance, a single frozen droplet may in certain cases sprout multiple ice-columns. This increases the complexity in developing a simple scaling model for the ice-bridging analysis unlike some previous works. On SCh/SCt/SB, random nucleation of multiple ice columns from a single frozen drop was observed—an example of which is shown in FIG. 26E for SCh. The ice crystals had varied tip propagation velocities ranging from 0.32 μm/s to 0.91 μm/s. In the context of discussion regarding FIGS. 25-26, it must be noted that these images correspond to the experiments in FIG. 12D performed at $T_{pel}$=−15° C., 80% RH. In these Figures, the time zero in the first frame denotes the onset of freeze front propagation for a constant field of view of the microscope (2.1 mm$^2$).

Example 10

Having discussed in detail about the various facets of condensation-frosting dynamics including role of inter-drop distance, droplet polydispersity and characteristic nature of ice-bridging mechanism on S-PCM/S-PSL surfaces, an important aspect is quantifying the rate of condensation-frosting for all the S-PCM/S-PSL surfaces. The frost propagation speeds on all S-PCM/S-PSL surfaces are compared in FIG. 27B. While these results are indicate that frosting speeds on rough S-PCM/S-PSL surfaces are significantly higher than those on smooth S-PCM/S-PSL surfaces, these results should be interpreted remembering that For the rough S-PCM/S-PSLs, the frosting speed represents the propagation of the global freezing front obtained by tracking the latter as it swept across the entire field of view of the microscope.

For the smooth S-PCMs/S-PSLs in bulk, frost propagation speed was obtained by tracking the individual growth of the local frost clusters in the field of view (2.1 $mm^2$). This methodology was adopted because on smooth S-PCMs/S-PSLs, as frost grows in certain portions of the field of view, while the remaining region remains frost-free either due to high inter-droplet distance of droplets/absence of droplets/unpredictable movement of mobile droplets which may avert a growing frost front and disappear from the field of view without freezing. It appears that on smooth S-PCM/S-PSL surfaces, the frost propagation occurs in form of 'bursts' wherein we see the progression of the frost front and sudden halting at places before recurring yet again.

Due to the fact that the concerned analysis was performed using different methodology for rough and smooth S-PCMs/S-PSLs, we have clearly demarcated the two regimes pertaining to the macro and micro-crystalline materials in FIG. 27B so as to provide a scientifically correct interpretation of the condensation-frosting dynamics.

Example 11

We have also investigated the performance of S-PCM/S-PSL surfaces as a function of ambient relative humidity (% RH) and effect of substrate subcooling (by varying the Peltier temperature Tpel) for solidified Cyclooctane surface and compared it's performance with a typical hydrophobic Silicon surface.

Figure 29:
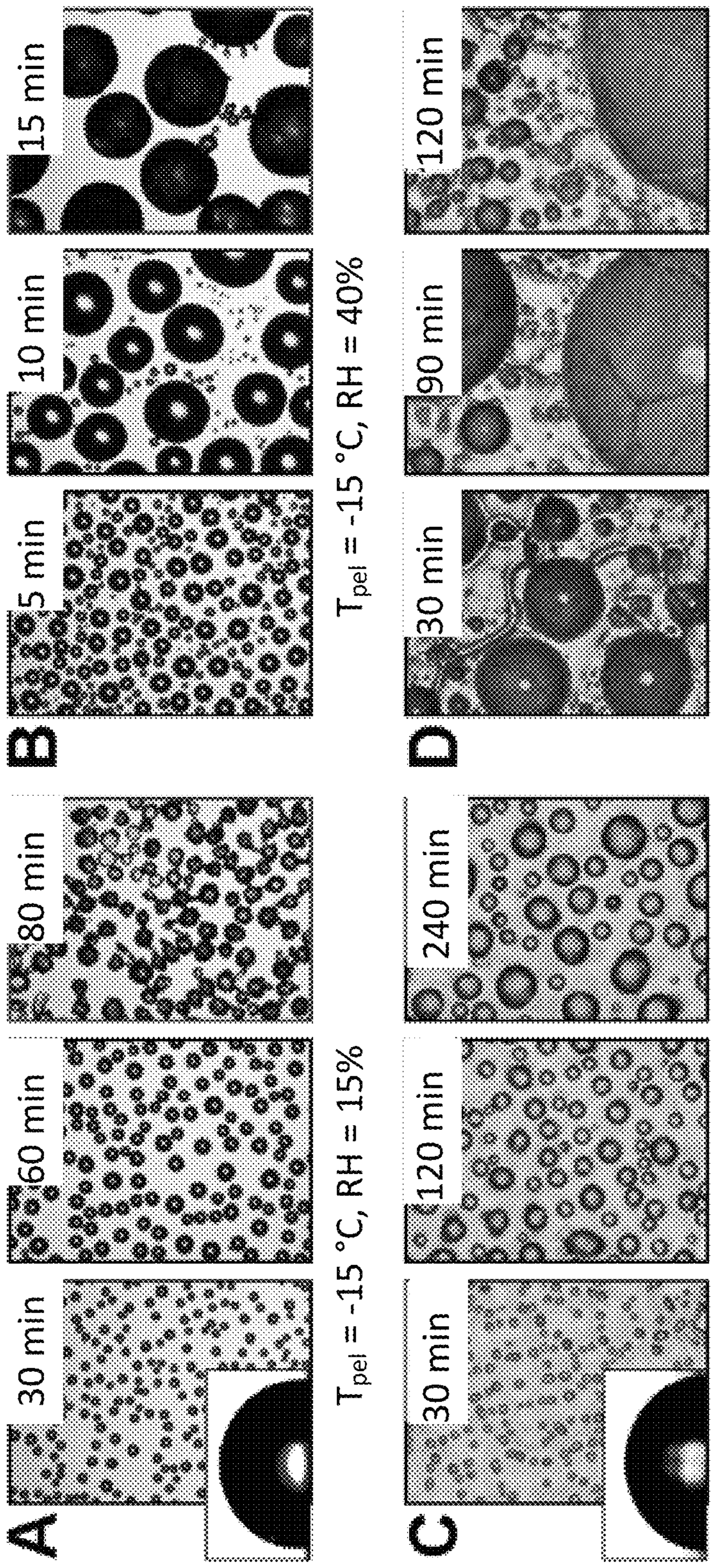
FIG. 29 shows the nature of condensation-frosting on a hydrophobic silicon surface, HySi (top panel), having a water contact angle of 100°, versus solidified phase change material (cyclooctane, "SCt") surface (bottom panel), having a water contact angle of 94.6±3.6°

FIG. 29 shows the nature of condensation-frosting on a hydrophobic Silicon surface, HySi (top panel) having a water contact angle of 100° (inset) and solidified Cyclooctane surface (bottom panel), SCt having a water contact angle of 94.6±3.6° (inset).

FIG. 2: Surface Freezing Delays; Mechanisms

Broadly, there are two primary scenarios for phase transformation by which frost formation occurs on surfaces as revealed by the time evolution of the freezing mechanism. Firstly, ambient water vapor (at low water partial pressure) can directly change phase into solid condensate by circumventing the intermediate liquid phase by a process known as desublimation. In the second and most common case known as condensation-frosting atypical to hydrophobic surfaces, ambient moisture first condenses as supercooled liquid atop surface and eventually freezes.

The interplay of these two processes, acting in harmony over a range of length and time scales under various environs, leads to the myriad of observed frosting phenomenon as described below.

The growth and sustenance of surface ice/frost from water vapor is determined by two governing parameters: substrate surface temperature and ambient water vapor supersaturation. In order to provide a comprehensive picture of condensation-frosting dynamics, SCt surface was subjected to diverse environmental conditions (varying relative humidity and $T_{pel}$) and its performance was compared both qualitatively and quantitatively with a hydrophobic Silicon surface (HySi).

Figure 30:
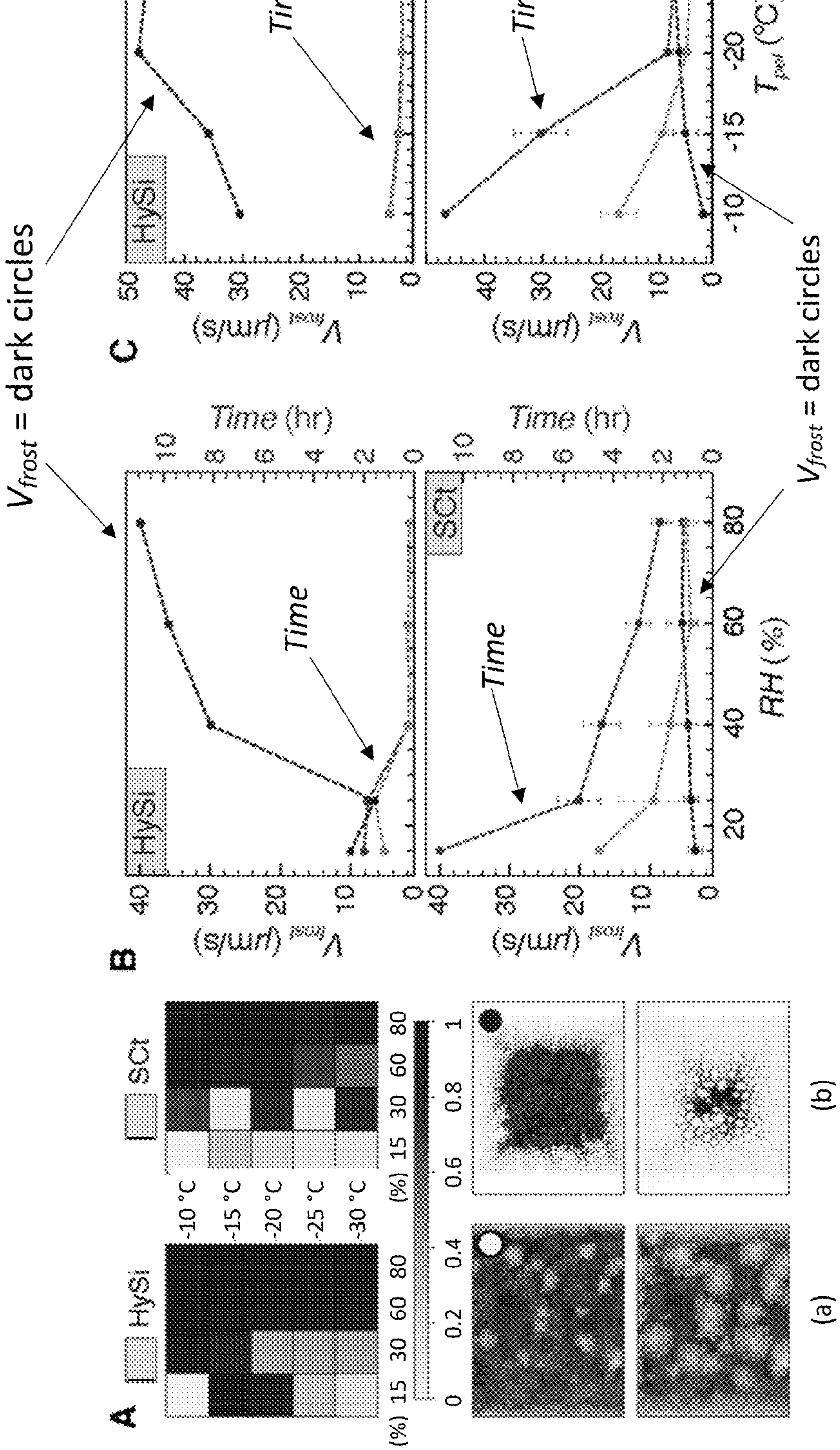
FIG. 30 shows surface frosting via two mechanisms, frost propagation and the freezing of individual drops on a surface using smooth hydrophobic Silicon (HySi) and solidified cyclooctane phase change material under wide ranging relative humidity and peltier temperatures.

The heatmap in FIG. 30A qualitatively depicts the probability of occurrence each of the aforementioned freezing mechanism by using a system of color-coding for a matrix of different experimental conditions. For each substrate (HySi, SCt), four RH (15%, 30%, 60% and 80%) was systematically investigated and for each RH, the test samples were cooled from ambient (25° C.) to five different substrate temperatures ($T_{pel}$=−10° C., −15° C. −20° C., −25° C., and −30° C.). The two mechanisms of surface frosting are (a) Frost Propagation, and (b) Freezing of individual drops on smooth hydrophobic Silicon (HySi) and SCt under wide ranging RH and Peltier Temperatures. Clearly, frost propagation is main mechanism of failure at high RH regardless of Peltier Temp. As RH is decreased, the individual freezing drop mechanism starts to dominate; however, it is not the only mechanism, because once a drop freezes, it can start its own frost propagation wave. FIG. 30B shows the frost propagation rate. Frost initiation and total frosting time on Hydrophobic Si and SCt as a function of RH. Here $T_{pel}$ was −15° C. The dashed regions are those where desublimation is expected. But because the peltier slowly reached such conditions, droplet condensation occurred first. FIG. 30C shows the frost propagation rate, frost initiation and total frosting time on Hydrophobic Si and SCt as a function of Peltier Temp. Here RH was 60%.

Desublimation Frosting

At very low Peltier temperatures (Tpel) and typically lower RH values, the entire surface was micro/nanoscale surface condensate froze quickly resulting in surface coverage of HySi/SCt with a thin layer of frost. This stemmed from discrete subcooled condensate freezing into global ice-crystals at random spatial locations of the test surface in a self-triggered fashion and eventually freezing the neighboring drops mediated by inter-drop freezing phenomenon to some extent. However, the predominant mechanism was direct vapor-ice deposition (FIG. 30A(a)), in which the saturated water vapor in the ambient directly froze into ice on the already existing ice crystals.

Condensation-Frosting

The phenomenon of condensation-frosting (FIG. 30A(b)) involves freezing of a single droplet, which effectuates propagation of frost front by growth of ice bridges in a relentless chain reaction and/or evaporation of supercooled droplets. An Inter-droplet freezing wave typically propagates across the entire surface from the substrate edge defects, which serve as geometric singularities for heterogeneous ice nucleation. Water vapor from evaporating condensate feeds the ice bridges which act as sinks via the Wegener-Bergeron-Findeisen process.

This source-sink interaction sustains the oriented growth of ice bridges towards the supercooled droplets. In certain cases, large separation between ice bridge and target supercooled droplet or small size of the latter can cause its complete evaporation before being engulfed by the encroaching ice bridge. However, this frost front propagation mechanism, which is dependent on the surface coverage, is neglected for the current experimental analysis as E is significantly on the higher bound and only a few supercooled condensate evaporate before an ice bridge reaches them.

Example 12

Quantitative Characterization of the Global Frost Percolation

The macroscopic freezing mechanism qualitatively investigated on HySi, SCt surfaces was further quantitatively correlated with the microscopic inter-droplet frost front propagation. The global dynamics of condensation frosting as a function of surface temperature and ambient conditions was characterized by means of the local freeze-front velocity, freezing initiation time and total freezing delay time. Surface freezing delay was characterized by means of two typical timescales: "freezing initiation time" which refers to the instant when droplet freezing was first observed in the field of view (2.1 $mm^2$) and the total time it took for all the droplets on the entire surface (area≈2375 $mm^2$) to freeze since the onset of freezing initiation.

With increasing RH (high supersaturation) and decreasing $T_{pel}$, the final surface coverage (instant before freezing initiation in field of view) increases, leading to faster freezing front propagation locally, resulting in diminished net freezing duration of supercooled condensate globally. Under "extreme" conditions of very low substrate temperatures (e.g. $T_{pel}$=−30° C.) probability to observe spontaneous freezing events of certain supercooled droplets increases because of enhanced thermal gradient between the drop-substrate system and in part owing to the fact that $T_{pel}$ approaches the temperature regime fostering homogeneous ice nucleation in the droplet.

Freezing being a stochastic event, the exact initial location where the freezing wave front invades the bulk surface is difficult to visualize. Hence, in an attempt to evaluate the inter-droplet freeze front velocity with minimal "edge effect", a field-of-view (2.1 $mm^2$) at the center of the sample was fixated for all the experiments.

Liquid condensate remain in a dropwise condensation mode until an edge-effect ensued frost front intrudes the field-of-view (FI), freezing the droplets and percolating the bulk surface in a spate of freezing events (FD). Each of these time scales (FI and FD) are correlated by the freezing front propagation velocity ($V_{frost}$).

It must be noted that apart from very low substrate temperature conditions, direct freezing of droplets on SCt surface is uncommon due to the consistent droplet departure sweeping the surface.

The speed of inter-droplet frost growth across the population of supercooled condensate was calculated as $V_{frost}=\sqrt{A}/\Delta t$,[21] where A is the total rectangular area of the field-of view and Δt is the time required for all the drops in A to completely freeze.

While some previous studies have estimated the average freezing wave velocity by considering only the width of the field of view or calculating the individual tip propagation velocities of dendrites, the current estimation based on area averaged length scale is better representative of the bulk condensation-frosting dynamics.

The frost propagation velocity on HySi is faster than that on the SCt surface, indicating the effectiveness of SCt on the condensation-frosting performance.

Figure 31:
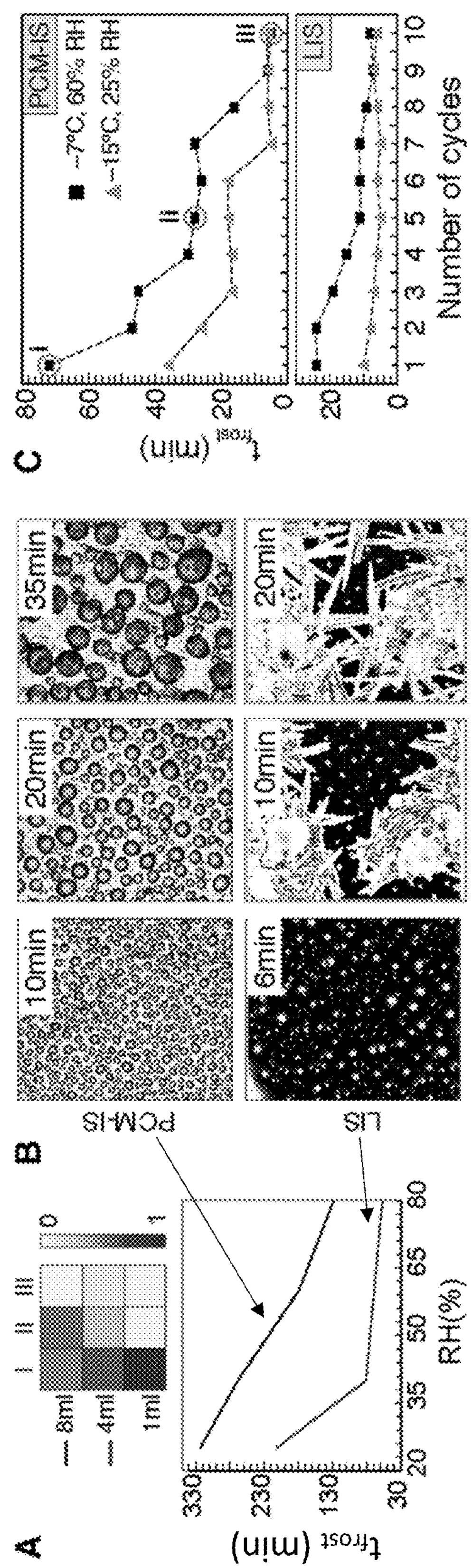
FIG. 31 shows the condensation-frosting performance of a phase change material-infused micro textured surface as compared to a typical Lubricant Infused Surface (LIS). Silicone oil was used for the LIS. Solidified cyclooctane was used for the Phase Change Material Infused Surface (PCM-IS).

FIG. 31A shows the effect of coating thickness on the freezing delay performance against condensation-frosting as a function of varying percent RH. The PCM/PSL volume was varied from 8 ml to 1 ml which changed the coating thickness.

FIG. 31B shows time-lapse images demonstrating the condensation-frosting performance of a PCM/PSL infused micro textured surface as compared to a typical Lubricant Infused Surface (LIS). For LIS we used Silicone oil with 10 cST viscosity as the lubricant. For PCM-IS/PSL-IS (PCM/PSL-Infused surface) we used cyclooctane. In LIS the liquid lubricant wicks into the incipient frost and depletes the surface of its natural lubricant. However, in a PCM-IS/PSL-IS surface below the characteristic melting point of the PCM/PSL, the infusing material is a solid lubricant and hence doesn't get depleted after icing happens. FIG. 31C shows the durability of PCM-IS surface as compared to a typical LIS surface under different substrate subcoolings and ambient conditions. LIS does not perform as well as a PCM-IS/PSL-IS surface. Performance of PCM-IS/PSL-IS surface degrades over a period of icing-deicing cycles due to sublimation of SCt. This performance can be improved by using natural vegetable based/naturally derived oils which do not evaporate as easily and are environmentally safe. Test were done in microtextured (100 um post spacing) silicone samples (each 6.45 cm2 size)

Example 13

We have also investigated the performance of some naturally derived vegetable oils and essential oils for anti-icing applications.

Figure 32:
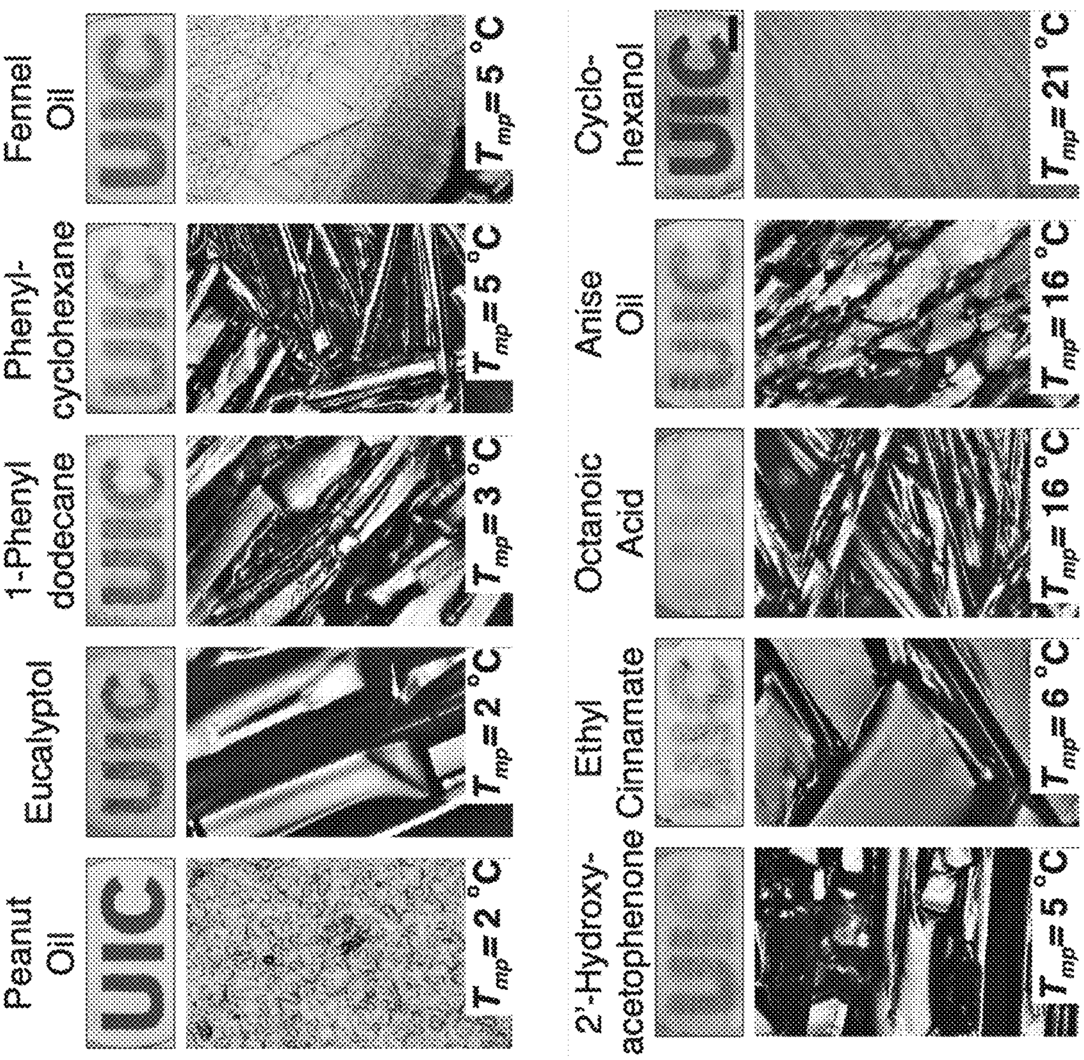
FIG. 32 shows images of optical transparency of PCM (PSL) coated aluminum surfaces at Tpeltier=4° C., and a relative humidity RH=15%. The bottom panel shows microscopic surface features of S-PCM (S-PSL) surfaces maintained below their respective melting points in a very low humidity environment.

FIG. 32 (top panel) shows macro images of the optical transparency of PCM/PSL coated aluminum surfaces at Tpel=4° C., RH=15%. FIG. 32 (bottom panel) shows microscopic surface features of S-PCM/S-PSL surfaces maintained below their respective melting points in a very low humidity environment.

Figure 33:
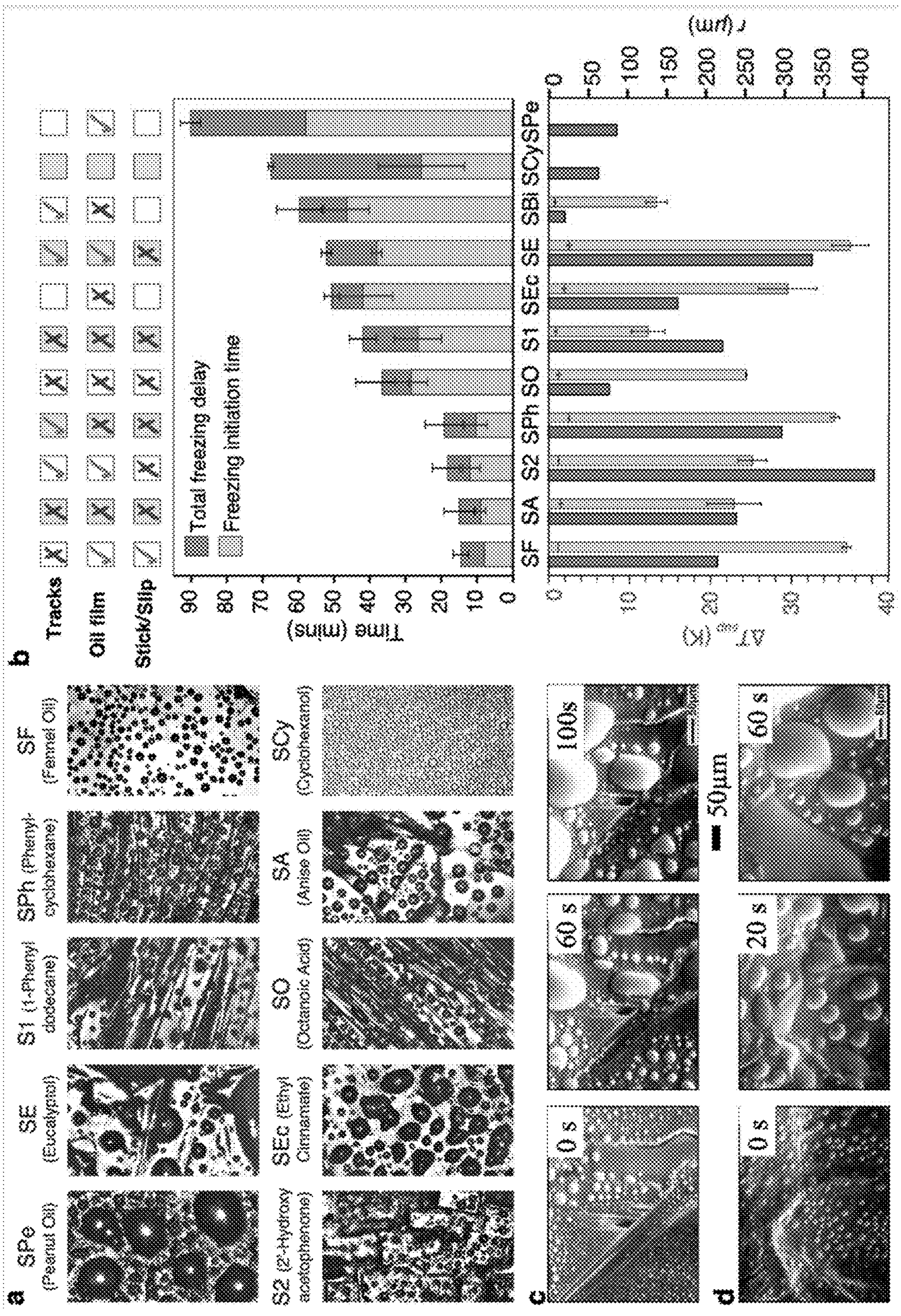
FIG. 33 shows optical microscopy images of typical condensation behavior on corresponding bulk S-PCM (S-PSL) surfaces at low temperatures; the condensation-frosting performance of various bulk S-PCMs (S-PSLs), measuring "freezing initiation time" and the "total freezing delay time"; and the effect of degree of supercooling contributing to the performance of these materials plotted as a function of surface roughness.

FIG. 33*a* shows optical microscopy images of typical condensation behavior on corresponding bulk S-PCM/S-PSL surfaces at Tpel=−15° C. and RH=80%.

FIG. 33*b* shows condensation-frosting performance of various bulk S-PCMs/S-PSLs cooled to Tpel=−15° C. in 80% RH environment. The "freezing initiation time" depicts the occurrence of the first condensate freezing event in the field of view (2.1 mm2), while the "total freezing delay time" represents the net time required for all the condensed droplets on S-PCM/S-PSL surface (2375 mm2) to freeze since the onset of freezing initiation. The error bars (left and right) denote standard deviations, obtained from experimental measurements on different S-PSLs repeated at least four times each. Bottom graph shows Effect of degree of supercooling contributing to the performance of these materials plotted as a function of surface roughness.

FIG. 33*d*, 33*d* show environmental Scanning Electron Microscopy images showing nature of condensation on SO (c) and SEc (d) surfaces respectively.

Example 14

Regarding the Experimentation for FIG. 34:

Test chemicals used: (1) Dimethyl Sulfoxide: DMSO; (2) Poly(ethylene glycol)-block-poly(propylene glycol)-block-poly(ethylene glycol): block-copolymer BCP or P; (3) Cyclooctane: SCt.

For FIG. 34, only DMSO+BCP were used to assess whether the BCP would increase the lifetime over only DMSO, preventing its dissolution, maintaining/increasing its anti-icing performance on being applied as a thin coating.

The Contact Angle (Θ) of a water drop on solidified surfaces (DMSO+varying % BCP) in a low humidity environment was assessed, with results in FIG. 34. Contact angle increases with increasing BCP concentration.

Figure 35:
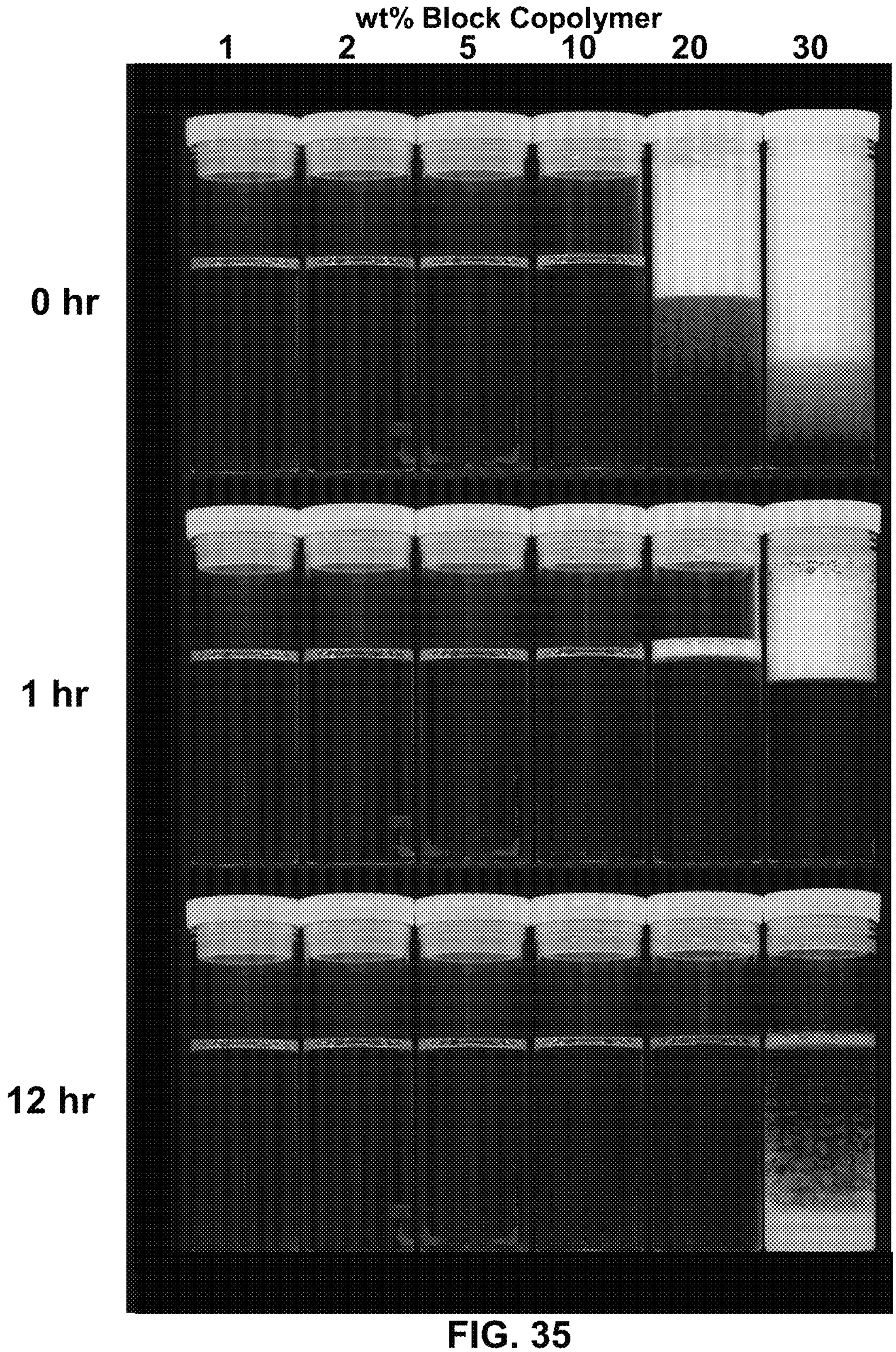
FIG. 35 shows the anti-icing effects of varying block-copolymer in bulk DMSO solutions.

The stability of prepared solutions of DMSO with varying weight percents (wt %) of BCP was assessed in FIG. 35.

Pure DMSO surface is hydrophilic. The addition of BCP helps in dropwise condensation on surface and increases lifetime of the materials in terms of anti-icing.

When tested in bulk with 8 ml solution (3 mm solidified coating thickness) of DMSO with varying % BCP added, all surfaces lasted >24 hrs (FIG. 36) without any ice accumulation and they thus can serve as superior anti-icing agents.

Figure 36:
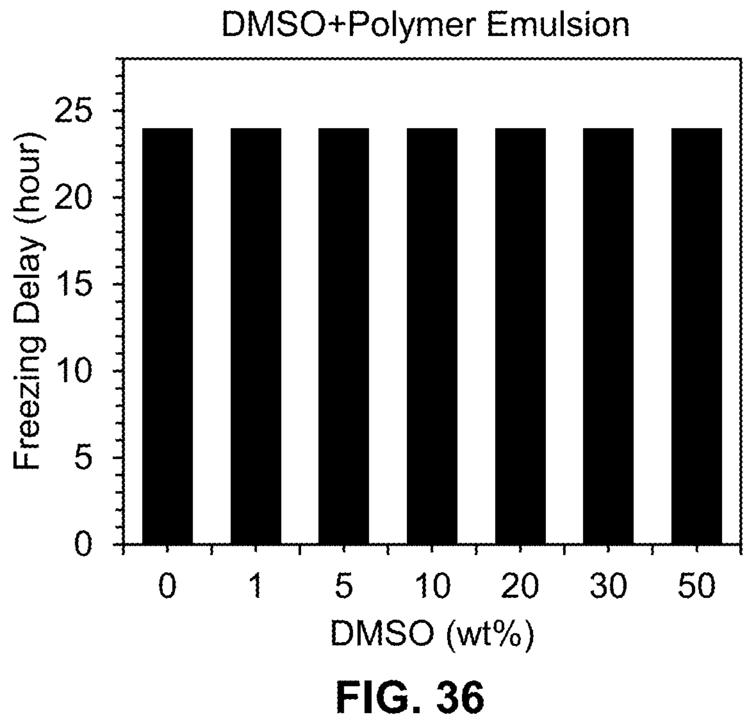
FIG. 36 shows the effects of varying block-copolymer on freezing delay

Test conditions for FIGS. 35, 36 were as follows: 25° C. ambient air temperature, 60% Relative humidity (% RH), cooled down to Peltier temperature (Tpel) of −15° C.

Figure 37:
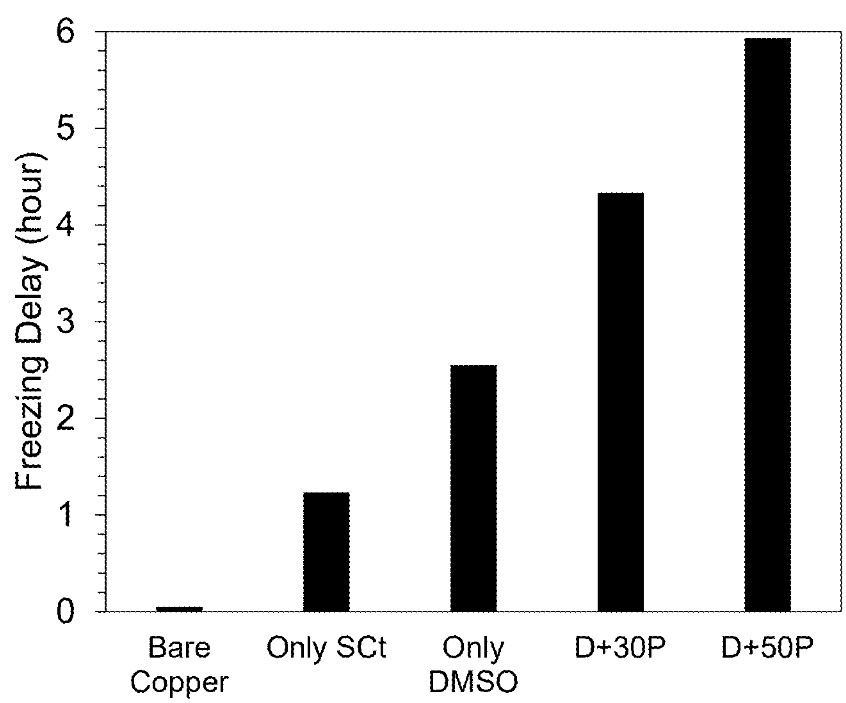
FIG. 37 shows the effect on freezing delay provided by the addition of block polymer.

When tested as thin coatings (~1 mm thick) on hydrophilic copper samples (size 6.45 $cm^2$), the coatings demonstrated the performance shown in FIG. 37.

Test conditions for FIG. 37: 25° C. ambient air temperature, 60% Relative humidity (% RH), cooled down to Peltier temperature ($T_{pel}$) of −7° C.

"Bare Copper" indicates hydrophilic copper sample without any coating; "Only SCt" indicates a copper sample coated with cyclooctane only; "Only DMSO" indicates a copper sample coated with DMSO only; "D+30P" indicates DMSO+30 wt % BCP;

"D+50P" indicates DMSO+50 wt % BCP. Freezing delay increases with the addition of the block copolymer.

Example 15

Emulsion of DMSO, BCP, Silicone Oil and Cyclooctane

Figure 38:
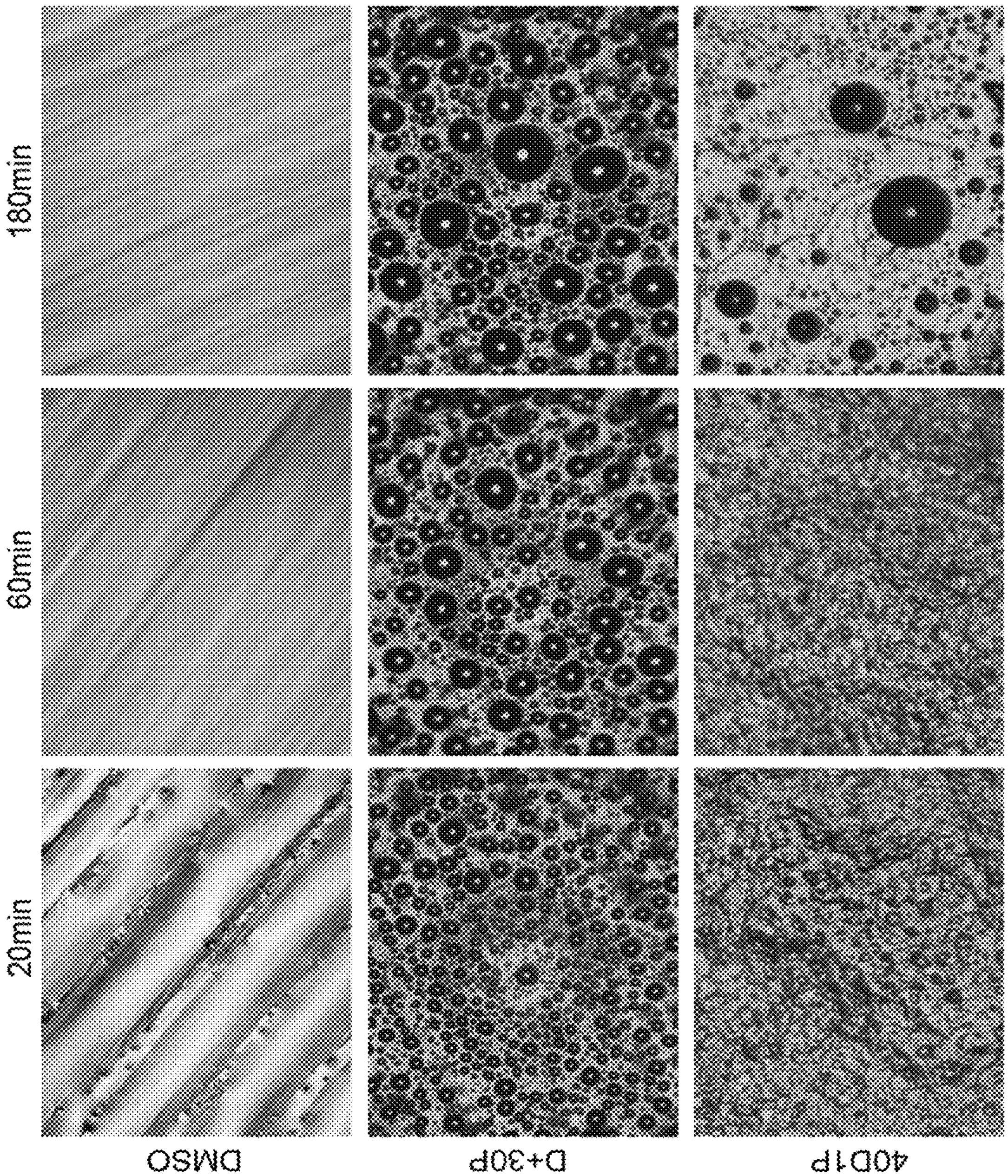
FIG. 38 shows the condensation frosting performance of DMSO with and without the addition of block copolymers.

FIG. 38 shows the nature of condensation-frosting performance on different surfaces in bulk (8 ml) solution under 25° C. ambient air temperature, 60% Relative humidity (% RH), cooled down to Peltier temperature ($T_{pel}$) of −15° C.

"D+30P" indicates DMSO+30 wt % BCP; "40D1P" indicates 40 wt % DMSO, 60 wt % Cyclocotane, 1 wt % BCP, Silicone Oil (10 cSt viscosity).

Example 16

Block Copolymer Emulsions.

Figure 39:
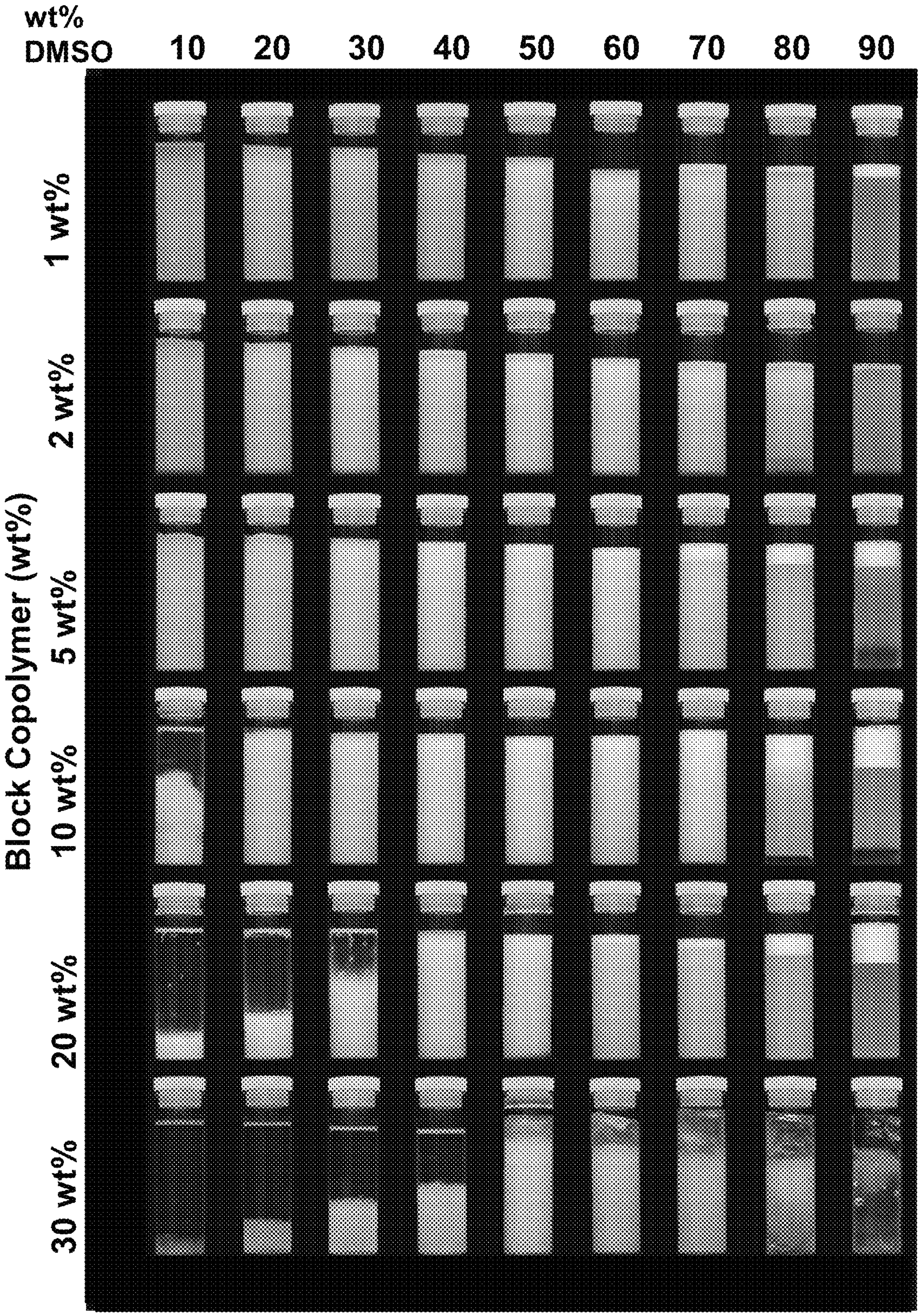
FIG. 39 shows a family of anti-icing emulsions with varying weight percent block copolymer and DMSO.
Figure 40:
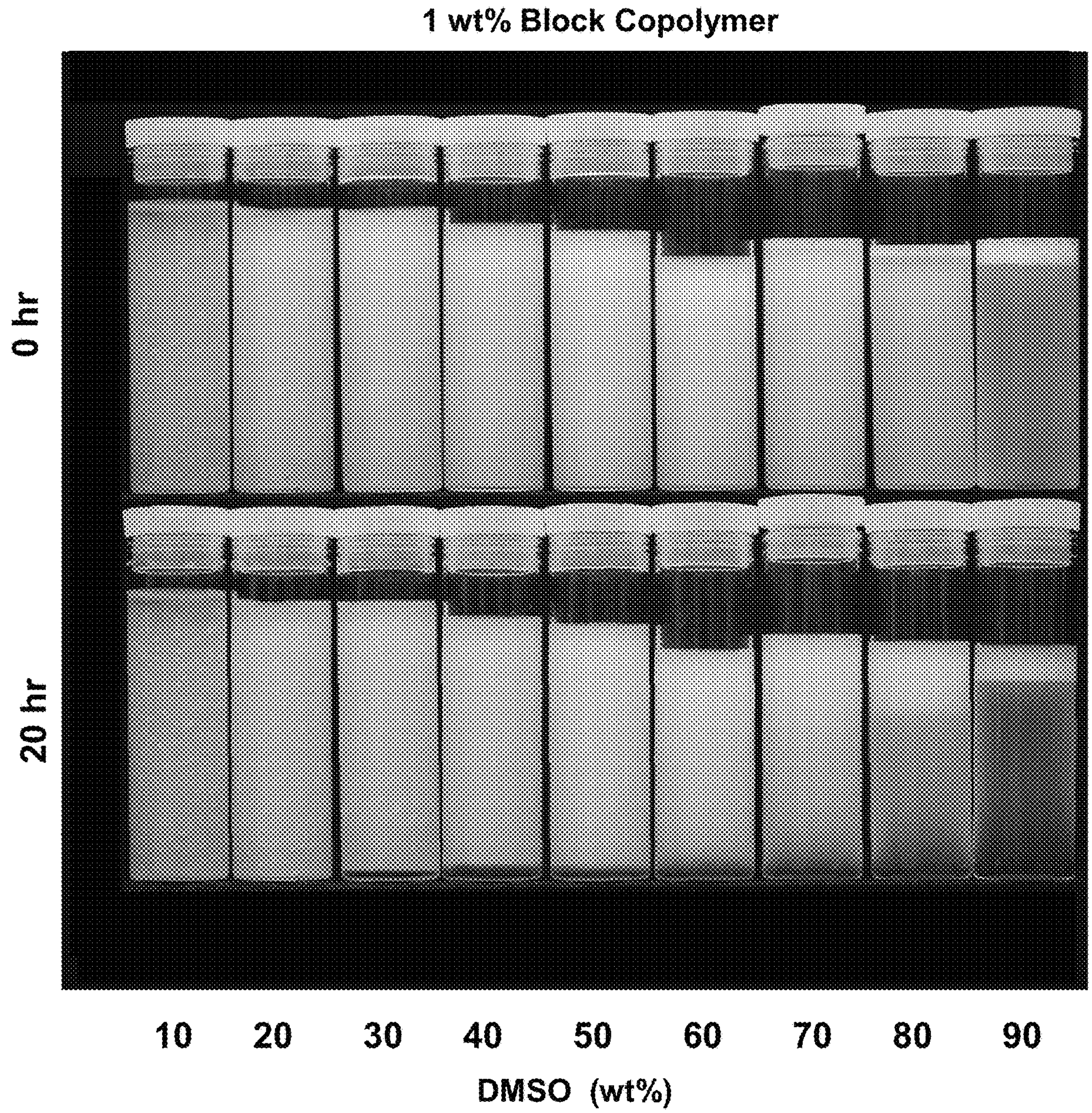
FIG. 40 shows the stability of some of the emulsions of FIG. 39.
Figure 41:
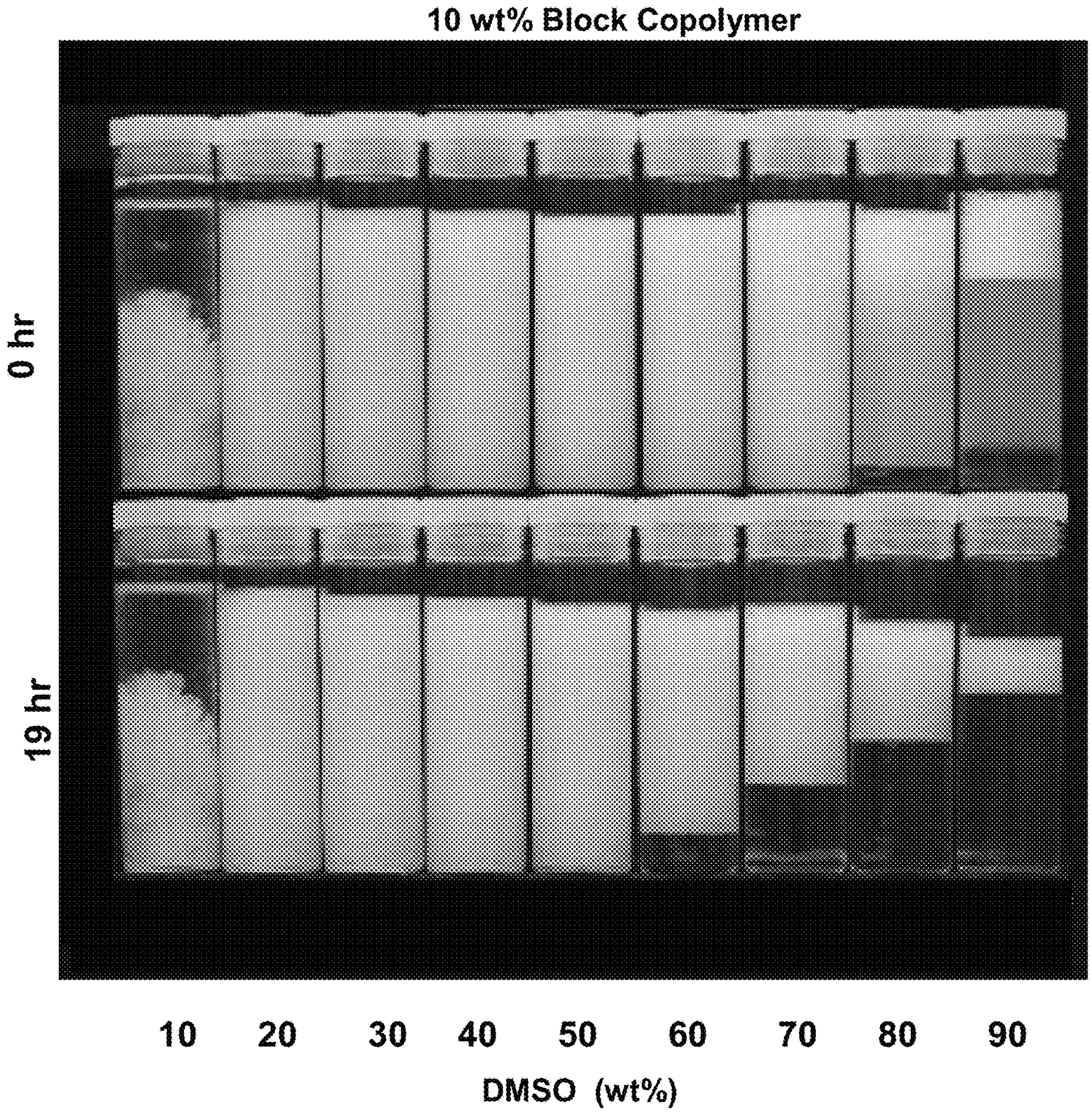
FIG. 41 shows the stability of other emulsions of FIG. 39.
Figure 42:
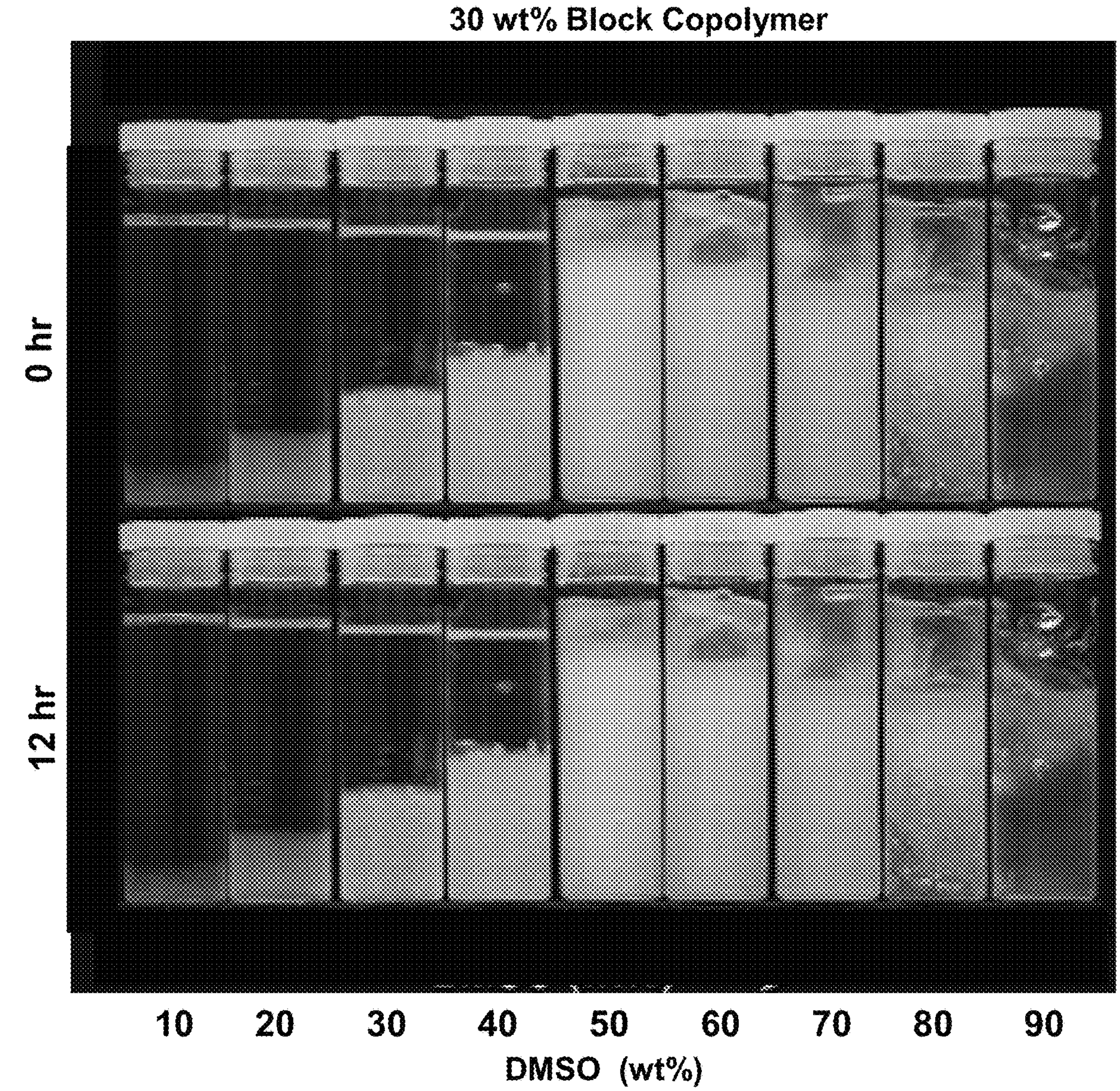
FIG. 42 shows the stability of yet other emulsions of FIG. 39.

FIG. 39 shows a family of anti-icing gels/emulsions made by varying the wt % of BCP and DMSO as described in the figure. FIGS. 40-42 show the stability of the anti-icing emulsions over the indicated time periods.

Methods for Making Emulsions:

DMSO: 5 ml==>$W_1$ (gr)=5 ml)*Rho=5.5 gm; Rho in gr/ml)

Cyclooctane: ==>$W_2$=57.8/42.2 $W_1$=7.5332 gm

Silicone Oil (10 cSt viscosity): $W_3$=[x/100]*$W_2$=0.075332 gm, where when [x/100] varies for weight percent. For example, for 1 wt percent, [x/100]=[1/100].

Block copolymer (Poly(ethylene glycol)-block-poly(propylene glycol)-block-poly(ethylene glycol): W4=[10.6/89.4]$W_1$=0.6521 gm.

Step 1: mix DMSO and block copolymer as prepared above.

Step 2: mix Cyclooctane and Silicone oil as prepared above

Step 3: bath sonicate for 30 minutes

Step 4: Ultrasonicate the mixtures prepared in step 1 and step 2 via horn sonication for 15 minutes with a dry ice bath.

Example 17

Anti-Icing Performance

Figure 43:
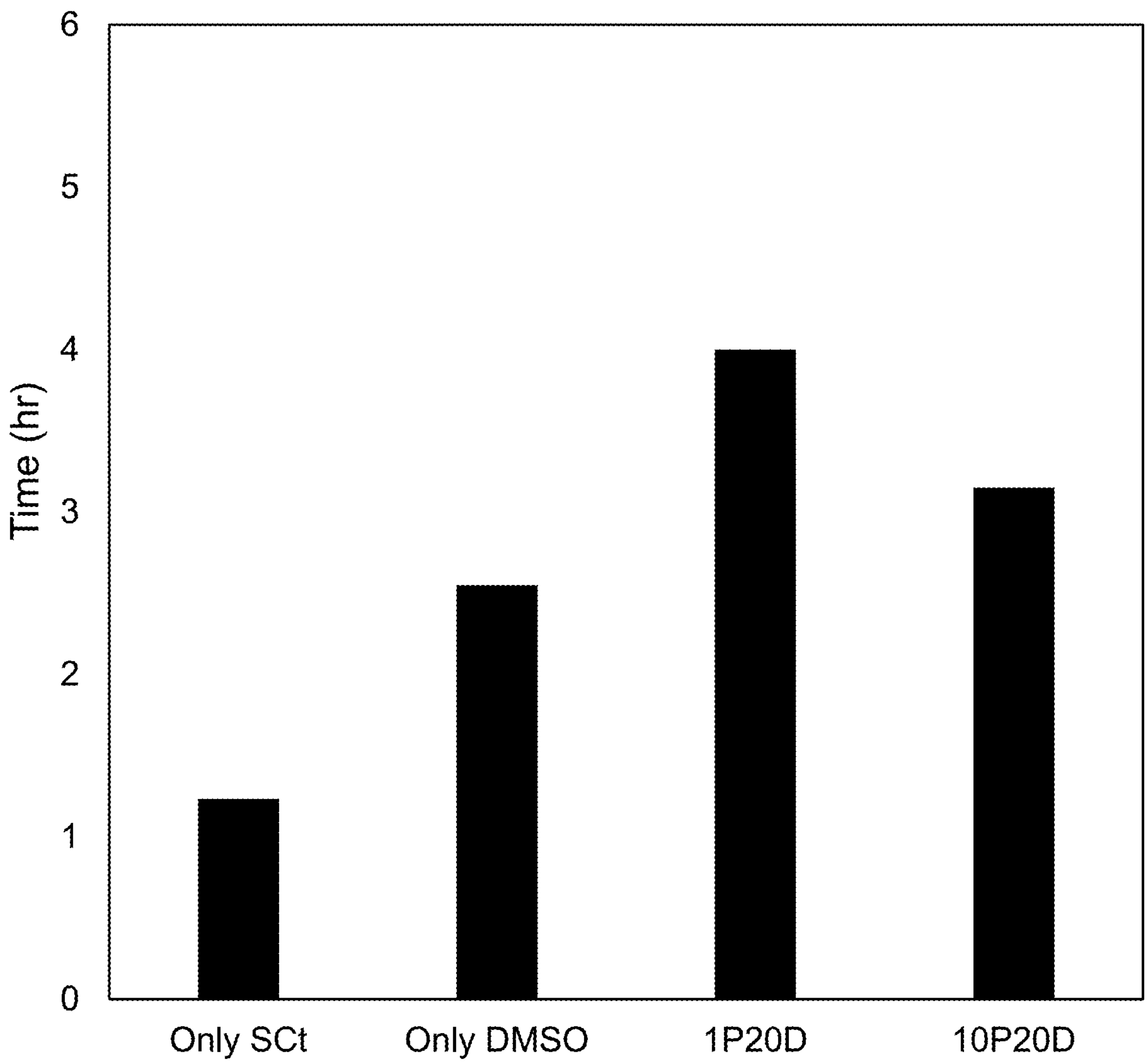
FIG. 43 shows the anti-icing performance of certain block copolymer/DMSO samples.
Figure 44:
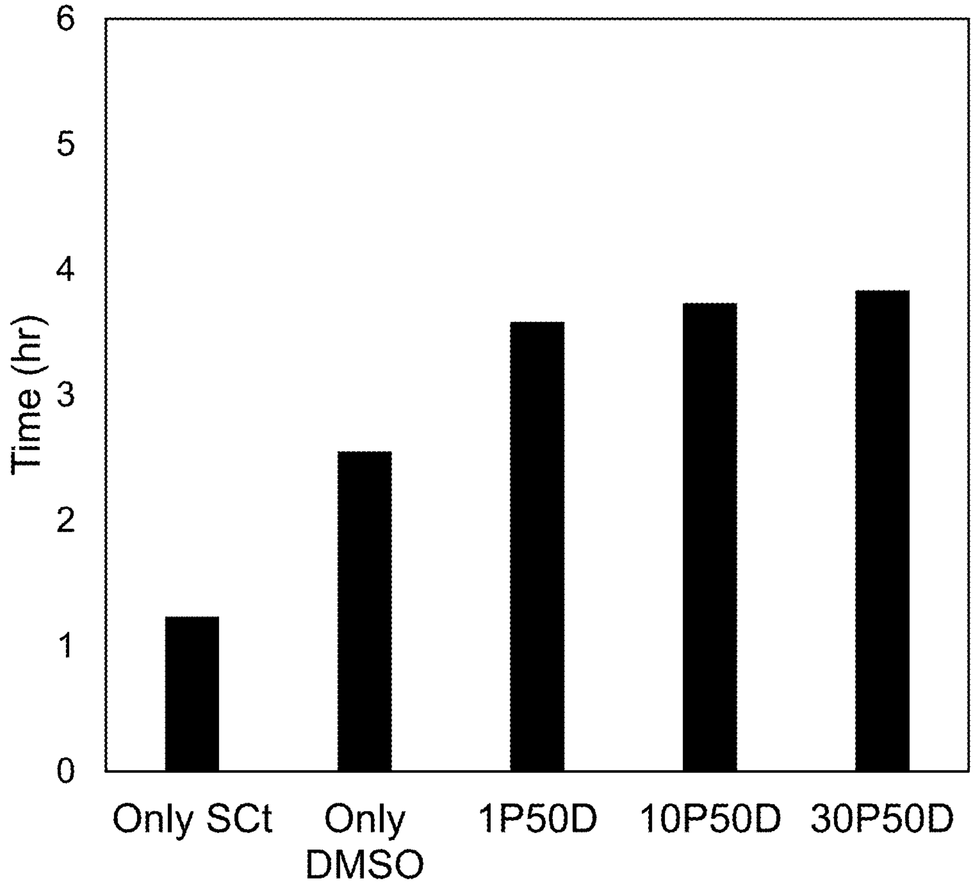
FIG. 44 shows the anti-icing performance of other block copolymer/DMSO samples.
Figure 45:
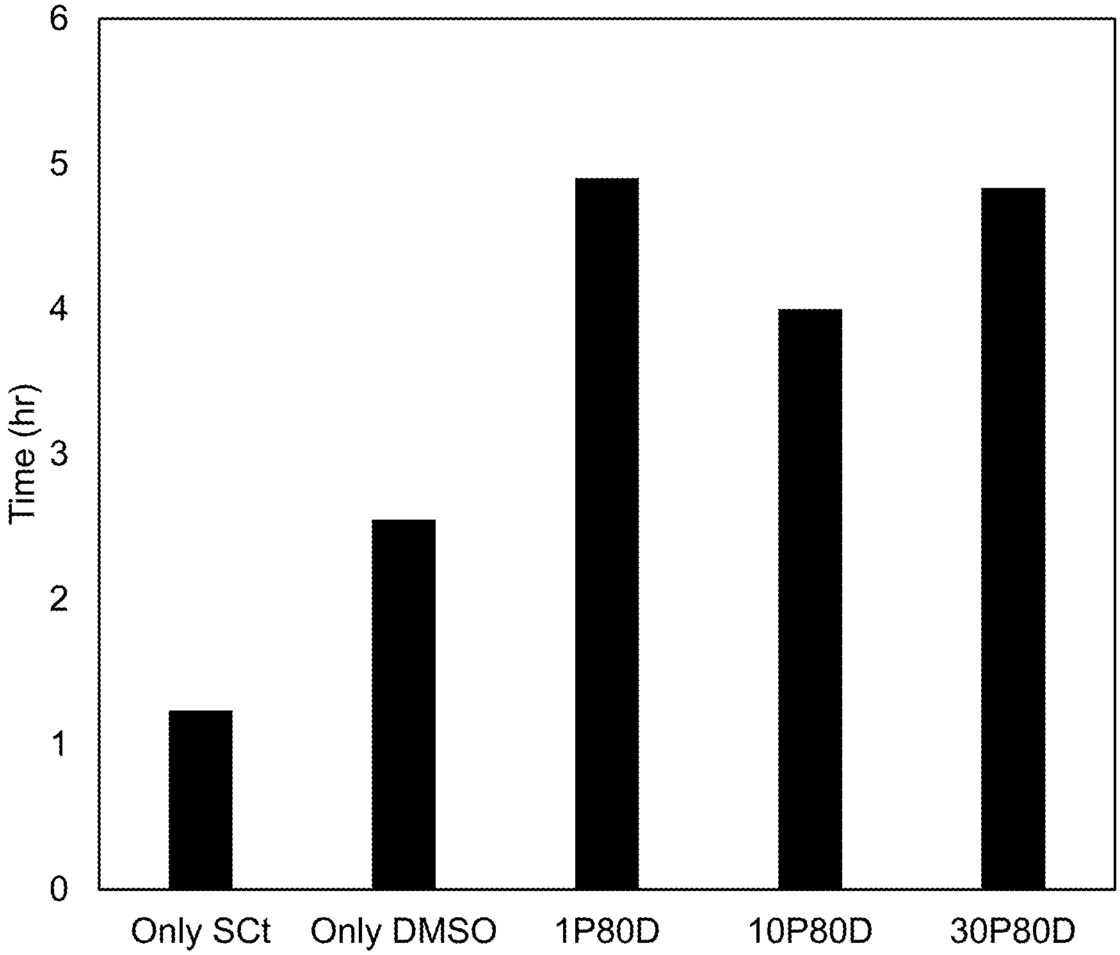
FIG. 45 shows the anti-icing performance of yet other block copolymer/DMSO samples.

When tested as thin coatings (~1 mm thick) on hydrophilic copper samples (size 6.45 $cm^2$), the coatings demonstrate the performance shown in FIGS. 43-45.

Test conditions: 25° C. ambient air temperature, 60% Relative humidity (% RH), cooled down to Peltier temperature ($T_{pel}$) of −7° C. "Only SCt" indicates a copper sample coated with cyclooctane only; "Only DMSO" indicates a copper sample coated with DMSO only; the "_P_D" generic formula refers to the percentage of block polymer and DMSO. For example, "1P20D" indicates 1 wt % BCP, 20 wt % DMSO, 80 wt % Cyclocotane, Silicone Oil (10 cSt viscosity). "10P" indicates 10 wt % BCP, etc.

Example 18

It was desired to develop cryoprotectant, including DMSO, based formulations with low dissolution rates while maintaining anti-icing properties. Additionally, it was desired to test the effectiveness of coatings using such formulations in delaying icing and decreasing ice-adhesion on any surface regardless of the surface's inherent chemistry. To this end, four different formulations were synthesized: a DMSO block copolymer (BCP) solution, a non-aqueous emulsion, a cream and finally a freeze-resistant organohydrogel. Each of the different formulations presented herein show excellent delay in DMSO dissolution/hygroscopicity while maintaining their anti-icing properties—both in terms of delaying freezing and decreasing ice-adhesion. Each type of formulation can be used as a standalone coating on plain surfaces negating the need of expensive surface treatments or can be integrated with textured surfaces to produce effective LIS for anti-icing application.

Synthesis of Non-Aqueous Emulsions and Creams

Figure 47:
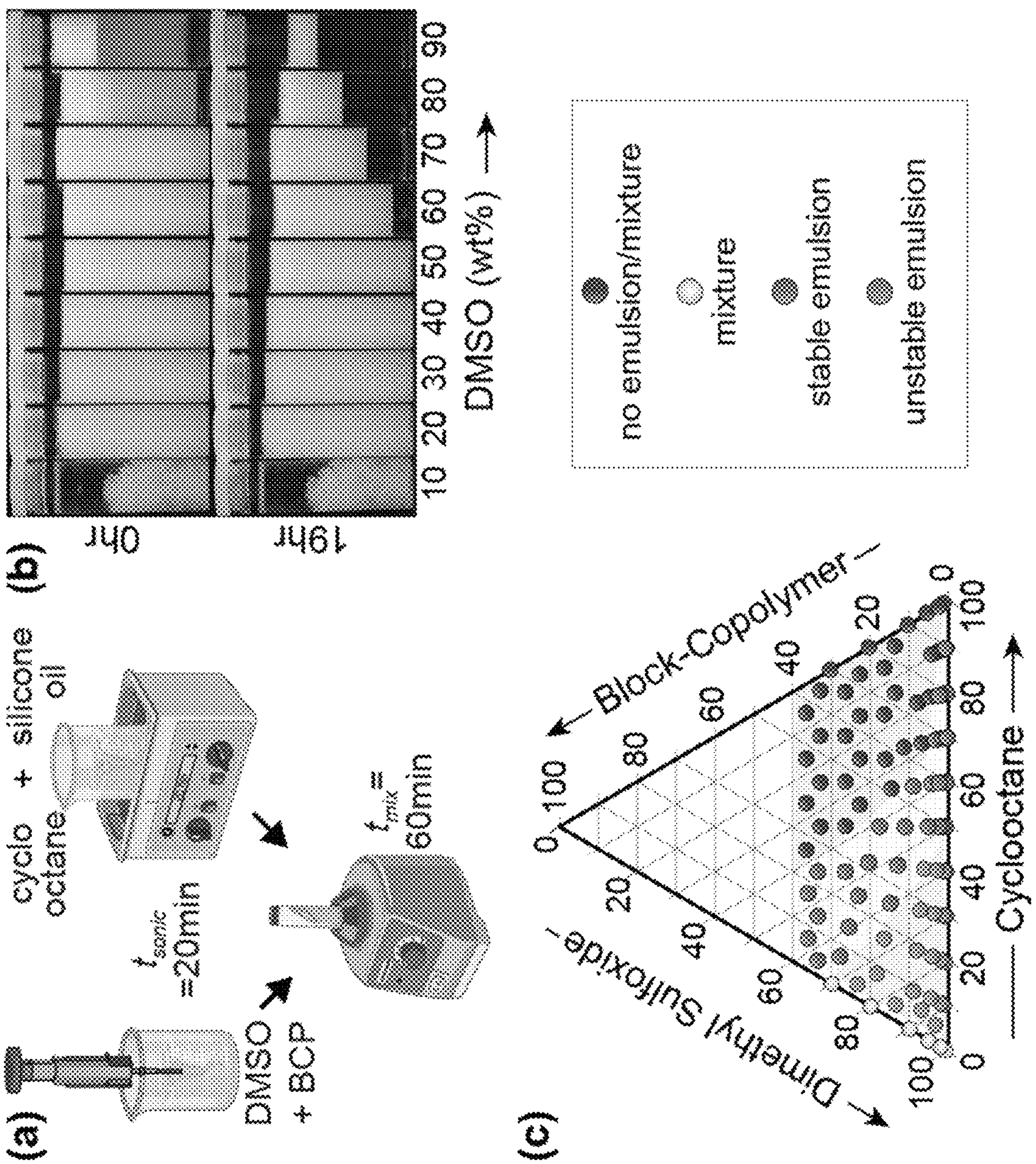
FIG. 47 shows the example preparation of creams and emulsions according to an example embodiment.
Figure 47:
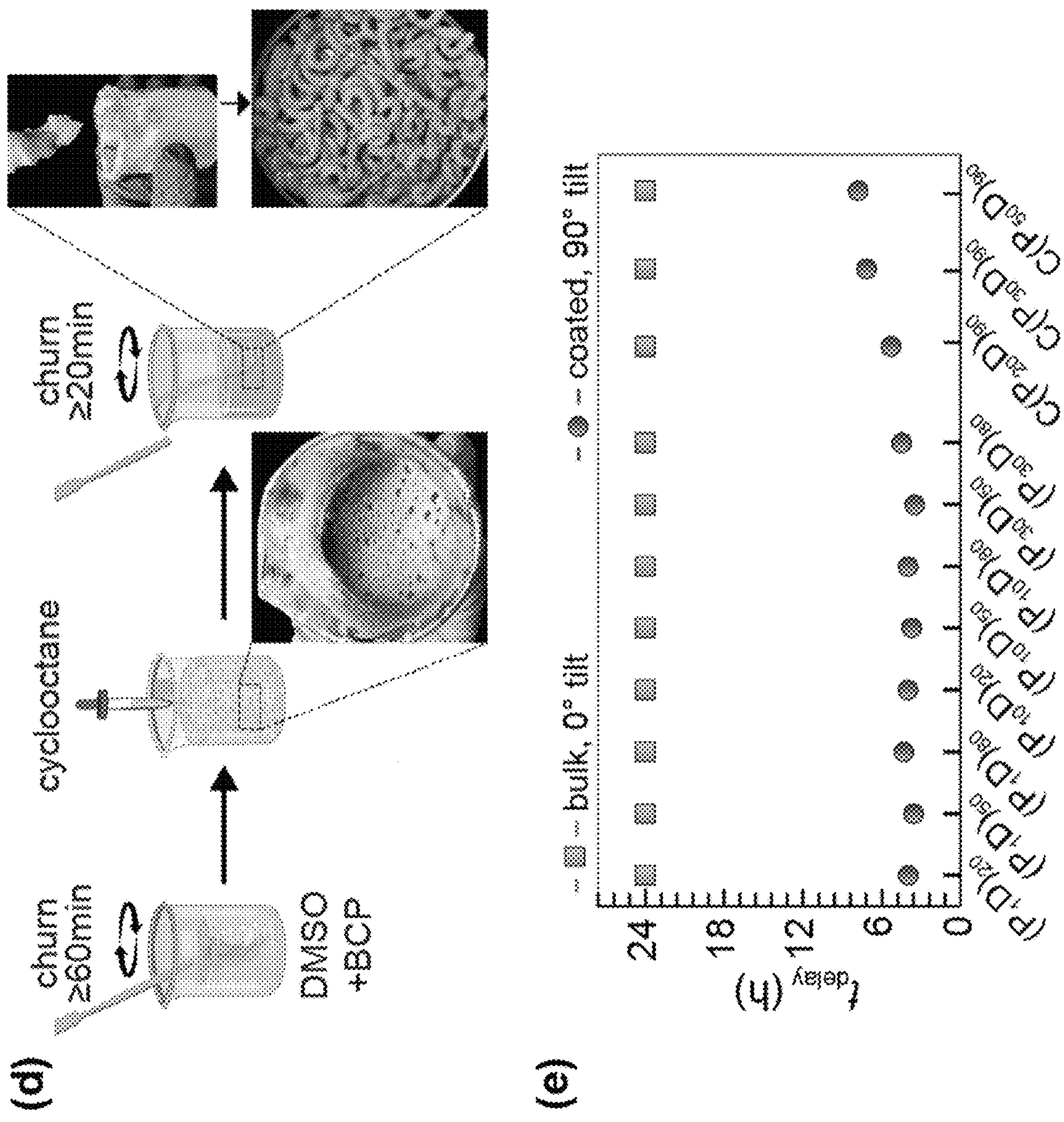

The significant lowering in dissolution, supercooling, hygroscopicity accompanied concomitantly by the substantial improvements in condensation-freezing delay by the BCP addition to DMSO make these solutions excellent candidate for anti-icing coatings. However, the rheology changes in ambient conditions at higher BCP concentrations and their depletion under heavy condensation limits their applicability in applications where coating a surface multiple times is not a viable option. Consequently, we next sought to formulate coatings with longer lifetime by replacing a fraction of DMSO with another anti-icing hydrophobic molecule while preserving the scalability of coating process. To meet these objectives, we formulated non-aqueous (also called as waterless or oil-in-oil[1]) emulsions and creams with DMSO concentrations larger than 60% by weight. Non-aqueous emulsions are synthesized by the emulsification of two immiscible organic liquids in presence of a compatible surfactant. For the second organic phase, cyclooctane (Cy) we chose because of its non-polar nature and anti-icing properties demonstrated in our earlier work. Visual inspection confirmed that DMSO and Cy were highly immiscible in each other—an important criterion required for the preparation of the non-aqueous emulsions. The BCP Pluronic® F-108 was again chosen as a surfactant because it is more soluble in DMSO (compared to Cy) and once absorbed at oil-oil interface, it shows significantly slower desorption kinetics as its long polymer chains entangle forming a sterically protective thick adsorbed layer with a loop-train-tail conformation which aren't easily desorbed. Non-aqueous emulsions typically show lower emulsion stability compared to the oil-in-water emulsions because they are more prone to Ostwald ripening effect. To address this problem, a trace amount (1% v/v) of silicone oil (viscosity~10 cSt) was added to the droplet phase (cyclooctane) because it is fully soluble in the latter and insoluble in the continuous phase (DMSO). A schematic outlining the final preparation method is shown in FIG. 47*a*. Separately performed experiments confirmed that emulsions prepared without silicone oil were less stable but gained long-time stability (over many days) in its presence—behavior that can be attributed to the arrested growth rate of droplets by significant lowering of Ostwald ripening. The details of the emulsion preparation process are outlined in.

An emulsions' stability and rheology depend on the relative concentration of its constituents. To characterize abovementioned factors, we did parametric studies making 80 different combinations of DMSO/BCP/Cy (with silicone oil). These combinations could be classified into stable emulsion, unstable emulsion (emulsions that break down after some time), simple mixtures, and non-emulsion (where no emulsion can be formed at all) phases. Some examples of these combinations are shown in FIG. 47*b*, and a detailed regime-map is shown through a pseudo-ternary phase diagram in FIG. 47*c*. DSC measurements showed that stable emulsions showed ~8K supercooling, same as pristine DMSO. Rheological measurements showed that the creams had much higher viscosity compared to DMSO-BCP solution and could be applied by painting on a superhydrophilic surface—like emulsions. We also discovered that modifying our emulsion preparation method by replacing the horn-sonicator with an electric whipping machine and adding cyclooctane drop by drop into the mixture led to colloids with consistency of creams. Henceforth such creams are referred by addition of 'C' as a prefix.

To gauge the anti-icing effectiveness of the emulsions and creams, we investigated the condensation-frosting dynamics on them with copper (6.45 $cm^2$) as the base substrate in both vertical and horizontal orientation, and under conditions identical to prior experiments ($T_{pel}$=−7° C., $T_{air}$=24° C., RH=60%). Thanks to their rheology, emulsions and creams could be easily brush coated on the plain surface without requiring special surface treatment or expensive micro-nano texturing (Fig. S6*a*). In each case, the coating thickness was ~1 mm. To depict the performance of different representative emulsion groups amongst varying BCP and DMSO concentrations, $(P_1D)_{20}$, $(P_1D)_{40}$, $(P_1D)_{50}$, $(P_1D)_{60}$, $(P_1D)_{80}$, $(P_{10}D)_{20}$, $(P_{10}D)_{50}$, $(P_{10}D)_{80}$, $(P_{30}D)_{50}$, and $(P_{30}D)_{80}$ were selected. All the selected emulsions were stable in nature against phase separation for prolong periods. The experiments showed that in coatings with lower DMSO content such as $(P_1D)_{20}$, stable dropwise condensate rolled down the entire surface area during the entire experimental duration, whereas on coatings with high DMSO content such as $(P_1D)_{50}$ and $(P_1D)_{80}$, the condensation process started as tiny drops but then quickly changed to film-wise mode. Nevertheless, the average freezing delay time on all the tested samples was ~4 hrs in vertical orientation (FIG. 47*e*), which is 2×-4× compared to only DMSO-BCP solution-based coatings. For 1 wt % and 10 wt % BCP concentration, the emulsion-based coatings outperformed its DMSO-BCP counterparts in terms of freezing delay potential, matching closely with 30 wt % BCP in DMSO performance. Thus, even with relatively low BCP concentration, the same desired delayed icing/frosting could be achieved. It was also found that more the BCP content in the coating, slower the coating dissolution and higher the freezing delay time. $(P_{30}D)_{80}$, had a thick paste-like consistency and lasted the longest amongst the tested samples at 4.5 hours but showed complete deterioration by the end. On the other hand, $(P_1D)_{20}$ sample completely frosted in 4 hours with most of the coating remaining intact, so overall i better coating. In the identical conditions, the cream coatings performed even better than the emulsion coatings (FIG. 47*e*). For example, considering the 30 wt % BCP concentration, the cream based $CD_{30}P$ outlasted the $BCP_{30\%}$ and pure DMSO based coating by 1.7 and 2.8 times, respectively. $CD_{50}P$ with a freezing delay time of 7.83 hours performed the best amongst all the developed coatings so far. Note that, in horizontal position, all emulsion and cream coatings showed a freezing delay of ~24 hours which was the duration of our experiments (FIG. 47*e*).

Example 19

Multifunctional Icephobic Performance of Non-Aqueous Creams

Figure 48:
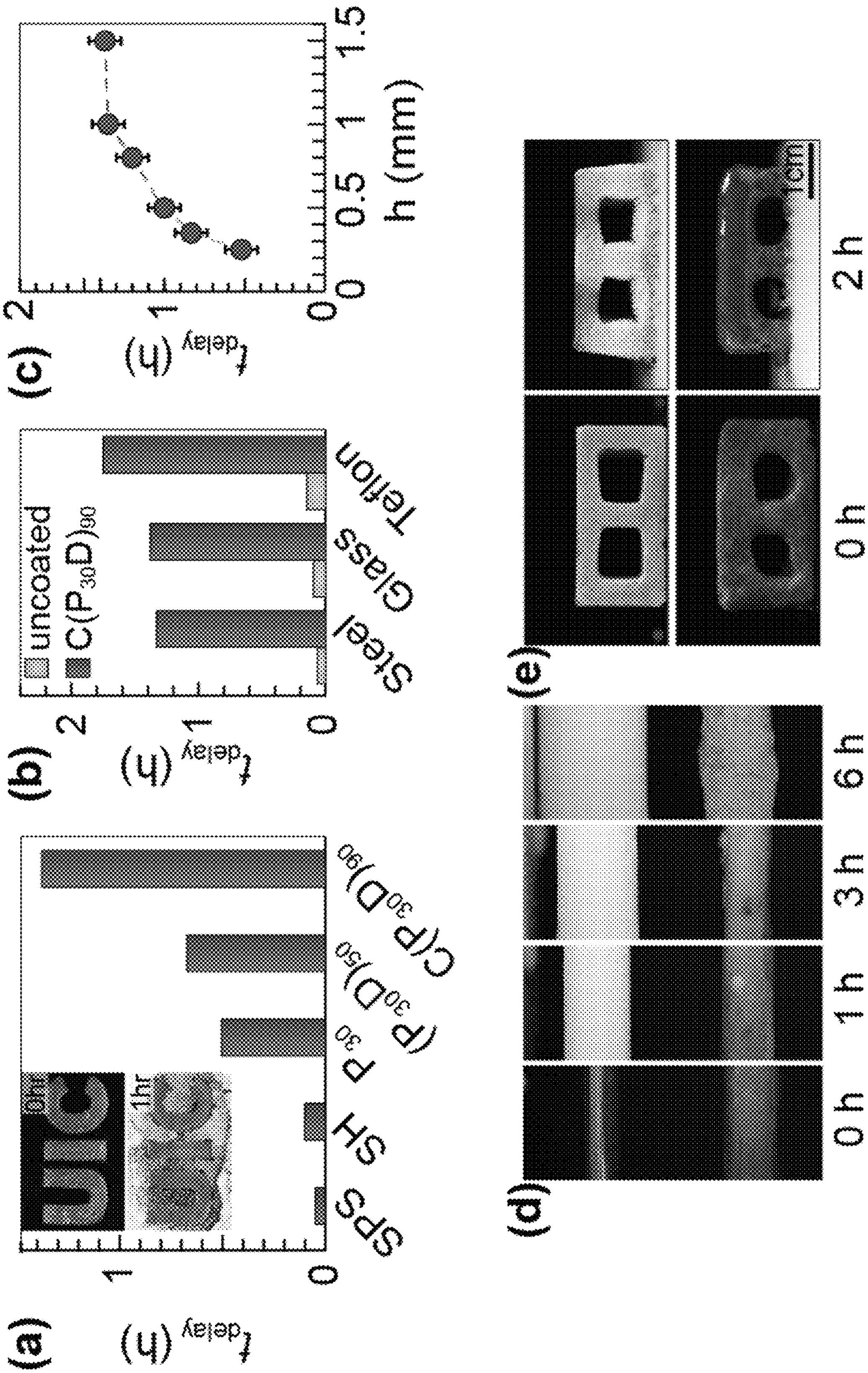
FIG. 48 shows the anti-icing and other properties of cream-based coatings according to an example embodiment.
Figure 48:
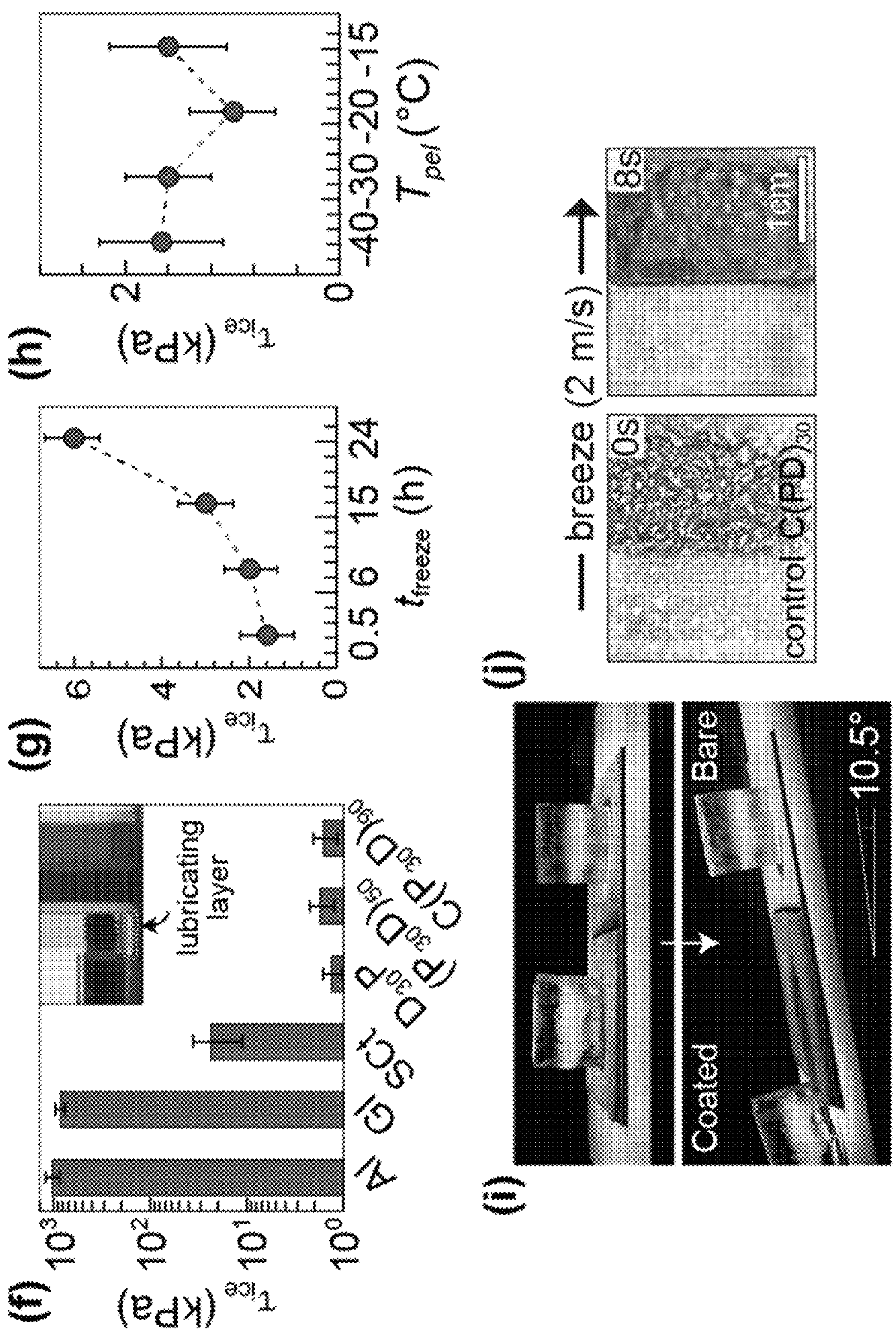
Figure 48:
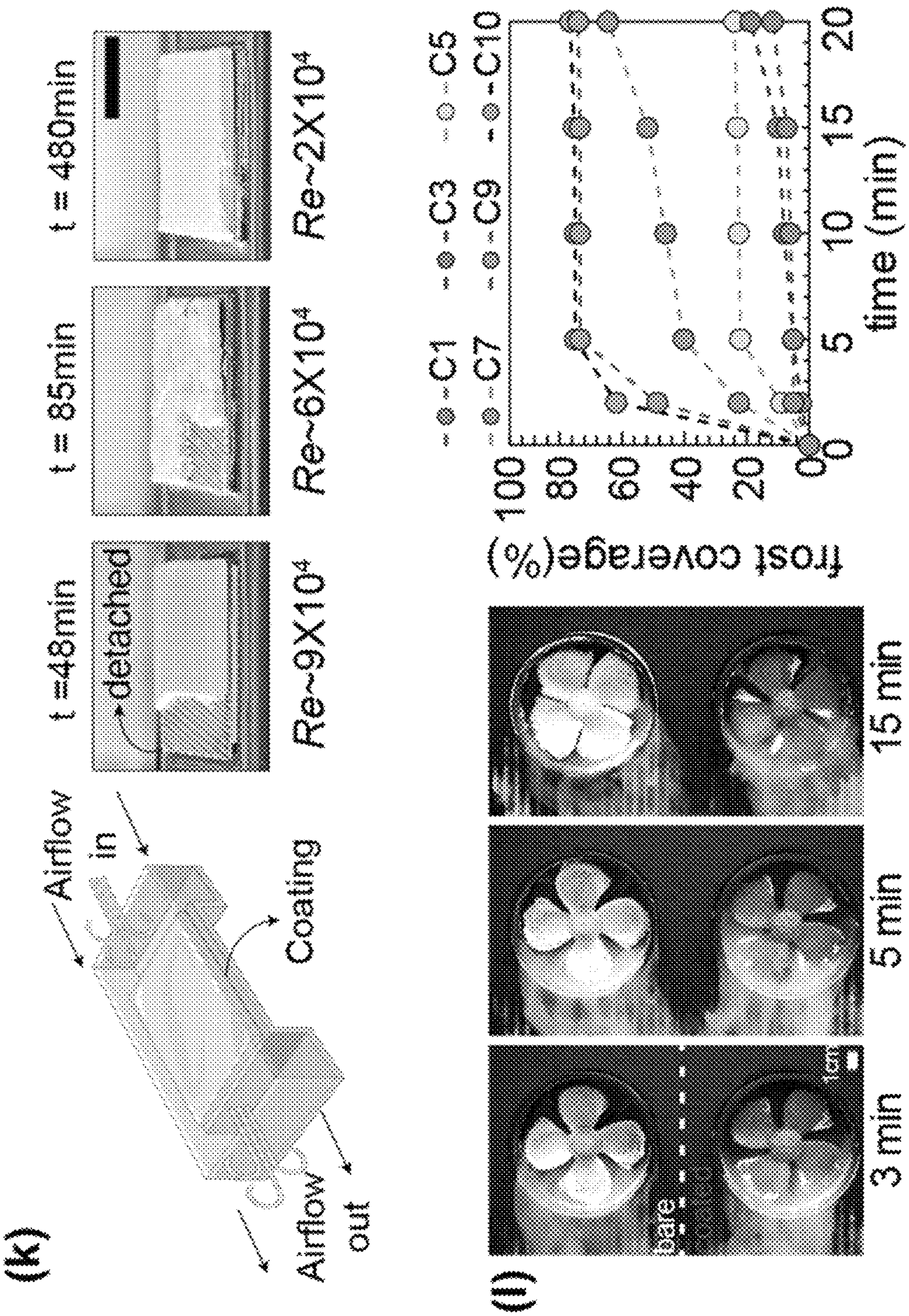

Since the $CD_{30}P$ coating was amongst the best performing coating in condensation-frosting freezing delay, in the next stage, we focused exclusively on studying its performance in delaying condensation frosting under more strenuous conditions, its anti-icing capabilities and durability. The condensation-frosting studies were all performed in the same deep freeze conditions ($T_{pel}$=−30° C., 24° C., RH=60%, supersaturation=37.5) in the environmental chamber. Select coatings including 30 wt % BCP in DMSO ($P_{30}$), emulsion ($(P_{30}D)_{50}$), Neverwet™ (SH) were tested for comparison as well. The base substrate for all the coatings was plain copper, but the compatibility of cream on other thermally conducting/insulating materials including steel, glass and Teflon was also tested. All substrates had same area (6.45 $cm^2$), were oriented vertically and the coating thickness of all DMSO based formulations was ~1 mm in all the cases. As shown in FIG. 48*a*, even under such deep chill conditions, $CD_{30}P$ performed the best although the total freezing delay time due to the extreme substrate subcooling ($T_{pel}$=−30° C.) decreased 5.2 times compared to the $T_{pel}$=−7° C. case (FIG. 48*e*). The cream adhered well on copper, steel, glass and Teflon without any signs of delamination. Results showed that $CD_{30}P$ coated PTFE due to its thermally insulating properties performed relatively better delaying condensation frosting for 1.75 hrs, while coated copper, steel and glass substrates performed relatively similar at ~1.36 hours (FIG. 48*b*).

In literature, research groups have reported use of coatings ranging from a few microns to ~2 mm in thickness. Thicker coatings typically perform better but are prone to peeling off and may not be conducive to all conditions. A trade-off is often necessary between the amounts of coating thickness versus its anti-icing service life governed by factors including but not limited to harshness of the environmental conditions, degree of surface inclination, feasibility of frequent reapplication and the desired practical application platform. For this purpose, we studied the freezing delay potential on copper coated with $CD_{30}P$ with thickness varying from 250 μm to ~1.5 mm. As expected, it was observed that higher the coating thickness, the longer it was able to halt the surface icing (FIG. 48*c*). This is reasonable since the condensation-frosting resistance offered by $CD_{30}P$ stems from a volumetric effect; the more the available native DMSO available in coating's reservoir the further it can hold off against the incipient frosting front. The very thin coating (~250 μm) exhibited surface cracks (but did not disintegrate) as the experiment progressed. In contrast to the edge-effect induced progression of condensation-frosting observed in thicker coatings, the thinnest coating demonstrated sparse but isolated surface-frosting event likely stemming from frosting in the cracked regions. These results support our choice of using ~1 mm thick coatings to demonstrate the absolute potential of the $CD_{30}P$.

Because of their consistency, the creams can be easily brush-painted on any shape and surface complexity. This feature is advantageous in practical applications such as ice prevention on overhead power transmission lines made of copper. To show the $CD_{30}P$ coatings effectiveness in such applications, we studied condensation-frosting on plain and $CD_{30}P$ coated copper rods (FIG. 48*d*. The bare sample froze quickly within 11 mins, while the $CD_{30}P$ maintained its coating integrity for 158 mins. The first signs of icing on the latter were noticed after ~180 mins, at a location compromised by the removal of the coating. Starting from this exact location, over the next 2 hours the emergent frost slowly consumed the entire $CD_{30}P$ until it completely failed to offer any anti-frosting protection at the end of ~5 hours of total experimental duration—a performance far surpassing the case of bare surface. Another possible application of $CD_{30}P$ type creams could be to stave off icing on building infrastructure, especially under frigid conditions. While icing on buildings is mostly a result of snow accumulation, temperature conditions can also induce frosting ice. Scaled down (1:12) version of bare and $CD_{30}P$ treated concrete blocks ($3.27\times2\times1.63$ $cm^3$) were attached to the Peltier surface with a thermal paste and subjected to the same experimental conditions as FIG. 48*a-d*. Due to its moderate insulating properties and air entrainment, the bare concrete completely froze after 35 minutes. In contrast, the coated surface did no ice even after 3 hours although the coating dissolution had initiated after 1.5 hours. With time, the frost from the adjoining Peltier surface started growing vertically and slowly consumed the $CD_{30}P$. This typical "edge-effect" induced failure ultimately resulted in fully enshrouding the coated block after 6.5 hours of continuous operation. These results suggest that an entire façade coated with $CD_{30}P$ could potentially last several hours longer without frosting over.

The discussions so far have been focused on the capability to deter the ice/frost formation on the surface. However, as already shown herein, eventual failure of a coating results in surface icing. So a desirable feature for coatings also is their icephobicity i.e. the ease with which ice can be removed from their surface. Consequently, we examined the ice adhesion strength (IAS) on our coatings using the peak force method (shear ice adhesion test) in a standardized test procedure ($T_{pel}$=−15° C., RH=10%, shear rate=0.1 mm/s) inside our environmental chamber. Ice columns were formed on the test surfaces by freezing water at −15° C. for a duration ($t_{freeze}$) of f 1 hour inside hydrophobic plastic cuvettes with uniform and well-polished bases placed on them. Further details on experiment protocols are shared in SI Note N7. After each experiment, the sheared-off location of the ice column on the test surface was closely examined to determine if there were signs of any residual ice on the substrate—an indication of cohesive ice failure. The first set of tests involved IAS comparison of the best anti-icing representative candidates amongst our coatings ($P_{30}$, $(P_{30}D)_{50}$, $CD_{30}P$) with industrial materials (untreated hydrophilic aluminum, glass) as a baseline. For experimental uniformity and repeatability of results, each test was conducted a minimum of four times. These experiments showed that all DMSO based coatings had an average ice adhesion strength of ~1.56±0.2 kPa—a remarkable ~665× reduction in the ice adhesion when compared to a bare aluminum surface (FIG. 480. A close examination of the ice column on DMSO based coatings showed that the interface closest to the surface developed a thin aqueous layer (FIG. 48*f*, inset image). Close-up of the test showed that after the ice slides on the coated sample, the footprint it leaves behind (i.e., the position in which it had been standing for the previous 1 hour) is liquidly in appearance. We stress here that the coatings were completely solid and dry before cold water (at ~0° C.) in cuvettes was placed on them, so the interface layer was not formed by thermal interactions. Furthermore, the water in column was frozen throughout before the test. It appears that this lubricating layer responsible for diminishing the mechanical anchorage of ice had formed in-situ, likely due to solid DMSO dissolution by water/ice and the accompanied exothermic effects on ice. We also discovered that the interfacial liquid layer increased with freezing time suggesting the migration of DMSO molecules at the interface of ice resulting in its melting, and so unsurprisingly low IAS <10 kPa was observed regardless of the freezing time (FIG. 48*g*). Typically, it is observed that the IAS increases with decreasing substrate temperature due to the evolving interfacial interactions. However, in our case the IAS was found to be almost constant at ~1.5±0.5 kPa for a wide range of temperature, $T_{pel}$=−15° C. to −40° C. (FIG. 48*h*).

The low IAS on $CD_{30}P$ suggests that application of mild forces like gravity, gentle mechanical agitation, light breeze etc. could potentially dislodge any ice from the coated surfaces. To confirm this, we deposited an ice cube on an aluminum surface in absence and presence of $CD_{30}P$ under deep frosting conditions ($T_{pel}$=−40° C., $T_{air}$~0° C. and RH=70%). The ice block strongly adhered to the bare surface but slid off the $CD_{30}P$ surface after the tilt angle reached ~10.5° (FIG. 48*i*). In another test, we investigated whether ice removal could be spurred solely by aerodynamic forces by blowing wind on the coated surface under severe frosting conditions. Bare superhydrophilic copper partially coated with $CD_{30}P$ was subjected to $T_{pel}$=−30° C., RH=50% for >4 hours to grow condensation-frost. A gentle breeze (velocity=2-3 m/s; $T_{air}$~0° C.) was then blown across the hybrid surface. Within a minute the frost over the $CD_{30}P$ surface was blown away, but the frost on the bare copper surface remained unperturbed. Even when thicker frost was grown in the same deep-freeze experimental conditions for an extended period (>12 hours), the gentle cold airflow cleared the surface of any frost—although it took few minutes longer on account of higher frost density compared to the previous case.

In the next stage, we investigated the mechanical durability and the corresponding anti-icing performance of $CD_{30}P$. In the first test, we exposed the coated samples to high shear flows typically observed in demanding applications like airplane wings, wind turbine blades wherein coating separation or impairment can occur. For this test, a hydrophilic copper sample (size 6.45 $cm^2$) coated with $CD_{30}P$ (thickness~1 mm) was firmly attached to the center of a sample holder inside a custom-designed experimental setup. The coated surface was then exposed to varying degrees of shear airflow (Reynolds number, Re ranging from 21,000 to 87,000) corresponding to the Beaufort number (an empirical relation to quantify wind speeds observed in nature) of 12 (the maximum in the scale) which is analogous to a devastating 'hurricane force'. While the coating held strongly at Re=21,000, at higher Re a portion of the coating fractured and sheared off. For the Re~87,000 case, the first disintegration occurred after 48 mins into the experiment removing 33% of the coated area and the last shearing off after 8 hours leaving behind 20% of coated area behind at the end of 24 hours. Repeated experiments confirmed that the fractures occurred at random points and possibly related to inhomogeneity in applying the coating. In the second test, we compared the performance of a scaled-down version of a bare vs $CD_{30}P$ coated plastic propeller (6 cm diameter) exposed to real-world like icing conditions in a custom-built chamber. The propellers were operated by a DC motor at their full-rated speed (24,000 RPM) and exposed to chilled moist air (obtained by mixing dry air ~−10° C. and steam). Few minutes into the experiment, the bare propeller blade turned white from the ice accretion followed by "ice-throwing" wherein ice-chunks are hurled out by the rotating turbine blades. The heavily frosted blades stalled the motor after ~28 minutes of constant operation. In contrast, the $CD_{30}P$ coated propeller remained ice-free after 1 hour of continuous operation, showing no signs of failure with only minor edge-icing although it shed liquid condensate (FIG. 48I). We repeated the experiments under multiple freeze-thaw cycles and measured the temporal surface frost coverage over 10 cycles. As seen in FIG. 48I, the $CD_{30}P$ coating was able to hold-off the surface icing to a 24% coverage rate until cycle #5, however with progressive loss of the material the value increased to 76% at the end of cycle #10.

Overall, the experiments described above demonstrate that the cream coatings accord significant multifunctional and durable icephobicity to surfaces. Although, they are opaque, prone to fast dissolution in warm water or water flowing at high speeds; they could be useful in many practical applications such as wind-turbine blades, buildings and could potentially operate over days in moderate environmental conditions.

Example 20

Preparation of Phase-Change Materials Incorporated within a Polymer Network

It was considered to trap phase change formulations, namely DMSO, within a polymer network through the formation of organohydrogels (OHGs). It is well known that hydrogels can lose their functionality in subzero temperature environments, but mimicking the evolutionary freezing resistance of bio-organisms by using additives such as water soluble cryoprotectants can extend their functional temperature window in the form of OHGs.

To create OHGs in this work, gelatin was chosen as the organogelator because of its abundant availability, cheapness, convenient processability, ability to make physically crosslinked hydrogels without use of toxic chemical, and because it provides a facile design template for synthetic OHG adaption. The simplest method to fabricate OHGs follows a two-step process, wherein the gelatin hydrogel is fabricated first, and an anti-icing solution is infused into the gel matrix post-gelation. This process was used to make the first type of OHG (henceforth referred as D-OHG) by soaking gelatin in DMSO for a prescribed time. In addition, a new one-step, rapid and scalable technique was developed to make OHGs. This method relies on the fact that DMSO-water interactions are stronger than DMSO-gelatin interactions resulting in hydrogen bonding between the various functional groups in the polymer network that act as physical crosslinkers for the DMSO based gels.

Four different OHGs were prepared this way using binary mixtures of DMSO and water and are henceforth referred as $D_xW_y$, where 'D' denotes DMSO, 'W' denotes water and 'x' and 'y' specify the weight % in solution for a fixed amount of gelatin, respectively. Depending upon the geometric complexity and the extent of surface area to be coated, the $D_xW_y$ OHGs can be directly cured on the substrate, or the soaked gel film can be prepared separately and then attached on the test material.

Figure 49:
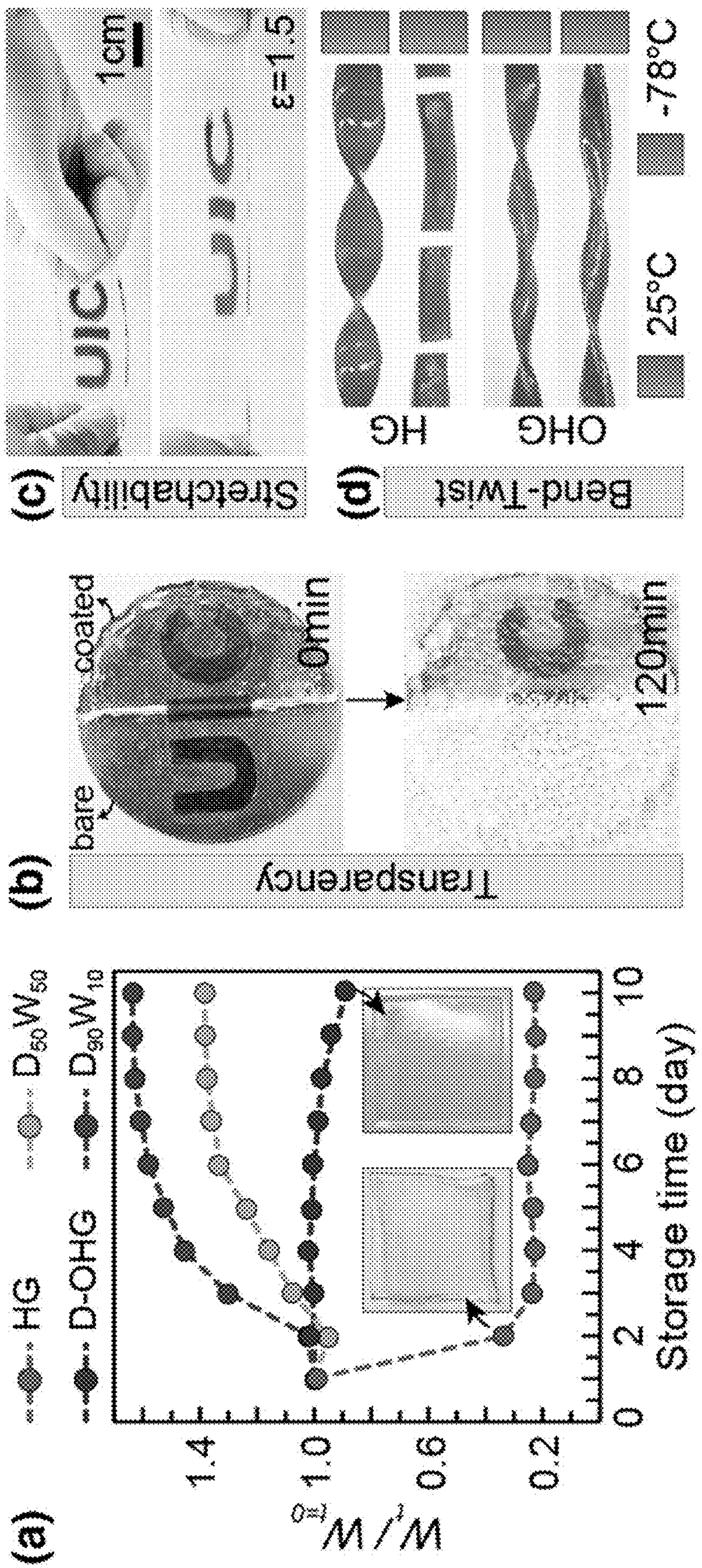
FIG. 49 shows the anti-icing and other properties of a phase change material incorporated within a polymeric matrix according to an example embodiment.
Figure 49:
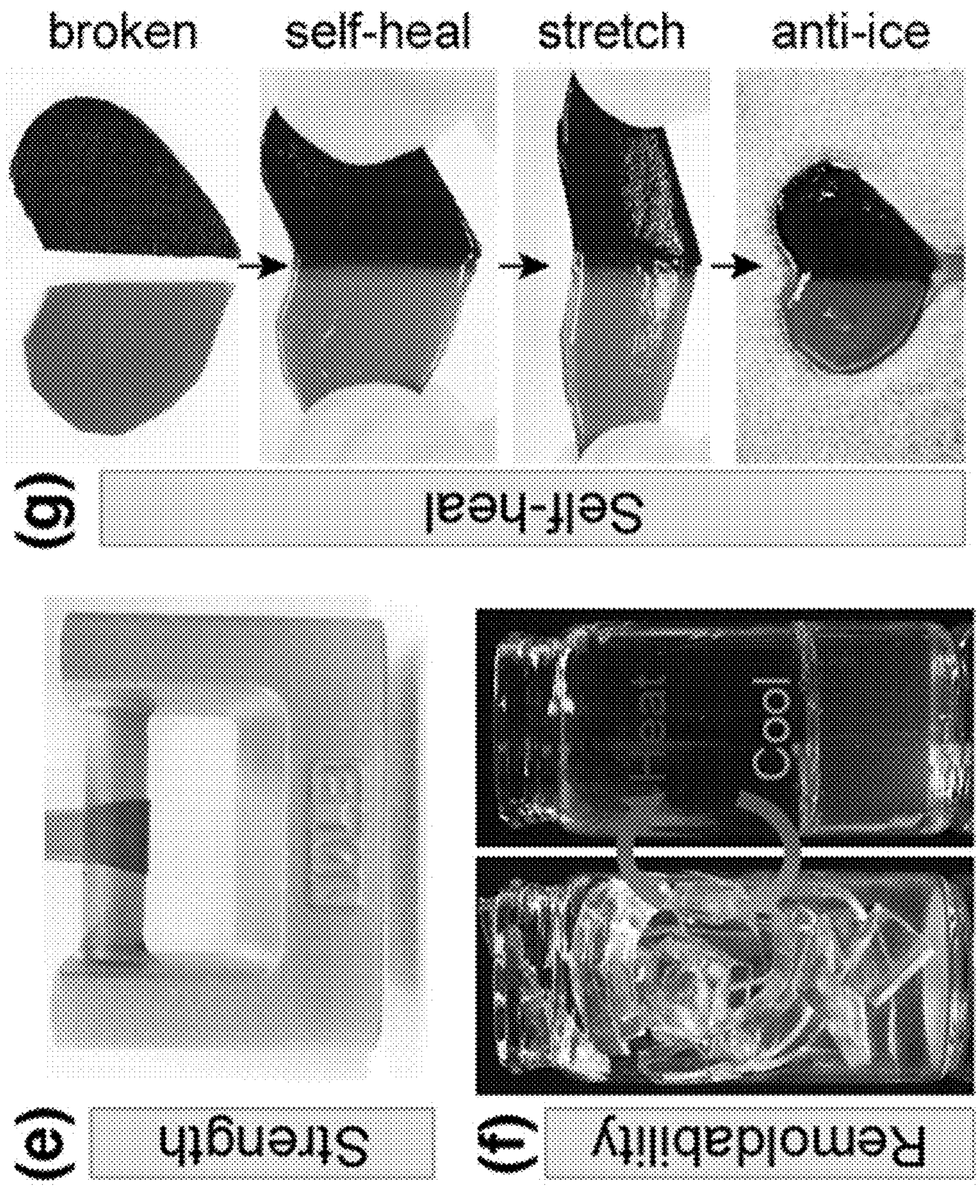
Figure 49:
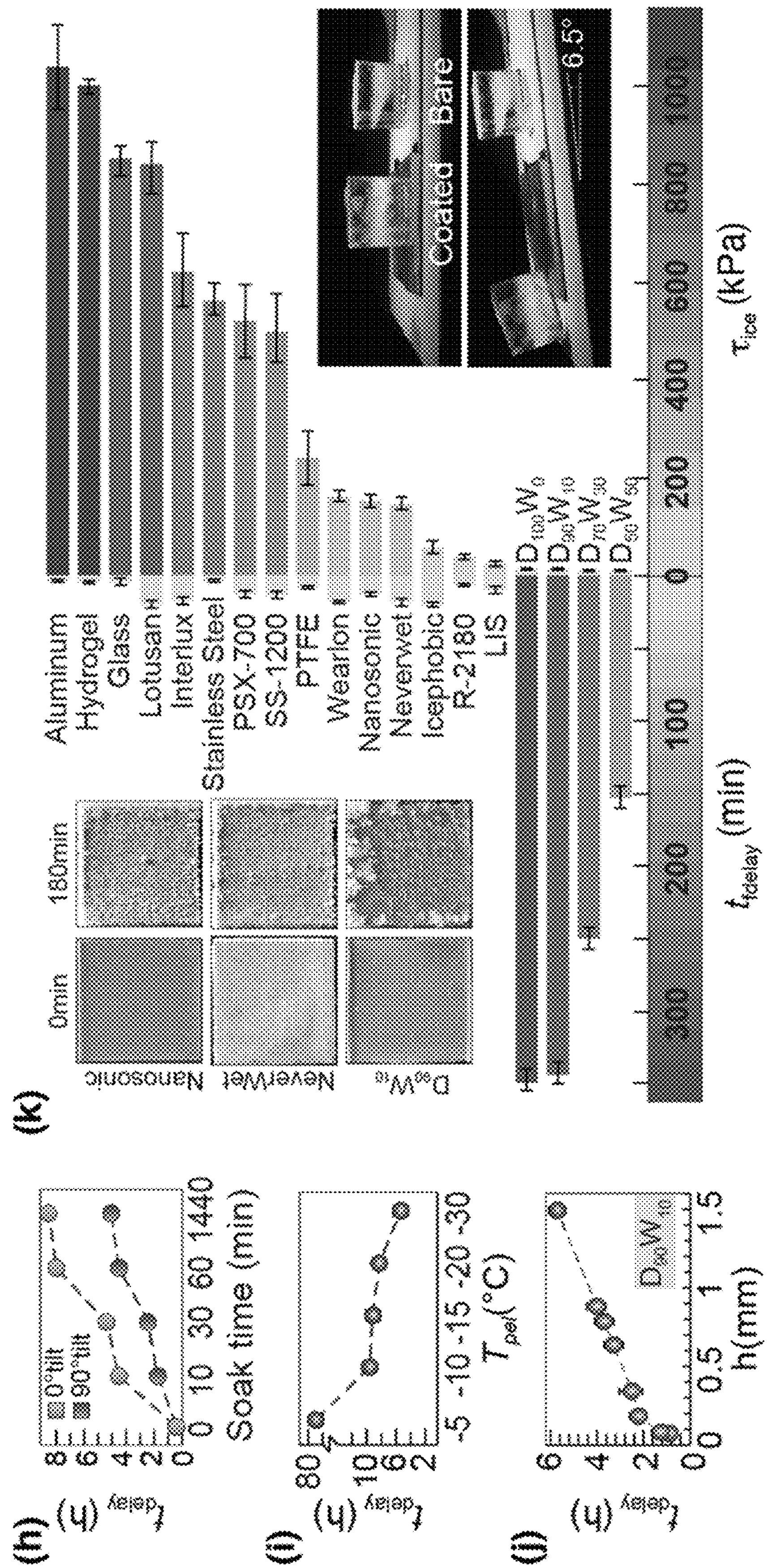
Figure 49:
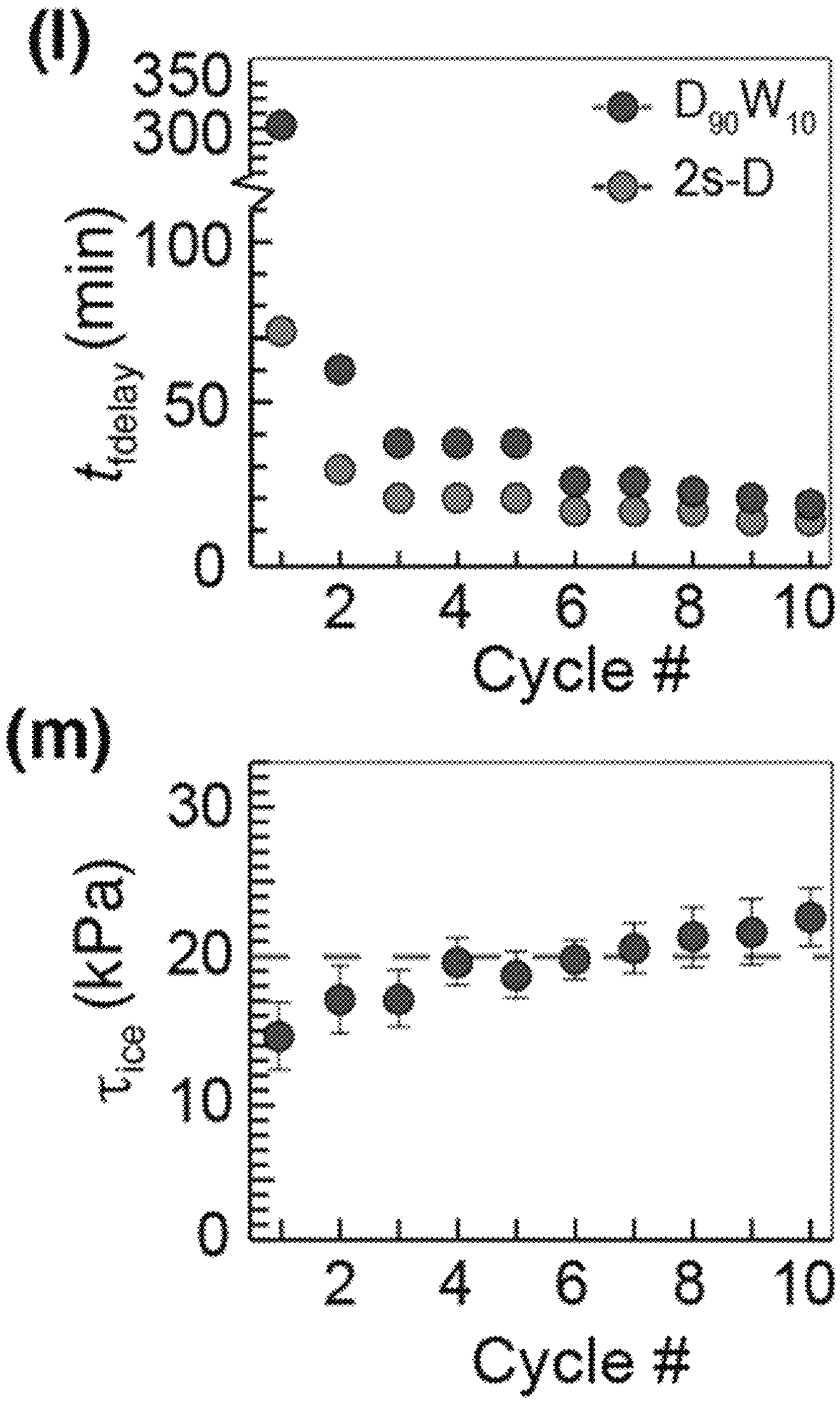
Figure 49:
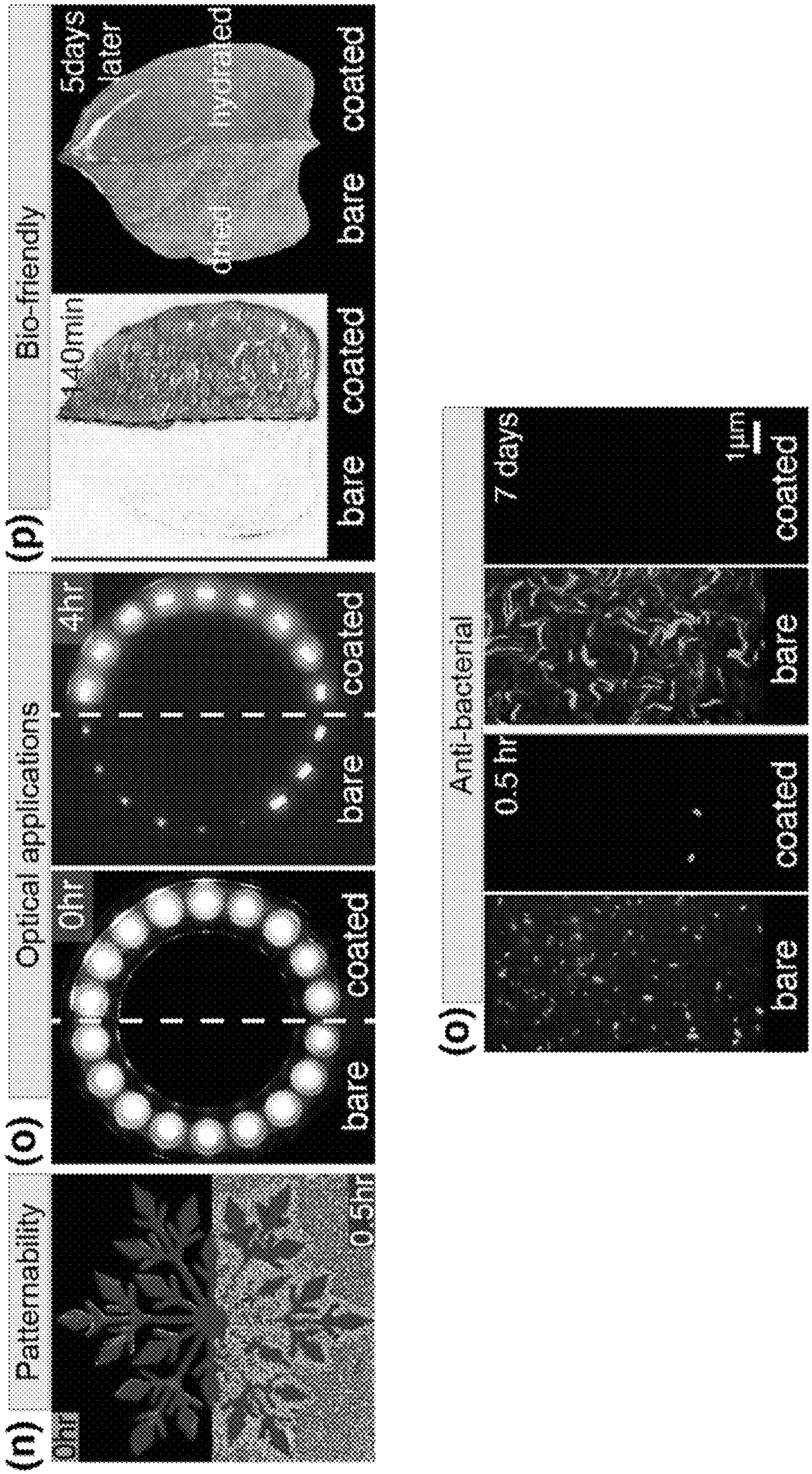

Irrespective of the preparation method, the mechanical properties of a gel are governed largely by the composition and volumetric content of the fluid infused in the gel. Gelatin hydrogels are inherently fragile, brittle, have limited stretchability, irreversibly disintegrate upon compression and can only support a weight of up to 0.25 kg before breaking because of their structural inhomogeneities and weak physical cross-linked networks. But the infusion of solvents (e.g. DMSO) serves to increase the physically cross-linked crystalline domain density in the gelatin network thereby making OHGs mechanically robust and resilient. Such advantages can only be achieved if the OHGs retain their infused content over time, otherwise gels can deform, crack and lose their mechanical properties. Consequently, in the first test, the retention of the infused liquids in the gels was studied (size=6.45 $cm^2$, thickness~1 mm, and same initial weight before infusion) by storing them at constant room conditions (25° C., 50% RH) and then weighing them at regular time intervals using a highly sensitive electronic weighing balance over a period of 10 days. The liquid retention was quantified by the ratio $w_t/w_0$, wherein $w_{t=0}$ is the initial weight and $w_t$ is the weight after time t. The tests showed that gelatin hydrogels lost 90% of their water content by evaporation within ~2 days, turning into a wilted scaffold. On the other hand, all DMSO based OHGs showed remarkable solvent-retaining abilities after 10 days (FIG. 49*a*). The weight retention in D-OHG was ~4 times compared to bare hydrogel after 10 days. The $D_xW_y$ OHGs showed intermittent weight gain instead of weight-loss. Water droplets appeared on their surface after some time and although the surfaces were gently wiped prior to measurements, their weight gain reflects the hygroscopicity induced water absorption throughout the gel. More importantly, all OHGs were found to be moist even after 30 days of room temperature storage and retained their functionality even after deep-freeze or storage in refrigerator (~0° C.) for 7 days. The remarkable long-term liquid retention capability in the OHGs can be attributed to DMSO's low vapor pressure, its non-volatility and formation of strong hydrogen bonds with water molecules in gelatin network thereby preserving the initial gel state. These attributes have far reaching consequences on the mechanical properties of the OHGs as discussed next.

Because of DMSO presence, D-OHG demonstrated the ability to withstand various forms of deformation including extended tensile stretching (~200% beyond its initial length, FIG. 49*c*), knotted stretching, pulling, bending, folding and twisting (FIG. 49*d*) and multiple compression-relaxation cycles at a stretch. In ambient conditions, both the hydrogel and D-OHG could be twisted and stretched until their failure, although OHG endured much higher stretchability. This behavior changed dramatically when the gels were exposed to ultra-low temperatures (−79° C. by keeping them on dry ice). Owing to their large volume of stored "free water" which freezes at subzero temperatures, HG loses its elasticity and broke when slightly deformed (bent/twisted/compressed). However, the D-OHG retained its mechanical flexibility without fracture. Its enhanced properties arise because DMSO presence in the gel matrix facilitates hydrogen bonding between the hydroxyl groups on the gelatin chains into the crystalline domains. For the same reason, D-OHG exhibited capability of supporting a wide range of point and distributed loads up to a maximum limit of 5 kgs (FIG. 49*e*).

Enhanced mechanical properties aside, all materials degrade over time due to wear and tear. In this regard, self-healing materials capable of repairing damages intrinsically without human intervention and capable of regaining their initial properties are of prime importance in various applications such as in environmental coatings, flexible electronics and biomedicine. As shown in FIG. 49*g*, when D-OHG was cut in half and brought in contact, it self-healed with an indiscernible interface after some time. Such stimuli-free self-healing characteristics in our OHGs arise due to the presence of functional components that imparts reversible yet potent physical interactions (namely the hydrogen bonding, electrostatic interactions and/or guest-host interactions) in the gel's polymer network. The self-healed DMSO-OHG was as good as new with the ability to withstand different mechanical deformations (like bending, twisting and stretching) and delay condensation-frosting (discussed later in detail) just like the uncut sample. Note that the healing time can be accelerated by application of external energy (e.g., by moistening the incised faces with lukewarm water) which reforms the interfacial proteins, rendering them highly adhesive for topological adhesion by an internal solvent displacement process between superficial hot water-rich and inner DMSO-rich areas. Another particularly attractive feature of DMSO based OHGs is that unlike traditional gelatin hydrogels, they exhibit thermal plasticizing, allowing repeated change of their shape by melting/remolding without hampering their functionality due to the reversible creation and destruction of hydrogen bonds between gelatin chains.

Multifunctional Icephobic Performance of OHGs

The OHGs are prepared herein were found to perform as multifunctional icephobic coatings, both in terms of delaying complete frost coverage and reducing ice-adhesion. Like before, the total freezing delay time ($t_{fdelay}$) was measured during condensation-frosting on coated surfaces (6.45 $cm^2$ size, OHG thickness~1 mm) under deep freeze conditions ($T_{pel}$=−30° C., $T_{air}$=24° C., RH=60% or 90%). In the first test, the effect of DMSO soaking time on $t_{fdelay}$ was measured for both horizontally and vertically mounted D-OHG coated copper. As shown in FIG. 4*h*, the anti-icing in either orientation increased as the soaking time was increased with higher values for horizontal samples. To study how effective OHGs maybe in delaying frosting at different temperatures, D-OHG coated copper was subjected to Peltier temperatures from $T_{pel}$=−5° C. to −30° C. under very high humidity conditions (conditions: >12 hrs soaking time, $T_{air}$=24° C., 90% RH and 90° tilt) in the glovebox. For moderate degrees of subcooling (e.g., $T_{pel}$=−5° C.) the freezing delay performance was impressively ~3 days at a stretch. Even for highly frigid conditions of $T_{pel}$=−30° C., the anti-icing performance was 3× better than previously discussed $CD_{30}P$ and 43 times better than the superhydrophobic Neverwet coated surface. The condensation behavior on OHG was like $CD_{30}P$ with condensed drops rolling down the surface without freezing and having a deicing effect along its way for any incipient frost.

However, unlike $CD_{30}P$ the DMSO-based gels did not get washed away or consumed over a period. This increases the service lifetime of the gels; a major setback of the DMSO-based creams/emulsions discussed before. Additionally, DMSO-OHG however did not lose it optical transparency throughout the experimental duration of the frosting tests. At the end of the condensation-frosting experiments, the sample had swelled 3× its original size due to accumulation of condensate in its inner polymer network due to hygroscopic action of DMSO. Note that our OHGs also adhere strongly to various materials of industrial relevance (copper, aluminum, stainless steel, glass, PTFE) with diverse surface chemistry and demonstrated analogous condensation-frosting performance. Next, we systematically varied the coating thickness of $D_{90}W_{10}$ from 70 μm to 1.5 mm and quantified the $t_{fdelay}$ for each case by subjecting them to the conditions of $T_{pel}$=−30° C., $T_{air}$=24° C., RH=90% and 90° tilt in the glovebox. As expected, the freezing delay improved significantly when thicker coatings were used. But notably even the thinnest coatings demonstrated significantly improved freezing delays (~1.5 hours) compared to bare hydrophilic and superhydrophobic surfaces.

Clearly OHGs possess many superior characteristics compared to conventional anti-icing coatings. So, next we studied the multifunctional anti-icing performance of our OHGs with several commercial superhydrophobic and icephobic coatings. As baseline materials, we chose aluminum (Type 7075), stainless steel (Type 410), glass, Teflon®, a silicon oil-based lubricant infused surface (LIS) and gelatin hydrogel. The following commercial coatings/paints were purchased/requested from the corresponding manufacturer and tested immediately upon receipt: (i) StoColor® Lotusan—a superhydrophobic paint; (ii) Interlux Brightside—a stain/abrasion resistant polyurethane alkyd based boat paint; (iii) Sigmashield™ 1200—an abrasion-resistant paint by PPG; (iv) PSX-700—a siloxane coating by PPG; (v) Wearlon Super F-1 Icephobic coating by Plastic Maritime Corporation; (vi) HybridShield® Icephobic Aerosol based coating for passive anti-icing and ice-shedding application; (vii) Rust-Oleum NeverWet superhydrophobic coating; (viii) A commercial superhydrophobic material for protection against iced-snow accretion that is not named herein, but referred as 'Icephobic'; and finally (ix) Nusil R-2180 icephobic coating. All the commercial paints/coatings were applied on clean hydrophilic aluminum/copper as instructed in each company's product data sheet and the recommended dry film thickness was maintained in each case. We acknowledge the fact that the desired functionality of majority of these commercial paints/coatings is not to deter ice-formation but rather offer surface protection or aid in ice-release from the substrate. Also note that our purpose was to relatively rank the performance of our OHG coatings with them and our independent study is by no means intended to promote or discredit the reputation of any commercially marketed coating. The comparative performance of all the coatings tested under identical conditions is demonstrated in the butterfly chart in FIG. 49*k*. The lateral height of each bar on the left and right are indicative of the $t_{fdelay}$ and average shear stress for failure respectively. The corresponding error bars denote the standard deviations, obtained from experimental measurements for each material repeated at least ten times each. Condensation-frosting performance of all the above materials and coatings were measured in identical conditions as FIG. 49*j*.

As seen in FIG. 49*k*, condensation-frosting experiments showed that the gelatin hydrogels frosted within 6 minutes irrespective of the substrate orientation. The freezing event was accompanied by a dramatic transformation of the optical transparency of the HG sample turning it opaque white. The OHGs on the other hand demonstrated stable dropwise condensation before failing due to edge-effect induced frosting. $D_xW_y$ gels with >50 wt % DMSO show no signs of failure for extended hours. Higher the DMSO content in the gel, longer the freezing-delay duration. For example, $D_{30}W_{10}$ gel which is comprised mostly of water freezes like gelatin-hydrogel within 11 minutes, whereas $D_{90}W_0$ being imbibed with DMSO in its gel matrix deters surface icing for ~5.7 hours. $D_{100}W_0$ gel being comprised solely of DMSO and gelatin-protein shows the longest $t_{fdelay}$ of ~5.8 hours, a significant performance improvement compared to D-OHG under similar environmental conditions and is the best performing gel developed in this study. All the commercial paints/coatings were found to fail prematurely by supercooled condensation, inter-droplet ice bridging and finally frost densification. For example, $D_{90}W_{10}$ gel deterred surface ice accumulation ~20 times longer compared to almost all the commercial coatings.

The IAS measurements showed that our $D_xW_y$ gels significantly outperformed all the other coatings. The average IAS of $D_xW_y$ gels was ~12 kPa implying ~86× lesser adhesion compared to bare aluminum surface. This implies that if ice at all forms on these surfaces it can be scraped off with minimal manual effort. The gels exuded a lubricating layer on its exposed surface like $CD_{30}P$ which resulted in reduction of the anchoring strength of adherent ice. Interestingly it was observed that the bottom face of the dislodged ice pillar in contact with the gel surface was spongy in nature likely due to the deicing action of DMSO (discussed previously). By virtue of possessing low IAS, a hexagonal ice cube (2.2×1.2×1.2 $cm^3$) on the D-OHG was unseated simply by minimal titling (~6.5°) of the surface even in severe frosting conditions ($T_{pel}$=−40° C., $T_{air}$~0° C. and 70% RH).

The longevity of the OHGs was also quantified by conducting thermal cycling test. The tested coatings were D-OHG (immersion time=10 mins) and $D_{90}W_{10}$ (curing time=7 days) coatings (~1 mm). Two superhydrophilic copper substrates (6.45 $cm^2$ size) were coated with the gels and subjected to $T_{pel}$=−30° C., RH=90% and 90° tilt in the glovebox. The cooling cycle for this thermal cycling test lasted until 100% sample surface area had frosted over, post which it was defrosted to ambient temperature, allowed to thermally equilibrate for 5 mins and then cooled again. In each run the $t_{fdelay}$ was used to determine the cooling cycle duration and eventually characterize the gel's anti-icing potential. In the very first cycle $D_{90}W_{10}$ lasted for ~5.2 hrs which is 4× more than that of D-OHG. It outranked the latter by ~2× in terms of delaying the surface frost coverage over the next 4 cycles. After the first 5 cycles, while $D_{90}W_{10}$ still dominated over D-OHG by a margin, the absolute $t_{fdelay}$ plummeted compared to the first cycle, but the IAS on $D_{90}W_{10}$ for showed no significant variation over multiple icing/deicing cycles. It must however be noted that the anti-icing performance of $D_{90}W_{0}$ even after 10 freeze-thaw cycles is ~3× better compared to SHS/LIS surfaces under the same conditions. The performance degradation maybe likely occurs because of depletion of DMSO from the gel matrix over time. Over the multiple icing-deicing cycles, an osmotic pressure driven concentration gradient develops between the frigid-humid ambient (icing condition) and the gel between the (physical solutes at the interface) causing DMSO molecules to slowly diffuse out of the binding gel matrix when it comes in contact with moisture/water-rich conditions. The miscibility and infinite solubility of DMSO-water further aggravates this problem. DMSO being a benign solvent, while this diffusion triggered 'leaching out' is not environmentally unsafe it causes degeneration of the coating's anti-icing functionality for prolonged usage. The aforementioned problem can be addressed by adopting better lubricant retention strategies such as coating the gels with diffusion barriers like elastomers or other impermeable materials.

Potential Applications of OHGs

The DMSO-based coatings can be easily molded into any random shape or conformed to any surface with complex geometrical features upon completion of the curing process of the gelatin solution. To demonstrate the patternability of D-OHG, the precursor gelatin solution (dyed red) was filled in a three-dimensional ice-crystal cavity laser cut out of a rectangular acrylic plate (black). Once the gelatin solution cured the entire substrate was soaked in DMSO for 30 mins and subjected to $T_{pel}$=−30° C., $T_{air}$=24° C., RH=80%, 0° orientation. As shown in FIG. **49*n***, the DMSO-OHG filled cavity was completely free of condensation-frosting while the surrounding substrate was enveloped in a thick layer of frost. Since the preparation technique for the $D_xW_y$ gel being a one-pot method, its precursor solution can be directly cured in a mold or to create any desired pattern.

Because of their transparency even under frosting, the OHG coatings can be useful in various optical applications such as architectural windows, painted structures, solar panels, automotive windshields, and optoelectronic devices. Severe weather conditions and frosting can lead to critical transport equipment (e.g., guiding lights on airport runways, streetlights) to be covered by ice resulting in delays or air disasters. As a potential solution to such problems, we tested the viability of OHG under simulated winter weather conditions. A ring flashlight (containing 18 LED strips) was partially coated with D-OHG (immersion time >12 hrs, coating thickness~1 mm) and attached to a bracket for mounting it vertically. The entire light assembly was bolted to the Peltier operated at $T_{pel}$=−30° C. and placed in a custom-glovebox operated at simulated winter conditions ($T_{air}$=−5° C. and RH=80%). Over a period, the LED bulbs in the uncoated portion of the ring light started failing due to the extreme cold and became dark. At the end of 4 hours, 6 out of 9 LED in the uncoated side switched off while the luminosity of the other 3 faded. However, there was no change in brightness or occurrence of any icing/frosting on the DMSO-OHG treated portion of the light assembly till the end of the experiment.

Another potential use of OHG coatings could be as anti-frost sprays in agricultural sector. Severe frost conditions cause the water in the plant tissue to freeze, catalyzing a chain of freezing events inter- and intracellularly mutilating the cell walls in the process, thus leaving the plants susceptible to disease and crop loss. The extent of winter-weather damage depends on the winter-hardiness of the plant species and the local climate. The leaf was partially coated with D-OHG (soaking time=30 mins, thickness~1.5 mm) and cooled to $T_{pel}$=−30° C. and RH=55% in the glovebox. As expected, the bare portion froze within a matter of minutes while the coated portion remained frost-free (for >2.5 hours). After removing the leaf, and keeping it in ambient over 5 days, it was observed that the bare portion of the leaf had become dried and crispy suggesting cell-death, but the coated portion appeared to have retained the moisture.

A final aspect of our OHGs is their anti-microbial nature because of which they could also be effective in reducing biofouling. Mature biofilms are both complex and persistent, and their adverse effects are well-known. A variety of coatings have been introduced aimed in preventing their formation or weakening microbial adhesion, but not all of such coatings are simultaneously icephobic in nature. Since DMSO also has bactericidal properties, our OHGs benefit from the both the ability of inherent DMSO (trapped in gel matrix) to rapidly terminate pathogens thereby alleviating its bacterial burden and the slippery interface it provides as a result of the sustenance of the lubricating layer. This ability is shown in FIG. 49O, wherein our OHGs ability to resist *E. coli* growth and adhesion was tested and compared against bare gelatin-hydrogel. The experiments were performed via static culture (24 hours at 37° C.) following a well-established experimental procedure described in literature and subsequent exposure of the test surfaces to *E. coli* pathogen was monitored. In HG, *E. coli* pathogens bond firmly to the gelatinous substrate, begin to proliferate and eventually mature into an immobilized biofilm matrix. Fluorescence imaging of the test substrates revealed that a strongly adherent thick biofilm results on the control HG surface. However, the OHGs showcased either a constant decline ($D_{50}W_{50}$) in the number of living microbes or complete curtailment ($D_{90}W_{10}$) of the same and the absence of any biofilm over the entire imaged area. Thus, DMSO-based gels lacked any microbial adhesion sites and did not encourage biofilm formation. Note that majority of real-life environments where biofilm occurs and attaches robustly are under dynamic flow conditions (e.g., ship hulls, catheters). Since, DMSO itself rapidly kills majority of the bacteria instead of solely leveraging its slippery interfacial property, we did not conduct any further investigation of its anti-fouling properties under flow conditions. Future studies can investigate the same and its effect against different other pathogens. Various additional aspects of the disclosure are provided by the following enumerated embodiments, which can be combined in any number and in any combination not technically or logically inconsistent.

Embodiment 1. A method for inhibiting the formation of ice on a surface, the method comprising applying to the surface one or more phase change materials, wherein the phase change materials have a melting point above a temperature at which ice formation occurs on the surface.

Embodiment 2. The method of embodiment 1, wherein the one or more phase change materials have a melting point in the range of 0° C. to 30° C., e.g., 0° C. to 25° C., or 0° C. to 20° C., or 0° C. to 15° C., or 0° C. to 10° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

Embodiment 3. The method of embodiment 1 or embodiment 2, wherein the method includes, after applying to the surface the one or more phase change materials, allowing water to be disposed on the surface (e.g., by condensation), the inhibition of the formation of ice comprising delaying the freezing of the water, and optionally, the surface is allowed to reach a temperature of 0° C. or colder (e.g., −10° C. or colder, or even −15° C. or colder) while the water is disposed thereon (e.g., the surface can be at one of these temperatures before water is disposed thereon, or reach that temperature after water is disposed thereon).

Embodiment 4. The method of embodiment 3, wherein the one or more phase change materials makes direct full contact with the water at an interface between the one or more phase change materials and the water.

Embodiment 5. The method of embodiment 3, wherein the one or more phase change materials makes direct partial contact with the water at an interface between the one or more phase change materials and the water.

Embodiment 6. The method of any of embodiments 1-5, wherein the one or more phase change materials is supported entirely by the surface.

Embodiment 7. The method of any of embodiments 1-5, wherein the one or more phase change materials is incorporated within one or more structures or textures on the surface.

Embodiment 8. The method of any of embodiments 1-3, wherein the one or more phase change materials is encapsulated within a secondary solid material that is in contact with the water such that the secondary solid material prevents a direct contact between the water and the one or more phase change materials.

Embodiment 9. The method of any of embodiments 1-8, wherein one or more of the phase change materials is immiscible with water.

Embodiment 10 The method of embodiment 9, wherein one or more of the phase change materials is selected from cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclo-hexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

Embodiment 11. The method of any of embodiments 1-10, wherein one or more of the phase change materials is miscible with water.

Embodiment 12. The method of embodiment 11, wherein one or more of the phase change materials is selected from DMSO, 1-bromonaphthalene, ethylenediamine, ethanolamine, formamide, and glycerol.

Embodiment 13. The method of any of embodiments 1-12, wherein the phase change materials comprise a mixture of two or more phase change materials.

Embodiment 14. The method of embodiment 13, wherein the two or more phase change materials are miscible in one another.

Embodiment 15. The method of embodiment 13, wherein the two or more phase change materials are immiscible with one another.

Embodiment 16. The method of embodiment 15, wherein the mixture is stabilized by one or more surfactants, emulsifiers or nanoparticles, or a combination thereof.

Embodiment 17. The method of embodiment 13, wherein at least one phase change material is miscible with water, and at least one phase change material is immiscible with water.

Embodiment 18. The method of embodiment 1, wherein the one or more phase change materials are mixed with one or more deicing liquids.

Embodiment 19. The method of embodiment 18, wherein the one or more deicing liquids comprises a freezing point depressant.

Embodiment 20. The method of embodiment 19, wherein the freezing point depressant comprises a glycol-based fluid.

Embodiment 21. The method of embodiment 20, wherein the glycol-based fluid comprises one or more of propylene glycol, ethylene glycol and diethylene glycol.

Embodiment 22. The method of any of embodiments 18-21, wherein the deicing liquid further comprises one or more additives.

Embodiment 23. The method of embodiment 22, wherein the one or more additives comprise benzotriazole and methyl-substituted benzotriazoles, alkylphenols and alkylphenol ethoxylates, triethanolamine, high molecular weight, nonlinear polymers and dyes.

Embodiment 24. The method of any of embodiments 18-23, wherein the deicing liquids have a melting point below the freezing point of water, provided that the phase change materials comprise greater than 50% by weight of the mixture.

Embodiment 25. The method of any of embodiments 18-24, wherein the mixture further comprises one or more water miscible deicing chemicals.

Embodiment 26. The method of any of embodiments 15-25, wherein the mixture is in the form of a solid, liquid, emulsion or blend.

Embodiment 27. The method of any of embodiments 15-25, wherein the mixture is in the form of a eutectic mixture.

Embodiment 28. The method of any of embodiments 1-27, wherein the one or more phase change materials are each in a phase that has a melting point above a temperature at which ice formation occurs on the surface.

Embodiment 29. The method of embodiment 28, wherein the one or more phase change materials are each in a phase that has a melting point in the range of 0° C. to 30° C., e.g., 0° C. to 25° C., or 0° C. to 20° C., or 0° C. to 15° C., or 5° C. to 30° C., or 5° C. to 25° C., or 5° C. to 20° C., or 5° C. to 15° C., or 10° C. to 30° C., or 10° C. to 25° C., or 10° C. to 20° C., or 15° C. to 30° C., or 15° C. to 25° C.

Embodiment 30. The method of any of embodiments 1-29, wherein the one or more phase change materials forms one or more layers on the surface with an average roughness of ≤1 micron and a Z-roughness of ≤1 micron.

Embodiment 31. The method of any of embodiments 1-29, wherein the one or more phase change materials form one or more layers on the surface with an average roughness of >1 micron and a Z-roughness of >1 micron.

Embodiment 32. The method of embodiment 1, wherein the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

Embodiment 33. The method of embodiment 32, wherein the one or more phase change materials forms one or more layers on the surface wherein the one or more layers exhibits an average inter-droplet distance ($L_{avg}$) to droplet size ratio ($D_{avg}$) of >1.3.

Embodiment 34. The method of either of embodiments 32 or 33, wherein the one or more phase change materials forms one or more layers on the surface wherein the one or more layers exhibits an average inter-droplet distance ($L_{avg}$) of >80 microns.

Embodiment 35. The method of any of embodiments 1-34, wherein the one or more phase change materials forms one or more layers on the surface wherein the one or more layers exhibits a bridging parameter <1.

Embodiment 36. A method for reducing contact line pinning at a water-solid interface comprising applying to a surface of the solid one or more phase change materials, wherein the phase change materials have a melting point above the temperature at which the water exhibits a phase change from liquid to solid on the surface.

Embodiment 37. The method of embodiment 36, wherein the one or more phase change materials is partially or fully in a liquid state at the water-solid interface.

Embodiment 38. The method of embodiment 37, wherein the partially or fully melted phase change material acts as a lubricant that reduces contact line pins.

Embodiment 39. The method of embodiment 36, wherein the one or more phase change materials is as further described in any of embodiments 2-35.

Embodiment 40. A method for inhibiting the transition of water from a vapor state to a solid state (desublimation) on a surface comprising applying to the surface one or more phase change materials, wherein the phase change materials have a melting point above the temperature at which the water exhibits a phase change from a vapor to solid on the surface.

Embodiment 41. The method of embodiment 40, wherein the one or more phase change materials is as further described in any of embodiments 2-35.

Embodiment 42. A method for reducing the power required to transport a heated fluid through a pipeline comprising applying to an inner surface of the pipeline one or more phase change materials, wherein the phase change materials have a melting point below the temperature of the fluid in the pipeline so that the phase change material is partially or fully in a liquid state.

Embodiment 43. The method of 42, wherein the partially or fully melted phase change material acts as a lubricant for the fluid in the pipeline.

Embodiment 44. The method of embodiment 42, wherein the fluid comprises a liquid petroleum product.

Embodiment 45. The method of embodiment 44, wherein the liquid petroleum product comprises crude oil.

Embodiment 46. The method of embodiment 42, wherein the one or more phase change materials makes direct full contact with the heated fluid at an interface between the one or more phase change materials and the heated fluid.

Embodiment 47. The method of embodiment 42, wherein the one or more phase change materials makes direct partial contact with the heated fluid at an interface between the one or more phase change materials and the heated fluid.

Embodiment 48. The method of any of embodiments 42-47, wherein the one or more phase change materials is supported entirely by the surface.

Embodiment 49. The method of any of embodiments 42-47, wherein the one or more phase change materials is incorporated within one or more structures or textures on the surface.

Embodiment 50. The method of embodiment 42, wherein the one or more phase change materials is encapsulated within a secondary solid material that is in contact with the heated fluid such that the secondary solid material prevents a direct contact between the heated fluid and the one or more phase change materials.

Embodiment 51. The method of any of embodiments 42-50, wherein one or more of the phase change materials is immiscible with water.

Embodiment 52. The method of any of embodiments 42-50, wherein one or more of the phase change materials is miscible with water.

Embodiment 53. The method of any of embodiments 42-52, wherein the phase change materials comprise a mixture of two or more phase change materials.

Embodiment 54. The method of embodiment 53, wherein the two or more phase change materials are miscible in one another.

Embodiment 55. The method of embodiment 53, wherein the two or more phase change materials are immiscible with one another.

Embodiment 56. The method of embodiment 53, wherein at least one phase change material is miscible with water, and at least one phase change material is immiscible with water.

Embodiment 57. The method of either of embodiment 55 or 56, wherein the mixture is stabilized by one or more surfactants, emulsifiers or nanoparticles, or a combination thereof.

Embodiment 58 The method of any of embodiments 51, 53, 55, 56 or 57, wherein the mixture is in the form of a solid below the temperature of the fluid in the pipeline, a liquid, an emulsion or a blend.

Embodiment 59. The method of any of embodiments any of embodiments 51, 53, 55, 56 or 57, wherein the mixture is in the form of a eutectic mixture.

Embodiment 60. The method of any of embodiments 42-59, wherein the one or more phase change materials forms one or more layers on the surface with an average roughness of ≤1 micron and a Z-roughness of ≤1 micron.

Embodiment 61. The method of any of embodiments 42-59, wherein the one or more phase change materials form one or more layers on the surface with an average roughness of >1 micron and a Z-roughness of >1 micron.

Embodiment 62. The method of embodiment 42, wherein the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

Embodiment 63. The method of embodiment 62, wherein the one or more phase change materials forms one or more layers on the surface wherein the one or more layers exhibits an average inter-droplet distance ($L_{avg}$) to droplet size ratio ($D_{avg}$) of >1.3.

Embodiment 64. The method of either of embodiments 62 or 63, wherein the one or more phase change materials forms one or more layers on the surface wherein the one or more layers exhibits an average inter-droplet distance ($L_{avg}$) of >80 microns.

Embodiment 65. The method of any of embodiments 42-64, wherein the one or more phase change materials forms one or more layers on the surface wherein the one or more layers exhibits a bridging parameter <1.

Embodiment 66. A method for decreasing adhesion of a substance to a surface comprising applying to the surface one or more phase change materials, wherein the phase change materials have a melting point above the temperature at which a substance condenses on the surface.

Embodiment 67. The method of embodiment 66 wherein the one or more phase change materials partially or fully changes to a liquid state at an interface between the one or more phase change materials and the substance condensing on the surface.

Embodiment 68. The method of 67 wherein the partially or fully melted phase change material acts as a lubricant for the substance, decreasing adhesion of the substance to the surface.

Embodiment 69. The method of embodiment 66, wherein the one or more phase change materials is as further described in any of embodiments 2-35.

Embodiment 70. The method of embodiment 66 wherein the substance is water vapor.

Embodiment 71. The method of embodiment 66 wherein the substance is liquid water.

Embodiment 72. The method of embodiment 71, wherein the liquid water further comprises one or more solutes.

Embodiment 73. The method of embodiment 72, wherein the one or more solutes comprise salts.

Embodiment 74. The method of embodiment 73, wherein the salts comprise sodium chloride, calcium chloride, potassium chloride, magnesium chloride, sodium acetate, calcium magnesium acetate, ammonium nitrate, ammonium sulfate, and blends thereof, optionally including urea.

Embodiment 75. The method of 71, wherein the liquid water comprises water from a natural or man-made body of water.

Embodiment 76. The method of embodiment 75, wherein the natural body of water is a pond, lake, river, ocean or sea.

Embodiment 77. A method for increasing the operating efficiency of a wind turbine comprising applying to one or more surfaces of the turbine one or more phase change materials, wherein the phase change materials have a melting point above the temperature at which water condenses on the surface.

Embodiment 78. The method of embodiment 77 wherein the one or more phase change materials partially or fully changes to a liquid state at an interface between the one or more phase change materials and water condensing on the surface.

Embodiment 79. The method of 78 wherein the partially or fully melted phase change material acts as a lubricant for the water condensing on the surface decreasing adhesion of the water to the surface.

Embodiment 80. The method of embodiment 77, wherein the one or more phase change materials is as further described in any of embodiments 2-35.

Embodiment 81. A method for increasing the operating efficiency of a steam turbine comprising applying to one or more surfaces of the turbine one or more phase change materials, wherein the phase change materials have a melting point above the temperature at which water condenses on the surface.

Embodiment 82. The method of embodiment 81 wherein the one or more phase change materials partially or fully changes to a liquid state at an interface between the one or more phase change materials and water condensing on the surface.

Embodiment 83. The method of 82 wherein the partially or fully melted phase change material acts as a lubricant for water condensing on the surface decreasing adhesion of the water to the surface.

Embodiment 84. The method of embodiment 81, wherein the one or more phase change materials makes direct full contact with the water at an interface between the one or more phase change materials and the water.

Embodiment 85. The method of embodiment 81, wherein the one or more phase change materials makes direct partial contact with the water at an interface between the one or more phase change materials and the water.

Embodiment 86. The method of any of embodiments 81-85, wherein the one or more phase change materials is supported entirely by the surface.

Embodiment 87. The method of any of embodiments 81-85, wherein the one or more phase change materials is incorporated within one or more structures or textures on the surface.

Embodiment 88. The method of embodiment 81, wherein the one or more phase change materials is encapsulated within a secondary solid material that is in contact with the water such that the secondary solid material prevents a direct contact between the water and the one or more phase change materials.

Embodiment 89. The method of any of embodiments 81-88, wherein one or more of the phase change materials is immiscible with water.

Embodiment 90. The method of any of embodiments 81-88, wherein one or more of the phase change materials is miscible with water.

Embodiment 91. The method of any of embodiments 81-90, wherein the phase change materials comprise a mixture of two or more phase change materials.

Embodiment 92. The method of embodiment 91, wherein the two or more phase change materials are miscible in one another.

Embodiment 93. The method of embodiment 91, wherein the two or more phase change materials are immiscible with one another.

Embodiment 94. The method of embodiment 93, wherein the mixture is stabilized by one or more surfactants, emulsifiers or nanoparticles, or a combination thereof.

Embodiment 95. The method of embodiment 91, wherein at least one phase change material is miscible with water, and at least one phase change material is immiscible with water.

Embodiment 96. The method of any of embodiments 93-95, wherein the mixture is in the form of a solid at the temperature at which water condenses on the surface, a liquid, an emulsion or a blend.

Embodiment 97. The method of any of embodiments 93-95, wherein the mixture is in the form of a eutectic mixture.

Embodiment 98. The method of any of embodiments 81-97, wherein the one or more phase change materials are each in a phase that has a melting point above a temperature at which water condenses on the surface.

Embodiment 99. The method of embodiment 98, wherein the one or more phase change materials are each in a phase that has a melting point in the range of 100° C. to 130° C., e.g., 100° C. to 125° C., or 100° C. to 120° C., or 100° C. to 115° C., or 105° C. to 130° C., or 105° C. to 125° C., or 105° C. to 120° C., or 105° C. to 115° C., or 110° C. to 130° C., or 110° C. to 125° C., or 110° C. to 120° C., or 115° C. to 130° C., or 115° C. to 125° C.

Embodiment 100. The method of any of embodiments 81-99, wherein the one or more phase change materials forms one or more layers on the surface with an average roughness of ≤1 micron and a Z-roughness of ≤1 micron.

Embodiment 101. The method of any of embodiments 81-100, wherein the one or more phase change materials form one or more layers on the surface with an average roughness of >1 micron and a Z-roughness of >1 micron.

Embodiment 102. The method of embodiment 81, wherein the one or more phase change materials comprise materials that satisfy a relationship characterized by $(P_a+P_{Lw})t_m=Q_c+(P_c+P_{Lc})t_m$, wherein Pa represents convective heat from air, PLw represents water latent heat of fusion, tm represents time to heat and melt a layer of phase change material of thickness e, Qc represents a sensitive heat of a phase change material represented by $Q_c=\pi eR^2\rho_{cs}C_{p,cs}(T_m-T_c)$, Pc represents convective heat from a surface to which one or more phase change materials are applied and PLc is phase change material latent heat of fusion.

Embodiment 103. The method of embodiment 102, wherein the one or more phase change materials forms one or more layers on the surface wherein the one or more layers exhibits an average inter-droplet distance ($L_{avg}$) to droplet size ratio ($D_{avg}$) of >1.3.

Embodiment 104. The method of either of embodiments 102 or 103, wherein the one or more phase change materials forms one or more layers on the surface wherein the one or more layers exhibits an average inter-droplet distance ($L_{avg}$) of >80 microns.

Embodiment 105. The method of any of embodiments 81-104, wherein the one or more phase change materials forms one or more layers on the surface wherein the one or more layers exhibits a bridging parameter <1.

Embodiment 106. The method of any of embodiments 1, 36, 40, or 66, wherein the surface comprises one or more surfaces of a motorized or non-motorized vehicle.

Embodiment 107. The method of embodiment 106, wherein the vehicle comprises aircraft.

Embodiment 108. The method of embodiment 106, wherein the vehicle comprises watercraft.

Embodiment 109. The method of embodiment 106, wherein the vehicle comprises a land-going vehicle.

Embodiment 110. The method of embodiment 109, wherein the land-going vehicle comprises one or more wheels or tracks.

Embodiment 111. The method of any of embodiments 1, 36, 40, or 66, wherein the surface comprises one or more surfaces of a power transmission line.

Embodiment 112. The method of any of embodiments 1, 36, 40, or 66, wherein the surface comprises one or more surfaces of a plant susceptible to frost damage.

Embodiment 113. The method of any of embodiments 1-112, wherein the phase change material is incorporated within a polymer network.

Embodiment 114. The method of embodiment 113, wherein the polymer network is an organohydrogel.

Embodiment 115. The method of embodiment 114, wherein the organohydrogel comprises gelatin.

Embodiment 116. The method of embodiment 115 wherein the organohydrogel comprises gelatin, and the phase change material comprises DMSO.

Embodiment 117. A deicing or anti-icing composition comprising one or more phase change materials.

Embodiment 118. The composition of embodiment 117 further comprising one or more solvents, diluents, thickeners, surfactants, polymers, nanoparticles, pigments, carriers, biologically active ingredients or emulsifiers.

Embodiment 119. The composition of embodiment 118, wherein the composition is a paint.

Embodiment 120. The composition of embodiment 118, wherein the composition is a pesticide.

Embodiment 121. The composition of embodiment 118, wherein the composition is a solid at ≤0° C., or a liquid, a blend, or an emulsion.

Embodiment 122. The composition of embodiment 118, wherein the phase change material is immiscible with water.

Embodiment 123. The composition of embodiment 122, wherein the phase change material is selected from cyclohexane, peanut oil, corn oil, eucalyptol, 1-phenyl dodecane, phenyl-cyclohexane, fennel oil, 2'-hydroxy-acetophenone, ethyl cinnamate, octanoic acid, anise oil, cyclo-hexanol, cyclo-octane, pentadecane, hexadecane, tetradecane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, nitrobenzene, bicyclohexyl, and cyclohexylbenzene.

Embodiment 124. The composition of embodiment 118, wherein the phase change material is miscible with water.

Embodiment 125. The composition of embodiment 124, wherein the phase change material is selected from DMSO, 1-bromonaphthalene, ethylenediamine, ethanolamine, formamide, and glycerol.

Embodiment 126. The composition of embodiment 117, wherein the phase change materials comprise a mixture of two or more phase change materials.

Embodiment 127. The composition of embodiment 117, wherein the phase change materials are miscible in one another.

Embodiment 128. The composition of embodiment 117, wherein the phase change materials further comprising one or more deicing liquids.

Embodiment 129. The composition of embodiment 128, wherein the one or more deicing liquids comprises a freezing point depressant.

Embodiment 130. The composition of embodiment 129, wherein the freezing point depressant comprises a glycol-based fluid.

Embodiment 131. The composition of embodiment 130, wherein the glycol-based fluid comprises one or more of propylene glycol, ethylene glycol and diethylene glycol.

Embodiment 132. The composition of any of embodiments 128-131, wherein the deicing liquid further comprises one or more additives.

Embodiment 133. The composition of embodiment 132, wherein the one or more additives comprise benzotriazole and methyl-substituted benzotriazoles, alkylphenols and alkylphenol ethoxylates, triethanolamine, high molecular weight, nonlinear polymers and dyes.

Embodiment 134. The composition of any of embodiments 128-133, wherein the deicing liquids have a melting point below the freezing point of water, provided that the phase change materials comprise greater than 50% by weight of the mixture.

Embodiment 135. The composition of embodiment 117, wherein the phase change materials are immiscible with one another and the mixture is stabilized by one or more surfactants, polymers, emulsifiers or nanoparticles, or a combination thereof.

Embodiment 136. The composition of embodiment 117, wherein the phase change materials comprise a mixture of water miscible and water immiscible phase change materials.

Embodiment 137. The composition of either of embodiments 135 or 137, wherein the mixture further comprises one or more water miscible deicing liquids.

Embodiment 138. The composition of embodiment 137, wherein the mixture is in the form of an emulsion, blend or eutectic mixture.

Embodiment 139. The composition of any of embodiments 117-138, wherein the phase change materials are substantially transparent when deposited on a surface.

Embodiment 140. The composition of embodiment 139, wherein the substantially transparent phase change materials exhibit a total transmittance in the range of 50% to 100%, e.g., 50% to 100%, 55% to 100%, 60% to 100%, m 65% to 100%, 70% to 100%, 75% to 100%, 80% to 100%, 85% to 100%, 90% to 100%, 95% to 100%, 96% to 100%, 97% to 100%, 98% to 100%, or 99% to 100%.

Embodiment 141. The composition of any of embodiments 117-138, wherein when deposited on a surface, the composition spontaneously self-heals mechanical damage to the composition in the presence of water condensation.

Embodiment 142. The composition of embodiment 141, wherein the mechanical damage is in a size range of 1 nm to 10 mm in any dimension, e.g., 1 nm to 5 mm, or 1 nm to 1 mm, or 1 nm to 500 microns, or 1 nm to 100 microns, or 1 nm to 50 microns, or 1 nm to 10 microns, or 1 nm to 5 microns, or 1 nm to 1 micron, or 1 nm to 500 nm, or 1 nm to 100 nm.

Embodiment 143. The composition of any of embodiments 117-142, wherein the phase change material is incorporated within a polymer network.

Embodiment 144. The composition of embodiment 143, wherein the polymer network is an organohydrogel.

Embodiment 145. The composition of embodiment 144, wherein the organohydrogel comprises gelatin.

Embodiment 146. The composition of embodiment 144 wherein the organohydrogel comprises gelatin, and the phase change material comprises DMSO.

Embodiment 147. The method of embodiment 18, wherein the one or more phase change materials are mixed with the composition of any of embodiments 117-146.

Embodiment 144. The method of any of embodiments 1-41, wherein the one or more phase change materials comprises the composition of embodiment 117.

Embodiment 145. The method of any of embodiments 1-41, wherein the one or more phase change materials comprises the composition of embodiment 118.

Embodiment 146. The method of any of embodiments 1-41, wherein the one or more phase change materials comprises the composition of embodiment 119.

Embodiment 147. The method of any of embodiments 1-41, wherein the one or more phase change materials comprises the composition of embodiment 120.

Embodiment 148. The method of any of embodiments 1-41, wherein the one or more phase change materials comprises the composition of embodiment 121.

Embodiment 149. The method of any of embodiments 1-41, wherein the one or more phase change materials comprises the composition of embodiment 122.

Embodiment 150. The method of any of embodiments 1-41, wherein the one or more phase change materials comprises the composition of embodiment 123.

Embodiment 151. The method of any of embodiments 1-41, wherein the one or more phase change materials comprises the composition of embodiment 124.

Embodiment 152. The method of any of embodiments 1-41, wherein the one or more phase change materials comprises the composition of embodiment 125.

Embodiment 153. The method of any of embodiments 1-41, wherein the one or more phase change materials comprises the composition of embodiment 126.

Embodiment 154. The method of any of embodiments 1-41, wherein the one or more phase change materials comprises the composition of embodiment 127.

Embodiment 155. The method of any of embodiments 1-41, wherein the one or more phase change materials comprises the composition of embodiment 128.

Embodiment 156. The method of any of embodiments 1-41, wherein the one or more phase change materials comprises the composition of embodiment 129.

Embodiment 157. The method of any of embodiments 1-41, wherein the one or more phase change materials comprises the composition of embodiment 130.

Embodiment 158. The method of any of embodiments 1-41, wherein the one or more phase change materials comprises the composition of embodiment 131.

Embodiment 159. The method of any of embodiments 1-41, wherein the one or more phase change materials comprises the composition of embodiment 132.

Embodiment 160. The method of any of embodiments 1-41, wherein the one or more phase change materials comprises the composition of embodiment 133.

Embodiment 161. The method of any of embodiments 1-41, wherein the one or more phase change materials comprises the composition of embodiment 134.

Embodiment 162. The method of any of embodiments 1-41, wherein the one or more phase change materials comprises the composition of embodiment 135.

Embodiment 163. The method of any of embodiments 1-41, wherein the one or more phase change materials comprises the composition of embodiment 136.

Embodiment 160. The method of any of embodiments 1-41, wherein the one or more phase change materials comprises the composition of embodiment 137.

Embodiment 161. The method of any of embodiments 1-41, wherein the one or more phase change materials comprises the composition of embodiment 138.

Embodiment 162. The method of any of embodiments 1-116, wherein the one or more phase change materials applied to the surface has a thickness in the range of 0.1 micron to 10 mm, e.g., 0.1 micron to 7.5 mm, or 0.1 micron to 5 mm, or 0.1 micron to 2.5 mm, or 0.1 micron to 1 mm, or 0.1 micron to 750 microns, or 0.1 micron to 500 microns, or 0.1 micron to 250 microns, or 0.1 micron to 100 microns, or 0.1 micron to 75 microns, or 0.1 micron to 500 microns, or 0.1 micron to 250 microns, or 0.1 micron to 100 microns, or 0.1 micron to 75 microns, or 0.1 micron to 50 microns, or 0.1 micron to 25 microns, or 0.1 micron to 10 microns, or 0.1 micron to 7.5 microns, or 0.1 micron to 5 microns, or 0.1 micron to 2.5 microns, or 0.1 micron to 1 micron, or 0.2 micron to 10 mm, 0.2 micron to 7.5 mm, or 0.2 micron to 5 mm, or 0.2 micron to 2.5 mm, or 0.2 micron to 1 mm, or 0.2 micron to 750 microns, or 0.2 micron to 500 microns, or 0.2 micron to 250 microns, or 0.2 micron to 100 microns, or 0.2 micron to 75 microns, or 0.2 micron to 500 microns, or 0.2 micron to 250 microns, or 0.2 micron to 100 microns, or 0.2 micron to 75 microns, or 0.2 micron to 50 microns, or 0.2 micron to 25 microns, or 0.2 micron to 2.5 microns, or 0.5 micron to 10 mm, 0.5 micron to 7.5 mm, or 0.5 micron to 5 mm, or 0.5 micron to 2.5 mm, 0.5 micron to 1 mm, or 0.5 micron to 750 microns, or 0.5 micron to 500 microns, or 0.5 micron to 250 microns, or 0.5 micron to 100 microns, or 0.5 micron to 75 microns, or 0.5 micron to 500 microns, or 0.5 micron to 250 microns, or 0.5 micron to 100 microns, or 0.5 micron to 75 microns, or 0.5 micron to 50 microns, or 0.5 micron to 25 microns, or 1 micron to 10 mm, 1 micron to 7.5 mm, or 1 micron to 5 mm, or 1 micron to 2.5 mm, or 1 micron to 1 mm, or 1 micron to 750 microns, or 1 microns to 500 microns, or 1 micron to 250 microns, or 1 micron to 100 microns, or 1 micron to 75 microns, or 1 micron to 50 microns, or 1 micron to 25 microns, or 1 micron to 10 microns, or 2 microns to 10 mm, 2 microns to 7.5 mm, or 2 microns to 5 mm, or 2 microns to 2.5 mm, or 2 microns to 1 mm, or 2 microns to 750 microns, or 2 microns to 500 microns, or 2 microns to 250 microns, or 2 microns to 100 microns, or 2 microns to 75 microns, or 2 microns to 50 microns, or 2 microns to 25 microns, or 2 microns to 10 microns, or 5 microns to 10 mm, 5 microns to 7.5 mm, or 5 microns to 5 mm, or 5 microns to 2.5 mm, or 5 microns to 1 mm, or 5 microns to 750 microns, or 5 microns to 500 microns, or 5 microns to 250 microns, or 5 microns to 100 microns, or 5 microns to 75 microns, or 5 microns to 50 microns, or 5 microns to 25 microns, or 5 microns to 10 microns, or 10 microns to 10 mm, 10 microns to 7.5 mm, or 10 microns to 5 mm, or 10 microns to 2.5 mm, or 10 microns to 1 mm, or 10 microns to 750 microns, or 10 microns to 500 microns, or 10 microns to 250 microns, or 10 microns to 100 microns, or 10 microns to 75 microns, or 10 microns to 50 microns, or 10 microns to 25 microns, or 25 microns to 10 mm, 25 microns to 7.5 mm, or 25 microns to 5 mm, or 25 microns to 2.5 mm, or 25 microns to 1 mm, or 25 microns to 750 microns, or 25 microns to 500 microns, or 25 microns to 250 microns, or 25 microns to 100 microns, or 25 microns to 75 microns, or 25 microns to 50 microns, or 50 micron to 10 mm, 50 microns to 7.5 mm, or 50 microns to 5 mm, or 50 microns to 2.5 mm, or 50 microns to 1 mm, or 50 microns to 750 microns, or 50 microns to 500 microns, or 50 microns to 250 microns, or 50 microns to 100 microns, or 50 microns to 75 microns, or 100 microns to 10 mm, 100 microns to 7.5 mm, or 100 microns to 5 mm, or 100 microns to 2.5 mm, or 100 microns to 1 mm, or 100 microns to 750 microns, or 100 microns to 500 microns, or 100 microns to 250 microns, or 250 microns to 10 mm, 250 microns to 7.5 mm, or 250 microns to 5 mm, or 250 microns to 2.5 mm, or 250 microns to 1 mm, or 250 microns to 750 microns, or 250 microns to 500 microns, or 500 microns to 10 mm, or 500 microns to 7.5 mm, or 500 microns to 5 mm, or 500 microns to 2.5 mm, or 500 microns to 1 mm, or 500 microns to 750 microns, or 750 microns to 10 mm, or 750 microns to 7.5 mm, or 750 microns to 5 mm, or 750 microns to 2.5 mm, or 750 microns to 1 mm, or 1 mm to 10 mm, or 1 mm to 7.5 mm, or 1 mm to 5 mm, or 1 mm to 2.5 mm, or 2.5 mm to 10 mm, or 2.5 mm to 7.5 mm, or 2.5 mm to 5 mm, or 5 mm to 10 mm, or 5 mm to 7.5 mm.

Embodiment 163. The method of any of embodiments 139-161, wherein the one or more phase change materials applied to the surface have a thickness in the range of 0.1 micron to 10 mm, e.g., 0.1 micron to 7.5 mm, or 0.1 micron to 5 mm, or 0.1 micron to 2.5 mm, or 0.1 micron to 1 mm, or 0.1 micron to 750 microns, or 0.1 micron to 500 microns, or 0.1 micron to 250 microns, or 0.1 micron to 100 microns, or 0.1 micron to 75 microns, or 0.1 micron to 500 microns, or 0.1 micron to 250 microns, or 0.1 micron to 100 microns, or 0.1 micron to 75 microns, or 0.1 micron to 50 microns, or 0.1 micron to 25 microns, or 0.1 micron to 10 microns, or 0.1 micron to 7.5 microns, or 0.1 micron to 5 microns, or 0.1 micron to 2.5 microns, or 0.1 micron to 1 micron, or 0.2 micron to 10 mm, 0.2 micron to 7.5 mm, or 0.2 micron to 5 mm, or 0.2 micron to 2.5 mm, or 0.2 micron to 1 mm, or 0.2 micron to 750 microns, or 0.2 micron to 500 microns, or 0.2 micron to 250 microns, or 0.2 micron to 100 microns, or 0.2 micron to 75 microns, or 0.2 micron to 500 microns, or 0.2 micron to 250 microns, or 0.2 micron to 100 microns, or 0.2 micron to 75 microns, or 0.2 micron to 50 microns, or 0.2 micron to 25 microns, or 0.2 micron to 2.5 microns, or 0.5 micron to 10 mm, 0.5 micron to 7.5 mm, or 0.5 micron to 5 mm, or 0.5 micron to 2.5 mm, 0.5 micron to 1 mm, or 0.5 micron to 750 microns, or 0.5 micron to 500 microns, or 0.5 micron to 250 microns, or 0.5 micron to 100 microns, or 0.5 micron to 75 microns, or 0.5 micron to 500 microns, or 0.5 micron to 250 microns, or 0.5 micron to 100 microns, or 0.5 micron to 75 microns, or 0.5 micron to 50 microns, or 0.5 micron to 25 microns, or 1 micron to 10 mm, 1 micron to 7.5 mm, or 1 micron to 5 mm, or 1 micron to 2.5 mm, or 1 micron to 1 mm, or 1 micron to 750 microns, or 1 microns to 500 microns, or 1 micron to 250 microns, or 1 micron to 100 microns, or 1 micron to 75 microns, or 1 micron to 50 microns, or 1 micron to 25 microns, or 1 micron to 10 microns, or 2 microns to 10 mm, 2 microns to 7.5 mm, or 2 microns to 5 mm, or 2 microns to 2.5 mm, or 2 microns to 1 mm, or 2 microns to 750 microns, or 2 microns to 500 microns, or 2 microns to 250 microns, or 2 microns to 100 microns, or 2 microns to 75 microns, or 2 microns to 50 microns, or 2 microns to 25 microns, or 2 microns to 10 microns, or 5 microns to 10 mm, 5 microns to 7.5 mm, or 5 microns to 5 mm, or 5 microns to 2.5 mm, or 5 microns to 1 mm, or 5 microns to 750 microns, or 5 microns to 500 microns, or 5 microns to 250 microns, or 5 microns to 100 microns, or 5 microns to 75 microns, or 5 microns to 50 microns, or 5 microns to 25 microns, or 5 microns to 10 microns, or 10 microns to 10 mm, 10 microns to 7.5 mm, or 10 microns to 5 mm, or 10 microns to 2.5 mm, or 10 microns to 1 mm, or 10 microns to 750 microns, or 10 microns to 500 microns, or 10 microns to 250 microns, or 10 microns to 100 microns, or 10 microns to 75 microns, or 10 microns to 50 microns, or 10 microns to 25 microns, or 25 microns to 10 mm, 25 microns to 7.5 mm, or 25 microns to 5 mm, or 25 microns to 2.5 mm, or 25 microns to 1 mm, or 25 microns to 750 microns, or 25 microns to 500 microns, or 25 microns to 250 microns, or 25 microns to 100 microns, or 25 microns to 75 microns, or 25 microns to 50 microns, or 50 micron to 10 mm, 50 microns to 7.5 mm, or 50 microns to 5 mm, or 50 microns to 2.5 mm, or 50 microns to 1 mm, or 50 microns to 750 microns, or 50 microns to 500 microns, or 50 microns to 250 microns, or 50 microns to 100 microns, or 50 microns to 75 microns, or 100 microns to 10 mm, 100 microns to 7.5 mm, or 100 microns to 5 mm, or 100 microns to 2.5 mm, or 100 microns to 1 mm, or 100 microns to 750 microns, or 100 microns to 500 microns, or 100 microns to 250 microns, or 250 microns to 10 mm, 250 microns to 7.5 mm, or 250 microns to 5 mm, or 250 microns to 2.5 mm, or 250 microns to 1 mm, or 250 microns to 750 microns, or 250 microns to 500 microns, or 500 microns to 10 mm, or 500 microns to 7.5 mm, or 500 microns to 5 mm, or 500 microns to 2.5 mm, or 500 microns to 1 mm, or 500 microns to 750 microns, or 750 microns to 10 mm, or 750 microns to 7.5 mm, or 750 microns to 5 mm, or 750 microns to 2.5 mm, or 750 microns to 1 mm, or 1 mm to 10 mm, or 1 mm to 7.5 mm, or 1 mm to 5 mm, or 1 mm to 2.5 mm, or 2.5 mm to 10 mm, or 2.5 mm to 7.5 mm, or 2.5 mm to 5 mm, or 5 mm to 10 mm, or 5 mm to 7.5 mm.

Embodiment 164. The composition of any of embodiments 117-146, wherein when applied to a surface the one or more phase change materials applied to the surface have a thickness in the range of 0.1 micron to 10 mm, e.g., 0.1 micron to 7.5 mm, or 0.1 micron to 5 mm, or 0.1 micron to 2.5 mm, or 0.1 micron to 1 mm, or 0.1 micron to 750 microns, or 0.1 micron to 500 microns, or 0.1 micron to 250 microns, or 0.1 micron to 100 microns, or 0.1 micron to 75 microns, or 0.1 micron to 500 microns, or 0.1 micron to 250 microns, or 0.1 micron to 100 microns, or 0.1 micron to 75 microns, or 0.1 micron to 50 microns, or 0.1 micron to 25 microns, or 0.1 micron to 10 microns, or 0.1 micron to 7.5 microns, or 0.1 micron to 5 microns, or 0.1 micron to 2.5 microns, or 0.1 micron to 1 micron, or 0.2 micron to 10 mm, 0.2 micron to 7.5 mm, or 0.2 micron to 5 mm, or 0.2 micron to 2.5 mm, or 0.2 micron to 1 mm, or 0.2 micron to 750 microns, or 0.2 micron to 500 microns, or 0.2 micron to 250 microns, or 0.2 micron to 100 microns, or 0.2 micron to 75 microns, or 0.2 micron to 500 microns, or 0.2 micron to 250 microns, or 0.2 micron to 100 microns, or 0.2 micron to 75 microns, or 0.2 micron to 50 microns, or 0.2 micron to 25 microns, or 0.2 micron to 2.5 microns, or 0.5 micron to 10 mm, 0.5 micron to 7.5 mm, or 0.5 micron to 5 mm, or 0.5 micron to 2.5 mm, 0.5 micron to 1 mm, or 0.5 micron to 750 microns, or 0.5 micron to 500 microns, or 0.5 micron to 250 microns, or 0.5 micron to 100 microns, or 0.5 micron to 75 microns, or 0.5 micron to 500 microns, or 0.5 micron to 250 microns, or 0.5 micron to 100 microns, or 0.5 micron to 75 microns, or 0.5 micron to 50 microns, or 0.5 micron to 25 microns, or 1 micron to 10 mm, 1 micron to 7.5 mm, or 1 micron to 5 mm, or 1 micron to 2.5 mm, or 1 micron to 1 mm, or 1 micron to 750 microns, or 1 microns to 500 microns, or 1 micron to 250 microns, or 1 micron to 100 microns, or 1 micron to 75 microns, or 1 micron to 50 microns, or 1 micron to 25 microns, or 1 micron to 10 microns, or 2 microns to 10 mm, 2 microns to 7.5 mm, or 2 microns to 5 mm, or 2 microns to 2.5 mm, or 2 microns to 1 mm, or 2 microns to 750 microns, or 2 microns to 500 microns, or 2 microns to 250 microns, or 2 microns to 100 microns, or 2 microns to 75 microns, or 2 microns to 50 microns, or 2 microns to 25 microns, or 2 microns to 10 microns, or 5 microns to 10 mm, 5 microns to 7.5 mm, or 5 microns to 5 mm, or 5 microns to 2.5 mm, or 5 microns to 1 mm, or 5 microns to 750 microns, or 5 microns to 500 microns, or 5 microns to 250 microns, or 5 microns to 100 microns, or 5 microns to 75 microns, or 5 microns to 50 microns, or 5 microns to 25 microns, or 5 microns to 10 microns, or 10 microns to 10 mm, 10 microns to 7.5 mm, or 10 microns to 5 mm, or 10 microns to 2.5 mm, or 10 microns to 1 mm, or 10 microns to 750 microns, or 10 microns to 500 microns, or 10 microns to 250 microns, or 10 microns to 100 microns, or 10 microns to 75 microns, or 10 microns to 50 microns, or 10 microns to 25 microns, or 25 microns to 10 mm, 25 microns to 7.5 mm, or 25 microns to 5 mm, or 25 microns to 2.5 mm, or 25 microns to 1 mm, or 25 microns to 750 microns, or 25 microns to 500 microns, or 25 microns to 250 microns, or 25 microns to 100 microns, or 25 microns to 75 microns, or 25 microns to 50 microns, or 50 micron to 10 mm, 50 microns to 7.5 mm, or 50 microns to 5 mm, or 50 microns to 2.5 mm, or 50 microns to 1 mm, or 50 microns to 750 microns, or 50 microns to 500 microns, or 50 microns to 250 microns, or 50 microns to 100 microns, or 50 microns to 75 microns, or 100 microns to 10 mm, 100 microns to 7.5 mm, or 100 microns to 5 mm, or 100 microns to 2.5 mm, or 100 microns to 1 mm, or 100 microns to 750 microns, or 100 microns to 500 microns, or 100 microns to 250 microns, or 250 microns to 10 mm, 250 microns to 7.5 mm, or 250 microns to 5 mm, or 250 microns to 2.5 mm, or 250 microns to 1 mm, or 250 microns to 750 microns, or 250 microns to 500 microns, or 500 microns to 10 mm, or 500 microns to 7.5 mm, or 500 microns to 5 mm, or 500 microns to 2.5 mm, or 500 microns to 1 mm, or 500 microns to 750 microns, or 750 microns to 10 mm, or 750 microns to 7.5 mm, or 750 microns to 5 mm, or 750 microns to 2.5 mm, or 750 microns to 1 mm, or 1 mm to 10 mm, or 1 mm to 7.5 mm, or 1 mm to 5 mm, or 1 mm to 2.5 mm, or 2.5 mm to 10 mm, or 2.5 mm to 7.5 mm, or 2.5 mm to 5 mm, or 5 mm to 10 mm, or 5 mm to 7.5 mm.

While the invention has been described in terms of various embodiments, it is understood that variations and modifications will occur to those skilled in the art. Therefore, it is intended that the appended embodiments cover all such equivalent variations that come within the scope of the invention as embodimented. In addition, the section headings used herein are for organizational purposes only and are not to be construed as limiting the subject matter described.

All references described in this application are expressly incorporated by reference hereon in their entirety.

What is claimed is:

1. A method for inhibiting the formation of ice on a surface, the method comprising applying to the surface one or more phase change materials, wherein the one or more phase change materials have a melting point in the range of 0° C. to 30° C., and wherein the phase change materials are selected from the group consisting of cyclohexane, peanut oil, corn oil, eucalyptol, 1-phenyl dodecane, phenyl-cyclohexane, fennel oil, 2'-hydroxy-acetophenone, ethyl cinnamate, anise oil, cyclo-octane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, bicyclohexyl, DMSO, 1-bromonaphthalene, ethylenediamine, and formamide, wherein the one or more phase change materials are incorporated within a layer of a polymer; and wherein the polymer is an organohydrogel.

2. The method of claim 1, wherein the method further comprises, after applying to the surface the one or more phase change materials, allowing water to be disposed on the surface, and allowing the surface to reach a temperature of 0° C. or colder while the water is disposed thereon, the inhibition of the formation of ice comprising delaying the freezing of the water.

3. The method of claim 1, wherein the organohydrogel comprises gelatin.

4. The method of claim 1, wherein the surface comprises one or more surfaces of a motorized or non-motorized vehicle.

5. The method of claim 1, wherein the phase change materials are DMSO and cyclo-octane; and wherein the composition further comprises one or more polymers.

6. A deicing or anti-icing composition comprising:

a layer of a polymer; and incorporated within the layer of the polymer, one or more phase change materials, wherein the one or more phase change materials have a melting point in the range of 0-30° C., wherein the phase change material is DMSO; and wherein the polymer is an organohydrogel comprising gelatin.

7. The composition of claim 6, further comprising one or more solvents, diluents, thickeners, surfactants, polymers, nanoparticles, pigments, carriers, biologically active ingredients, or emulsifiers.

8. The composition of claim 6 disposed as a layer on a surface, wherein the composition is disposed on the surface in an amount such that the layer has a thickness in the range of 100 micron to 10 mm.

9. The composition of claim 6, wherein when deposited on a surface, the composition spontaneously self-heals mechanical damage to the composition in the presence of water condensation.

10. The composition of claim 6, wherein the composition does not comprise a glycol-based fluid.

11. A method for inhibiting the formation of ice on a surface, the method comprising providing the composition of claim 6 as a layer on the surface.

12. A deicing or anti-icing composition comprising:

a layer of a polymer; and incorporated within the layer of the polymer, one or more phase change materials, wherein the one or more phase change materials have a melting point in the range of 0-30° C., wherein the polymer is a copolymer of ethylene glycol and propylene glycol.

13. The composition of claim 12, wherein the polymer is a block copolymer of ethylene glycol and propylene glycol.

14. The composition of claim 13, wherein the phase change materials are selected from the group consisting of cyclohexane, peanut oil, corn oil, eucalyptol, 1-phenyl dodecane, phenyl-cyclohexane, fennel oil, 2'-hydroxy-acetophenone, ethyl cinnamate, anise oil, cyclo-octane, 2-heptyne, n-dodecyl acetate, oleic acid, benzene, nitrobenzene, cyclohexylbenzene, 1,2,3-tribromopropane, 2,2-dimethyl-3-pentanol, hexafluorobenzene, ethylene dibromide, tert-butyl mercaptan, bromoform, diiodomethane, bicyclohexyl, DMSO, 1-bromonaphthalene, ethylenediamine, and formamide.

15. A method for inhibiting the formation of ice on a surface, the method comprising providing the composition of claim 12 as a layer on the surface.

16. A method for inhibiting the formation of ice on a surface, the method comprising providing the composition of claim 13 as a layer on the surface.

* * * * *